(12) United States Patent
Lottmann

(10) Patent No.: US 8,095,908 B2
(45) Date of Patent: *Jan. 10, 2012

(54) METHODS, SYSTEMS AND USER INTERFACE FOR EVALUATING PRODUCT DESIGNS IN LIGHT OF PROMULGATED STANDARDS

(75) Inventor: Todd Francis Lottmann, Washington, MO (US)

(73) Assignee: Cooper Technologies Company, Houston, TX (US)

( * ) Notice: Subject to any disclaimer, the term of this patent is extended or adjusted under 35 U.S.C. 154(b) by 478 days.

This patent is subject to a terminal disclaimer.

(21) Appl. No.: 12/351,489

(22) Filed: Jan. 9, 2009

(65) Prior Publication Data

US 2009/0119628 A1 May 7, 2009

Related U.S. Application Data

(63) Continuation-in-part of application No. 11/622,526, filed on Jan. 12, 2007, now Pat. No. 7,779,371.

(60) Provisional application No. 60/859,624, filed on Nov. 17, 2006.

(51) Int. Cl.
*G06F 17/50* (2006.01)

(52) U.S. Cl. ...................................................... 716/136
(58) Field of Classification Search .................. 716/106, 716/112, 136
See application file for complete search history.

(56) References Cited

U.S. PATENT DOCUMENTS

| 7,779,371 | B2 * | 8/2010 | Lottmann | 716/112 |
| 2004/0130218 | A1 * | 7/2004 | Locke | 307/147 |
| 2005/0197812 | A1 * | 9/2005 | Kolenc et al. | 703/9 |
| 2006/0009959 | A1 * | 1/2006 | Fischer et al. | 703/18 |
| 2008/0120579 | A1 | 5/2008 | Lottmann | |
| 2008/0253052 | A1 * | 10/2008 | Crewson et al. | 361/98 |

* cited by examiner

*Primary Examiner* — Vuthe Siek
(74) *Attorney, Agent, or Firm* — Armstrong Teasdale LLP

(57) ABSTRACT

Interactive, computer implemented systems and methods for analyzing issues raised by promulgated industry standards for complex electrical product and system design. Data and information related to the electrical system and to the promulgated standards of interest are archived in the system databases, and with an intuitive menu driven user interface and graphic displays, interested users may rather quickly evaluate complex product designs for certification with desired promulgated standards applicable to the product and system design.

40 Claims, 96 Drawing Sheets

| | A | B | C | D | | | |
|---|---|---|---|---|---|---|---|
| 1 | | | | | | | |
| 2 | COOPER | | | | | | |
| 3 | Bussmann | | | | | | |
| 4 | | | | | | | |
| 5 | Productivity Through Production | | | | | | |
| 6 | | | | | | | |
| 7 | | | | | | | Report |
| 8 | Component Location | | | | | | Component Ratings from Database |
| 9 | Main | Feeder | Sub-Feeder | Branch | Part Number | Device Description | |
| 10 | S1 | | | | | | |
| 11 | | | | | 1494V-DHX636 | Fused Switch (UL 98 Misc Switches) with Branch Circuit Fuses (UL 248 Fuses) | |
| 12 | | | | | LPJ-35SP | 30 A CLASS J FUSED (60A FUSE CLIP) SWITCH FLANGE-MOUNTED (LEFT SIDE) | |
| 13 | S1 | | | | | CLASS - J | |
| 14 | | | | SB1 | FNQ-R-1 | Branch Circuit Fuses (UL 248 Fuses) in Fuseholder (UL 512 Fuseholder) | |
| 15 | | | | | BC6033B | CLASS - CC | |
| 16 | S1 | | | SB1 | | Fuse Block - Box Lug 3 Pole | |
| 17 | | | | | | Bus Bar System | |
| 18 | S1 | | | SB1 | | Bus Bar | |
| 19 | | | | | | Bus Bar System | |
| 20 | | | | | | Bus Bar | |
| 21 | S1 | F11 | | | | Bus Bar System | |
| 22 | | | | FB111 | | Branch Circuit Fuses (UL 248 Fuses) in Fuseholder (UL 512 Fuseholder) | |
| 23 | | | | | FNQ-R-1 | CLASS - CC | |
| 24 | S1 | F11 | | FB111 | BC6031B | Fuse Block - Box Lug 1 Pole | |
| 25 | | | | | | Bus Bar System | |
| 26 | S1 | F11 | | | | Bus Bar | |
| 27 | | | SF111 | | | Bus Bar System | |
| 28 | | | | | FNQ-R-1 | Branch Circuit Fuses (UL 248 Fuses) in Fuseholder (UL 512 Fuseholder) | |
| 29 | S1 | F11 | SF111 | | BC6031B | CLASS - CC | |
| 30 | S1 | F11 | SF111 | | | Fuse Block - Box Lug 1 Pole | |
| 31 | | | | | | Bus Bar System | |
| 32 | S1 | F11 | SF111 | SFB1111 | FNQ-R-1 | Branch Circuit Fuses (UL 248 Fuses) in Fuseholder (UL 512 Fuseholder) | |
| 33 | | | | | BC6031B | CLASS - CC | |
| 34 | S1 | F11 | SF111 | SFB1111 | | Fuse Block - Box Lug 1 Pole | |
| 35 | | | | | | Bus Bar System | |
| 36 | | | | | | Bus Bar | |
| 37 | | | | | | Short Circuit Current Rating = 10 kA | |

Assembly SCCR Calculator

Project Name: patent
Panel Designation: spec

| Voltage | Ampere | SCCR | Adjusted SCCR | IR | Final SCCR | Comments |
|---|---|---|---|---|---|---|
| 600 V | 30 A | 200 kA | 200 kA | - | 200 kA | |
| 600 V | 35 A | - | | 300 kA | | |
| 600 V | 1 A | - | | 200 kA | | |
| 600 V | 30 A | 200 kA | 200 kA | - | 200 kA | |
| 600 V | - | 10 kA | 10 kA | - | 10 kA | |
| 600 V | - | 10 kA | 10 kA | - | 10 kA | |
| 600 V | - | 10 kA | 10 kA | - | 100 kA | |
| 600 V | 1 A | - | | 200 kA | | |
| 600 V | 30 A | 200 kA | 200 kA | - | 200 kA | SCCR Rating is increased by the Device upstream. |
| 600 V | - | 10 kA | 10 kA | - | 100 kA | |
| 600 V | 1 A | - | | 200 kA | | |
| 600 V | 30 A | 200 kA | 200 kA | - | 200 kA | SCCR Rating is increased by the Device upstream. |
| 600 V | - | 10 kA | 10 kA | - | 100 kA | |
| 600 V | 1 A | - | | 200 kA | | |
| 600 V | 30 A | 200 kA | 200 kA | - | 0 kA | SCCR Rating is increased by the Device upstream. |
| 600 V | - | 10 kA | 10 kA | - | 0 kA | |

| Object | Purpose | Description |
|---|---|---|
| Data Access | List Store procedures Used Single point for database access methods | Factory object to create single Connection to Database |
| Common | | List of Commonly used methods and application Wide variables and Enumerations |
| Application | | Methods and properties used in Presentation Layer |
| UL Rules | | Methods and properties to calculate UL508A standards |
| User Objects | | |
| User | Contains 1 of the Following objects listed below | Methods and Properties For User |
| User Preferences | | Start page and other User preferences |
| User Information | | Company information and address etc |
| User Security | | Methods and properties for security Questions, password Etc |
| User Purchase Plan | | Method and properties for purchase of Subscription |
| Projects and Panels | | |
| Projects | (lists of Project) | Contains methods and properties to get and save list of projects |
| Project | | Contains methods and properties for a single project, would also contain all Panels (see below) for that Project Identifier |
| Panels | (lists of Panel) | Contains methods and properties to get and save lists of panels |
| Panel | | Contains methods and properties for a single panel, would also contain, all panel sections (see below) for that Panel Identifier |
| Panel Sections | (lists of Panel Section) | Contains method and properties to get and save list of panel sections (circuits) |
| Panel Section | | Contains methods and properties for a single circuit would also contain all Components (see below) for that panel Section (circuit) |
| Components | (lists of Component) | Contains methods and properties to get and save a list of components |
| Component | | Contains methods and properties for a single component |

FIG. 45

| UL Change | Change To OSCAR |
|---|---|
| Remote OCPD only on Single Circuits | Remove option for remote OCPD on multiple circuits through use of template selection |
| Let Through Can Not Raise the SCCR of a Feeder Other Device | Remove let through logic from feeder device logic |

UL Changes

FIG. 47

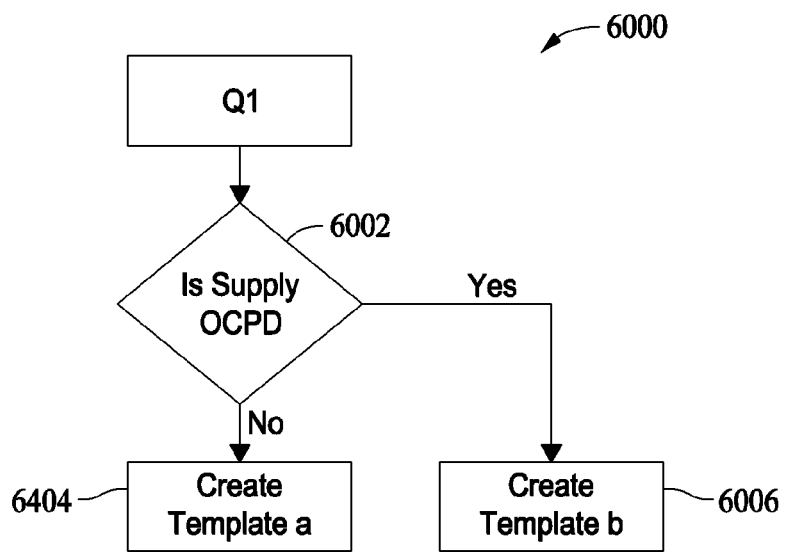

FIG. 60a

| Circuit Type | Device List | No Req. | Comments |
|---|---|---|---|
| Supply | OCPD & Other | Only 1 | Can not be removed |
| Branch | OCPD / Other | Open* | Add / remove |
| Tap | Tap other Devices | Open | Add / remove |
| Feeder | OCPD / Other | Open* | Add / remove |
| Branch | OCPD / Other | Open** | Add / remove |
| Tap | Tap other Devices | Open | Add / remove |
| Sub - Feeder | OCPD / Other*** | Open** | Add / remove |
| Branch | OCPD / Other | Min 1 | Add / remove |
| Tap | Tap other Devices | Open | Add / remove |

FIG. 60b

| Circuit Type | Device List | No Req. | Comments |
|---|---|---|---|
| Remote | OCPD - Remote Supply | Only 1 | Can not be removed |
| Supply | Template 3 - Other | Only 1 | Can not be removed |
| Branch | Other | Min 1 | Add / remove |
| Tap | Tap other Devices* | Open | Add / remove |

With Remote OCPD

| Circuit Type | Device List | No Req. | Comments |
|---|---|---|---|
| Supply | OCPD - Template 3 | Only 1 | Can not be removed |
| Branch | OCPD - Template 3 | Open* | Add / remove |
| Branch | Other | Min 1 | Add / remove |
| Tap | Tap other Devices** | Open | Add / remove |

No Remote (supply is OCPD)
*optional

FIG. 61c

| Circuit Type | Device List | No Req. | Comments |
|---|---|---|---|
| Supply | Other Template 3 | Only 1 | Can not be removed |
| Branch | Other Template 3 | Min 1 | Add / remove |
| Branch | Other | Min 1 | Add / remove |
| Tap | Tap other Devices* | Open | Add / remove |

No Remote (supply is other device)

FIG. 61d

OCPD Lists for Remote OCPD

| Shortname | Remote |
|---|---|
| Fuse | X |
| Fuse in FuseHolder | X* |
| Bus Bar | |
| Circuit Breaker | X |
| MCP | |
| Starter - Self Protected | X |
| Fuse Pullout | X* |
| Fuse Switch | X* |
| GFCI | |
| Magnetic Controller | |
| Magnetic Motor Starter | |
| Mini Fuse | |
| Molded Case switch | |
| Multilug Terminals | |
| Non-Fused Switch Motor | |
| Non-Fused Switch | |
| Not Specified | |
| Overload Relay | |
| PCE - Soft Start | |
| Receptacle | |
| Semiconductor Fuse | X |
| Silicon control Rectifie | |
| Supplementary Protector | |
| Terminal Block - Feeder | |
| Terminal Block - Branch | |
| Terminal Block - Power Distribution | |
| Transformer | |
| Semiconductor Fuseholder | |
| Mini FusesHolder | |

* Comes with OCPD, dealt with as other

FIG. 61e

| Circuit Type | Device List | No Req. | Comments |
|---|---|---|---|
| Remote | OCPD - Remote Supply | Only 1 | |
| Supply | Template 4 - Other | Only 1 | Can not be removed |
| Branch | Other | Min 1 | Add / remove |
| Tap | Tap other Devices* | Min 2 | Add / remove |

With Remote OCPD

FIG. 62a

| Circuit Type | Device List | No Req. | Comments |
|---|---|---|---|
| Supply | OCPD Template 4 | Only 1 | Can not be removed |
| Branch | OCPD Template 4* | Open | Add / remove |
| Branch | Other | Min 1 | Add / remove ** *check* |
| Tap | Tap other Devices** | Min 2 | Add / remove |

No Remoter (supply OCPD)
*optional

FIG. 62b

| Circuit Type | Device List | No Req. | Comments |
|---|---|---|---|
| Supply | Other Template 4 | Only 1 | Can not be removed |
| Branch | OCPD - Template 4* | Min 1 | Add / remove |
| Branch | Other | Min 1 | Add / remove ** *check* |
| Tap | Tap other Devices** | Min 2 | Add / remove |

No Remote (Supply is Other Device)
*optional

FIG. 62c

| Circuit Type | Device List | No Req. | Comments |
|---|---|---|---|
| Remote | OCPD Remote Supply only | Only 1 | Can not be removed |
| Supply | Template 3 - Other | Only 1 | Can not be removed |
| Branch | Other | Open | Add / remove |
| Tap | Tap other Devices* | Only 1 | Can not be removed |

With Remote OCPD

FIG. 63a

| Circuit Type | Device List | No Req. | Comments |
|---|---|---|---|
| Supply | OCPD - Template 3 | Only 1 | Can not be removed |
| Branch | OCPD - Template 3 | Open* | Add / remove |
| Branch | Other | Min 1 | Add / remove |
| Tap | Tap other Devices** | Only 1 | Can not be removed |

No Remote (supply OCPD)
*optional

FIG. 63b

| Circuit Type | Device List | No Req. | Comments |
|---|---|---|---|
| Supply | Other Template 3 | Only 1 | Can not be removed |
| Branch | OCPD Template 3 | Open* | Add / remove |
| Branch | Other | Min 1 | Add / remove |
| Tap | Tap other Devices* | Only 1 | Can not be removed |

No Remote (Supply is Other Device)

FIG. 63c

Icons

| Device Type and Icon | | | |
|---|---|---|---|
| Fuses (UL 248 Fuses) | | Fuses (UL 248 Fuses) in Fuseholder (UL 512 Fuseholder) | |
| Bus Bar System | | Circuit Breaker (UL 489 Circuit Breaker) | |
| Fused Pullout (UL 1429 Pullout Switch) with Fuses (UL 248 Fuses) | | Fuse Switch (UL 98 Misc Switches) with Fuses (UL 248 Fuses) | |
| Manual Motor Starter - MMP (UL 508 Manual Motor Controller) | | GFCI Receptacle (UL 943) | |
| Receptacle (UL 498) | | Magnetic Motor Starter - Contractor with OL Relay (UL 508 Magnetic Controller with OL Relay) | |
| Magnetic Controller - includes definite purpose, lighting, or HP rated contractor | | MCP No device Added (yet) | mcp |
| Molded Case Switch (UL 489 Molded Case Switch) | mcs | Multilug Terminals | |
| Icon not available | h/R | Non-Fused Switch (UL 508 Manual Motor Controller) | mMP |
| Overload Relay (UL 508) | | Power Conversion Equipment - Drive or Soft - Start (UL 508C) | Drive |
| Silicon Control Rectifier (UL 508C) | SCR | Supplementary Protector (UL 1077) | SP |
| Combination Starter with MCP (UL 508 - Combination Motor Controller) | mcp | Combination Starter with Self Protected Starter (UL 508 - Combination Motor Controller) | SPS |
| Non-Fused & Fused SwitchSwitch (UL 98 Misc Switch) | | Terminal Block - Power Dist. Block (UL 1059) Terminal Block-Power Distribution Block (UL 1953) | |
| Manual Motor Starter - MMP (UL 508 Manual Motor Controller) | | Solid State Relay | SSR |
| Transformer (UL 506 or UL 1561) | | Not Specified | ? |
| Miscellaneous or Miniature (UL 248 Fuses) | | Miscellaneous or Miniature (UL 248 Fuses) in Fuseholder (UL 512 Fuseholder) | |
| Semiconductor Fuses (UL 248 Fuses) | | Semiconductor Fuses (UL 248 Fuses) in Fuseholder (UL 512 Fuseholder) | |

FIG. 67

| Look Up Value | Where Clause |
|---|---|
| any Part of field | Like '%xxxx%' |
| whole field | ='xxxx' |
| Start of Field | Like 'xxx%' |

FIG. 68

| Filter Item | Comments |
|---|---|
| Device type | Fuse / Switch etc |
| Manufacture | (a Single Item or "Not Specified") |
| Voltage rating | From Filter list (240/480) |
| Amperes | = XX >XX ≥XX < XX or ≤ XX OR HP Valu |
| Horse power (HP) | = XX >XX ≥XX < XX or ≤ XX |
| SCCR | = XX >XX ≥XX < XX or ≤ XX |
| IR | = XX >XX ≥XX < XX or ≤ XX |

FIG. 69

| Fused Switch | | | |
|---|---|---|---|
| Manufacturer | Cooper Bussmann ▾ | | |
| Description | 30A Class CC Fused Switch ▾ | | |
| Part Number | CFD30CC3 ▾ | | |
| Voltage Rating AC | 600 ▾ | Volts | |
| Ampere Rating | 30 ▾ | Ampere | |
| Horse Power Rating | - ▾ | Hp | |
| S.C.C.R. | 600 ▾ | kA | |
| Interrupting Rating [Ir] | - | kA | |
| I²t Rating | - | A²Sec | |

| Fuse | | |
|---|---|---|
| Cooper Bussmann ▾ | | |
| CLASS - CC ▾ | | |
| CFD30CC3 ▾ | | |
| 600 | Volts | |
| 0 | Ampere | |
| - | Hp | |
| - | kA | |
| 200 | kA | |
| 3000 | A²Sec | |

Multiple Circuit Panel Navigator Layout

| Supply | | | | | |
|---|---|---|---|---|---|
| | (Other in Supply) | | | | |
| | Branch OCPD | | | | |
| | | Device X / Device Y | | | |
| | | Add OCPD | | | |
| | Other | | | | |
| | | Device X / Device Y | | | |
| | | Add Other | | | |
| | Tap | | | | |
| | | Device X / Device Y | | | |
| | | Add Tap | | | |
| | Add Items to Branch | | | | |
| | Feeder OCPD | | | | |
| | | Device X / Device Y | | | |
| | | Add OCPD | | | |
| | Other | | | | |
| | | Device X / Device Y | | | |
| | | Add Other | | | |
| | | Branch OCPD | | | |
| | | | Device X / Device Y | | |
| | | | Add OCPD | | |
| | | Other | | | |
| | | | Device X / Device Y | | |
| | | | Add Other | | |
| | | Other | | | |
| | | | Device X / Device Y | | |
| | | | Add Tap | | |
| | | Add Items to Branch | | | |
| | | Sub-Feeder OCPD | | | |
| | | | Device X | | |
| | | Other | | | |
| | | | Device X / Device Y | | |
| | | | Add Other | | |
| | | | Branch OCPD | | |
| | | | | Device X / Device Y | |
| | | | | Add OCPD | |
| | | | | Other | |
| | | | | | Device X / Device Y |
| | | | | | Add Other |
| | | | | Tap | |
| | | | | | Device X / Device Y |
| | | | | | Add Tap |
| | | Add Items to Sub-feeder | | | |
| | Add Items to Feeder | | | | |
| Add Items to Panel | | | | | |

FIG. 72b

OCPD and Other Device Lists for Multiple Circuits

| Shortname | Supply OCPD | Supply Other | Feeder OCPD | Feeder Other | Subfeeder OCPD | Subfeeder Other | Branch OCPD | Branch Other |
|---|---|---|---|---|---|---|---|---|
| Fuse | X | | X | | X | | X | |
| FuseHolder | X* | | X* | | X* | | X* | |
| Bus Bar | | X | | X | | X | | |
| Circuit Breaker | X | | X | | X | | X | |
| MCP | | | | | | | X | |
| Starter - Self Protected | | | | | | | X | |
| Fuse Pullout | X* | | X* | | X* | | X* | |
| Fuse Switch | X* | | X* | | X* | | X* | |
| GFCI | | | | | | | | X |
| Magnetic Controller | | | | X | | X | | X |
| Magnetic Motor Starter | | | | | | | | X |
| Manual Motor Starter | | | | | | | | X |
| Mini Fuse | | | | | | | | X |
| Molded Case Switch | | X | | X | | X | | X |
| Multilug Terminals | | | | X | | X | | X |
| Non-Fused Switch Motor | | | | | | | | X |
| Non-Fused Switch | | X | | X | | X | | X |
| Not Specified | | | | | | | | |
| Overload Relay | | | | | | | | X |
| PCE - Soft Start | | | | | | | | X |
| Receptacle | | | | | | | | X |
| Semiconductor Fuse | | | | | | | X | X |
| Silicon Control Rectifier | | | | | | | | X |
| Supplementary Protector | | | | | | | | X |
| Terminal Block - Feeder | | X | | X | | X | | X |
| Terminal Block - Branch | | | | | | | | X |
| Terminal Block - Power Distribution | | X | | X | | X | | X |
| Transformer | | | | | | | X | |
| Semiconductor FuseHolder | | | | | | | | |
| Mini FusesHolder | | | | | | | | X |

* Comes with OCPD, dealt with as other

FIG. 72c

Template 3
Single Branch Circuit
Navigator Layout

Template 3
Single Branch Circuit
Navigator Layout

Other Selected in Supply

Template 3
Single Branch Circuit
Navigator Layout

OCPD Selected in Supply

OCPD and Other Device Lists for Template 3

| Shortname | Supply Template3 OCPD | Supply Template3 OTHER |
|---|---|---|
| Fuse | X | |
| FuseHolder | X* | |
| Bus Bar | | |
| Circuit Breaker | X | |
| MCP | X | |
| Starter - Self Protected | X | |
| Fuse Pullout | X* | |
| Fuse Switch | X* | |
| GFCI | | |
| Magnetic Controller | | X |
| Magnetic Motor Starter | | X |
| Manual Motor Starter | | X |
| Mini Fuse | | |
| Molded Case Switch | | X |
| Multilug Terminals | | |
| Non-Fused Switch Motor | | X |
| Non-Fused Switch | | X |
| Not Specified | | |
| Overload Relay | | |
| PCE - Soft Start | | X |
| Receptacle | | |
| Semiconductor Fuse | X | |
| Silicon Control Rectifier | | |
| Supplementary Protector | | |
| Terminal Block - Feeder | | X |
| Terminal Block - Branch | | X |
| Terminal Block - Power Distribution | | X |
| Transformer | | |
| Semiconductor FuseHolder | | |
| Mini FusesHolder | | |

\* Comes with OCPD, dealt with as other

FIG. 74f

Template 4
Group Motor

Other Selected in Supply

Template 4
Group Motor

OCPD Selected in Supply

*Additional OCPDs can be added

OCPD and Other Device Lists for Template 4

| Shortname | Supply Template4 OCPD | Supply Template4 OTHER |
|---|---|---|
| Fuse | X | |
| FuseHolder | X* | |
| Bus Bar | | |
| Circuit Breaker | X | |
| MCP | X | |
| Starter - Self Protected | X | |
| Fuse Pullout | X* | |
| Fuse Switch | X* | |
| GFCI | | |
| Magnetic Controller | | |
| Magnetic Motor Starter | | |
| Manual Motor Starter | | |
| Mini Fuse | | |
| Molded Case Switch | | X |
| Multilug Terminals | | |
| Non-Fused Switch Motor | | X |
| Non-Fused Switch | | X |
| Not Specified | | |
| Overload Relay | | |
| PCE - Soft Start | | |
| Receptacle | | |
| Semiconductor Fuse | X | |
| Silicon Control Rectifier | | |
| Supplementary Protector | | |
| Terminal Block - Feeder | | |
| Terminal Block - Branch | | |
| Terminal Block - Power Distribution | | |
| Transformer | | |
| Semiconductor FuseHolder | | X |
| Mini FusesHolder | | |

* Comes with OCPD, dealt with as other

FIG. 75f

Template 5
Single with BC Tap
OCPD in the Panel and Other in Supply

OCPD and Other Device Lists for Taps

| Shortname | Tap |
|---|---|
| Fuse | X |
| FuseHolder | X |
| Bus Bar | |
| Circuit Breaker | X |
| MCP | |
| Starter - Self Protected | |
| Fuse Pullout | |
| Fuse Switch | X |
| GFCI | X |
| Magnetic Controller | X |
| Magnetic Motor Starter | X |
| Manual Motor Starter | X |
| Mini Fuse | X |
| Molded Case Switch | |
| Multilug Terminals | X |
| Non-Fused Switch Motor | X |
| Non-Fused Switch | |
| Not Specified | |
| Overload Relay | X |
| PCE - Soft Start | X |
| Receptacle | X |
| Semiconductor Fuse | X |
| Silicon Control Rectifier | X |
| Supplementary Protector | X |
| Terminal Block - Feeder | X |
| Terminal Block - Branch | X |
| Terminal Block - Power Distribution | X |
| Transformer | |
| Semiconductor FuseHolder | X |
| Mini FusesHolder | X |

FIG. 76g the system shown in FIG. 1 complies with promulgated standards.

METHODS, SYSTEMS AND USER INTERFACE FOR EVALUATING PRODUCT DESIGNS IN LIGHT OF PROMULGATED STANDARDS

CROSS REFERENCE TO RELATED APPLICATIONS

This application is a continuation-in-part and claims benefit to "Methods, Systems, and User Interface for Evaluating Product Designs In Light of Promulgated Standards," U.S. patent application Ser. No. 11/622,526 filed Jan. 12, 2007 now U.S. Pat. No. 7,779,371, which claims the benefit of U.S. Provisional Patent Application No. 60/859,624 filed Nov. 17, 2006, both of which are hereby fully incorporated herein by reference.

TECHNICAL FIELD

This invention relates generally to product design and evaluation for certification with applicable industry standards, and more particularly, to interactive methods and systems for determining compliance with applicable standards and regulations for interconnected components in an electrical system.

BACKGROUND

Electrical systems typically include a large number of interconnected components. Like other industries, the electrical products industry is subject to standard setting bodies for products in the industry. Standards may be promulgated, for example, to address safety issues, to achieve a desired uniformity in performance characteristics of products and systems made by different manufacturers, and/or to achieve a certain degree of compatibility with other products, devices, and systems. A variety of recognized certification marks may be obtained for products that comply with applicable standards, and obtaining proper certification of products can be significant in the marketplace. Obtaining certification of products, devices and systems, as well as ensuring continuing compliance with promulgated standards, can be challenging in a number of aspects.

SUMMARY

The present invention provides systems and methods that allow users to evaluate a proposed design of interconnected devices in light of an established industry standard. The systems and methods accept information related to the individual components used in the design along with the rules needed to evaluate them. The systems and methods evaluate the design and presents information to the user. The information may be presented to the user in a user friendly method, which may include a graphical format.

Additional features that may be used in the exemplary embodiments include the use of icons to represent the various components. These icons may be manipulated to aid the user in inputting the design.

BRIEF DESCRIPTION OF THE DRAWINGS

FIGS. 4-7 illustrate portions of a flowchart illustrating exemplary navigational and data entry processes utilized by the system shown in FIGS. 2 and 3, wherein:

FIG. 4 illustrates a supply circuit connection data entry processing algorithm;

FIG. 5 illustrates a feeder circuit data entry processing algorithm;

FIG. 6 illustrates a sub-feeder circuit connection data entry processing algorithm; and FIG. 7 illustrates a navigation logic, display and reporting processing algorithm.

FIGS. 8-23 illustrate portions of data analysis processes utilized by the system shown in FIGS. 2 and 3 to analyze the electrical system in light of the promulgated industry standards, wherein:

FIG. 8 illustrates a logon processing algorithm;

FIG. 9 illustrates a project information processing algorithm;

FIG. 10 illustrates a portion of a supply circuit type selection processing algorithm;

FIG. 11 illustrates a supply circuit component selection processing algorithm;

FIG. 12 illustrates a feeder circuit component analysis processing algorithm;

FIG. 13 illustrates the rating adjustment logic processing algorithm shown in FIG. 12;

FIG. 14 illustrates the trans. thru logic algorithm shown in FIG. 12;

FIG. 15 illustrates the let-thru logic algorithm shown in FIG. 12;

FIG. 16 illustrates a branch circuit overcurrent protection device analysis processing algorithm for a first branch circuit;

FIG. 17 illustrates a second branch circuit analysis processing algorithm for another device in the first branch circuit;

FIG. 18 illustrates a branch circuit overcurrent protection device analysis processing algorithm for a second branch circuit;

FIG. 19 illustrates a branch circuit analysis processing algorithm for another device in the second branch circuit;

FIG. 20 illustrates a sub-feeder circuit overcurrent protection device component analysis processing algorithm;

FIG. 21 illustrates another device analysis processing algorithm for a sub-feeder circuit;

FIG. 22 illustrates an overcurrent protection device analysis processing algorithm for a branch circuit connected to the sub-feeder circuit; and FIG. 23 illustrates another component analysis processing algorithm for a branch circuit connected to the sub-feeder circuit.

FIGS. 24-44 illustrate exemplary embodiments of a user interface for the system shown in FIGS. 2 and 3, wherein:

FIG. 24 is an example embodiment of a user interface displaying a logon screen for a user of the system;

FIG. 25 is an example of a user interface displaying a panel information screen for a user of the system;

FIG. 26 is an example of a user interface displaying a supply circuit connection screen for a user of the system;

FIG. 27 is an example of a user interface displaying a supply circuit component selection screen for a user of the system;

FIG. 28 is an example of a user interface displaying a branch circuit connected to supply circuit device selection screen for a user of the system;

FIG. 29 is an example of a user interface displaying a feeder circuit connected to supply circuit screen for a user of the system;

FIG. 30 is an example of a user interface displaying a feeder circuit connected to supply circuit device selection screen for a user of the system;

FIG. 31 is an example of a user interface displaying a branch circuit connected to supply circuit selection screen for a user of the system;

FIG. 32 is an example of a user interface displaying a first branch circuit connected to supply circuit overcurrent protection device selection screen for a user of the system;

FIG. 33 is an example of a user interface displaying another first branch circuit connected to supply circuit device selection screen for a user of the system;

FIG. 34 is an example of a user interface displaying a second branch circuit connected to feeder circuit overcurrent protection device selection screen for a user of the system;

FIG. 35 is an example of a user interface displaying another second branch circuit connected to feeder circuit device selection screen for a user of the system;

FIG. 36 is an example of a user interface displaying a sub-feeder circuit screen for a user of the system;

FIG. 37 is an example of a user interface displaying a sub-feeder circuit connected to feeder circuit overcurrent protection device selection screen for a user of the system;

FIG. 38 is an example of a user interface displaying another sub-feeder circuit connected to feeder circuit device selection screen for a user of the system;

FIG. 39 is an example of a user interface displaying a branch circuit to sub-feeder circuit screen for a user of the system;

FIG. 40 is an example of a user interface displaying a first branch circuit to sub-feeder circuit component selection screen for a user of the system;

FIG. 41 is an example of a user interface displaying a second sub-feeder circuit component selection screen for a user of the system;

FIG. 42 is an example of a user interface displaying a project summary analysis screen;

FIG. 43 is an example of a user interface displaying a detailed project analysis screen for a user of the system; and FIG. 44 is an example of a user interface displaying a custom device input and selection screen for a user of the system.

FIG. 45 shows a chart of the various rules contained in the business layer.

FIG. 47 shows a chart reflecting the changes made to the UL rules according to an exemplary embodiment of the invention.

FIG. 60a shows a flowchart where the appropriate version of the multiple circuit template is selected in accordance with an exemplary embodiment of the invention.

FIG. 60b shows a chart related to the templates selected in FIG. 60a in accordance with an exemplary embodiment of the invention.

FIG. 61c shows a chart related to the templates selected in FIG. 61a wherein the circuit utilizes an OCPD in the supply in accordance with an exemplary embodiment of the invention.

FIG. 61d shows a chart related to the templates selected in FIG. 61a wherein the circuit does not utilize a remote OCPD nor a supply OCPD in accordance with an exemplary embodiment of the invention.

FIG. 61e shows a table with an exemplary listing of what components can be used as an OCPD remotely in accordance with an exemplary embodiment of the invention.

FIG. 62a shows a chart related to the templates selected in FIG. 61a wherein the single circuit contains a group motor and utilizes a remote OCPD in accordance with an exemplary embodiment of the invention.

FIG. 62b shows a chart related to the templates selected in FIG. 61a wherein the single circuit contains a group motor and utilizes an OCPD in the supply in accordance with an exemplary embodiment of the invention.

FIG. 62c shows a chart related to the templates selected in FIG. 61a wherein the single circuit contains a group motor and does not utilize a remote OCPD nor a supply OCPD in accordance with an exemplary embodiment of the invention.

FIG. 63a shows a chart related to the templates selected in FIG. 61a wherein the single circuit contains a control transmission and utilizes a remote OCPD in accordance with an exemplary embodiment of the invention.

FIG. 63b shows a chart related to the templates selected in FIG. 61a wherein the single circuit contains a control transmission and utilizes an OCPD in the supply in accordance with an exemplary embodiment of the invention.

FIG. 63c shows a chart related to the templates selected in FIG. 61a wherein the single circuit contains a control transmission and does not utilize a remote OCPD nor a supply OCPD in accordance with an exemplary embodiment of the invention.

FIG. 67 shows a listing of the icons that may be utilized by the invention in accordance with an exemplary embodiment of the invention.

FIG. 68 shows an example of a search function that allows users to look for details on a specific device in accordance with an exemplary embodiment of the invention.

FIG. 69 shows an example of a drill down search function that allows users to look for details on a specific device in accordance with an exemplary embodiment of the invention.

FIG. 70 shows a parts selection screen where the user selects a device in accordance with an exemplary embodiment of the invention.

FIG. 71 shows a custom input where the user may input information about a device in accordance with an exemplary embodiment of the invention.

FIG. 72b shows an example of a multi-circuit panel map according to an exemplary embodiment of the flowchart shown in FIG. 72a.

FIG. 72c shows a chart illustrating which devices are compatible with the flowchart shown in FIG. 72a.

FIG. 74a shows an example of a single circuit template where a single branch circuit is connected to a remote OCPD in accordance with an exemplary embodiment of the invention.

FIG. 74b shows an example of the panel map where a single branch circuit is connected to a remote OCPD.

FIG. 74c shows an example of a single circuit template 5906 where a single branch circuit is connected to the supply.

FIG. 74d shows an example of the panel map where a single branch circuit uses a supply other device.

FIG. 74e shows an example of a panel map where a single branch circuit uses a supply OCPD.

FIG. 74f shows a table with an exemplary listing of what devices can be used for the template shown in FIG. 74a.

FIG. 75a shows an example of the template where a single branch circuit with a group motor is used with a remote OCPD in accordance with an exemplary embodiment of the invention.

FIG. 75b is an example of a panel map showing a single branch circuit with a group motor and a remote OCPD.

FIG. 75c shows an example of the template where a single branch circuit with a group motor is used with an OCPD in the panel in accordance with an exemplary embodiment of the invention.

FIG. 75d shows an example of a panel map where a single branch circuit with a group motor is used with a branch OCPD in the panel, but not in the supply other device.

FIG. 75e shows an example of a panel map where a single branch circuit with a group motor is used with a supply OCPD.

FIG. 75f shows a table with an exemplary listing of what devices can be used for the template shown in FIGS. 75a-e.

FIG. 76a shows an example of the template where a single circuit with a remote OCPD is connected to the supply other device.

FIG. 76b shows an example of a panel map where a single circuit with a remote OCPD is connected to the supply other device.

FIG. 76c shows an example of the template where a single circuit with a supply OCPD is in the panel according to an exemplary embodiment.

FIG. 76d shows an example of a panel map where a single circuit with a supply OCPD is in the panel in accordance with an exemplary embodiment of the invention.

FIG. 76e shows an example of the template where a single circuit with a branch OCPD is in the panel with a supply other device in accordance with an exemplary embodiment of the invention.

FIG. 76f shows an example of a panel map where a single circuit with a branch OCPD is in the panel with a supply other device.

FIG. 76g shows a table describing the devices that may be used for the OCPD and other device lists for taps as shown in FIGS. 76a, 76c, and 76e in accordance with an exemplary embodiment of the invention.

DETAILED DESCRIPTION OF EXEMPLARY EMBODIMENTS

Exemplary embodiments of methods and systems are disclosed herein that overcome problems, difficulties and disadvantages discussed below for analyzing, for example, electrical products and systems to ensure that proper certification marks of the products and systems may be obtained. This is achieved at least in part with the provision of interactive web-based systems and methods for analyzing issues raised by promulgated industry standards for complex electrical product and system design. Data and information related to the electrical system and to the promulgated standards of interest are archived in the system databases, and with an intuitive menu driven user interface and graphic displays, interested users may rather quickly evaluate complex product designs for certification with desired promulgated standards. Human error in the analysis and evaluation is largely, if not completely avoided. Real time analysis feedback is presented and updated at each step of the analysis, permitting the user to understand the impact of design changes on the certification analysis. The feedback is available in summary form and in a detailed form for study by the user.

In order to appreciate the invention to its fullest extent, the following disclosure will be divided into different parts or segments, wherein Part I discusses particular problems of evaluating rather complex electrical products and systems with promulgated industry standards; Part II discloses an exemplary system for analyzing and evaluating the complex electrical products and systems discussed in Part I; Part III discloses exemplary processes utilized by the system of Part II to complete its analysis; and Part IV discusses exemplary systems and user interfaces implementing the systems and processes disclosed in Parts II and III.

I. INTRODUCTION TO THE INVENTION

The number and scope of potentially applicable promulgated industry standards or regulations for a given project, such as an electrical product and system design, is extensive. Locating the applicable standards, gathering necessary information to assess the standards to a given electrical system or product design, and properly applying the applicable standards to a selected design, can present significant challenges to product and system designers and manufacturers.

One exemplary type of electrical product or system in which such challenges are notable is the manufacture and assembly of electrical control panels. Industrial motors, machines, and HVAC equipment for example, typically are provided with electrical control panels that regulate power thereto. While the invention will be explained in the context of such electrical panels and the vexing problems associated therewith, it is contemplated that the invention may be equally applicable to other electrical products and systems apart from the electrical panels described below but raising similar issues.

Figure 1:
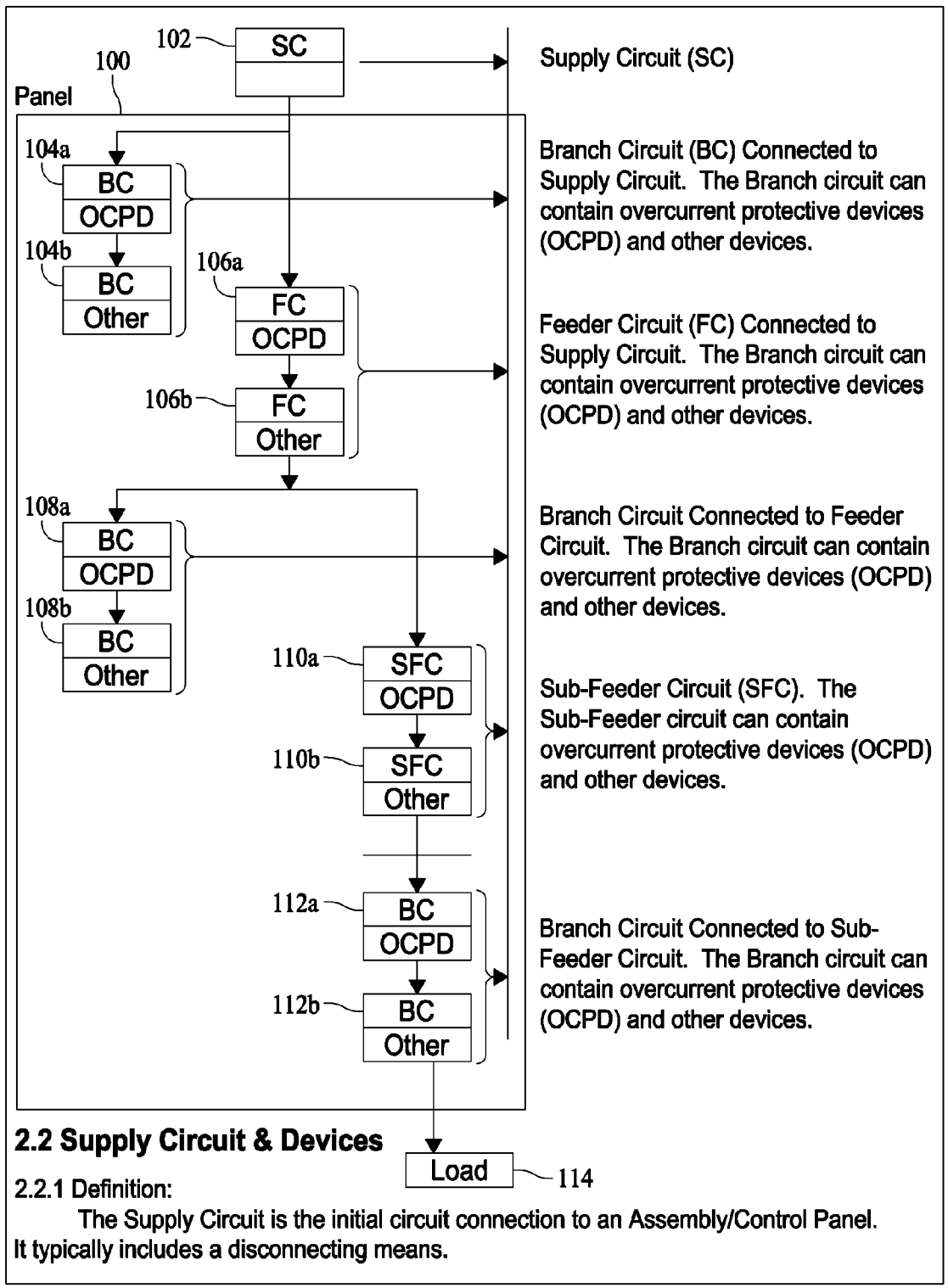
FIG. 1 is a schematic diagram of a portion of an exemplary electrical system that is subject to promulgated electrical industry standards.

FIG. 1 is a schematic diagram of an electrical control panel 100, in which the challenges of accurately and efficiently evaluating or assessing the panel in light of applicable standards are believed to be demonstrated. The panel 100 is connected to a power supply circuit 102 and includes control circuitry, described below, including protective devices to prevent damage to associated electrical loads in electrical fault conditions, which may include short-circuit current conditions, overcurrent conditions, and overvoltage conditions. The protective devices may include fuses, limiters, breakers, surge suppressors and other known devices.

One aspect of electrical control panel design that is important to safe installation and use is the short-circuit current rating of the panel 100. Recent changes to the National Electric Code (NEC) require that electrical control panel 100 satisfies short-circuit current rating marking requirements. Specifically, Article 409 of the NEC provides that short-circuit current fault levels throughout the entire control panel 100 be assessed, and the protective devices such as fuses and circuit breakers be selected in such a manner that the short-circuit current ratings of the panel 100, including all of its components, will not be exceeded should a short-circuit occur. As such, the electrical loads will be subjected to a short-circuit current that is no more than the short-circuit current rating of the panel 100.

The short circuit rating of the components used in the panel 100 are distinguishable from the short-circuit current rating of the panel 100 overall, although in some cases, the short-circuit current rating of the panel 100 as a whole may be found to be equal to a short current rating of one or more of its individual components. As used herein, the short-circuit current rating of an electrical component or device used in the panel 100 shall refer to the maximum short-circuit current rating that the individual component may safely withstand. In effect, however, the short circuit rating of the panel 100 including all its interconnected components may not be equal to the short circuit rating of any of its individual components. In particular certain components or devices connected upstream of other components or devices in the panel may and sometimes do increase the ultimate amount of short-circuit current that the panel 100 may safely withstand. Careful analysis and consideration is therefore required to determine the true short-circuit current rating of the panel 100.

It is a preferred practice that electrical control panels such as the panel 100 be marked appropriately with their short-circuit current ratings. To obtain certification of the panel 100 for use, the panel 100 is subject to approval by Underwriters Laboratories (UL). Application of UL standards, however, to the electrical control panel 100 can be complex, especially as the number of interconnected circuits and associated circuit components or circuit devices in any given control panel increases. In particular U.L. 508A defines procedures for determining a short-circuit current rating of interconnected components, and U.L. 508A as will be described below, can be complex to apply in the context of the electrical control panel 100. Moreover, the panel 100 can itself be rather complex in its number of circuits, devices connected in the circuits, and the functional relationship of the interconnected devices.

As shown in FIG. 1, a power supply circuit ("SC") 102 is the initial current circuit connection to the control panel 100. Within the panel 100 are one or more branch circuits 104 connected to the supply circuit 102, one or more feeder circuits 106 connected to the supply circuit 102 and/or the branch circuits 104, one or more branch circuits 108 connected to the feeder circuits 106, one or more sub-feeder circuits 110 connected to the feeder circuits 106 and/or the branch circuits 108, and one or more branch circuits 112 connected to the sub-feeder circuits 110. The branch circuits 112 are, in turn, connected to one or more loads 114. The control panel 100, via the circuits 104, 106, 108, 110 and 112 regulates power from the supply circuit 102 to the loads 114, and among other things regulates current flow to the electrical loads 114 to protect them from potentially damaging short circuit conditions, as well as other potential electrical fault conditions.

The number of branch circuits 104, feeder circuits 106, branch circuits 108 connected to feeder circuits, sub-feeder circuits 110 and branch circuits 112 connected to sub-feeder may each be relatively large in number, such as about ten, in different embodiments of the panel 100. In different embodiments, the panel 100 may be assembled with all its circuits and sold as an integral pre-packaged product for a particular load or loads 114, or the panel 100 may alternatively be assembled on site or constructed in a custom manner to meet the needs of a particular load or loads 114. Regardless, the short-circuit current rating of the panel 100 typically must be reliably established, and proper certification marks must be obtained and provided somewhere on the panel 100 prior to being connected to an energized power supply circuit 102.

Not only may the panel 100 entail a large number of circuit devices, but it may include a large number of different types of devices that each may affect the short-circuit rating of the panel as a whole. The power supply circuit 102 represents the first incoming circuit that is connected to the panel 100 and the components in the supply circuit 102 may affect the short-circuit current rating of the panel 100 in use. In different embodiments, the supply circuit 102 may include a disconnect switch or switching mechanism. More specifically, two basic types of supply circuits are conventionally provided for powering electrical control panels such as the panel 100, namely a disconnecting means coupled to a circuit protector such as an overcurrent protector, or a disconnecting means without a circuit protector, including but not limited to a remote disconnector.

The panel 100 may also include one or more branch circuits 104 connected to power supply circuit. The branch circuits 104 may contain protective devices such as overcurrent protection devices designated in portion 104*a*, and other devices designated in the portion 104*b*.

Additionally, the panel 100 may include a feeder circuit or circuits 106 connected to the power supply circuit 102, and the feeder circuit 106 may include protective devices such as overcurrent protection devices designated in portion 106*a*, and other devices designated in the portion 106*b*. The feeder circuit 106 represents the next level of circuit connection to the panel 100 after the supply circuit 102, and the feeder circuits may include devices connected on the supply side of the branch circuit overcurrent protection device designated in portion 104*a*.

The panel 100 may also include one or more branch circuits 108 connected to the feeder circuits 106, and the branch circuits 108 may include protective devices such as overcurrent protection devices designated in portion 108*a*, and other devices designated in the portion 108*b*.

Sub-feeder circuits 110 may also be provided in the panel 100 and may be connected to the feeder circuits 106. The sub-feeder circuits 110 may include protective devices such overcurrent protection devices designated in portion 110*a*, and other devices designated in the portion 110*b*. The sub-feeder circuits 110 may be considered similar to the feeder circuits 106 and are the next level of feeder circuits connected to the panel 100. The sub-feeder circuits 110 may include devices that are connected on the supply side of the branch circuit overcurrent protection device 108*a*.

Branch circuits 112 may be provided in the panel 100 and connected to the sub-feeder circuits 110. The branch circuits 112 may include protective devices such overcurrent protection devices designated in portion 112*a* and or other devices designated in the portion 112*b*. The branch circuits 112 are the final or lowest level of circuits closest to the loads 114 associated with the panel 100, such as a motor, a machine or HVAC equipment as several examples. The branch circuits 112 may include devices that are connected from the last overcurrent protection device in the panel 100 to the load 114. In other words, the branch circuits 112 include the conductors and components following the last overcurrent protection device protecting a load associated with the panel 100.

Considering that a variety of circuit devices exist that may be utilized as overcurrent protection devices and other devices in the various circuits of the panel 100, it should be apparent that the possible combinations of numbers of circuits and the number and type of components connected in the circuits in the panel 100 is substantial. To determine the maximum short-circuit current rating of the panel 100, one would need to know specific details for each component and device used in the circuits 104, 106, 108, 110 and 112. Conventionally, after the components after selected circuit-by-circuit for the panel 100, a search for the short-circuit current rating and other pertinent parameters of the devices, such as IR and $i^2t$ values of each individual circuit component used or device in the panel 100 would typically be undertaken. Such a search may include calling the various manufactures or suppliers of the components used, searching for the information on a manufacturer's website, or by perusing catalogs and publications including the necessary data for selected components. While much of short-circuit current data information is typically publicly available for individual components, finding and extracting the data from various sources for a large number of components offered by different manufacturers is often time and labor intensive. Aside from difficulties in obtaining the information in the first instance, it can sometimes be difficult to know whether the information is current and up-to-date for certain devices.

Researching the individual component ratings for devices and components selected in an proposed panel design may also involve locating the proper standard and learning the process and procedures for determining the panel short-circuit current rating by researching the appropriate Codes and standards. In doing so, one would find that N.E.C. Article 409 and UL 508A provides the industry recognized procedure for determining the short-circuit current rating of the panel 100. Especially for those that are not completely familiar with the applicable Codes and standards, locating the proper standard may also be time and labor intensive. Aside from difficulties in locating the proper standards in the first instance, it can sometimes be difficult to know whether the standards are current and up-to-date as the standards are subject to periodic revision.

Once all the component information has been obtained and the applicable procedures have been identified to analyze a proposed design for the panel 100, one would conventionally have to methodically, and typically manually apply the provisions of N.E.C. Article 409 and U.L. 508A for each component and circuit 104, 106, 108, 110 and 112 in the panel 100 to determine the short current rating assembly of the panel 100 as a whole. Once a result is obtained, it may or not match the short-circuit current rating of any of the individual components used in the panel 100, and it may be difficult to verify that the obtained result is, in fact, accurate. Many opportunities for mistake and misapplication are present, ranging from an improper or incomplete understanding of the procedures used in the analysis, a simple mistake in applying the procedure, reliance upon incorrect or obsolete data in the analysis, failure to account for all components in the analysis, and other error. Thus, it may take considerable time and resources to confirm the analysis result and ensure that the procedures were performed correctly.

Additionally, the interconnected components in the circuits 104, 106, 108, 110 and 112 in the panel 100 may impact the short-circuit current rating of the panel 100 in ways that are neither intuitive nor are readily appreciated by persons performing the analysis. Exactly how the selection of components in each of the circuits 104, 106, 108, 110, and 112 affect the ultimate short-circuit current rating of the panel as a whole is often far from clear, and whether substituting different components in or more of the circuits 104, 106, 108, 110, and 112 would raise, lower or be neutral to the final short-circuit current rating of the entire panel 100 may also be unclear, making it difficult to make design changes in a way that predictably affects the outcome of the analysis.

For all the above reasons, obtaining a panel design that achieves a desired short-circuit current rating for a particular load, while meeting other requirements for controlling power to the loads, is conventionally a trial and error process. From start to finish, the entire evaluation process can be a considerable amount of work and may take days or weeks to accomplish.

The consequences of not obtaining the proper short-circuit current rating can be significant. Any misunderstanding or misapplication of promulgated standards may lead to a failure to obtain certification marks from the standard setting bodies and costly redesign of the panel 100, or conversely may lead to unnecessary analysis and redesign of an otherwise compliant panel 100 on the mistaken belief that the panel 100 does not comply.

II. THE SYSTEM OF THE INVENTION

FIGS. 2-23 illustrate aspects of an exemplary system 150 and FIGS. 24-44 illustrate an exemplary user interface therefore, that in one embodiment is a computer program or software embodied on a computer readable medium and utilizing, for example, a Structured Query Language (SQL) with a client user interface front-end for administration and a web interface for user input, access, and information retrieval and reports by persons interested in assessing and evaluating, for example, a proposed panel design in light of an existing promulgated standard, such as the provisions of N.E.C. Article 409 and U.L. 508A relating to determination of a short-circuit current rating for the panel. The analysis and evaluation system 150 may be web enabled and may be run on a business-entity intranet or alternatively may be fully accessed by individuals having an authorized access outside the firewall of the business-entity through the Internet. In an exemplary embodiment, the analysis and evaluation system 150 may be run in a Windows® NT environment or operating system that is commercially available from Microsoft Corporation of Redmond, Wash. The application may be flexible and designed to run in various different environments without compromising any major functionality.

Figure 2:
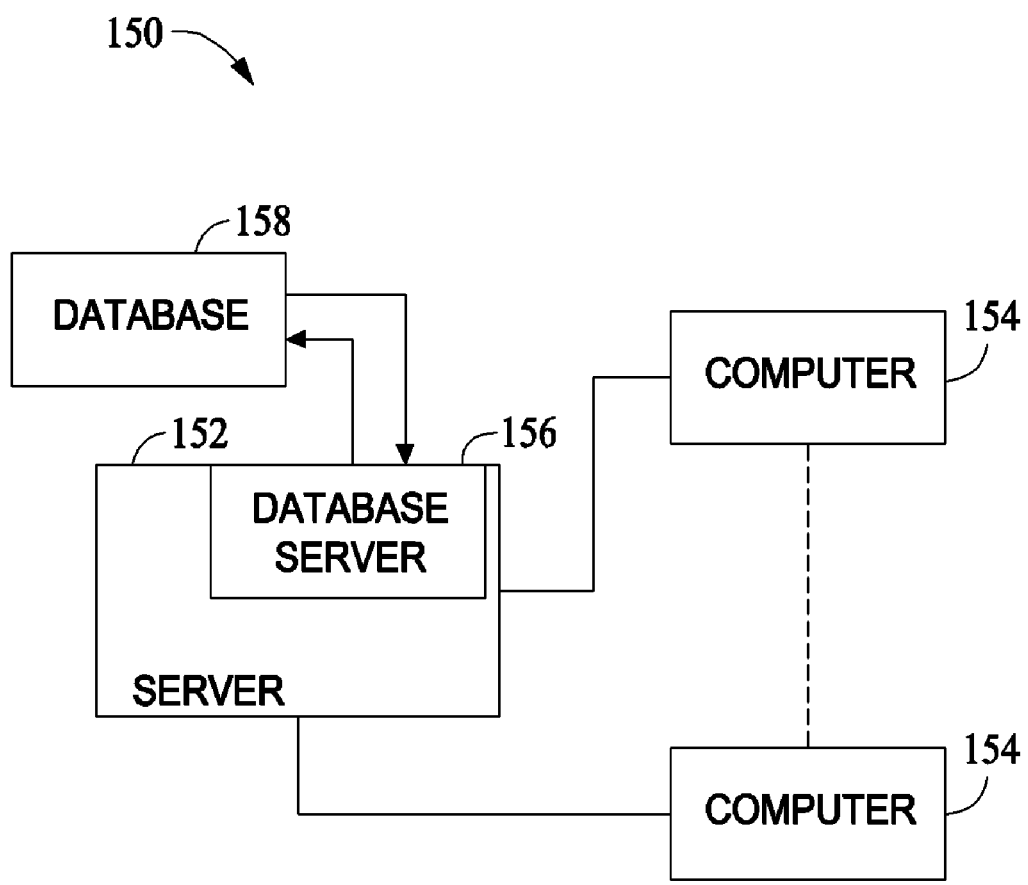
FIG. 2 is a simplified block diagram of an exemplary embodiment of an interactive system for ensuring that the system shown in FIG. 1 complies with promulgated standards.

FIG. 2 is a simplified block diagram of an exemplary embodiment of the analysis and evaluation system 150 including a server system 152, and a plurality of client subsystems, also referred to as client systems 154, connected to the server system 152. Computerized modeling and grouping tools, as described below in more detail, are stored in the server system 152 and can be accessed by a requester at any one of the client systems 154. In one embodiment, the client systems 154 are computers or other electronic devices including a web browser, such that the server system 152 is accessible to the client systems 154 using, for example, the Internet.

The client systems 154 may be interconnected to the Internet through many interfaces including, for example, a network such as a local area network (LAN) or a wide area network (WAN), dial-in-connections, cable modems and special high-speed ISDN lines. The client systems 154 may be any device capable of interconnecting to the Internet including a web-based phone, personal digital assistant (PDA), or other web-based connectable equipment or equivalents thereof. A database server 156 is connected to a database 158 containing information on a variety of matters, as described below in greater detail. In one embodiment, the database 158 is centralized and stored on the server system 152, and the database 158 be accessed by potential users at one of the client systems 154 by logging onto the server system 152 through one of the client systems 154. In an alternative embodiment, the database 158 may be stored remotely from server system 152 and may be non-centralized.

Figure 3:
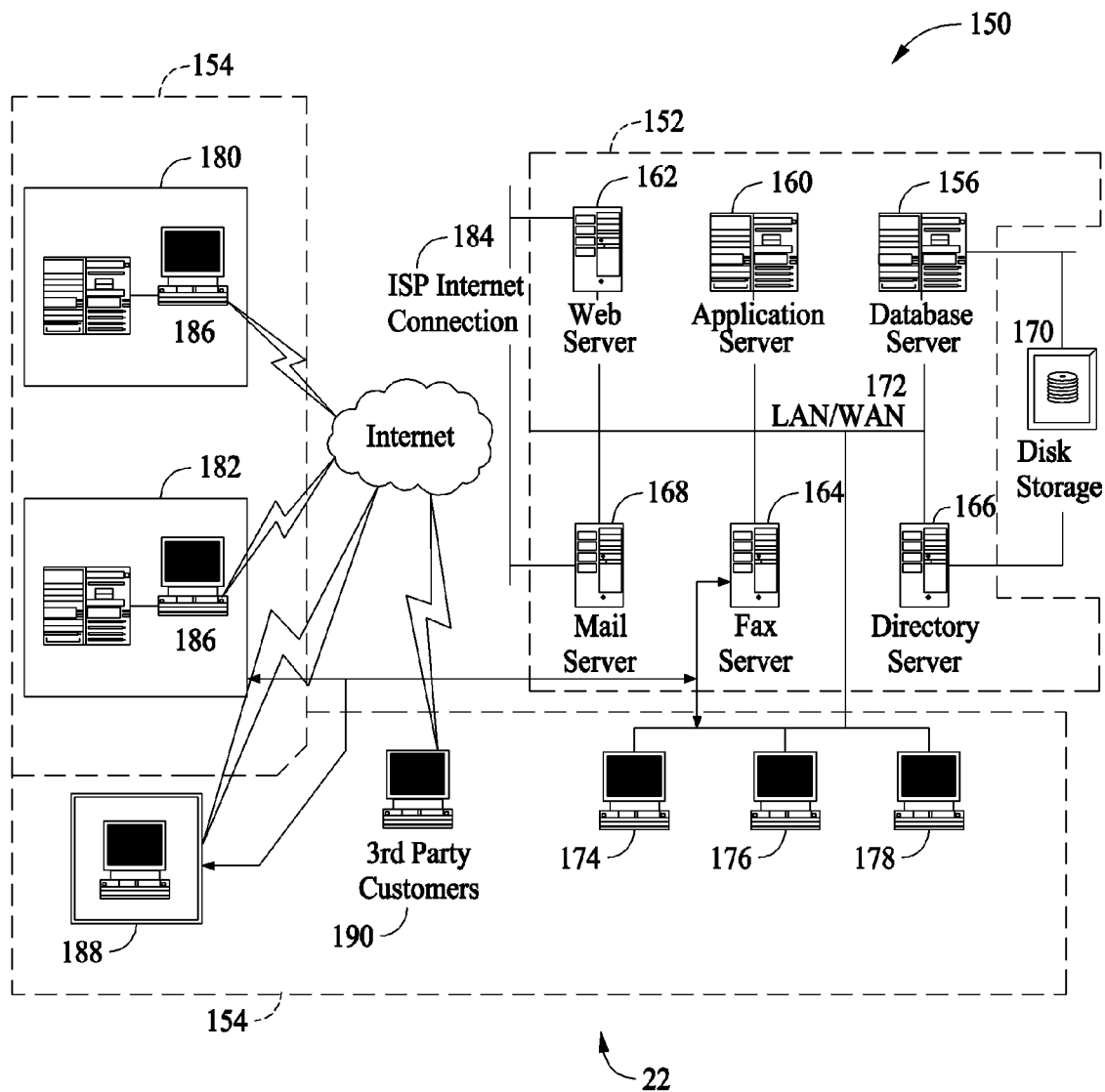
FIG. 3 is an expanded block diagram of an exemplary embodiment of a server architecture of the system shown in FIG. 1.

FIG. 3 is an expanded block diagram of an exemplary embodiment of a server architecture of the analysis and evaluation system 150 including the server system 152 and the client systems 154. The server system 152 may include the database server 156, an application server 160, a web server 162, a fax server 164, a directory server 166, and a mail server 168. A disk storage unit 170 may be coupled to the database server 156 and the directory server 166. The servers 156, 160, 162, 164, 166, and 168 may be coupled in a local area network (LAN) 172. In addition, a system administrator's workstation 174, a user workstation 176, and a supervisor's workstation 178 may be coupled to the LAN 172. Alternatively, workstations 174, 176, and 178 may be coupled to LAN 172 using an Internet link or are connected through an Intranet.

Each workstation 174, 176, and 178 may be a personal computer or other electronic device having a web browser. Although the functions performed at the workstations typically are illustrated as being performed at respective workstations 174, 176, and 178, such functions may be performed at one of many personal computers coupled to the LAN 172. Workstations 174, 176, and 178 are illustrated as being associated with separate functions only to facilitate an understanding of the different types of functions that can be performed by individuals having access to the LAN 172.

The server system 152 in one embodiment is configured or adapted to be communicatively coupled to various individuals via some of the client systems 154, including employees 180 associated with the analysis and evaluation system 150, and to third parties 182 in communication with the server system 152 using, for example, an ISP Internet connection 184. The communication in the exemplary embodiment is illustrated as being performed using the Internet, however, any other wide area network (WAN) type communication can be utilized in other embodiments. That is, the analysis and evaluation system 150, and its operating algorithms and processes described below are not limited to being practiced using the Internet.

In an exemplary embodiment, any authorized individual having a workstation 186, 188 can access the server system 152 via one of the client systems 154. At least one of the client systems 154 includes a manager workstation 188 located at a remote location. Workstations 186 and 188 may be personal computers or other electronic devices having a web browser. Additionally, third party customers may communicate with the server system 152 via a workstation 190 having, for example, a web browser.

The fax server 164 may communicates with remotely located client systems 154, including the workstations 186, 188 and 190. The fax server 164 may be configured or adapted to communicate with other client systems including but not limited to the workstations 174, 176 and 178 as well for reporting purposes.

While the system 150 is illustrated and described in the context of a networked-based computer system having a number of distributed processor-based devices such as the various servers and computer workstations described above, it is recognized that in an alternative embodiment the analysis and evaluation system may reside on a single processor-based device such as a laptop or notebook computer which consolidates the functions of some or all of the system components described above into a single device. Additionally, aspects of the system may be implemented in other types of processor-based devices, including but not limited to portable hand-held electronic devices including user provided data input and display screen capabilities. Various adaptations are possible in this regard to provide varying degrees of sophistication and complexity for different users, as well as potential cost savings.

The functionality and programming of the system is explained in detail below with respect to the methods and processes described below in Part III and the user interface disclosed in Part IV.

III. EXEMPLARY SYSTEM METHODS AND PROCESSES

The technical effect of the processes and systems described herein is achieved when data and information pertaining to a proposed product design or proposed system design, and components and devices utilized in the proposed designs to be considered is entered, transmitted, downloaded or otherwise accepted by the analysis and evaluation system 150. The data and information used by the analysis and evaluation system 150 may be supplied an accepted through any of the workstations connected to the server system 152 as described above, or may be supplied from other sources if desired. Exemplary data and information utilized by the system is described in some detail below.

The data and information supplied to the system 150 may be stored or archived in the aforementioned server system 152, and the data and information may be accessed by the system 150 to permit a reliable assessment, evaluation or analysis of the proposed product design in light of a promulgated industry standard in a dramatically reduced amount of time and labor, while substantially avoiding and eliminating human error.

The processes utilized in the system 150 will now be explained using the example of the electrical control panel 100 shown in FIG. 1, wherein the analysis and evaluation system 150 is configured to efficiently and reliably evaluate and assess a proposed electrical panel design in light of a promulgated industry standards such as the provisions of N.E.C. Article 409 and U.L. 508A pertaining to short-circuit current ratings of the circuit assemblies used in the control panel. As will become evident below, the analysis and evaluation system 150 is operable in an interactive manner in response to user inputs, and in one embodiment displays real time feedback at all stages of analysis. The time and labor required to evaluate a panel design short-circuit current rating is dramatically reduced, while substantially avoiding human misunderstanding and error in applying a rather complex industry standard to a relatively complex assembly in the proposed electrical control panel design.

In the illustrative embodiment, the system analysis and evaluation system 150 utilizing the processes described below is sometimes referred to as an OSCAR™ (Online Short-Circuit Current UL508A Rating) Compliance system. The OSCAR™ Compliance system in one embodiment is a comprehensive web application tool for calculating the short-circuit current rating of a proposed electrical control panel. The OSCAR™ system in one implementation is a database driven tool, where current and up-to-date device details for the control panel design are available and accessible in a database and the user selects the device from drop-down lists and menus. The OSCAR™ system may include large databases storing product details of major electrical components available to electrical control panel designers, sometimes referred to as eligible devices. By providing an up-to-date and accurate database of eligible device details, the user need not separately search for needed information to evaluate a proposed design and/or confirm the accuracy of the information. The system databases may be periodically updated to purge obsolete data and information, make and necessary revisions to the data, include new products and information, or to reflect changes to the standards of interest and information needed to evaluate them. Data and information to be stored in the databases may be directly supplied by device manufacturers, or gathered by responsible third parties.

Additionally, the OSCAR™ system also allows custom device selection by user, so that the user can provide information on custom devices that are not listed or stored in the database or that may not be considered eligible devices, and as such, the system can be extended to operate on circuit components or circuit devices outside of those captured in the system databases. Thus, for example, when new circuit components and devices are introduced to the market that is not yet in the system databases, the component or device may still be considered by the OSCAR™ system as a custom device.

It is to be understood that electrical control panel design and determination of short-circuit current ratings as described herein is but one example of a difficulties faced when evaluating a proposed assembly design in light of promulgated industry standards, and that the analysis and evaluation system 150 could be adapted to address other standards and other proposed product designs and proposed system designs if desired.

For proper operation of the system 150, some attention must be paid to data input and selection processes, and some attention must be paid to processing of the data and information pertaining to the input data and device selections made for a proposed panel design.

A. Data Entry and Device Selection

FIGS. 4-7 illustrate portions of a flowchart concerning exemplary navigational and data entry process 200 utilized by the analysis and evaluation system 150 shown in FIGS. 2 and 3. The navigational and data entry process 200 in one embodiment facilitates user identification and entry of components and devices in a proposed panel design to be evaluated, such as the panel 100 shown in FIG. 1.

Figure 4:
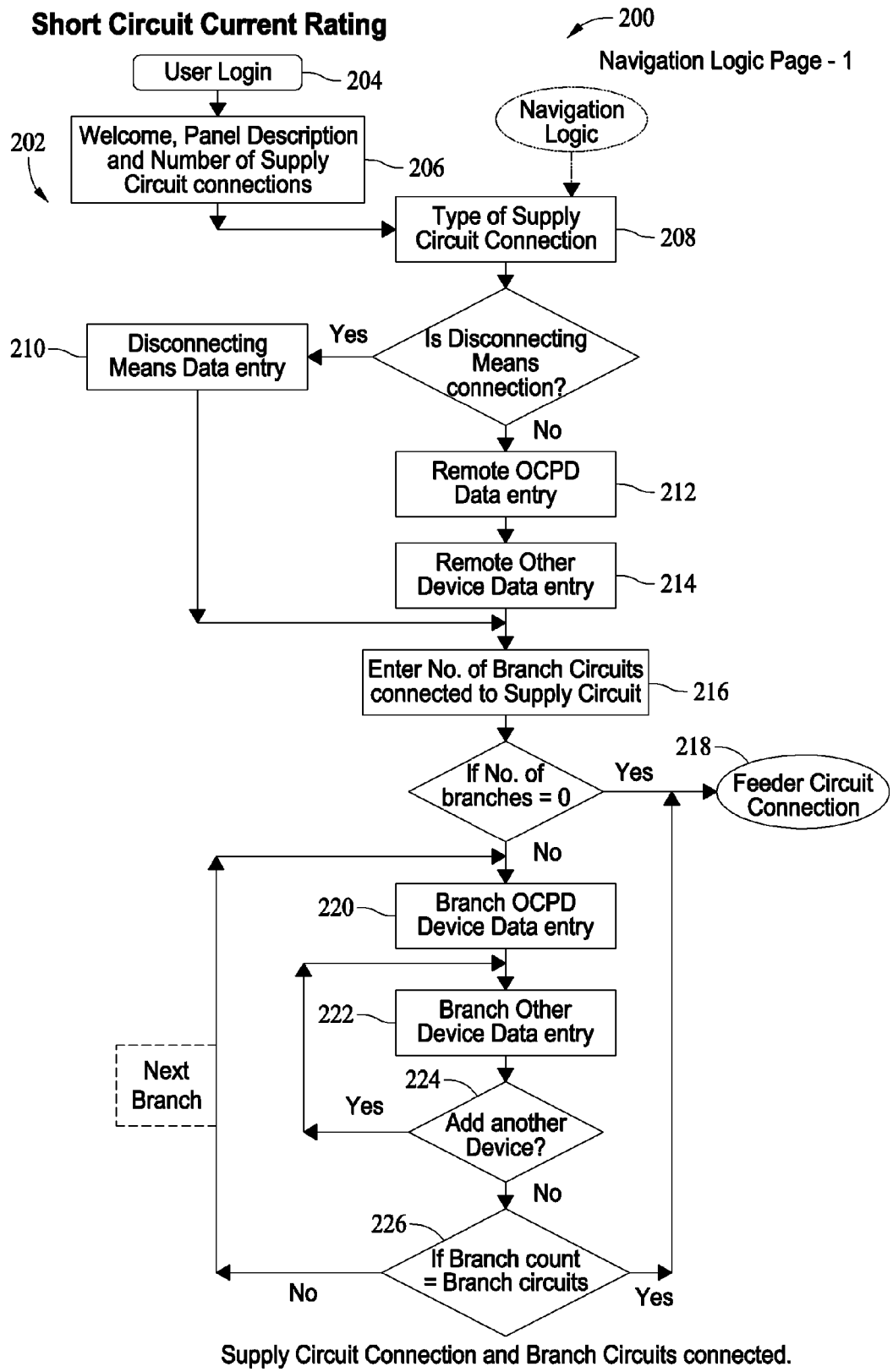

FIG. 4 illustrates a supply circuit connection data entry processing algorithm portion 202 of the navigational and data entry process 200. As shown in FIG. 4, the algorithm portion 202 includes prompting 204 a user to logon to the system 150, and presenting 206 a welcome to the user that facilitates user identification of or description of the electrical control panel to be analyzed, as well as prompting user entry of a number of supply circuits utilized for the proposed control panel to be analyzed.

After the welcome 206 is completed, the system prompts a user to enter or input 208 the type of supply circuit connection to be used with the proposed control panel to be analyzed. As previously mentioned, two types of supply circuits are predominately used in supply circuits, namely a supply circuit having disconnecting means with overcurrent protection, or a remote disconnecting means or disconnecting means without overcurrent protection. As used herein, a supply circuit type of "disconnecting means without overcurrent protection" shall refer to a circuit terminating in a device that provides both a disconnecting means and an overcurrent protection device, such as a fused disconnect switch or circuit breaker. As used herein a supply circuit type of "remote disconnecting means or disconnecting means without overcurrent protection" shall refer to a circuit terminating in a device that does not provide a disconnect function such as a power distribution block or fuse, or a circuit that terminates in a disconnect device that does not include overcurrent protection such as a molded case switch.

Depending on whether the user input or selection at step 208 is a disconnecting means with overcurrent protection or a remote disconnecting means, the system proceeds to prompt data input, selection or entry in steps 210, 212, and 214 for the applicable devices in the control panel to be utilized.

In an exemplary embodiment, when the control panel to be analyzed includes a disconnecting means with overcurrent protection selected at step 210 the system may require selection of one of the following possibilities for the disconnecting means in the supply circuit: a fused pullout device such as a UL 1429 Pullout Switch with Branch Circuit Fuses such as UL 248 Fuses; a Fused Switch such as UL 98 Misc. Switches with Branch Circuit Fuses such as UL 248 Fuses; a circuit breaker such as a UL 489 Circuit Breaker; a Combination Starter-Fusible such as a UL 508—Combination Motor Controller; a Combination Starter such as a UL 508 Combination Motor Controller—with Circuit Breaker; a Combination Starter such as UL 508—Combination Motor Controller with MCP; or a Combination Starter such as a UL 508—Combination Motor Controller with Self Protected Starter.

Further, for each of the possible selections for the disconnecting means at step 210, data and information pertaining to the devices may be entered, input or selected by the user, or alternatively the system may retrieve device data and information from the system database once the device is identified by the user. The data and information may include a manufacturer name, device codes supplied by the manufacturer to identify a specific device, and a short description, name, or title of the device. The data may also include current ratings, voltage ratings, short-circuit current ratings, interrupting ratings, let-thru current ratings, $i^2t$ ratings, and other product information of interest needed to analyze, assess, or evaluate the proposed control panel. In one exemplary embodiment, such data and information for a variety of available devices offered from various manufacturers are input by system operators and stored and archived in the databases 158 (FIG. 2) of the system 150 for use by the system without manual entry by the user, although in some embodiments the data and information could be manually entered by the user if desired.

In an exemplary embodiment, when the control panel to be analyzed includes a remote disconnecting means selected at step 212 the system may require selection of one or the following possible devices for the remote disconnecting means in the supply circuit: Branch Circuit Fuses such as UL 248 Fuses; a Circuit Breaker such as a UL 489 Circuit Breaker; or a Fuse or Circuit Breaker—Not Specified.

Further, for each of the possible selections for the remote disconnecting means at step 212, data and information pertaining to the devices may be entered, input or selected by the user, or alternatively the system may retrieve device data and information from the system database once the device is identified by the user. The data may include a manufacturer name, device codes supplied by the manufacturer to identify a specific device, and a short description, name, or title of the device. The data may also include current ratings, voltage ratings, short-circuit current ratings, interrupting ratings, let-thru current ratings, $i^2t$ ratings, and other product information of interest needed to analyze, assess, or evaluate the proposed control panel. In one exemplary embodiment, such data and information for a variety of available devices offered from various manufacturers are input by system operators and stored and archived in the databases 158 (FIG. 2) of the system 150 for use by the system without manual entry by the user, although in some embodiments the data and information could be manually entered by the user if desired.

In an exemplary embodiment, when the control panel to be analyzed includes remote disconnecting means selected at step 214 the system may require selection of one or the following possible other devices utilized with the remote disconnecting means in the supply circuit: Branch Circuit Fuses such as UL 248 Fuses in a Fuse holder such as a UL 512 Fuse holder; a Bus Bar System, a GFCI Receptacle (UL 943); a Magnetic Controller, including definite purpose, lighting, or HP rated contactor; a Magnetic Motor Starter—Contactor with Overload Relay such as a UL 508 Magnetic Controller; a Manual Motor Starter—MMP such as a UL 508 Manual Motor Controller; a Molded Case Switch such as a UL 489 Molded Case Switch; a Non-Fused Switch such as a UL 508 Manual Motor Controller; a Non-Fused Switch such as a UL 98 Misc. Switch; an Overload relay (UL 508); Power Conversion Equipment—Drive or Soft-Start (UL 508C); a Receptacle (UL 498); Semiconductor Fuses such as UL 248 Fuses in a Fuse holder such as a UL 512 Fuse holder; Semiconductor Fuses in Power Conversion Equipment—Drive or Soft-Start; a Silicon Control Rectifier (UL508C); a Terminal Block—Power Distribution Block (Recognized to UL 1059) with Feeder Circuit Spacing; a Terminal Block (Recognized to UL 1059) with Branch Circuit Spacing; and a Terminal Block-Power Distribution Block (Listed to UL 1953).

Further, for each of the possible selections for devices selected at step 214, data and information pertaining to the devices may be entered, input or selected by the user, or alternatively the system may retrieve device data and information from the system database once the device is identified by the user. The data may include a manufacturer name, device codes supplied by the manufacturer to identify a specific device, and a short description, name, or title of the device. The data may also include current ratings, voltage ratings, short-circuit current ratings, interruption ratings, let-thru current ratings, $i^2t$ ratings, and other product information of interest needed to analyze, assess, or evaluate the proposed control panel. In one exemplary embodiment, such data and information for a variety of available devices offered from various manufacturers are input by system operators and stored and archived in the databases 154 (FIG. 2) of the system 150 for use by the system without manual entry by the user, although in some embodiments the data and information could be manually entered by the user if desired.

Once the data input or selection steps 210, 212, and 214 are performed for the applicable devices of the proposed control panel, the system prompts 216 the user to enter the number of branch circuits connected to the supply circuit for the proposed panel. The prompt may ask the user to enter the number, or ask the user to select the number of branch circuits from a menu or list. In one embodiment, user input selection values of 0 through 10 are made available for user selection of the number of branch circuits connected to the supply circuits in the proposed panel, although input or selection values greater than 10 may be used if desired.

Figure 5:
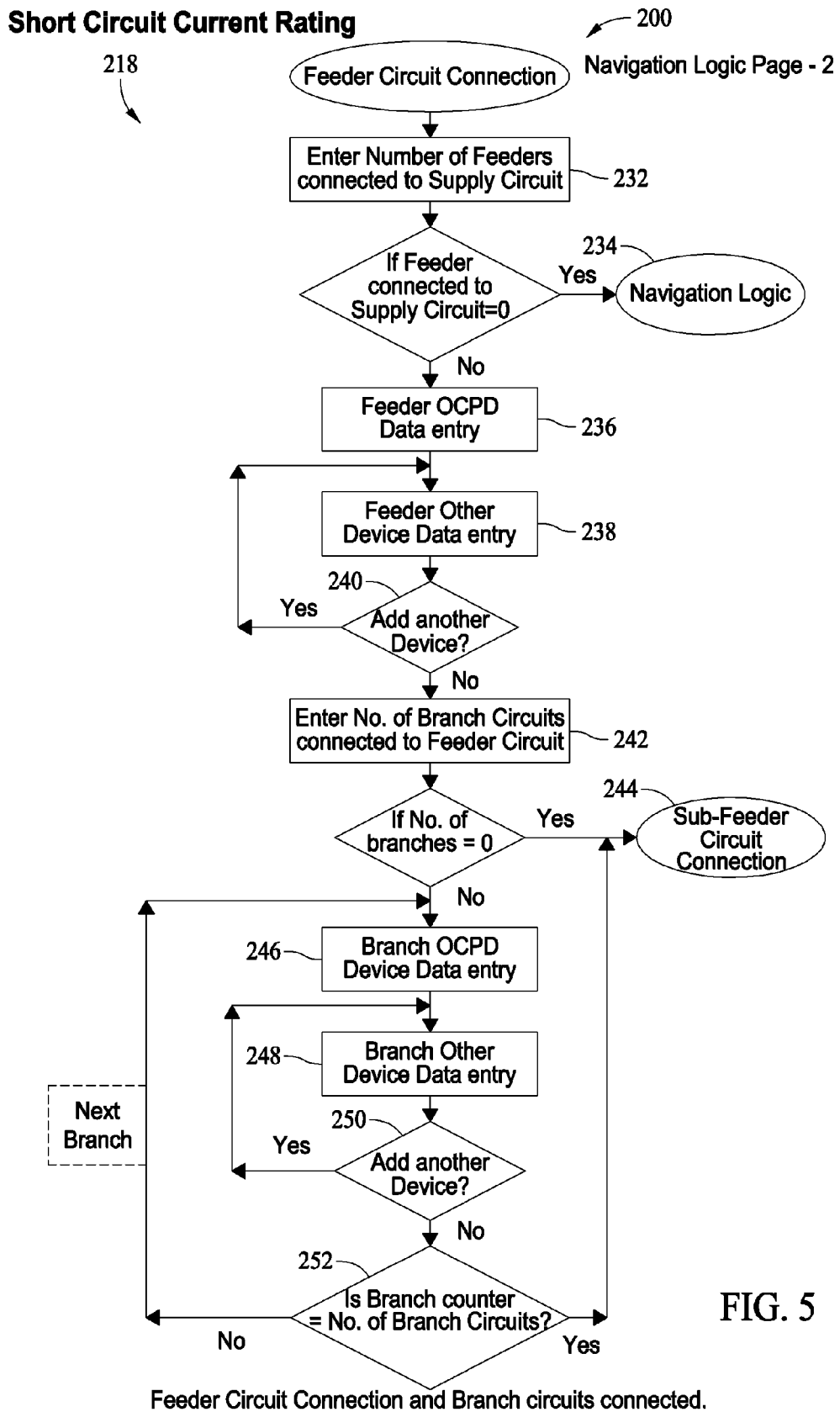

If the user selects or enters 0 for the number of branch circuit connected to supply circuits, the system enters 218 the feeder circuit data entry processing algorithm shown in FIG. 5. If the user selects or enters a non-zero value, the system prompts 220 and 222 the user to input, enter or select an overcurrent protection device for the branch circuit at step 220. At step 222, the system prompts the user to input, enter or select an "other device" for the branch circuit, and also prompts the user to enter whether the branch circuit contains yet another device at step 224. If the user chooses to add another device at step 224, the system returns to step 222. Possible devices to be entered, input or selected for the branch circuits at steps 220, 222, and 224 include any of the devices described above in reference to the steps 210, 212, and 214. It is understood that the devices mentioned in reference to steps 210, 212, and 214 are exemplary only, and that greater or fewer numbers of devices, including devices not listed above, may be may be entered, input or selected in other embodiments of the invention without limitation.

If the user does not choose to add another device at step 224, the system determines 226 whether the branch count obtained from step 216 equals the number of branch circuits entered into the system at steps 220 and 222. If the branch count is less than the number of branch circuits entered by the user, the system returns to step 220 for the next branch to be entered. If the branch count is equal to the number of branch circuits entered by the user, the system enters 218 the feeder circuit data entry processing algorithm shown in FIG. 5.

Turning now to FIG. 5, the feeder circuit data entry processing algorithm portion 218 of the navigational and data entry process 200 is illustrated. The feeder circuit algorithm portion 218 includes prompting 232 the user to enter, input or select the number of feeder circuits connected to the supply circuit. The prompt 232 may ask the user to enter the number of feeder circuits, or ask the user to select the number of feeder circuits from a menu or list. In one embodiment, user input selection values of 0 through 10 are made available for user selection of the number of feeder circuits connected to the supply circuits in the proposed panel, although input or selection values greater than 10 may be used if desired.

If the number of feeder circuits entered, input or selected by the user at step 232 is zero, the systems enters navigation logic 234 as explained below. If the number of feeder circuits entered, input or selected by the user at step 232 is a non-zero value, the system proceeds to prompt the user to input, enter or select an overcurrent protection device for the feeder circuit at step 236. At step 238, the system prompts the user to input, enter or select an "other device" for the feeder circuit, and also prompts the user to enter whether the branch circuit contains yet another device at step 240. If the user chooses to add another device at step 240, the system returns to step 238.

There are two basic types of devices for feeder circuits represented in steps 236 and 238. Possible overcurrent protective devices for feeder circuits to be entered, input or selected by the user at step 236 include Branch Circuit Fuses such as UL 248 Fuses in a Fuse holder such as a UL 512 Fuse holder; Circuit Breakers such as UL 489 Circuit Breakers; Fused Pullouts such as UL 1429 Pullout Switches with Branch Circuit Fuses such as UL 248 Fuses; and Fused Switches such as UL 98 Misc. Switches with Branch Circuit Fuses such as UL 248 Fuses.

Possible other devices for feeder circuits to be entered, input or selected by the user at step 238 include Bus Bar Systems; Magnetic Controllers including includes definite purpose, lighting, or HP rated contactors; molded Case Switches such as UL 489 Molded Case Switches; Non-Fused Switches such as UL 508 Manual Motor Controllers; Non-Fused Switches such as UL 98 Misc. Switches; Terminal Block-Power Distribution Blocks (Listed to UL 1953); Semiconductor Fuses (UL 248 Fuses) in Fuse holder (UL 512 Fuse holder); Silicon Control Rectifiers (UL508C); Terminal Blocks—Power Dist. Blocks (Recognized to UL 1059) with Feeder Circuit Spacing; Transformers (UL 506 or UL 1561); and Multi-Lug Terminals.

It is understood that the devices mentioned in reference to steps 236 and 238 are exemplary only, and that greater or fewer numbers of devices, including devices not listed above, may be entered, input or selected in other embodiments of the invention without limitation.

If the user does not choose to add another device at step 240 for the feeder circuit, the system prompts 242 the user to enter, input or select the number of branch circuits connected to the feeder circuit. The prompt 242 may ask the user to enter the number of branch circuits connected to the feeder circuit, or asks the user to select the number of branch circuits from a menu or list. In one embodiment, user input selection values of 0 through 10 are made available for user selection of the number of branch circuits connected to the feeder circuit in the proposed panel, although input or selection values greater than 10 may be used if desired.

Figure 6:
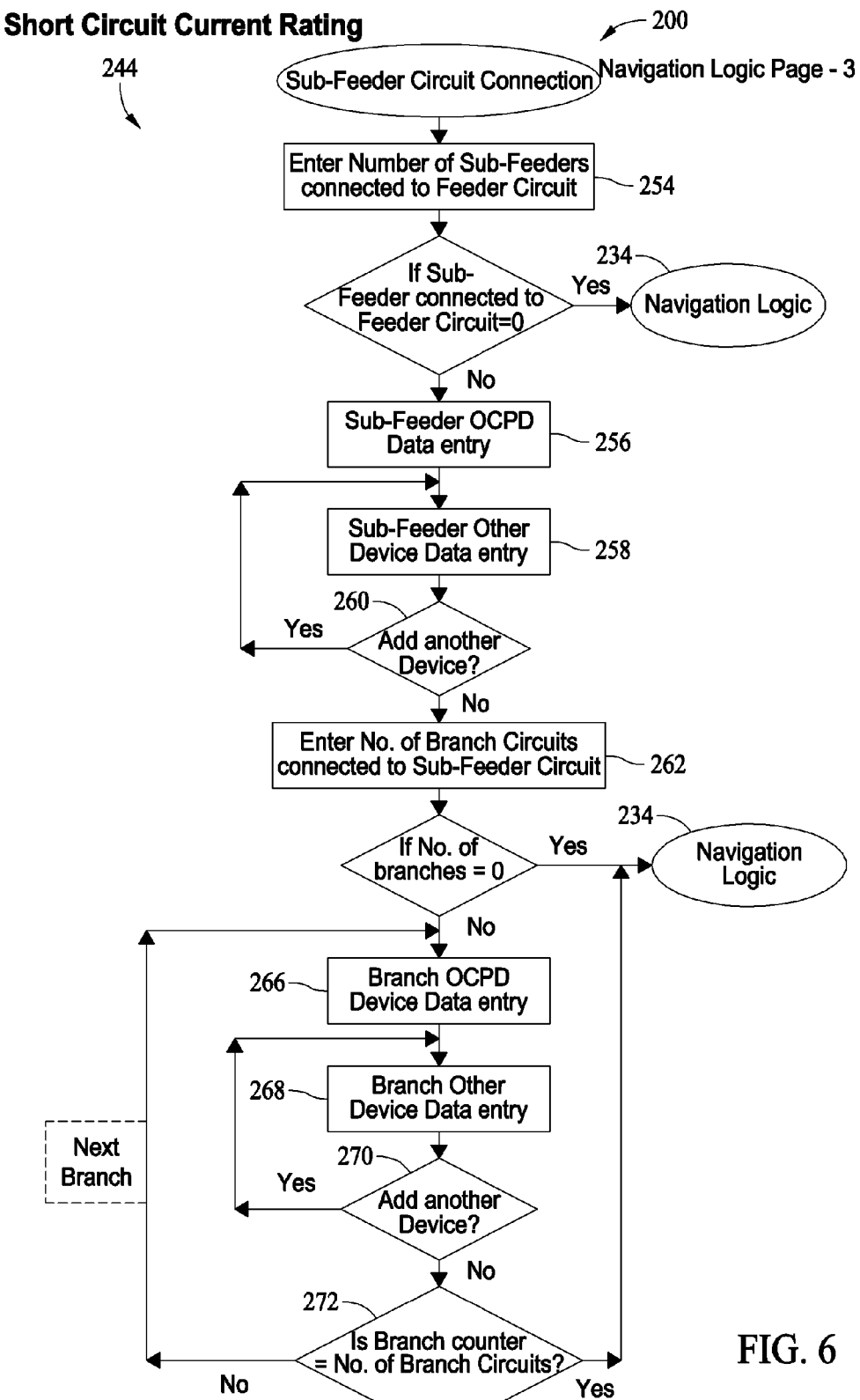

If the number of branch circuits entered, input or selected by the user at step 242 is zero, the systems enters 244 the sub-feeder circuit connection data entry processing algorithm shown in FIG. 6. If the number of branch circuits entered, input or selected by the user at step 242 is a non-zero value, the system proceeds to prompt the user to input, enter or select an overcurrent protection device for the branch circuit at step 246. At step 248, the system prompts the user to input, enter or select an "other device" for the branch circuit, and also prompts the user to enter whether the branch circuit contains yet another device at step 250. If the user chooses to add another device at step 250, the system returns to step 248.

In one embodiment, the possible devices to be entered, input or selected by the user for the branch circuits at steps 246 and 248 may include any of the branch circuit devices described in relation to steps 220 and 222 of FIG. 4. While specific devices are described, it is understood that the devices for the branch circuits are exemplary only, and that other devices may be entered, input or selected by a user in another embodiment.

If the user does not choose to add another device at step 250, the system determines 252 whether the branch count obtained from step 242 equals the number of branch circuits entered into the system at steps 246 and 248. If the branch count is less than the number of branch circuits entered by the user, the system returns to step 246 for the next branch to be entered. If the branch count is equal to the number of branch circuits entered by the user, the system enters 244 the sub-feeder circuit data entry processing algorithm shown in FIG. 6.

FIG. 6 illustrates the sub-feeder circuit connection data entry processing algorithm 244 of the navigational and data entry process 200. The sub-feeder circuit data entry processing algorithm 244 includes prompting 254 the user to enter, input or select the number of sub-feeder circuits connected to the feeder circuit. The prompt 254 may ask the user to enter the number of sub-feeder circuits, or ask the user to select the number of sub-feeder circuits from a menu or list. In one embodiment, user input selection values of 0 through 10 are made available for user selection of the number of sub-feeder circuits connected to the feeder circuit, although input or selection values greater than 10 may be used if desired.

If the number of sub-feeder circuits entered, input or selected by the user at step 254 is zero, the systems enters navigation logic 234 as explained below. If the number of sub-feeder circuits entered, input or selected by the user at step 254 is a non-zero value, the system proceeds to prompt the user to input, enter or select an overcurrent protection device for the sub-feeder circuit at step 256. At step 258, the system prompts the user to input, enter or select an "other device" for the feeder circuit, and also prompts the user to enter whether the branch circuit contains yet another device at step 260. If the user chooses to add another device at step 260, the system returns to step 258.

There are two basic types of devices for sub-feeder circuits represented in steps 256 and 258. Possible overcurrent protective devices for sub-feeder circuits to be entered, input or selected by the user at step 256 include Branch Circuit Fuses such as UL 248 Fuses in a Fuse holder such as a UL 512 Fuse holder; Circuit Breakers such as UL 489 Circuit Breakers; Fused Pullouts such as UL 1429 Pullout Switches with Branch Circuit Fuses such as UL 248 Fuses; and Fused Switches such as UL 98 Misc. Switches with Branch Circuit Fuses such as UL 248 Fuses.

Possible other devices for feeder circuits to be entered, input or selected by the user at step 258 include Bus Bar Systems; Magnetic Controllers including includes definite purpose, lighting, or HP rated contactors; molded Case Switches such as UL 489 Molded Case Switches; Non-Fused Switches such as UL 508 Manual Motor Controllers; Non-Fused Switches such as UL 98 Misc. Switches; Terminal Block-Power Distribution Blocks (Listed to UL 1953); Semiconductor Fuses (UL 248 Fuses) in Fuse holder (UL 512 Fuse holder); Silicon Control Rectifiers (UL508C); Terminal Blocks—Power Dist. Blocks (Recognized to UL 1059) with Feeder Circuit Spacing; Transformers (UL 506 or UL 1561); and Multi-Lug Terminals.

It is understood that the devices mentioned in reference to steps 256 and 258 are exemplary only, and that greater or fewer numbers of devices, including devices not listed above, may be entered, input or selected in other embodiments of the invention without limitation.

If the user does not choose to add another device at step 260 for the feeder circuit, the system prompts 262 the user to enter, input or select the number of branch circuits connected to the sub-feeder circuit. The prompt 262 may ask the user to enter the number of branch circuits connected to the sub-feeder circuit, or asks the user to select the number of branch circuits from a menu or list. In one embodiment, user input selection values of 0 through 10 are made available for user selection of the number of branch circuits connected to the sub-feeder circuit in the proposed panel, although input or selection values greater than 10 may be used if desired.

Figure 7:
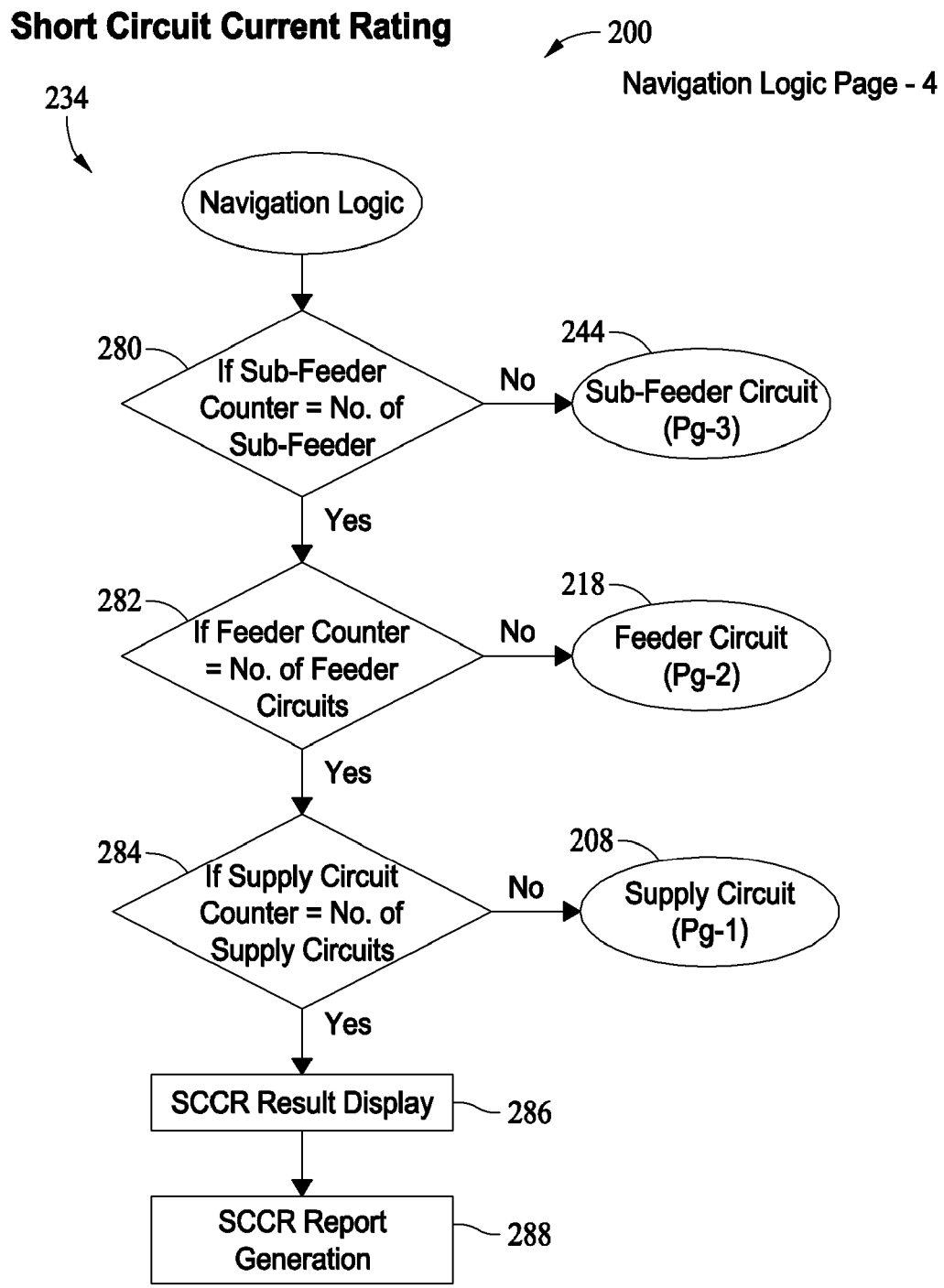

If the number of branch circuits entered, input or selected by the user at step 262 is zero, the systems enters 234 the navigation logic algorithm shown in FIG. 7. If the number of branch circuits entered, input or selected by the user at step 262 is a non-zero value, the system proceeds to prompt the user to input, enter or select an overcurrent protection device for the branch circuit at step 266. At step 268, the system prompts the user to input, enter or select an "other device" for the branch circuit, and also prompts the user to enter whether the branch circuit contains yet another device at step 270. If the user chooses to add another device at step 270, the system returns to step 268.

In one embodiment, the possible devices to be entered, input or selected by the user for the branch circuits at steps 266 and 268 may include any of the branch circuit devices described in relation to steps 220 and 222 of FIG. 4. While specific devices are described, it is understood that the devices for the branch circuits are exemplary only, and that other devices may be entered, input or selected by a user in another embodiment.

If the user does not choose to add another device at step 270, the system determines 272 whether the branch count obtained from step 262 equals the number of branch circuits entered into the system at steps 266 and 268. If the branch count is less than the number of branch circuits entered by the user, the system returns to step 266 for the next branch to be entered. If the branch count is equal to the number of branch circuits entered by the user, the system enters 234 navigation logic algorithm shown in FIG. 7.

Turning now to FIG. 7, the navigational logic algorithm 234 includes determining 280 whether the sub-feeder count obtained from step 254 in FIG. 6 is equal to the number of sub-feeder circuits entered into the system. If the sub-feeder count is less than the number of sub-feeder circuits entered into the system, the system returns to the sub-feeder circuit connection data entry processing algorithm 244.

If the sub-feeder count is equal to the number of sub-feeder circuits entered into the system, the system determines 282 whether the feeder count obtained from step 232 in FIG. 5 is equal to the number of feeder circuits entered into the system. If the feeder count is less than the number of feeder circuits entered into the system, the system returns to the feeder circuit connection data entry processing algorithm 218.

If the feeder count is equal to the number of feeder circuits entered into the system, the system determines 284 whether the supply circuit count obtained from step 206 in FIG. 4 is equal to the number of supply circuits entered into the system. If the supply circuit count is less than the number of supply circuits entered into the system, the system returns to the supply circuit data entry processing algorithm 202 at step 208.

By virtue of the steps 280, 282 and 284, the system is ensured of completely accounting for all circuits in the electrical panel and to account for all the circuits in the assessment or evaluation of the control panel. Human error associated with the failure to consider all the devices in all of the circuits in the panel is avoided.

If the supply circuit count at step 284 is equal to the number of supply circuits entered into the system, the system applies the promulgated standard of interest to the components or devices entered, input or selected by the user, and displays 286 the result, such as the short-circuit current rating of the electrical control panel per N.E.C. Article 409 and U.L. 508A as explained below, to the user. Additionally, the system generates 288 a detailed report for analysis by the user. As will become evident below, the system in one embodiment displays the result at each step of the analysis as the component devices of the supply circuits, feeder circuits, sub-feeder circuits and associated branch circuits are entered, input or selected by the user. Display of the result at each step provides feedback to the user at each step and provides some ability for the user to understand how certain devices impact the ultimate result obtained.

Algorithms for obtaining the processing of data and information inputs to generated outputs to be displayed to the user will now be explained.

B. Data Analysis Processes

FIGS. 8-23 illustrate portions of exemplary data analysis processes utilized by the system 150 shown in FIGS. 2 and 3 and which operate upon the data entered, input, selected or otherwise obtained with the navigational and data entry process 200 shown in FIGS. 4-7. Corresponding steps of FIGS. 4-7 and FIGS. 8-23 will be indicated with like reference characters in FIGS. 8-23 considering the overlap between the data analysis processes and the navigational and data entry processes. It is to be understood that while for the sake of description the data analysis processes and the navigational and data analysis processes are separately discussed herein, the data analysis processes and the navigational and data analysis processes operate in tandem as the user interacts with the system 150 as further explained below.

FIGS. 8-23 will be described in the context of an exemplary proposed panel design having one supply circuit, one feeder circuit, two branch circuits connected to the feeder circuit, one sub-feeder circuit and one branch circuit connected to the sub-feeder circuit. The selection of the components used in this example will also be explained in reference to the user interface and displays demonstrated in FIGS. 24-44 set forth below.

Figure 8:
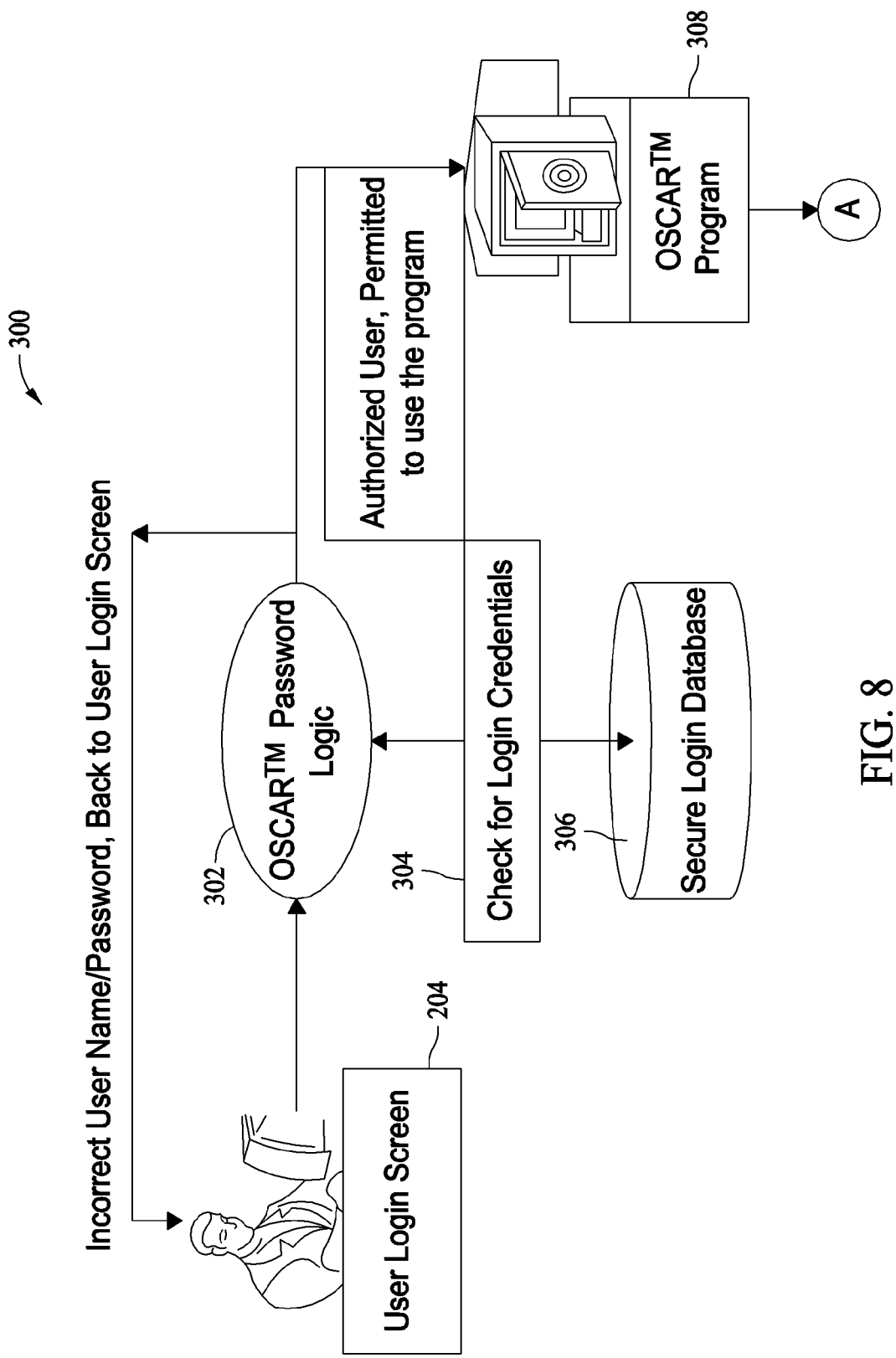

FIG. 8 illustrates an exemplary logon processing algorithm 300 for the analysis and evaluation system 150. The logon algorithm 300 may include prompting 204 the user to login to the system using a unique user-specified name and password. Once the name and password are entered by the user, the system processes 302 the name and password and compares the user name and password to login credentials 304 stored in a secure login database 306 on the system. If the credentials of the user name and password match a name and password stored in the database 306, the system determines that the user is authorized and enters 308 a main program algorithm, which in one embodiment may begin with the supply circuit data collection and navigation algorithm 202 shown in FIG. 4.

If the user name and password entered by a user do not match the credentials stored in the database 306 at step 302, the system returns to prompt 204 the user to login with a valid name and password. If the user forgets his or her username or password, username and password retrieval steps may be implemented with appropriate security measures may be provide to assist the user.

Figure 9:
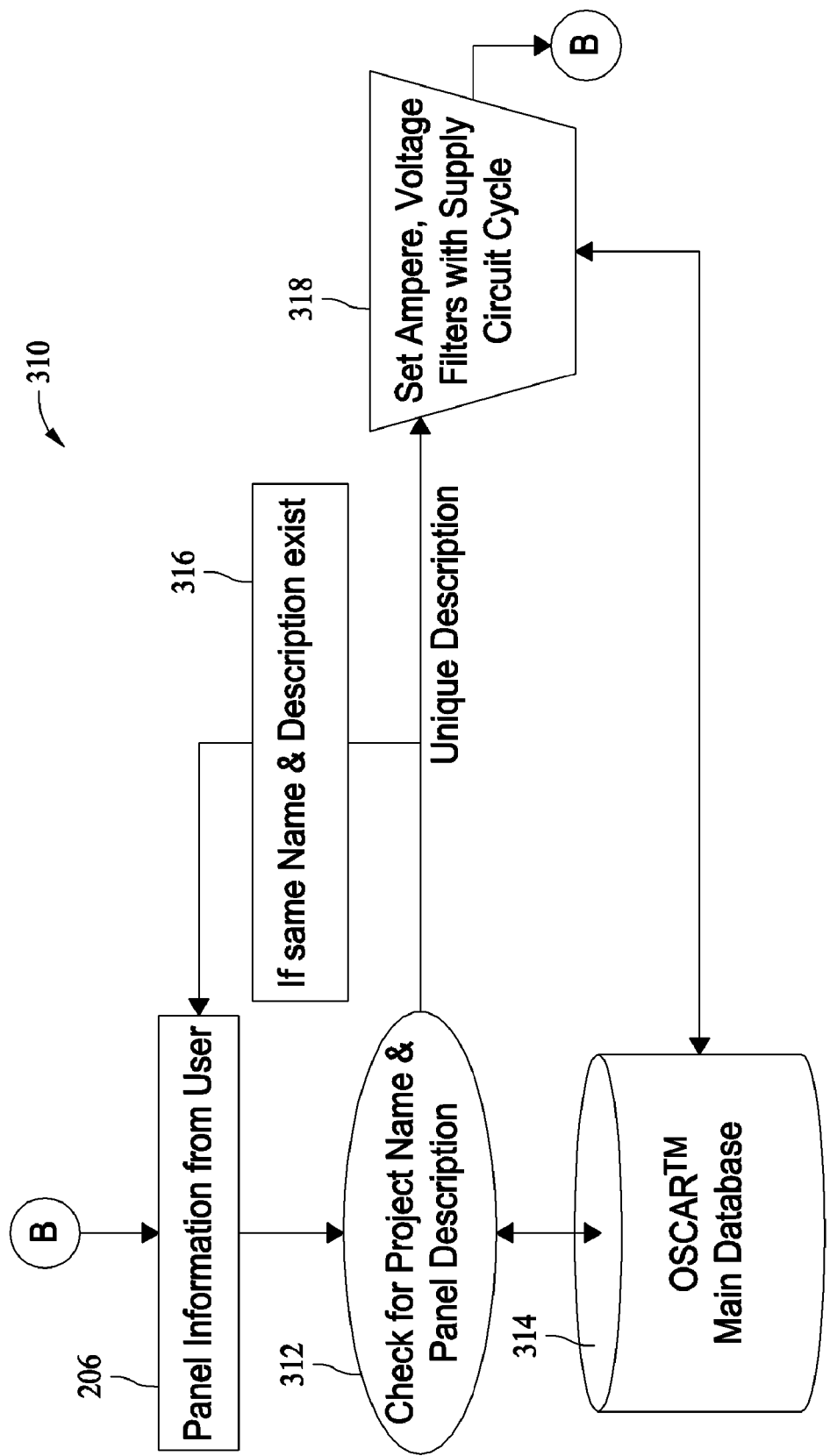

FIG. 9 illustrates a project information processing algorithm 310 that may be implemented in conjunction with the user welcome 206 as shown in FIG. 4 after a successful login by the user. At step 206, the user is prompted to enter panel information relating to the proposed electrical panel design. In an exemplary embodiment, the information includes a Project Name, a Panel Designation, an Ampere Rating of the Panel, a Voltage Rating of the Panel and a number of supply circuits connected to the Panel, although it is appreciated that other information may be prompted by the system for user entry if desired.

Once the panel information is obtained from the user at step 206, the system checks 312 the Project Name and Panel Description against project names and panel descriptions stored in a main database 314 of the system. If at step 316, the entered Project Name and Panel Description are found to exist in the database 314, the system returns to prompt 204 the user to re-enter panel information. Providing unique panel information for each project specified by a user increases the security of the system and prevents a user from creating multiple projects having the same name, but involving different panels and potentially confusing or inconsistent results.

As shown in FIG. 9, if a unique panel name and description are entered, the system sets 318 filters for the database so that available device selections presented to a user from the database are consistent with the user-entered Ampere Rating of the Panel, Voltage Rating of the Panel and Supply Circuit Cycle for the project.

Figure 10:
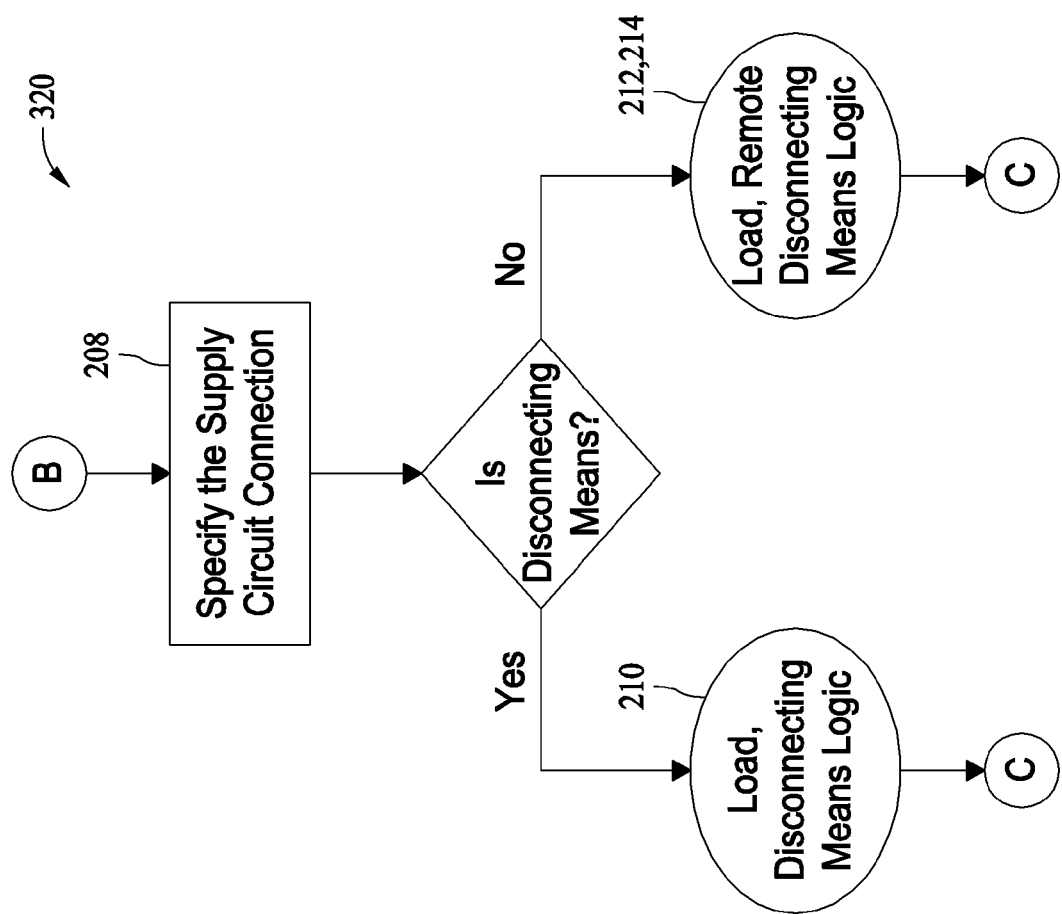

FIG. 10 illustrates a portion of a supply circuit type selection processing algorithm 320 utilized by the program after the project information processing algorithm 310 of FIG. 9 is completed. The supply circuit type processing algorithm 320 includes the steps 210 and 212, 214 as described above in relation to FIG. 4 wherein the user enters, inputs, or selects the devices utilized in the supply circuit for the project.

Figure 11:
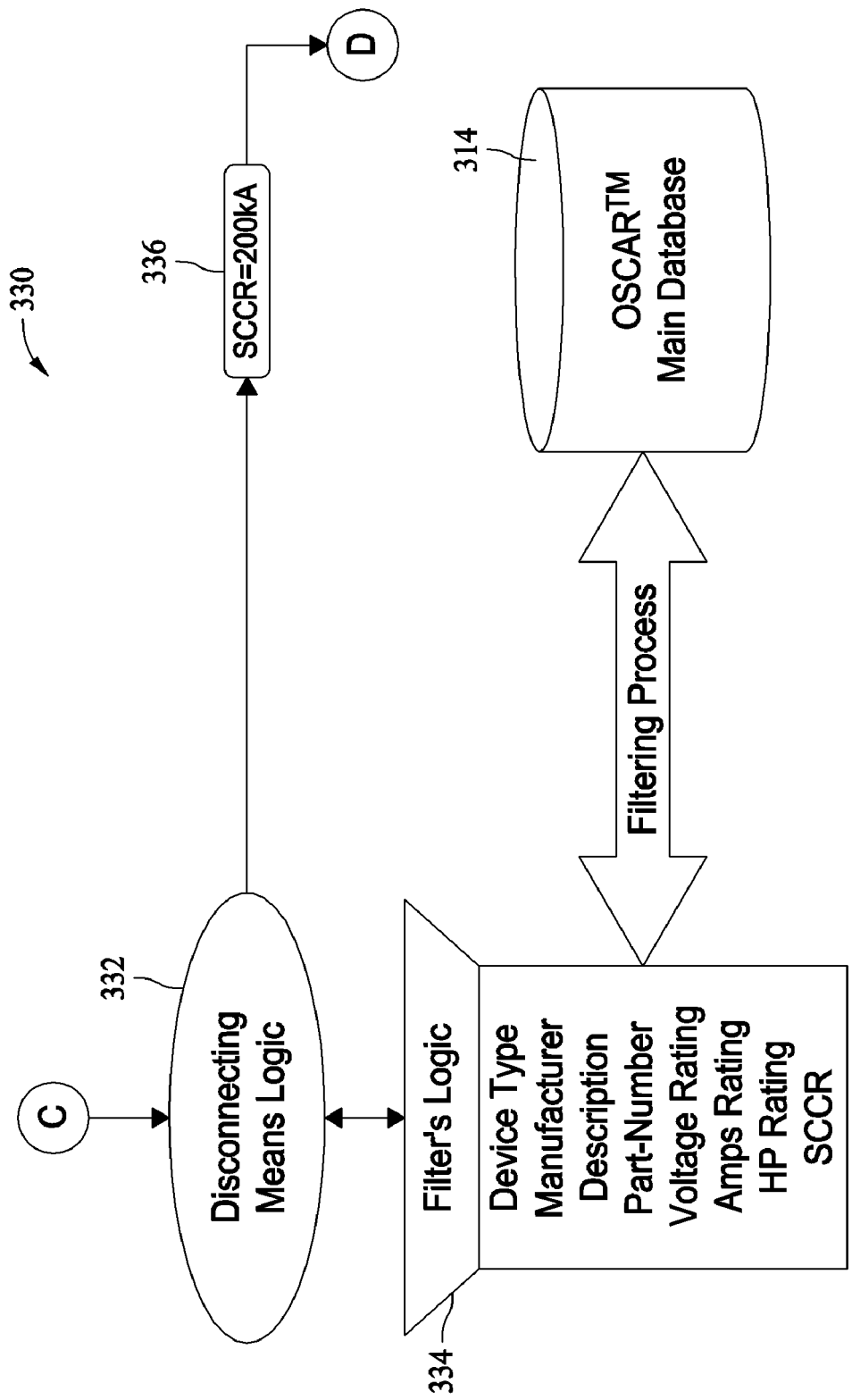

FIG. 11 illustrates a supply circuit component selection processing algorithm 330 that the system performs after the algorithm 320 of FIG. 10. The supply circuit component selection processing algorithm 330 includes entering 332 a logic loop wherein the main system database 314 is filtered to obtain device data and information corresponding to the selected component devices in the algorithm 320 for the supply circuit. Via the filtering process, complete information regarding the selected devices is obtained at step 334, including, for example, device type codes, manufacturer names, device descriptions, device part-numbers, device voltage ratings, device current ratings, HP ratings, and short-circuit current ratings (SCCR ratings) for the selected devices. Once the information is obtained at step 334, the system displays 336 the short-circuit current rating for the supply circuit, which in one example may be found to be 200 kA as shown in FIG. 11.

Figure 12:
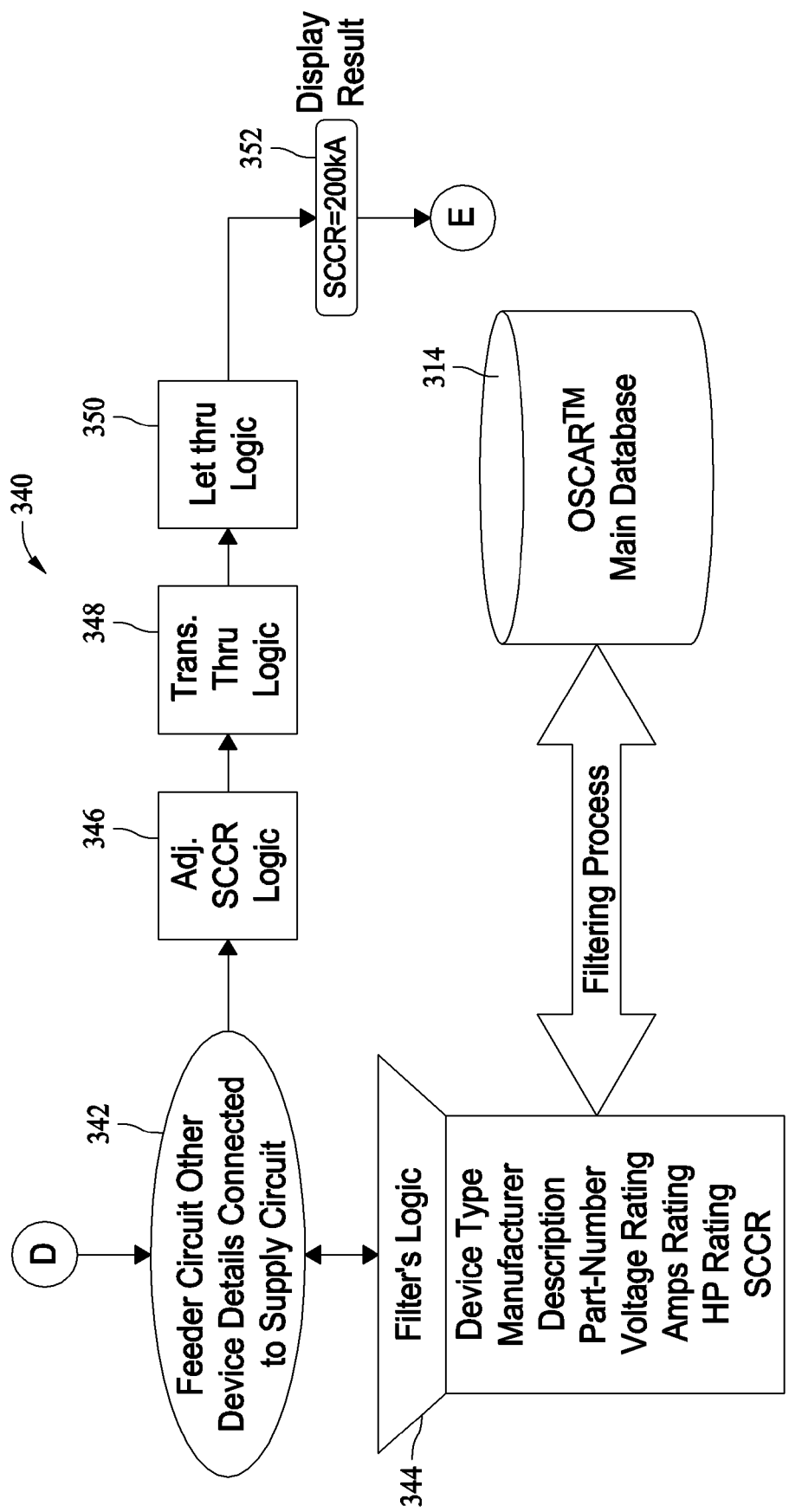

FIG. 12 illustrates a feeder circuit component analysis processing algorithm 340 to be performed after the supply circuit processing algorithm shown in FIG. 11. The feeder circuit component analysis processing algorithm 340 operates on the user inputs from the feeder circuit data collection and navigation algorithm 218 shown in FIG. 5.

The feeder circuit component analysis processing algorithm 340 includes entering 342 a logic loop wherein the main system database 314 is filtered to obtain device data and information corresponding to the selected component devices in the algorithm 218 at steps 236 and 238 (FIG. 5) for the feeder circuit. Via the filtering process, complete information regarding the selected devices is obtained at step 344, including, for example, device type codes, manufacturer names, device descriptions, device part-numbers, device voltage ratings, device current ratings, HP ratings, and SCCR ratings for the selected devices. Once the information is obtained at step 344, the system enters a series of logic loops 346, 348, 350 applying the procedures of U.L. 508A to the obtained information to determine the short-circuit current rating of the supply circuit and the connected feeder circuit.

More specifically, the system at step 346 enters an Adjusted SCCR Logic Loop that evaluates whether devices connected in the upstream circuit or immediately preceding circuit in the panel, such as the supply circuit, may increase the short-circuit current rating of the feeder circuit. At step 348 the system enters a Trans. thru Logic loop that evaluates the effects of an upstream transformer on the short-circuit current rating of the feeder circuit. At step 350, the system enters a Let-Thru Logic Loop that evaluates let-thru currents of overcurrent protection devices as they open or otherwise operate in a short-circuit current condition and the effects of let-thru currents on the rating of the panel. Once the steps 346, 348 and 350 are performed on the information obtained at step 348, the system displays 352 the short-circuit current rating for combination of the supply circuit and the feeder circuit, which in one example may be found to be 200 kA as shown in FIG. 12.

While the exemplary SCCR values displayed in FIGS. 11 and 12 match one another, it is noted that for certain combinations of devices in the supply circuit and the feeder circuit the values obtained and displayed in the algorithms 330 and 340 of FIGS. 11 and 12 will not match one another.

Figure 13:
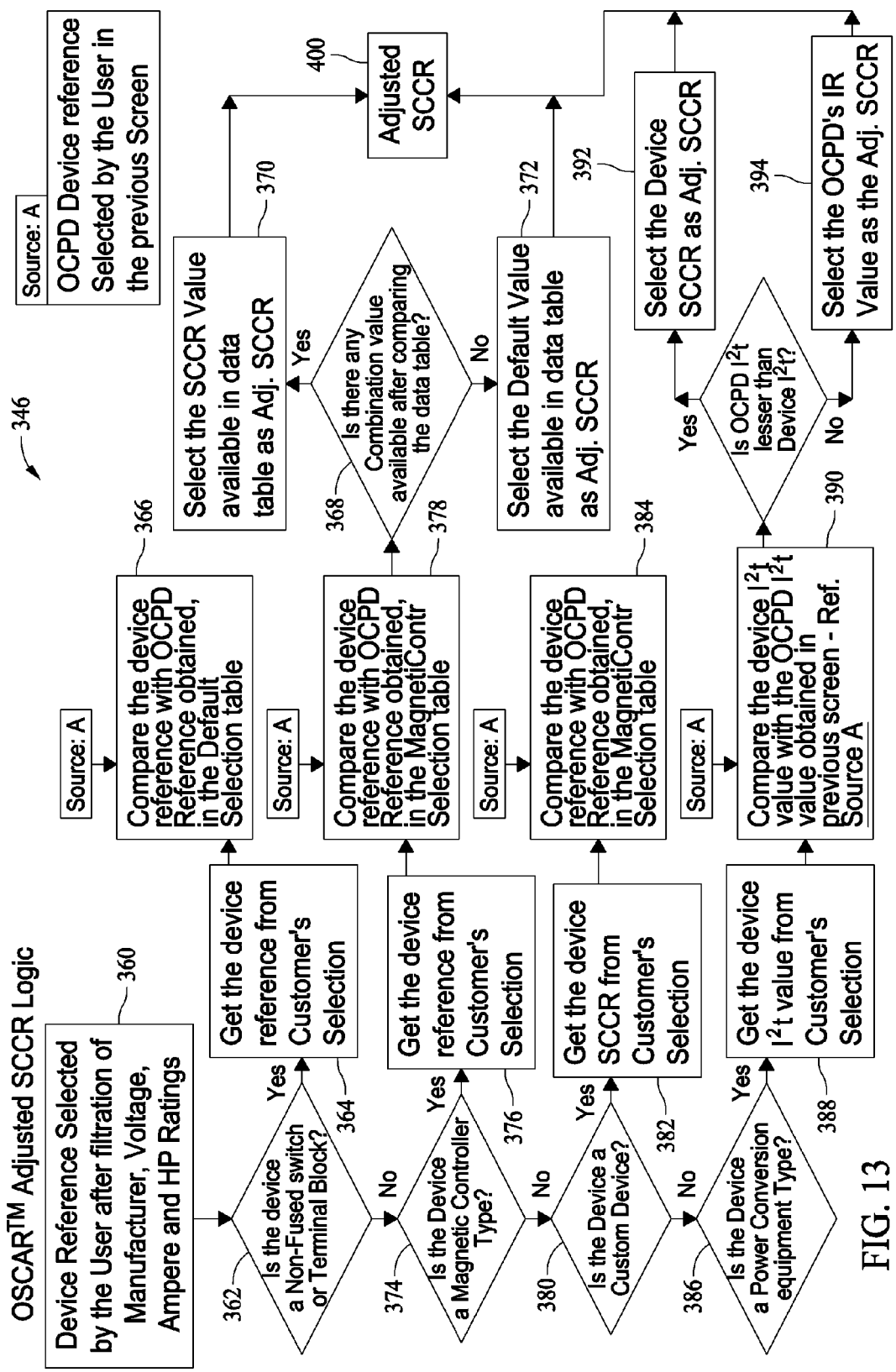

FIG. 13 illustrates the Adjusted SCCR Logic Loop 346 which is operable not only on the feeder circuit devices of the algorithm 340 of FIG. 12, but on branch circuits connected to the feeder circuits, sub-feeder circuits, and branch circuits connected to the sub-feeder circuits as will become apparent below.

The Adjusted SCCR Logic Loop 346 begins with supplying 360 information selected by the user after the system filtration of manufacturer, voltage rating, current rating, and HP ratings in the main database of the system. Once the information is supplied 360, the system determines whether the information pertains to a non-fuse switch or terminal block at step 362.

If the information corresponds to a non-fuse switch or terminal block at step 362, the system retrieves 364 the short-circuit current rating (SCCR) for the non-fuse switch or terminal block from the main database. The retrieved rating at step 364 is then compared at step 366 with a short-circuit rating of the overcurrent protection device (OCPD) selected by the user for preceding circuit in the proposed panel that is being analyzed. That is, for a feeder circuit, the preceding circuit would be the supply circuit. For a sub-feeder circuit the preceding circuit would be the feeder circuit. For branch circuits the preceding circuit would be the supply circuit, feeder circuit or sub-circuit to which the branch is connected.

Using the retrieved value at step 364 and the rating for the OCPD of the preceding circuit, the system looks to a default selection table including combination short-circuit ratings for various OCPD values and retrieved values for non-fuse switches or terminal blocks connected to one another. The combination ratings may be separately calculated or empirically determined to populate the default selection table.

At step 368, if the default selection table includes a combination short-circuit rating for the retrieved value and the OCPD value, the system selects 370 the combination rating from the selection table as the Adjusted SCCR value. If there is no combination short circuit-rating for the retrieved value and the OCPD value at step 368, the system selects 372 a default value, also contained in the default selection table, as the Adjusted SCCR Value.

If at step 362 the selected device does not correspond to a non-fused switch or terminal block, the system determines at step 374 whether the selected device information at step 360 corresponds to a magnetic controller type device.

If the information corresponds to a magnetic controller type device at step 374, the system retrieves 376 the SCCR for the magnetic controller type device from the main database. The retrieved rating at step 376 is then compared at step 378 with a short-circuit rating of the overcurrent protection device (OCPD) utilized in the preceding circuit in the panel. Using the retrieved value at step 376 and the rating for the OCPD, the system looks to a default selection table including combination short-circuit ratings for various OCPD values and retrieved values for magnetic controller type device when connected to one another. The combination ratings may be separately calculated or empirically determined to populate the default selection table.

At step 368, if the default selection table includes a combination short-circuit rating for the retrieved value and the OCPD value, the system selects 370 the combination rating from the selection table as the Adjusted SCCR value. If there is no combination short circuit-rating for the retrieved value and the OCPD value at step 368, the system selects 372 a default value, also contained in the default selection table, as the Adjusted SCCR Value.

If at step 374 the selected device does not correspond to a magnetic controller type device, the system determines at step 380 whether the selected device information at step 360 corresponds to a custom device that is not in the main database as a selectable device. For a custom device, the user manually enters the pertinent device information into the system, such as the manufacturer of the device, the voltage rating, the current rating, and the HP rating of the device.

If the information corresponds to a custom device at step 380, the system retrieves 382 the user-entered SCCR for the custom device. The retrieved rating at step 382 is then compared at step 384 with a short-circuit rating of the overcurrent protection device (OCPD) selected by the user for preceding circuit in the panel. Using the retrieved value at step 382 and the rating for the OCPD, the system looks to a default selection table including combination short-circuit ratings for various OCPD values and retrieved values for devices when connected to one another. The combination ratings may be separately calculated or empirically determined to populate the default selection table.

At step 368, if the default selection table includes a combination short-circuit rating for the retrieved value and the OCPD value, the system selects 370 the combination rating from the selection table as the Adjusted SCCR value. If there is no combination short circuit-rating for the retrieved value and the OCPD value at step 368, the system selects 372 a default value, also contained in the default selection table, as the Adjusted SCCR Value.

If at step 380 the selected device does not correspond to a custom device, the system determines at step 386 whether the selected device information at step 360 corresponds to a power conversion equipment type of device.

If the selected device information corresponds to a power conversion equipment type of device, the system retrieves 386 an $i^2t$ value for the selected device from the main database. The retrieved rating at step 388 is then compared at step 390 with an $i^2t$ value for the overcurrent protection device (OCPD) selected by the user for the preceding circuit in the panel.

If the $i^2t$ value of the OCPD is less than the $i^2t$ value of the selected power conversion equipment type device, the system selects 392 the SCCR value for the power conversion equipment type device as the Adjusted SCCR value.

If the $i^2t$ value of the OCPD is greater than the $i^2t$ value of the selected power conversion equipment type device, the system selects 394 an IR value for the OCPD, also stored in the main database, as the Adjusted SCCR value.

Figure 14:
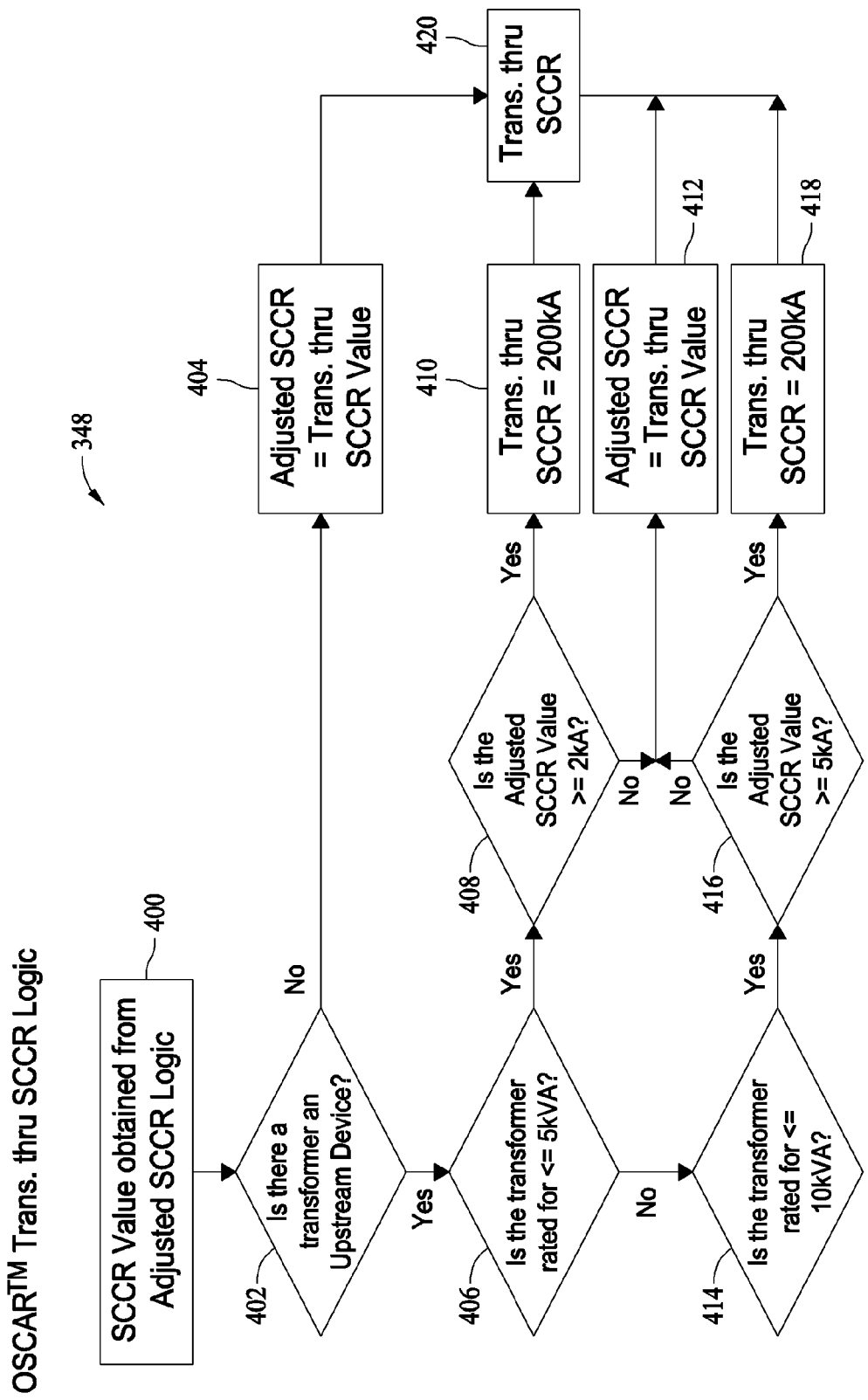

FIG. 14 illustrates the Trans. thru SCCR Logic loop 348. The Trans. thru SCCR Logic loop begins with the output of the Adjusted SCCR Logic loop 346 of FIG. 13 at one of the steps 370, 372, 392, or 394 wherein the Adjusted SCCR value is selected. The system then determines whether there is an upstream transformer in the preceding circuits in the panel. The system looks to upstream device selections to determine whether or not a transformer is present.

If at step 402 there is no upstream transformer, the Trans. thru SCCR value output is set 404 equal to the Adjusted SCCR value at step 400.

If there is an upstream transformer at step 402, the system determines at step 406, based upon the transformer selected by the user and its corresponding data in the main database, whether or not the transformer has a rating that is less than a first predetermined amount, such as 5 kVA in one example. If the transformer rating is less than the first predetermined amount, the system determines whether Adjusted SCCR value at step 400 is greater than a predetermined amount or threshold, such as 2 kA in one example, that corresponds to the SCCR rating of the previous circuit analyzed, such as the result at step 336 in FIG. 11 for the supply circuit when the circuit presently being evaluated is a feeder circuit. If the Adjusted SCCR value is greater than this predetermined threshold at step 408, the system sets 410 the Trans. thru SCCR value equal to the SCCR rating of the previous circuit analyzed. When the Adjusted SCCR value is less than the predetermined threshold at step 408, the system sets 412 the Trans. thru SCCR value equal to Adjusted SCCR value of step 400.

If the transformer rating is not less than the first predetermined threshold at step 406, the system proceed to determine at step 414, based upon the transformer selected by the user and its corresponding data in the main database, whether or not the transformer has a rating that is less than a second predetermined amount that is greater than the first predetermined amount, such as 10 kVA in one example. If the transformer rating is less than the second predetermined amount, the system determines 416 whether the Adjusted SCCR value at step 400 is greater than the first predetermined amount of step 406.

If the Adjusted SCCR value is greater than the second predetermined amount at step 416, the system sets 418 the Trans. thru SCCR value equal to the SCCR rating of the previous circuit analyzed. When the Adjusted SCCR value is less than the predetermined threshold at step 408, the system sets 412 the Trans. thru SCCR value equal to Adjusted SCCR value of step 400.

Figure 15:
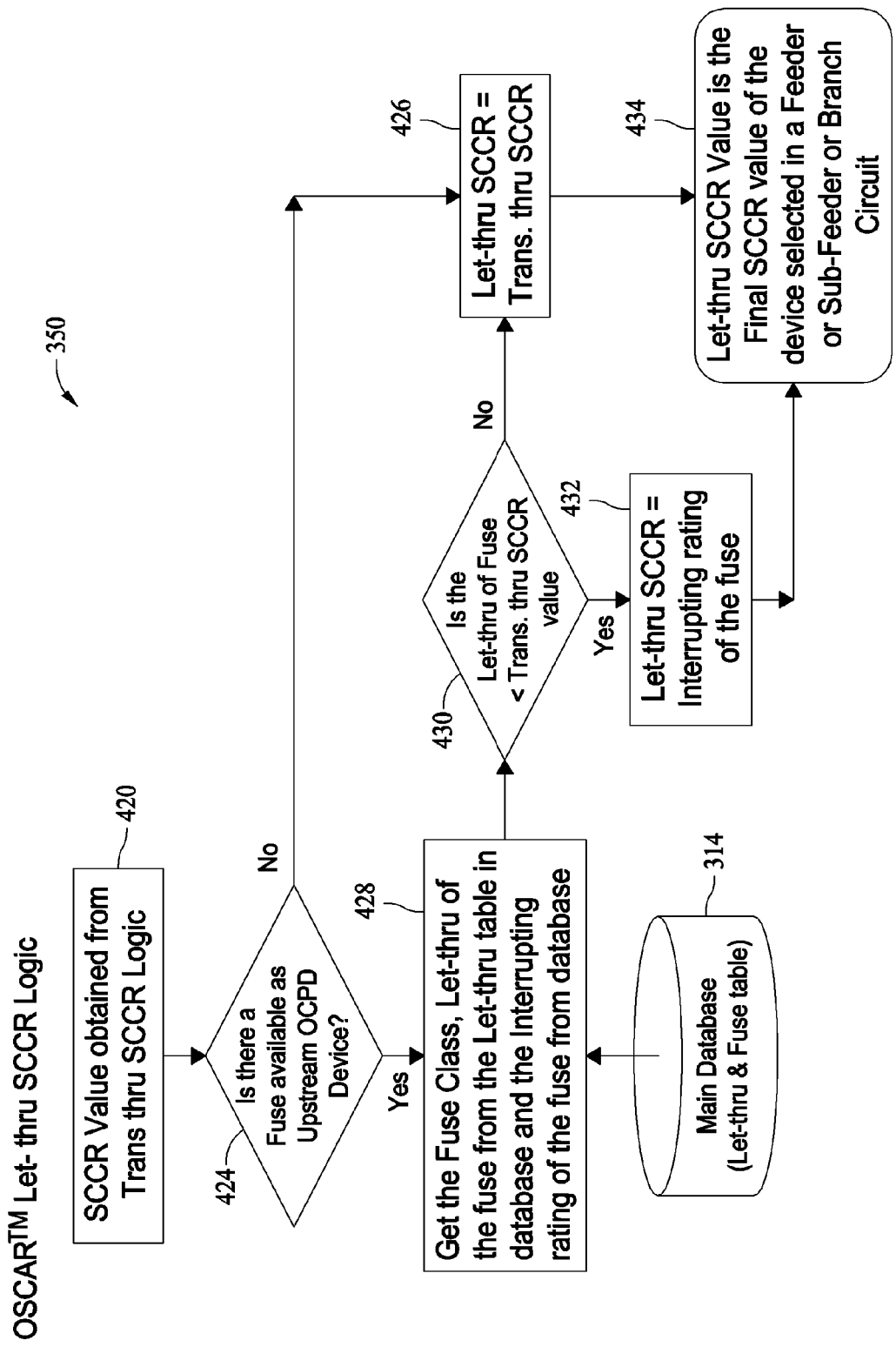

FIG. 15 illustrates the Let-thru SCCR Logic loop 350. The Let-thru SCCR Logic loop begins 420 with the output Trans. thru SCCR value 420 of FIG. 14. Once the Trans. thru SCCR value is supplied, the system determines 424 whether a fuse has been selected by the user as an upstream device to the circuit presently being analyzed. If no fuse has been selected, the system 426 sets a Let-thru SCCR value equal to the Trans. thru SCCR value supplied at step 420.

If a fuse has been selected as an upstream device, at step 428 the system retrieves 428, from the main database 314, data and information pertaining to the fuse class, a let-thru value from a lookup table, and an interrupting rating corresponding to the selected fuse. Once the information is retrieved at step 428 the system determines at step 430 whether the let-thru value of the fuse is less than the Trans. thru SCCR value supplied at step 420. If the let-thru value of the fuse is less than the Trans. thru SCCR value, the system sets 426 a Let-thru SCCR value equal to the Trans. thru SCCR value supplied at step 420.

If at step 430, the let-thru value of the fuse is greater than the Trans. thru SCCR value, the system sets 432 the Let-thru SCCR value equal to the interrupting rating of the fuse.

As indicated in FIG. 15, the Let-thru SCCR value is the final SCCR value for each feeder circuit, sub-feeder circuit, or branch circuit to be analyzed. This value, represented as step 434 in FIG. 15, is the result displayed, such as the result 352 shown in FIG. 12, at each iteration of analysis for the circuits found in the proposed panel design.

Figure 16:
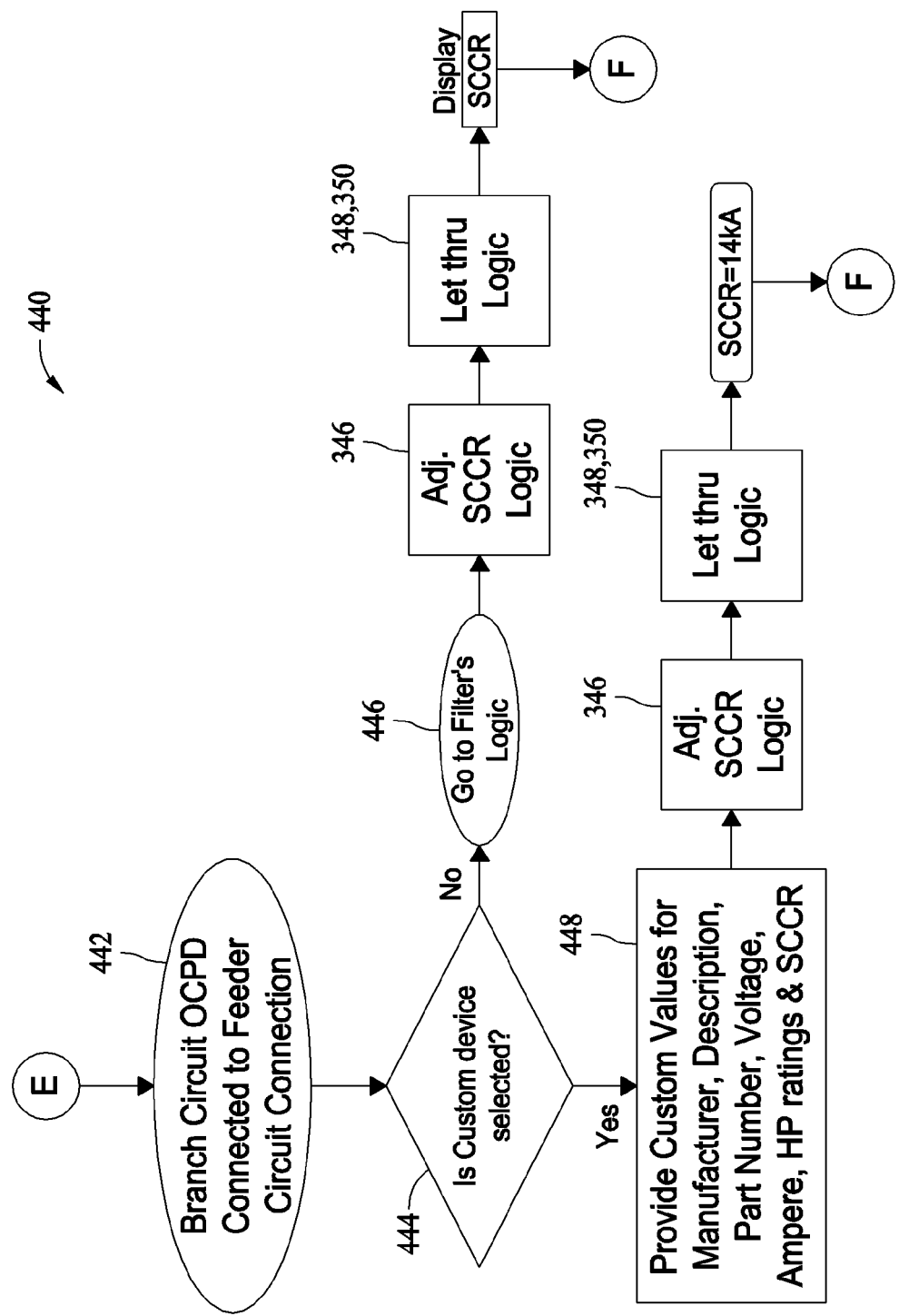

FIG. 16 illustrates a branch circuit analysis processing algorithm 440 for an overcurrent protection device in the first branch circuit connected to the feeder circuit in the exemplary proposed panel design. The algorithm 440 is performed after the algorithm 340 shown in FIG. 12, and the algorithm 440 operates on the user inputs from the feeder circuit data collection and navigation algorithm 218 shown in FIG. 5 at steps 246 and 248.

The branch circuit component selection processing algorithm 440 includes entering 442 a logic loop wherein the system determines 444 whether a custom device has been selected in the branch circuit. If no custom device is selected, the main system database is filtered 446 to obtain device data and information corresponding to the selected component devices in the algorithm 218 at step 246 (FIG. 5) for the feeder circuit. Via the filtering process, complete information regarding the selected devices is obtained, including, for example, device type codes, manufacturer names, device descriptions, device part-numbers, device voltage ratings, device current ratings, HP ratings, $i^2t$ values, IR values and SCCR ratings for the selected devices. Once the information is obtained at step 446, Adjusted SCCR logic loop 346 and the let-thru logic loops 348, 350 are performed to calculate and determine the output SCCR value for display.

If a custom device was selected, the user-entered data and information 448 for the custom device is used to perform the Adjusted SCCR logic loop 346 and the let-thru logic loops 348, 350 to calculate and determine the output SCCR value for display. As seen in FIG. 16, in one example, the resultant SCCR value of 14 kA in the example, based upon the information for the custom device, does not match the previous SCCR value obtained at step 352 of FIG. 12.

Figure 17:
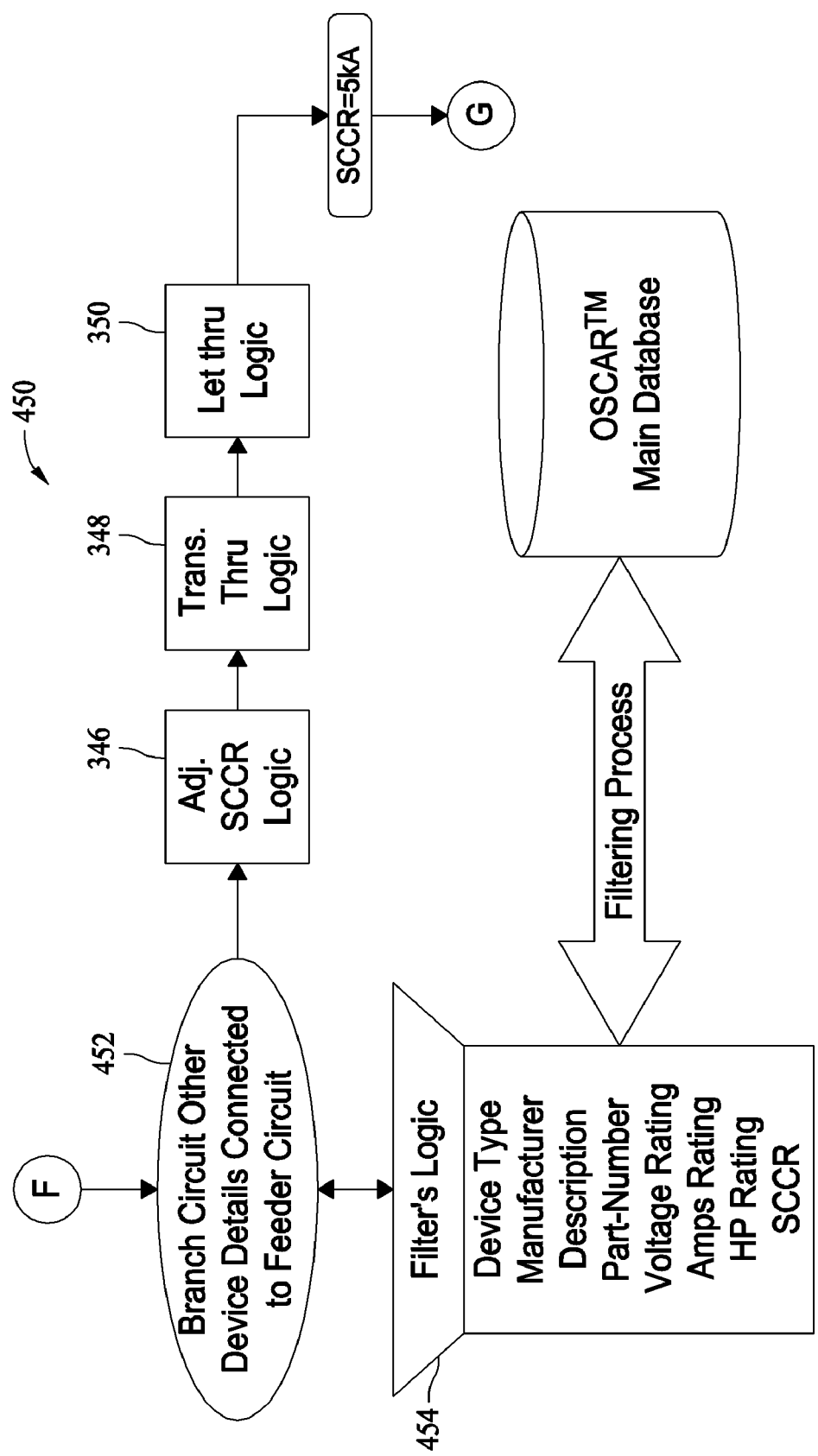

FIG. 17 illustrates a branch circuit analysis processing algorithm 450 for the "other" non-OCPD branch circuit device connected to the overcurrent protection device shown and analyzed in the algorithm shown in FIG. 16. The algorithm 450 is performed after the algorithm 440 shown in FIG. 16, and the algorithm 450 operates on the user inputs from the feeder circuit data collection and navigation algorithm 218 shown in FIG. 5 at step 248.

The branch circuit component analysis processing algorithm 450 includes entering 452 a logic loop wherein the system filters 454 the main database 314 to obtain device data and information corresponding to the selected component devices in the algorithm step 248 (FIG. 5) for the second branch circuit. Via the filtering process, complete information regarding the selected devices is obtained, including, for example, device type codes, manufacturer names, device descriptions, device part-numbers, device voltage ratings, device current ratings, HP ratings, $i^2t$ values, IR values and SCCR ratings for the selected devices. Once the information is obtained at step 454, the Adjusted SCCR logic loop 346 and the let-thru logic loops 348, 350 are performed to calculate and determine the output SCCR value for display. Of note, the resultant SCCR value of 5 kA shown in the example of FIG. 15 is unequal to both of the previously calculated SCCR values of FIGS. 12 and 16.

Figure 18:
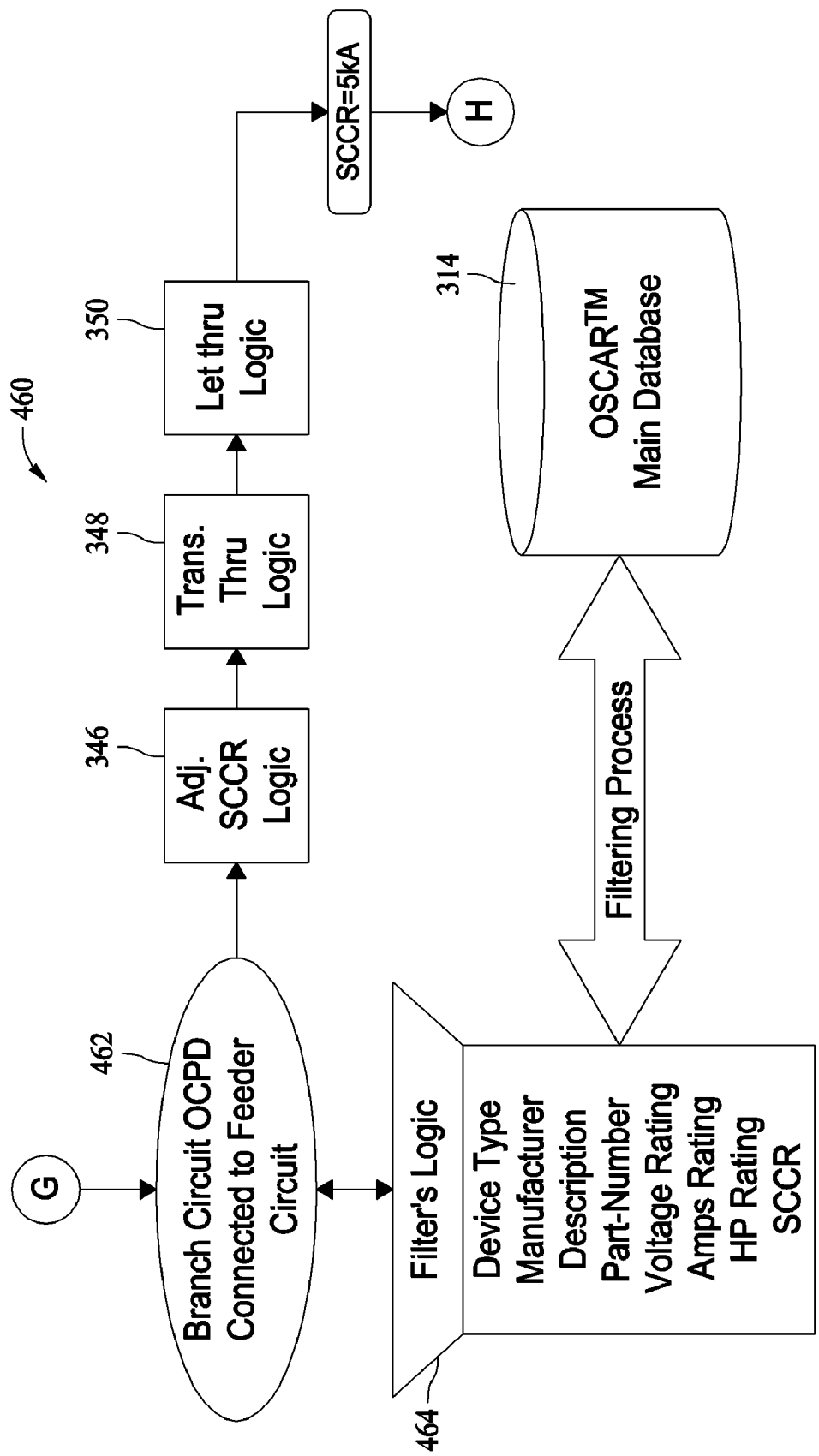
Figure 19:
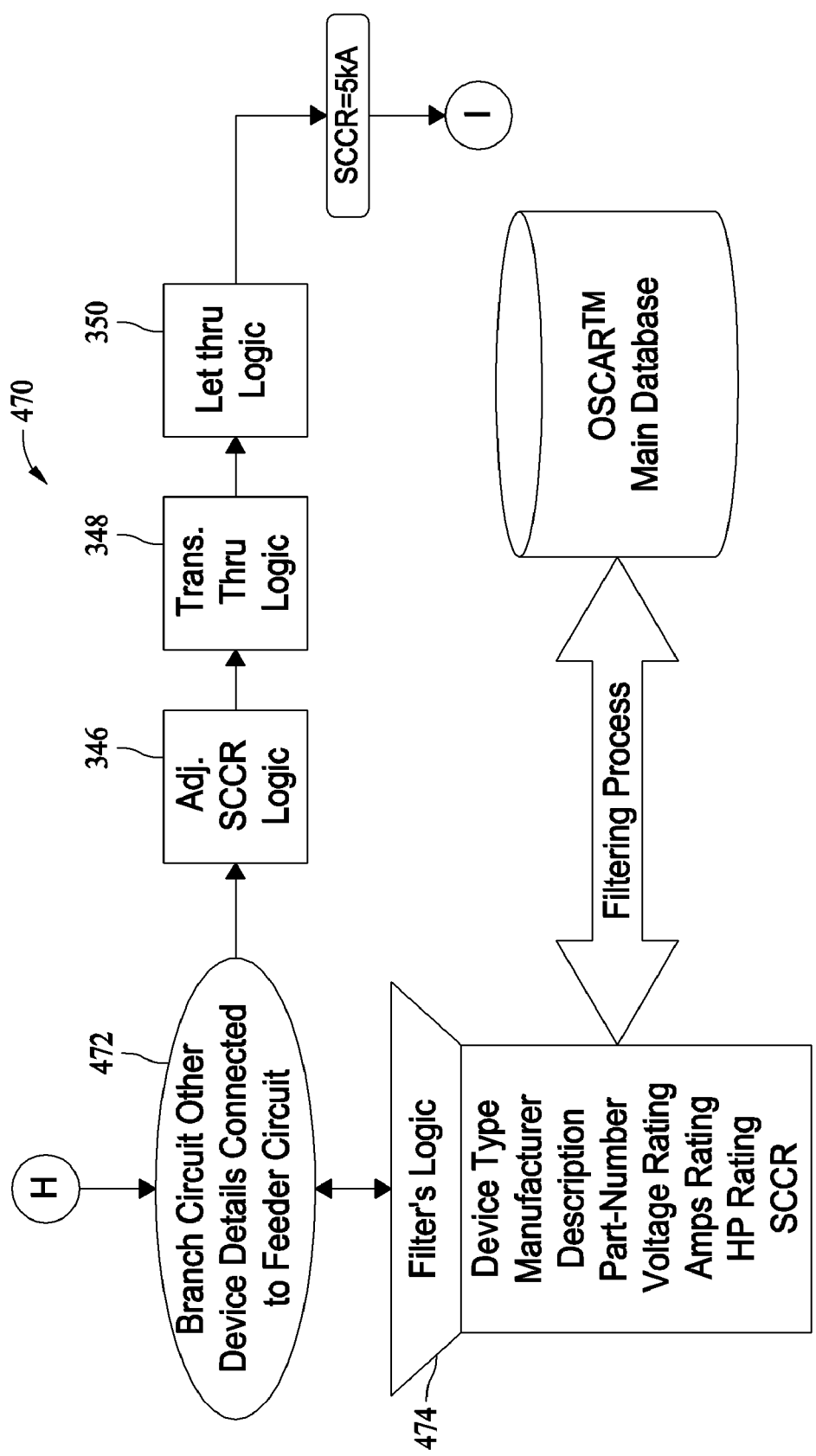

FIGS. 18 and 19 illustrate branch circuit analysis processing algorithms 460 and 470 for selected overcurrent protection devices and other devices in the second branch circuit connected to the feeder circuit in the exemplary proposed panel design. The algorithms 460 and 470 are similar to the algorithm 450 shown in FIG. 17, and generate the same output result as is shown in FIG. 17 in one example. That is, in the exemplary example, the properties of the devices selected in the second branch circuit do not change the output generated by the system under the analysis loops 346, 348, and 350.

Figure 20:
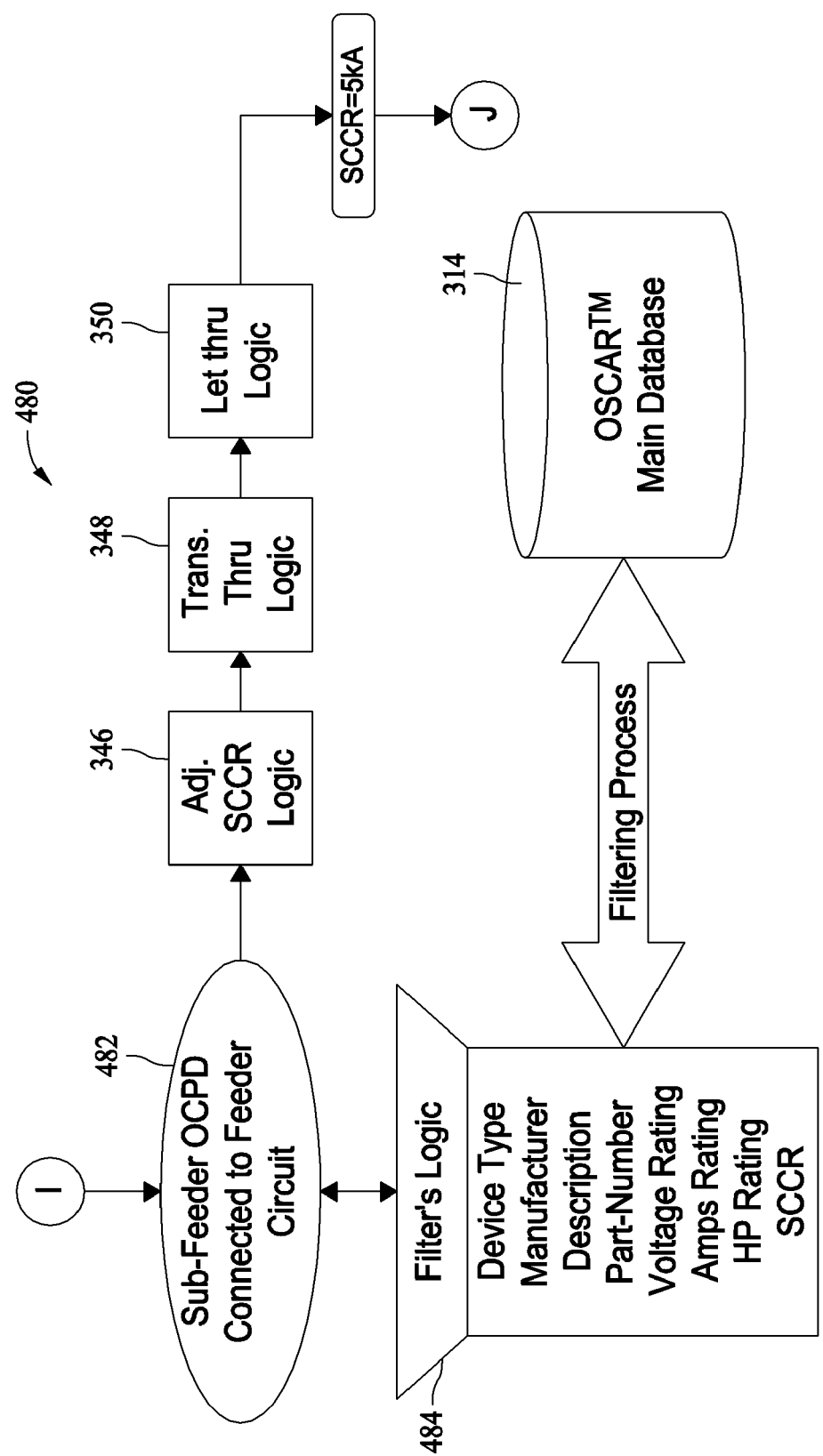

FIG. 20 illustrates a first sub-feeder circuit component analysis processing algorithm 480 that is performed after the branch circuit algorithms for branch circuits connected to the feeder circuit in the exemplary proposed panel design. The algorithm 480 operates on the user inputs from the sub-feeder circuit data data entry processing algorithm 244 shown in FIG. 6 relating to the overcurrent protection device in the sub-feeder circuit.

The sub-feeder circuit component selection processing algorithm 480 includes entering 482 a logic loop wherein the system filters 484 the main database 314 to obtain device data and information corresponding to the selected OCPD device in the algorithm step 256 (FIG. 6) for the sub-feeder circuit. Via the filtering process, complete information regarding the selected devices is obtained, including, for example, device type codes, manufacturer names, device descriptions, device part-numbers, device voltage ratings, device current ratings, HP ratings, $i^2t$ values, IR values and SCCR ratings for the selected devices. Once the information is obtained at step 484, the Adjusted SCCR logic loop 346 and the let-thru logic loops 348, 350 are performed to calculate and determine the output SCCR value for display.

Figure 21:
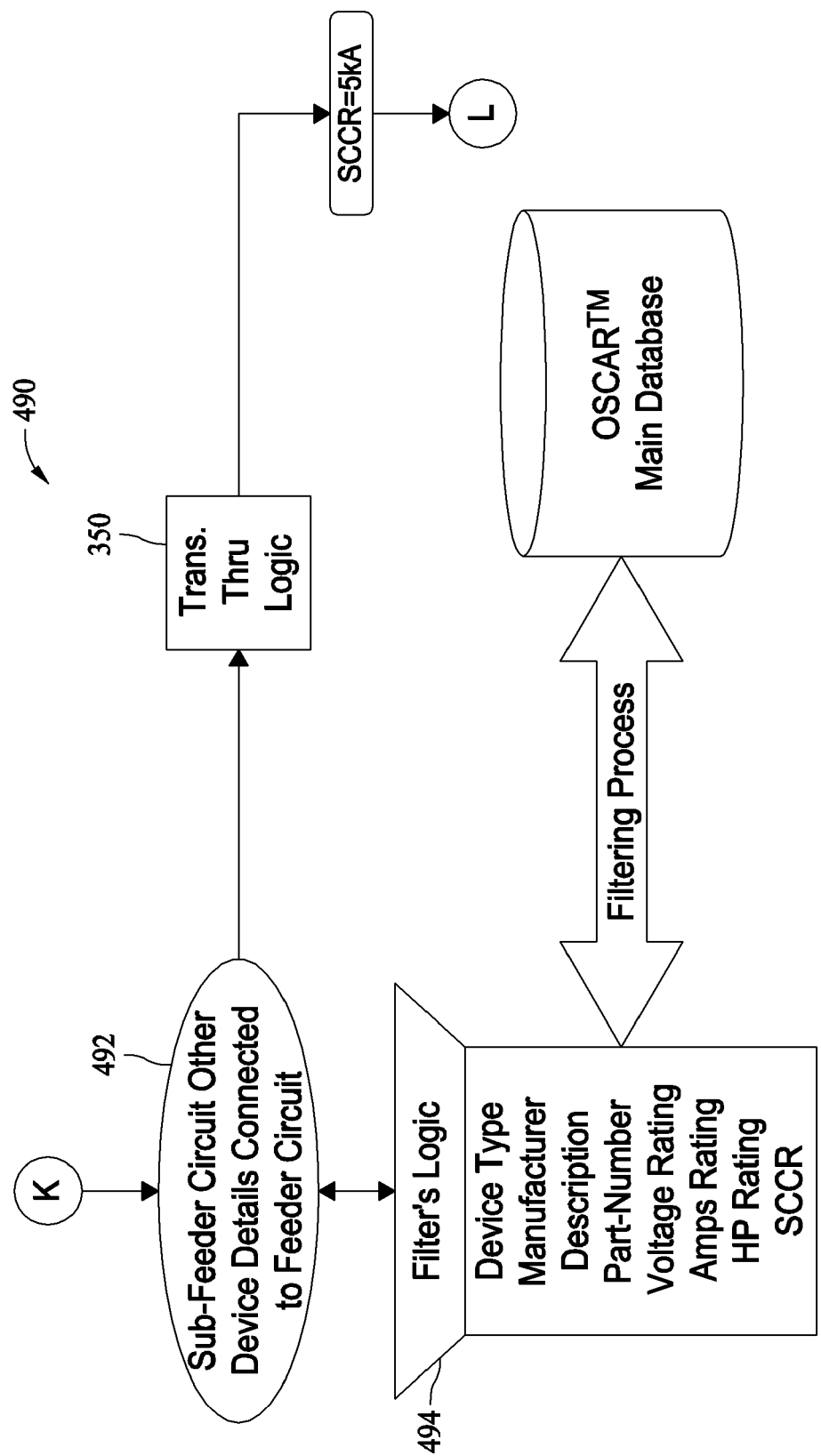

FIG. 21 illustrates a second sub-feeder circuit component analysis processing algorithm 490 that is performed after the sub-feeder circuit algorithms 480 for the OCPD of the sub-feeder circuit and relates to the other device connected to the OCPD. The algorithm 490 operates on the user inputs from the sub-feeder circuit data collection and navigation algorithm 244 shown in FIG. 6.

The sub-feeder circuit component analysis processing algorithm 490 includes entering 492 a logic loop wherein the system filters 494 the main database 314 to obtain device data and information corresponding to the selected "other" or non-OCPD device in the algorithm step 258 (FIG. 6) for the sub-feeder circuit. Via the filtering process, complete information regarding the selected device is obtained, including, for example, device type codes, manufacturer names, device descriptions, device part-numbers, device voltage ratings, device current ratings, HP ratings, $i^2t$ values, IR values and SCCR ratings for the selected devices. Once the information is obtained at step 494, the Adjusted SCCR logic loop 346 and the let-thru logic loops 348, 350 are performed to calculate and determine the output SCCR value for display.

Figure 22:
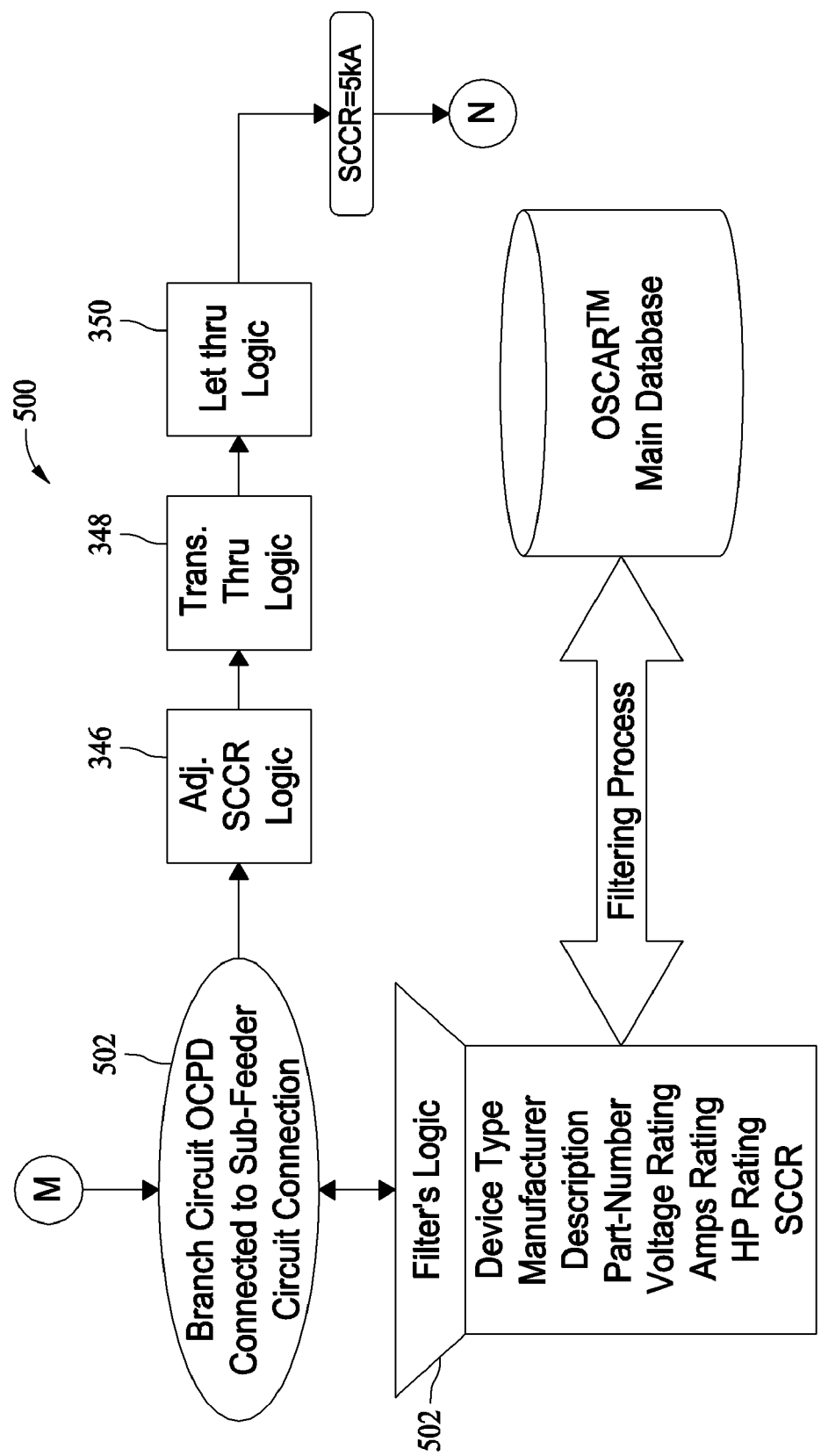
Figure 23:
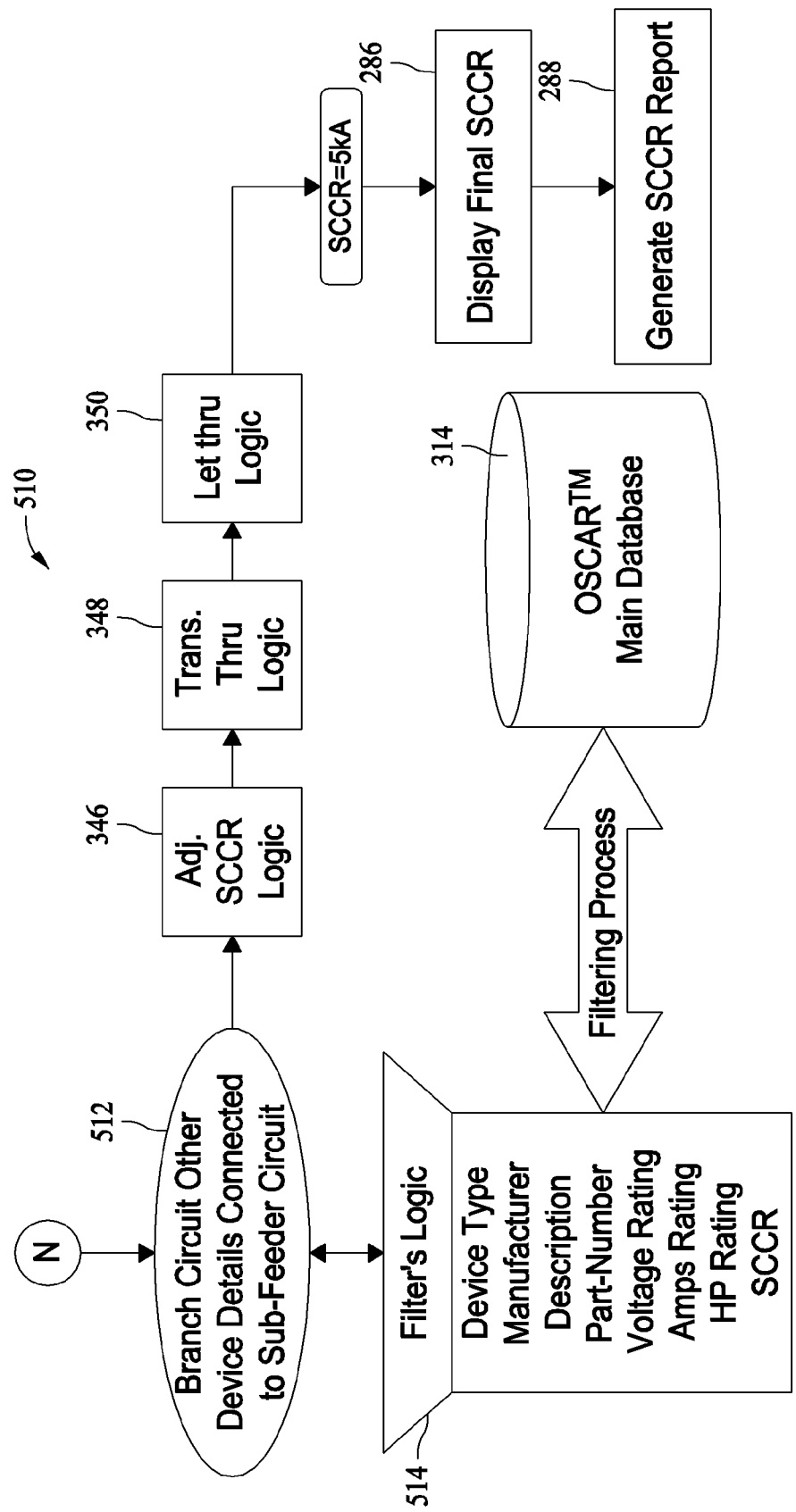

FIGS. 22 and 23 illustrate branch circuit analysis processing algorithms 500 and 510 for selected overcurrent protection devices and other devices in the second branch circuit connected to the sub-feeder circuit in the exemplary proposed panel design. The algorithms 500 and 510 are similar to the algorithms 480 and 490 shown in FIGS. 20 and 21, and generate the same output result as is shown in FIGS. 20 and 21 in one example. That is, in the exemplary example, the properties of the devices selected in the second branch circuit do not change the output generated by the system under the analysis loops 346, 348 and 360.

As shown in FIG. 23, the branch circuit connected to the sub-feeder circuit is the last circuit in the exemplary proposed panel design, so having considered all the circuits and all of the devices in each circuit, the system proceeds to display 286 a final SCCR rating for the entire panel, and if desired the system generates 288 a detailed report for review by a user. The final SCCR rating matches the output result obtained by the algorithm that considers the last circuit device in the proposed design.

As is believed to be evident from the algorithms 8-23, the system guides the user through the device selection process for the applicable circuits in the proposed panel design, and as each circuit device is selected, the system evaluates values corresponding to the selected devices in relation to upstream overcurrent protection device, upstream transformer components and upstream fuses to adjust the SCCR rating of the combined circuits appropriately. The algorithms flexibly accommodate a variety of different devices in the circuits, and capably manage the SCCR adjustments for a large number of circuit devices and associated circuits. While exemplary algorithms are described, it is understood that other algorithms may likewise be utilized, the described algorithms may be changed or modified, and that less than all of the described algorithms may be employed to achieve varying degrees of functionality and sophistication in different embodiments of the invention.

IV. THE USER INTERFACE OF THE INVENTION

Having now described exemplary processes utilized by the invention, the methods and processes described above may be implemented using a menu-driven graphical interface described in the examples below that guide the user through entering of panel information and selection of devices, while providing real time feedback and analysis regarding SCCR ratings at each step of the process.

FIGS. 24-44 illustrate exemplary displays of a user interface for the system 150 in an exemplary embodiment. The examples of FIGS. 24-44 are illustrative only, and it is contemplated that other interfaces and display may likewise be utilized in different embodiments of the invention without limitation.

Figure 24:
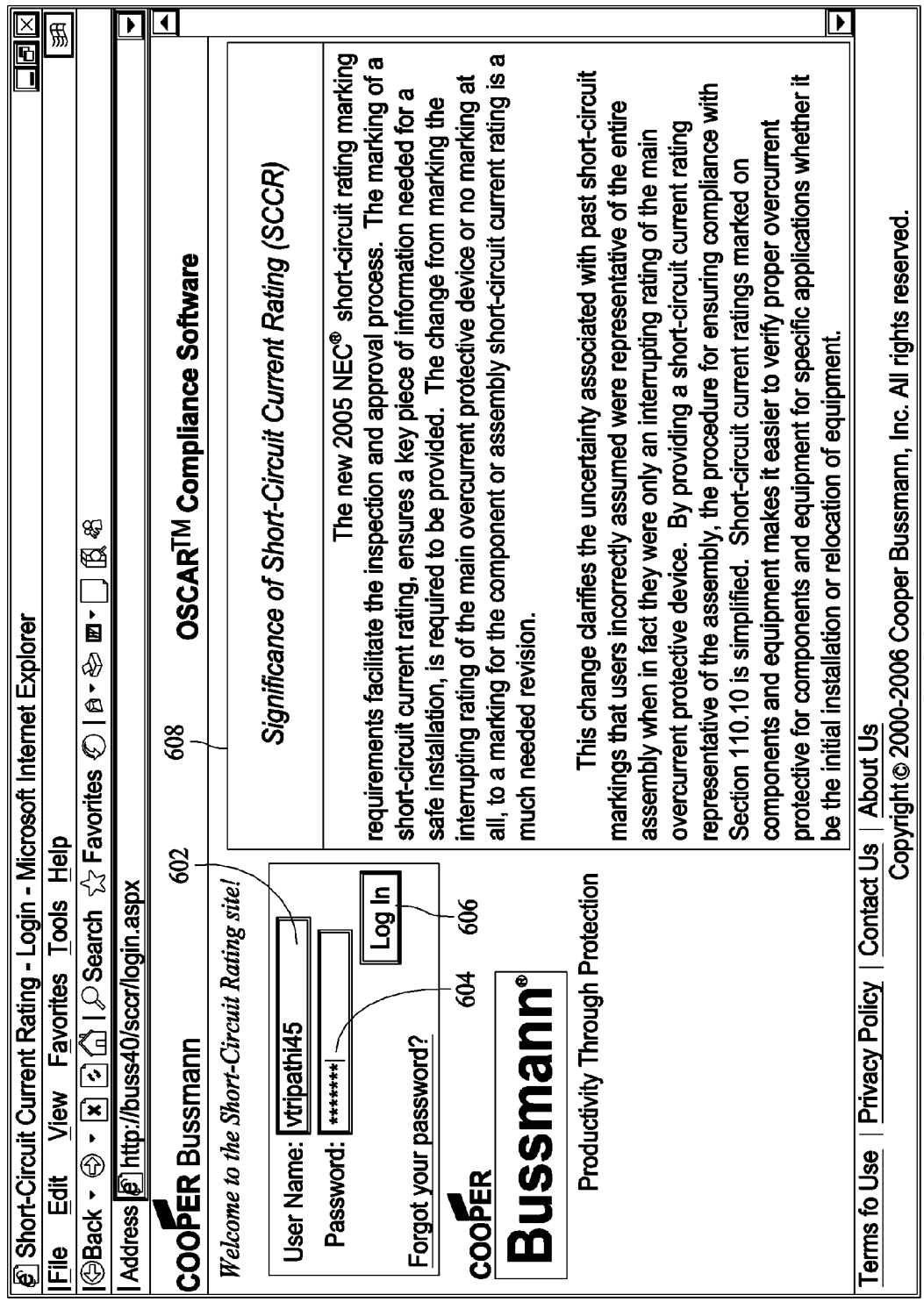

FIG. 24 is an example embodiment of a user interface displaying a logon screen for a user of analysis and evaluation system 150 described above. Authorized system users may log onto the analysis and evaluation system 150 with a conventional username data field 602, password data field 604, and a login button 606. Unauthorized system users are prevented from entering or accessing analysis and evaluation system 150 using the algorithm 300 shown in FIG. 8. The logon screen 600 in the illustrated embodiment also includes a welcome field 608 including a brief technical description regarding the importance of compliance with N.E.C. Article 409 in electrical panel design. Other welcome messages or explanation may alternatively be provided if desired.

Figure 25:
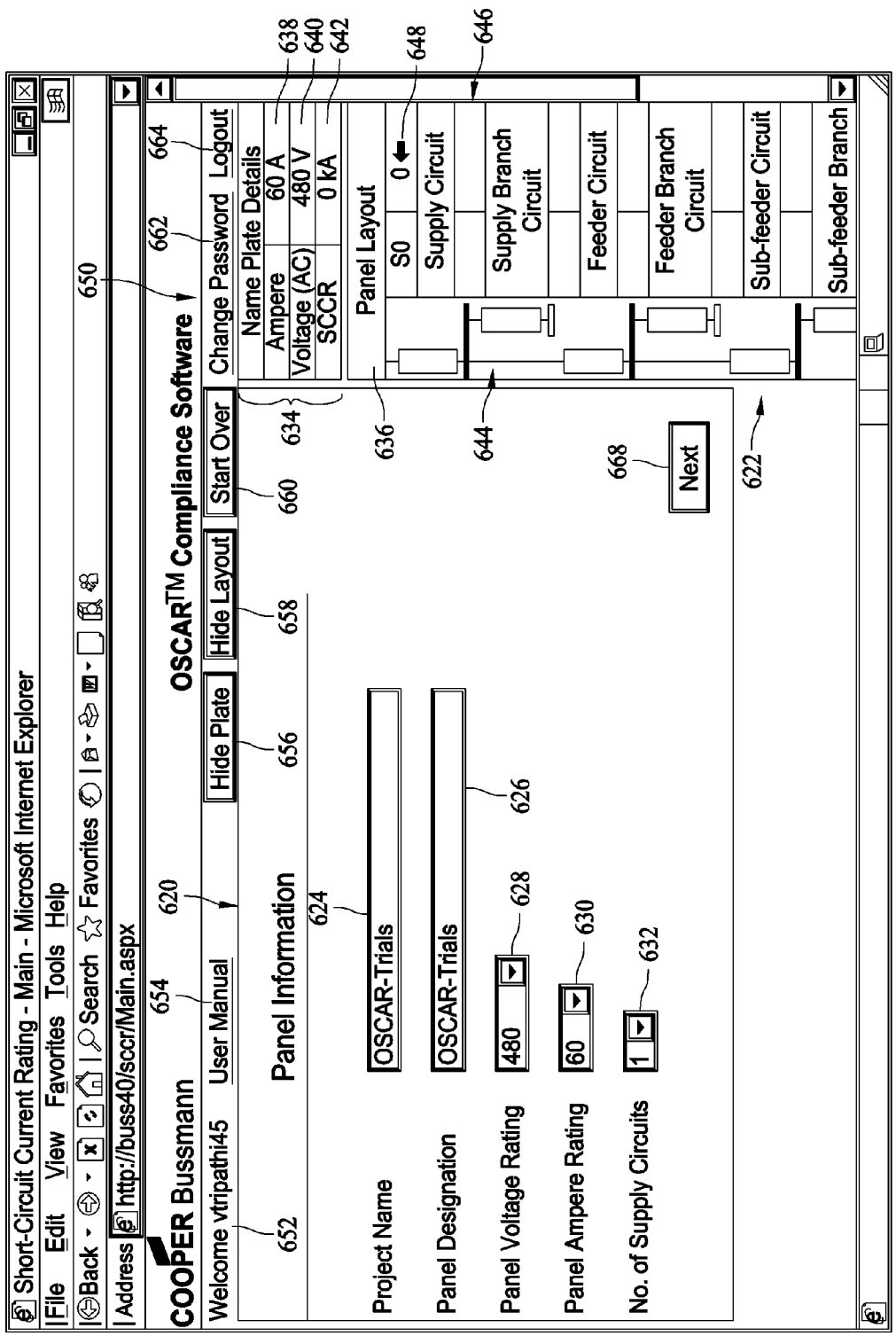

FIG. 25 is an example of a user interface displaying a panel information screen for a user of the analysis and evaluation system 150 after a successful login has occurred. The panel information screen includes a panel information section 620 and a graphical analysis and display section 622.

The panel information section 620 may include a project name data field 624, a panel designation data field 626, a panel voltage rating field 628, a panel ampere rating field 630, and a number of supply circuits data field 632. The project name and panel designation data fields 624 and 626 are open data fields wherein the user may type in or otherwise enter a name and panel designation of the user's choosing, while the voltage rating field 628, a panel ampere rating field 630, and a number of supply circuits data field 632 include drop-down menus wherein the user may choose from a predetermined set of values. The panel information section 620 may be presented in connection with the algorithm 310 shown in FIG. 10.

The analysis and display section 622 may include a panel name plate section 634 and a panel layout section 636. The name plate section 634 includes an ampere rating field 638 and a panel voltage rating field 640 that are each populated by the system 150 with the values selected in the data fields 630 and 628. The name plate section 634 may also include an SCCR rating field 642 that is populated by the most current value output from the algorithms shown in FIGS. 11-23 for example. Because the user at this point has not selected any devices used in the circuits of the panel, the SCCR rating field 642 reads zero in FIG. 25.

The panel layout section 636 includes a schematic section 644 and a status section 646. The status section 646 includes fields for supply circuits, supply branch circuits, feeder circuits, feeder branch circuits, sub-feeder circuits and sub-feeder branch circuits to be analyzed for a proposed panel design. A pointer or arrow 648 is provided to indicate the present stage of analysis to the user. As shown in FIG. 25, the user has not yet selected the number of supply circuits in the field 632 so that arrow is 648 present in the supply circuit data field and "0" is displayed to indicate that zero supply circuits have been selected.

A navigation bar 650 is provided in the upper portion of the screen, and the navigation bar 650 includes a welcome field that is populated by the system with the username from the field 602 in the logon screen, a user manual link 654, a hide plate button 656, a hide layout button 658, a start over button 660, a change password link 662 and a logout link 664 for exiting the system. The user manual link 654 when selected presents a user manual to the user for assistance in using the system. The hide plate and layout buttons 656 and 658 render the name plate section and the layout section 634 and 636, respectively, visible and invisible when selected. The start over button 660 clears the panel information screen, and the change password link 662 provides the user with an opportunity to select a different password.

Once the user has entered or selected appropriate information in the fields 624, 626, 628, 630 and 632 for the proposed panel design of interest, the user may select a next button 668 to continue.

Figure 26:
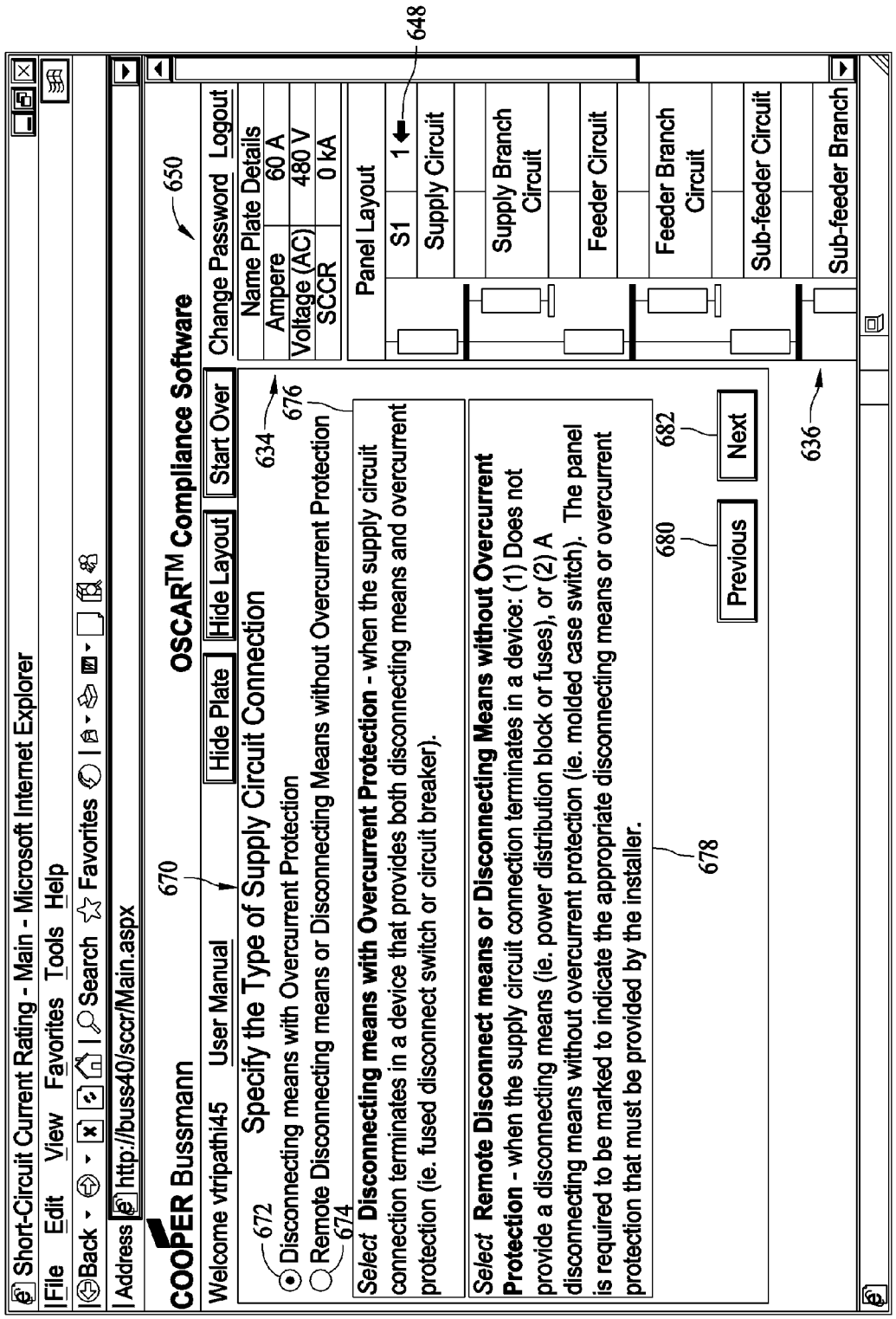

FIG. 26 is an example of a user interface displaying a supply circuit connection screen for a user of the analysis and evaluation system 150 that is displayed after the previously described screen. The supply circuit connection screen includes the name plate section 634, the layout section 636, the navigation bar 650 and a supply circuit type section 670. The supply circuit type section 670 includes selectors 672 and 674 for supply circuits having disconnecting means with overcurrent protection and remote disconnecting means or disconnecting means without overcurrent protection, respectively. Explanatory sections 676 and 678 are also provided for the user's guidance in selecting between the two types of supply circuits.

The arrow 648 is presented to the user in FIG. 26 as a pointer to the supply circuit field in the status section, and "1" is indicated in the supply circuit field as a reminder that the first supply circuit is currently under consideration. A previous button 680 is provided that when selected returns the user to the panel information screen, and a next button 682 is provided to allow the user to continue once the user has made an appropriate selection via the selectors 672 and 674. In the example shown in FIG. 26, the user has selected a supply circuit type as "disconnecting means with overcurrent protection" and the user may then select the next button 682 to proceed.

Figure 27:
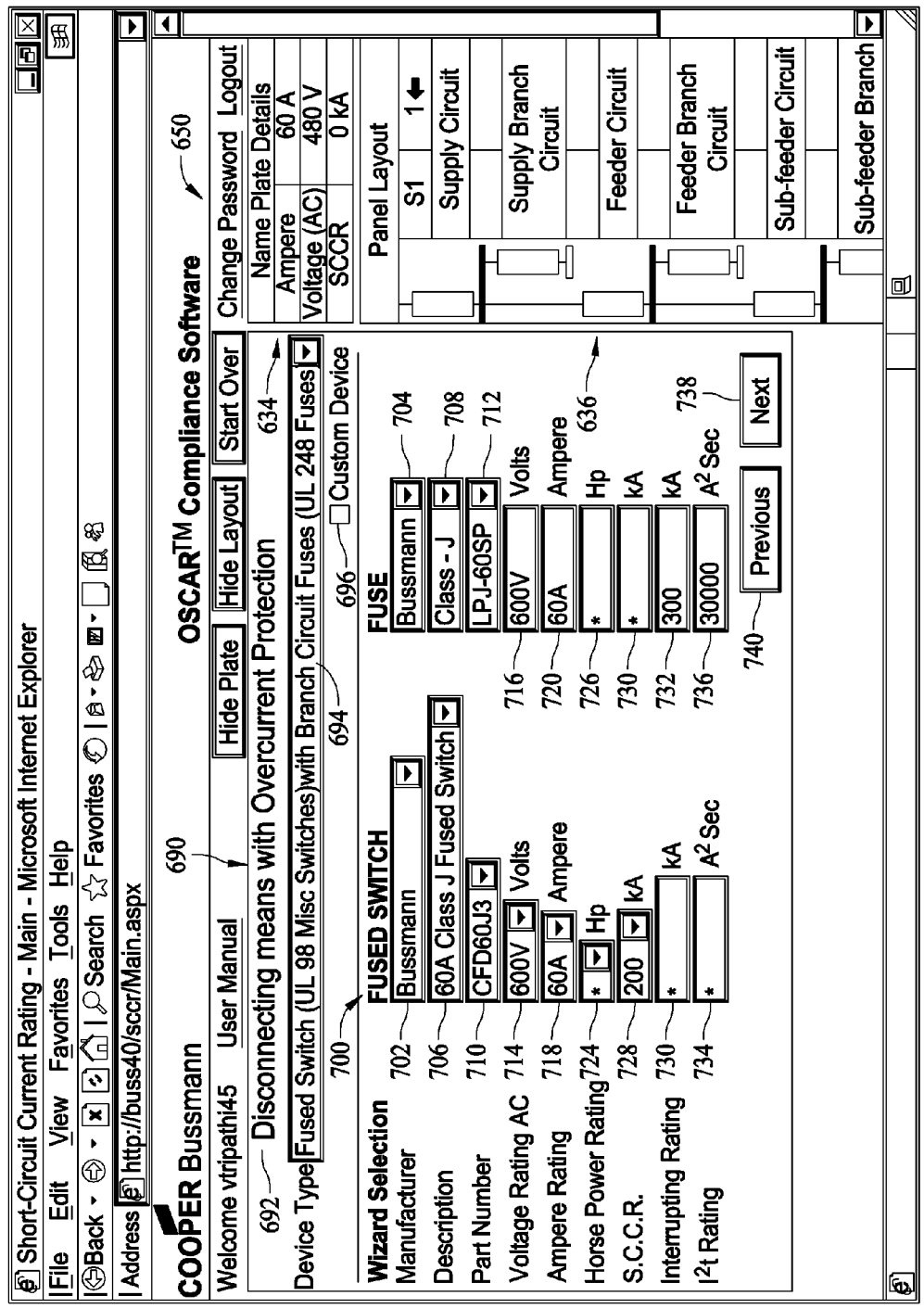

FIG. 27 is an example of a user interface displaying a supply circuit component selection screen to the user of the analysis and evaluation system 150 after the supply circuit type screen shown in FIG. 26. The supply circuit component selection screen includes the name plate section 634, the layout section 636, the navigation bar 650 and a supply circuit device selection section 690.

The supply circuit device selection section 690 includes a descriptive legend 692 corresponding to the supply circuit type selected in the screen of FIG. 26, a device type field 694, and a custom device selector 696. The device type field 694 includes a drop down menu listing any of the devices described above that are compatible with the user's supply circuit type selection. In the example shown in FIG. 27, the user has selected a device type of "Fused Switch (UL 98 Misc. Switches) with Branch Circuit Fuses (UL 248 Fuses)."

A device detail section 700 is provided including manufacturer name fields 702 and 704 for the devices selected in the device type field 694, description fields 706 and 708 for the selected devices, part number fields 708, 710 by the selected devices, voltage ratings 714 and 716 for the devices selected, current ratings 718 and 720 for the selected devices, horse power ratings 724 and 726 for the selected devices, SCCR ratings 728 and 730 for the respective devices, interrupting ratings 730 and 732 for the selected devices, and $i^2t$ fields 734 and 736 for the selected devices. As shown in FIG. 27, drop down menus are selected for required choices or selections by the user, and the remainder of the fields are populated by the system with values found in the system database or databases for the selected devices using the fields 702 through 714, 718, 724, and 728. Also as shown in FIG. 27, values for all of the fields may not exist for the selected devices, in which case a dash appears in the respective field. Once the user makes appropriate selections in the device type field 694 and the detail section 700, the user may select the next button 738 to proceed or the previous button 740 to return to the previous screen.

When the user selects the next button, the algorithm 330 of FIG. 11 is executed to process the data and information associate with the selected devices. The user may select a custom device with the selector 696 and manually enter the required data values for devices outside of the device selections available through the drop down menus as explained later below.

Figure 28:
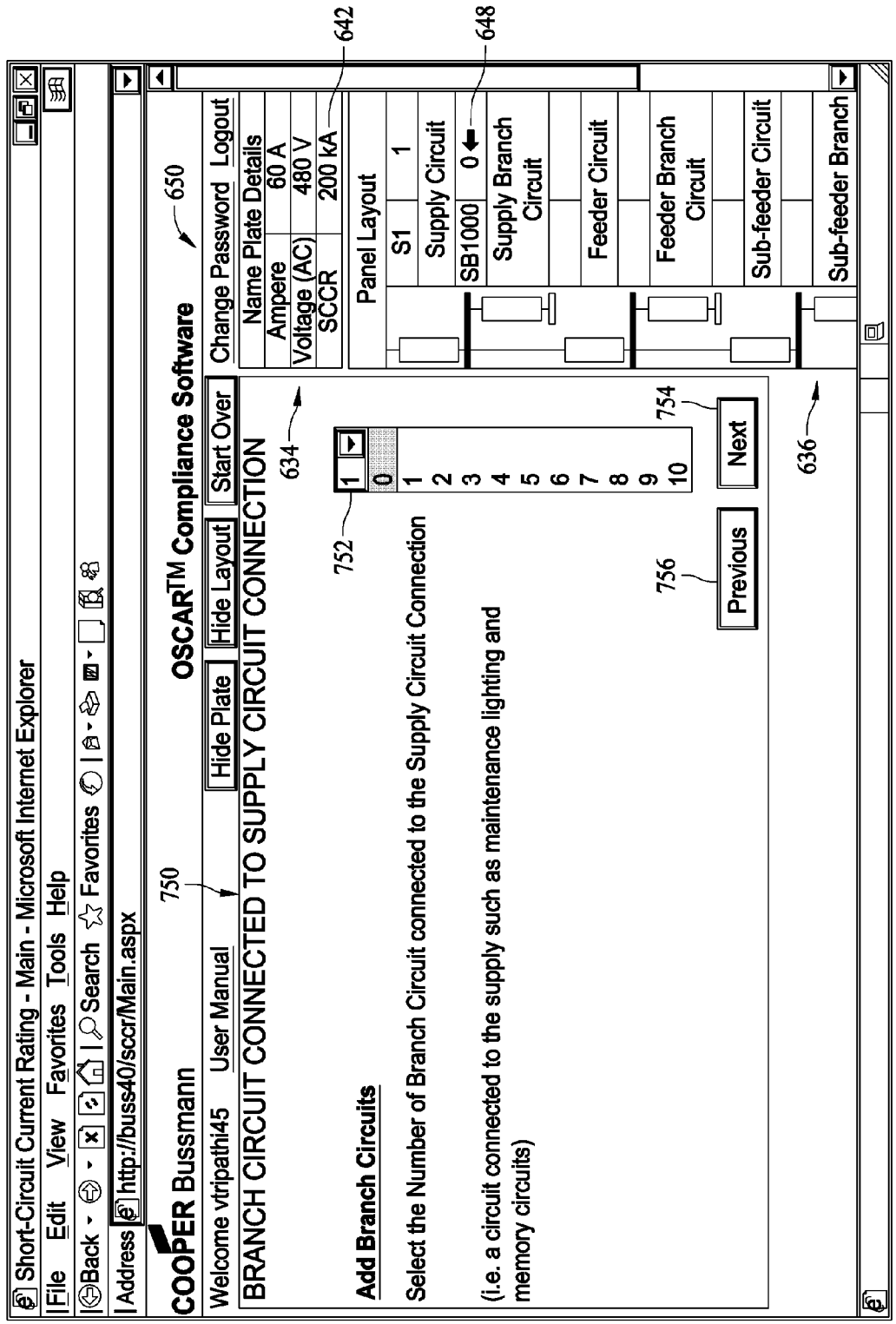

FIG. 28 is an example of a user interface displaying a branch circuit selection screen for a user of the analysis and evaluation system 150 after the supply circuit device selection screen shown in FIG. 27. The supply circuit component selection screen includes the name plate section 634, the layout section 636, the navigation bar 650 and a branch circuit selection section 750. Because circuit devices have now been selected by virtue of the previous screen, the system now displays an SCCR value in the field 642. Also, the user may see that the arrow 648 now points to the supply branch circuit field in the layout section 636, which indicates zero because a selection has not yet been made.

The branch circuit selection section 750 may include a drop down menu selection field 752 for the user to choose the number of branch circuits connected to the supply circuit in the proposed panel design of interest. When the appropriate number of branch circuits have been selected, the user may select the next button 754 to proceed or the previous button 756 to return to the previous screen. In the illustrated example, zero has been selected for the number of branch circuits connected to the supply circuit.

Figure 29:
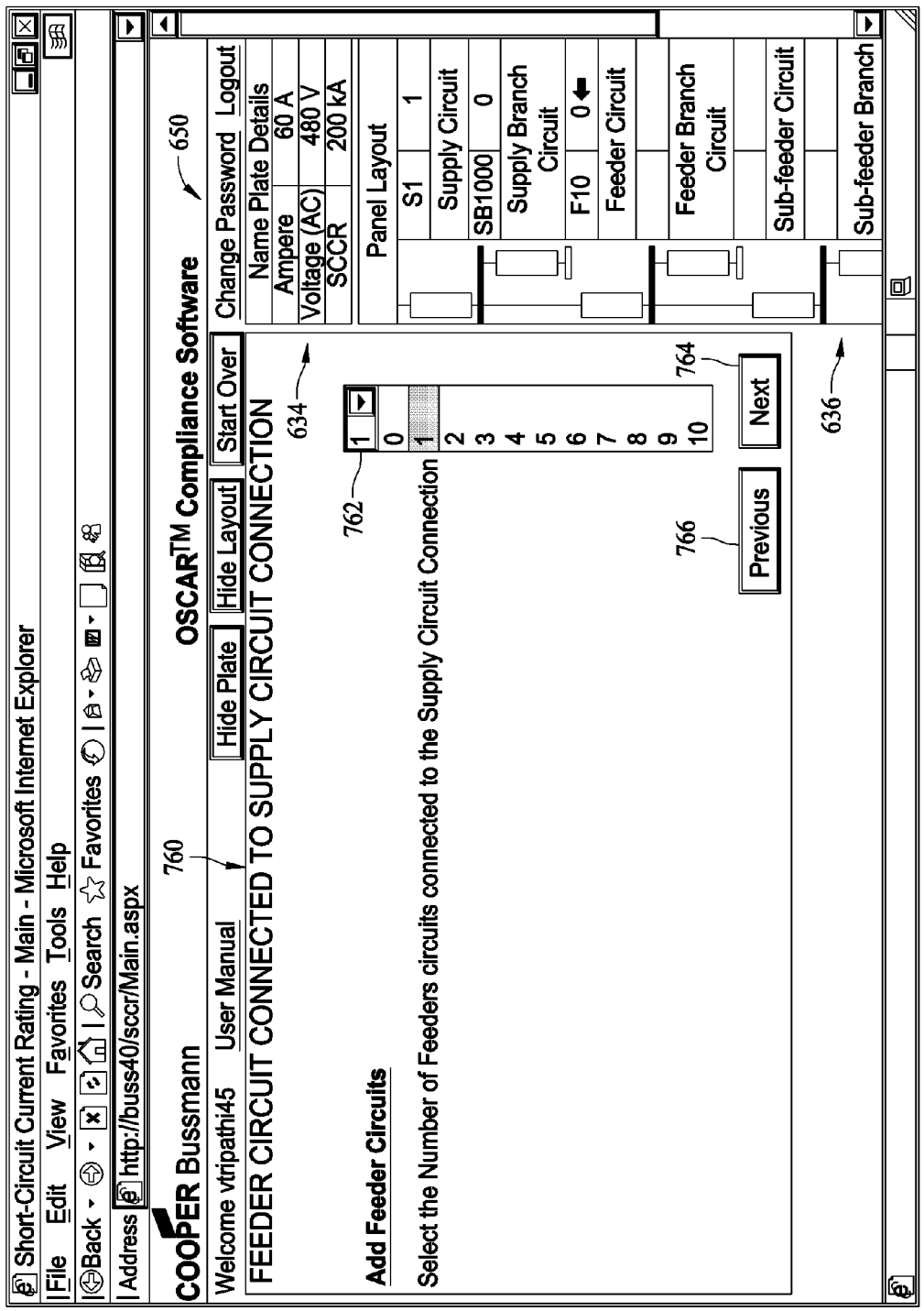

FIG. 29 is an example of a user interface displaying a feeder circuit screen for a user of the analysis and evaluation system 150 after the supply circuit device selection screen shown in FIG. 28. The feeder circuit screen includes the name plate section 634, the layout section 636, the navigation bar 650 and a feeder circuit section 760. Because circuit devices have now been selected by virtue of the previous screen, the system now displays a current SCCR value in the field 642. Also, the user may see that the arrow 648 now points to the feeder circuit field in the layout section 636, which indicates zero because a selection has not yet been made. Also, the supply circuit field in the layout section 636 now reads "1" and the supply branch circuit now reads "0" to reflect the analysis previously completed.

The feeder circuit selection section 760 may include a drop down menu selection field 762 for the user to choose the number of branch circuits connected to the supply circuit in the proposed panel design of interest. When the appropriate number of feeder circuits have been selected, the user may select the next button 764 to proceed or the previous button 766 to return to the previous screen. In the illustrated example, "1" has been selected for the number of feeder circuits connected to the supply circuit.

Figure 30:
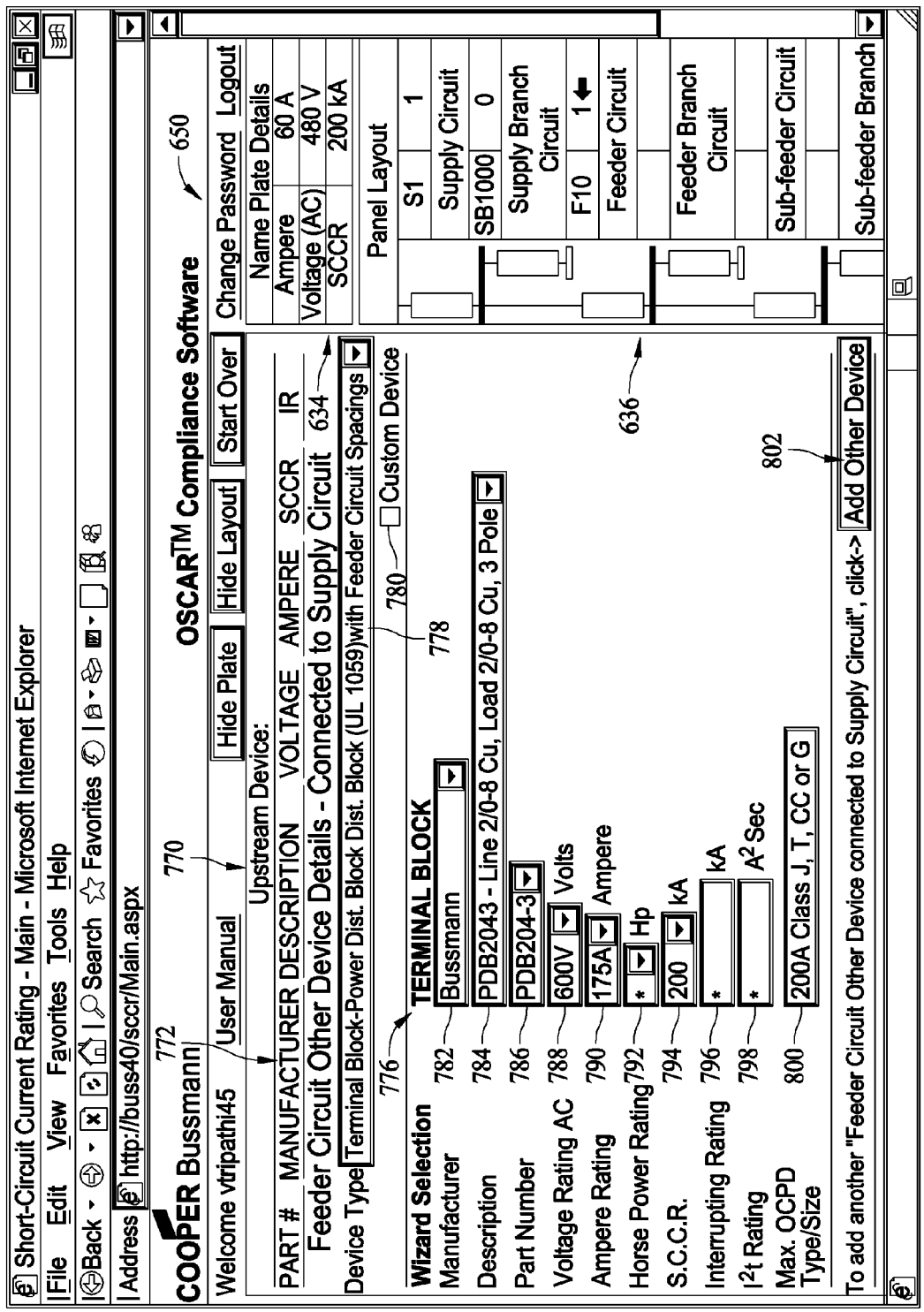

FIG. 30 is an example of a user interface displaying a feeder circuit component selection screen for a user of the system 150. The feeder circuit component selection screen includes the name plate section 634, the layout section 636, the navigation bar 650 and a feeder circuit device selection section 770.

The feeder circuit device selection section 770 includes an upstream device section 772, a device type section 774, and a device detail section 776. The device type section 774 includes a device type field 778, and a custom device selector 780. The device type field 778 includes a drop down menu listing any of the devices described above for a feeder circuit. In the example shown in FIG. 30, a device type of "Terminal Block—Power Dist. Block (UL 1059) with Feeder Circuit Spacings" has been selected.

The device detail section 776 is provided including a manufacturer name field 782, a description field 784, a part number field 786, a voltage rating 788, a current rating 790, a horse power rating 792, an SCCR rating 794, an interrupting ratings 796, an $i^2t$ and a maximum OCPD type/size field 800. As shown in FIG. 30, drop down menus are selected for required choices or selections by the user, and the remainder of the fields are populated by the system with values found in the system database or databases for the selected device using the fields 782 through 794. Also as shown in FIG. 30, values for all of the fields may not exist for any given selected device, in which case a dash appears in the respective field.

Once the user makes appropriate selections in the device type field 778 and the detail section 776, the user may select an add other device button 802 to select another device for the branch circuit, or the user may select by scrolling down to the bottom of the screen a next button to proceed or a previous button to return to the previous screen. When the next button is selected the algorithms described above are performed on the selected device information and the result is displayed in the name plate section 634.

Figure 31:
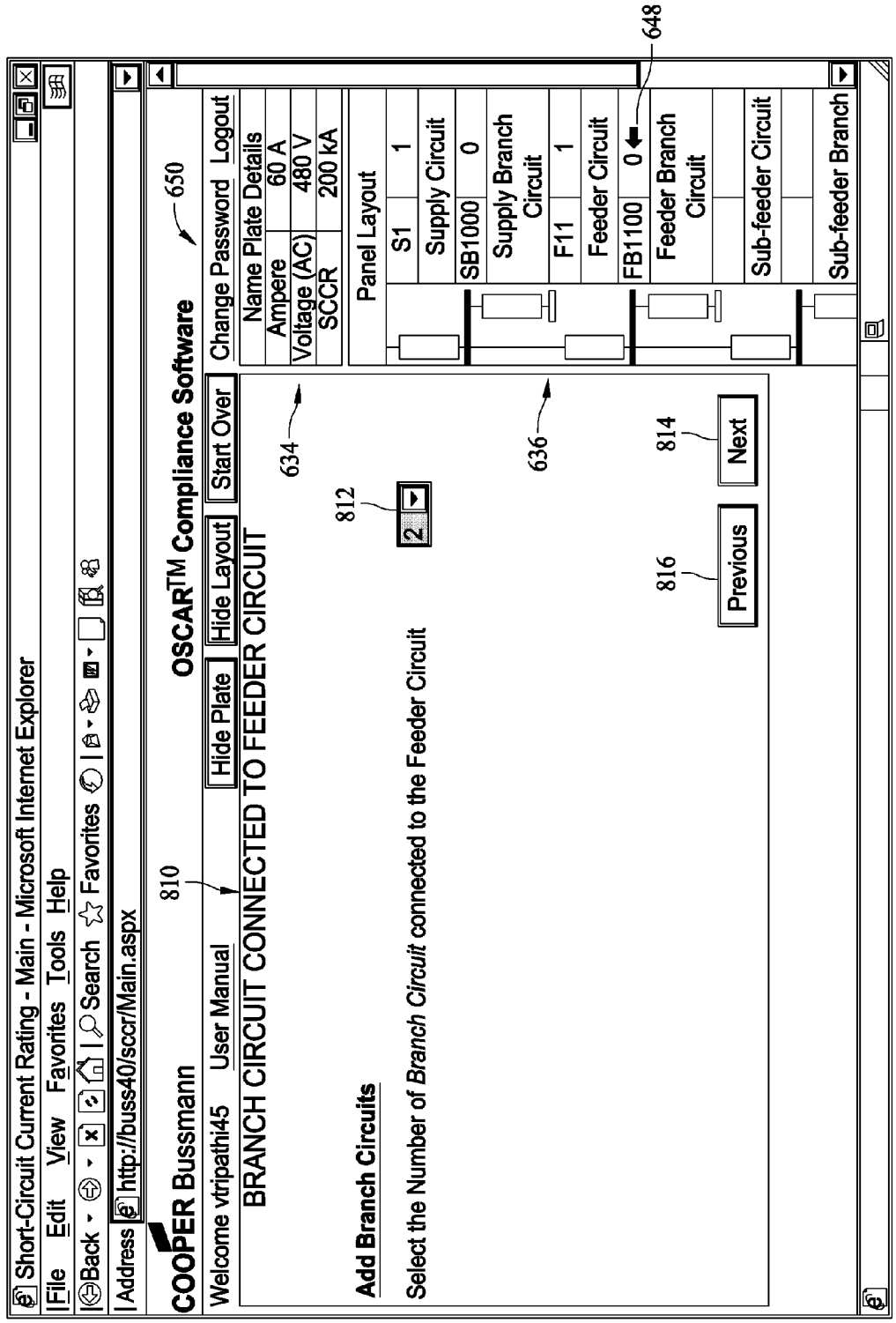

FIG. 31 is an example of a user interface displaying a branch circuit screen for a user of the analysis and evaluation system 150 after the screen shown in FIG. 30. The branch circuit screen includes the name plate section 634, the layout section 636, the navigation bar 650 and a branch circuit selection section 810. Because circuit devices have now been selected by virtue of the previous screen and analyzed by the system, a current SCCR value is displayed in the field 642. The SCCR value of 200 kA displayed in FIG. 31 is the same as that displayed in FIG. 30, indicating to the user that devices selected in the previous screen did not affect the SCCR of the proposed panel.

Also, in FIG. 31 the user may see that the arrow 648 now points to the feeder branch circuit field in the layout section 636, which indicates zero because a selection has not yet been made. Also, the supply circuit field in the layout section 636 now reads "1", the supply branch circuit field reads "0", the feeder circuit field reads "1" and the feeder branch circuit reads "0" to indicate to the user that a branch circuit connected to the feeder circuit is now under consideration.

The branch circuit selection section 810 may include a drop down menu selection field 812 for the user to choose the number of branch circuits connected to the supply circuit in the proposed panel design of interest. When the appropriate number of branch circuits have been selected, the user may select the next button 814 to proceed or the previous button 816 to return to the previous screen. In the illustrated example, "2" has been selected for the number of branch circuits connected to the feeder circuit.

Figure 32:
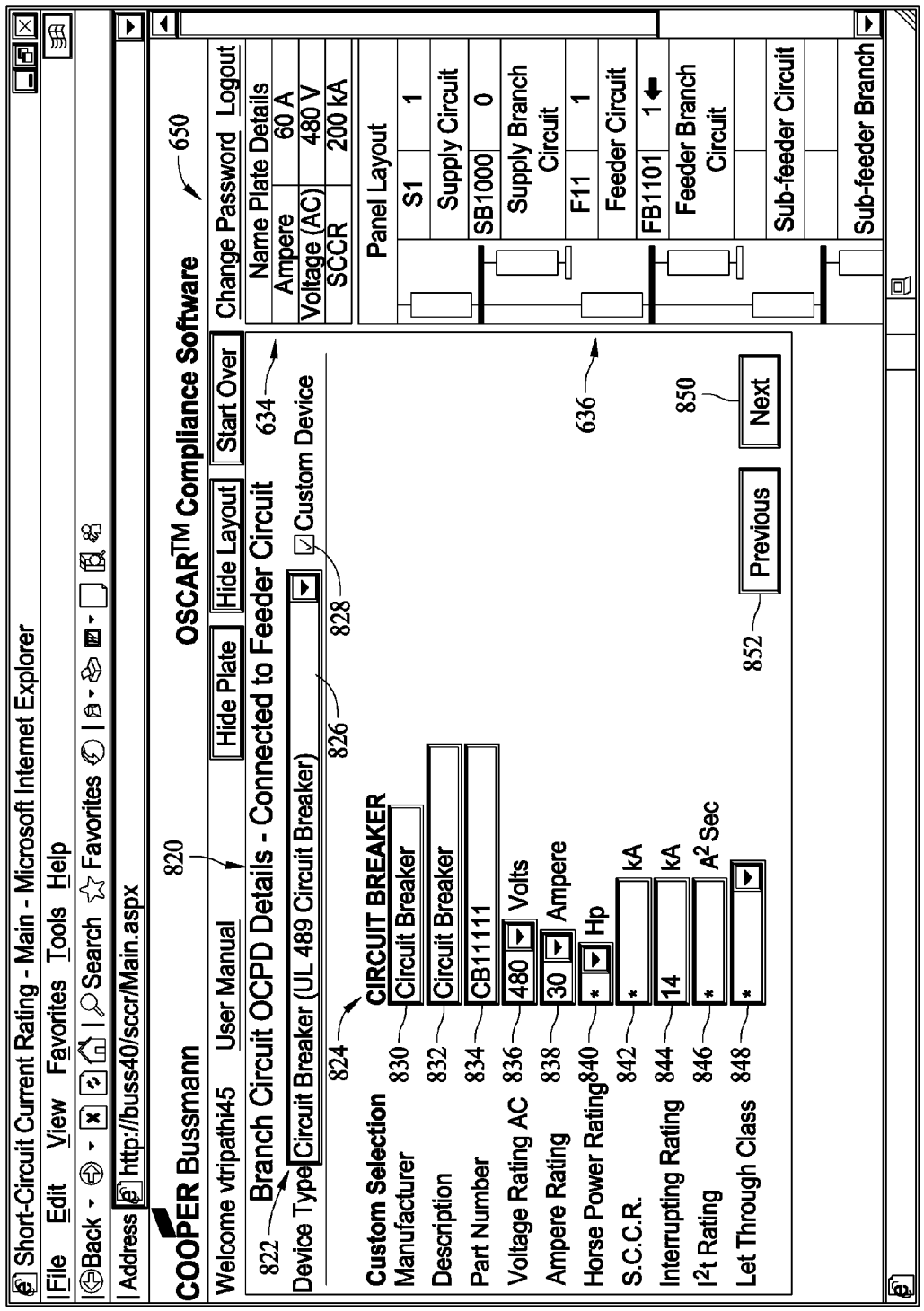

FIG. 32 is an example of a user interface displaying a first branch circuit component selection screen for a user of the system of the system 150. The branch circuit component selection screen includes the name plate section 634, the layout section 636, the navigation bar 650 and a feeder circuit device selection section 820.

The feeder circuit device selection section 820 includes a device type section 822, and a device detail section 824. The device type section 822 includes a device type field 826, and a custom device selector 826 that has been selected in FIG. 32.

When the custom device selector 826 has been selected, the device detail section 824 presents a number of fields to be completed by the user concerning the custom device. The fields include a manufacturer name field 830, a description field 832, a part number field 834, a voltage rating 836, a current rating 838, a horse power rating 840, an SCCR rating 842, an interrupting rating 844, an i²t rating 846 and a let through class field 848. As shown in FIG. 32, drop down menus are provided for the voltage, current and horsepower rating fields 842, 844 and 846, while the remaining fields are open fields to be typed or otherwise completed by the user without menu selections. As shown in FIG. 32, values for all of the fields may not exist for any given selected device, in which case a dash appears in the respective field.

Once the user makes appropriate selections in the device type field 822 and the detail section 824, the user may select a next button 850 to proceed or a previous button 852 to return to the previous screen. When the next button 850 is selected, the algorithms described above are performed using the data and information in the screen of FIG. 31, and the SCCR result, including any adjustments is displayed in the name plate section 634.

Figure 33:
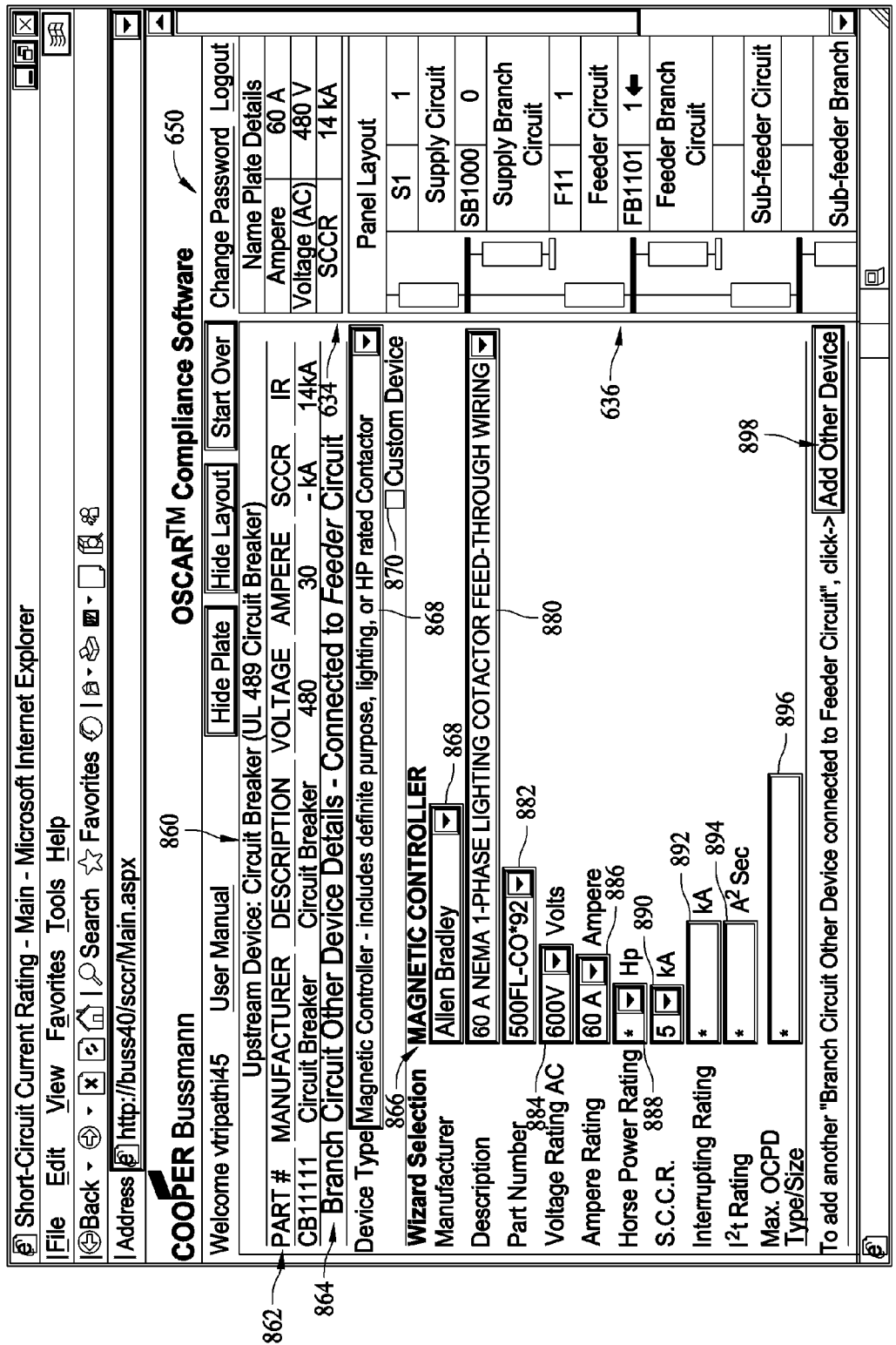

FIG. 33 is an example of a user interface displaying a second branch circuit component selection screen for a user of the system 150. The branch circuit component selection screen includes the name plate section 634, the layout section 636, the navigation bar 650 and a feeder circuit device selection section 860. The SCCR value of 14 kA displayed in FIG. 33 is different from that displayed in FIG. 32, indicating to the user that devices selected in the previous caused adjustments in the SCCR of the proposed panel to be made.

The feeder circuit device selection section 770 includes an upstream device section 862 populated with data corresponding to the selection made in the screen of FIG. 32, a device type section 864, and a device detail section 866. The device type section 864 includes a device type field 868 and a custom device selector 870. The device type field 876 includes a drop down menu listing any of the devices described above for a branch circuit connected to a feeder circuit. In the example shown in FIG. 33, a device type of "Magnetic Controller" has been selected.

The device detail section 866 is provided including a manufacturer name field 868, a description field 880, a part number field 882, a voltage rating 884, a current rating 886, a horse power rating 888, an SCCR rating 890, an interrupting rating 892, an i²t rating 894 and a maximum OCPD type/size field 896. As shown in FIG. 33, drop down menus are selected for required choices or selections by the user, and the remainder of the fields are populated by the system with values found in the system database or databases for the selected device using the fields 868 through 890. Also as shown in FIG. 33, values for all of the fields may not exist for any given selected device, in which case a dash appears in the respective field.

Once the user makes appropriate selections in the device type field 868 and the detail section 866, the user may select an add other device button 898 to select another device for the branch circuit, or the user may select by scrolling down to the bottom of the screen a next button to proceed or a previous button to return to the previous screen. When the next button is selected, the algorithms described above are performed using the data and information in the screen of FIG. 34, and the SCCR result, including any adjustments, is displayed in the name plate section 634.

Figure 34:
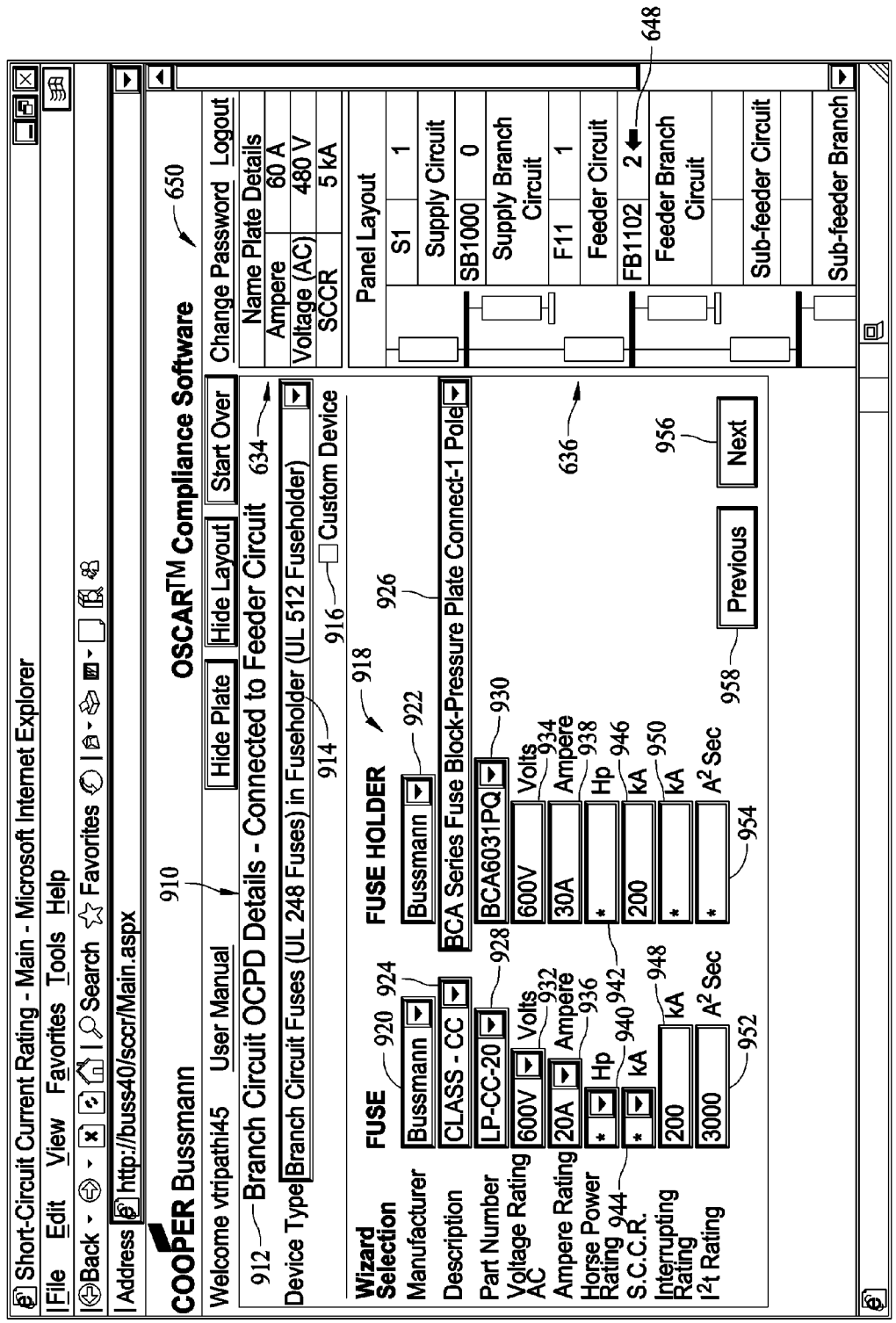

FIG. 34 is an example of a user interface displaying a third branch circuit component selection screen for a user of the analysis and evaluation system 150 after the screen shown in FIG. 33. The branch circuit component selection screen includes the name plate section 634, the layout section 636, the navigation bar 650 and a branch circuit device selection section 910. The SCCR value of 5 kA displayed in FIG. 34 is different from the 14 kA displayed in FIG. 33, indicating to the user that devices selected in the previous caused adjustments in the SCCR of the proposed panel to be made.

Also, the user may see that the arrow 648 now points to the feeder branch circuit field in the layout section 636. The supply circuit field in the layout section 636 now reads "1", the supply branch circuit field reads "0", the feeder circuit field reads "1" and the feeder branch circuit reads "2" to indicate to the user that the second branch circuit connected to the feeder circuit is now under consideration.

The branch circuit device selection section 910 includes a descriptive legend 912, a device type field 914, and a custom device selector 916. The device type field 914 includes a drop down menu listing any of the devices described above for a branch circuit. In the example shown in FIG. 34, a device type of "Branch Circuit Fuses (UL 248 Fuses) in Fuseholder (UL 512 Fuseholder)" has been selected.

A device detail section 918 is provided including manufacturer name fields 920 and 920 for the devices selected in the device type field 914, description fields 924 and 926 for the selected devices, part number fields 928 and 930 for the selected devices, voltage ratings 932 and 934 for the devices selected, current ratings 936 and 938 for the selected devices, horse power ratings 940 and 942 for the selected devices, SCCR ratings 944 and 946 for the respective devices, interrupting ratings 948 and 950 for the selected devices, and $i^2t$ fields 952 and 954 for the selected devices. As shown in FIG. 34, drop down menus are selected for required choices or selections by the user, and the remainder of the fields are populated by the system with values found in the system database or databases for the selected devices using the fields 920 through 932 and 936, 940, and 944. Also as shown in FIG. 34, values for all of the fields may not exist for the selected devices, in which case a dash appears in the respective field. Once the user makes appropriate selections in the device type field 914 and the detail section 918, the user may select the next button 956 to proceed or the previous button 958 to return to the previous screen.

When the next button is selected, the algorithms described above are performed using the data and information in the screen of FIG. 34, and the SCCR result, including any adjustments, is displayed in the name plate section 634.

Figure 35:
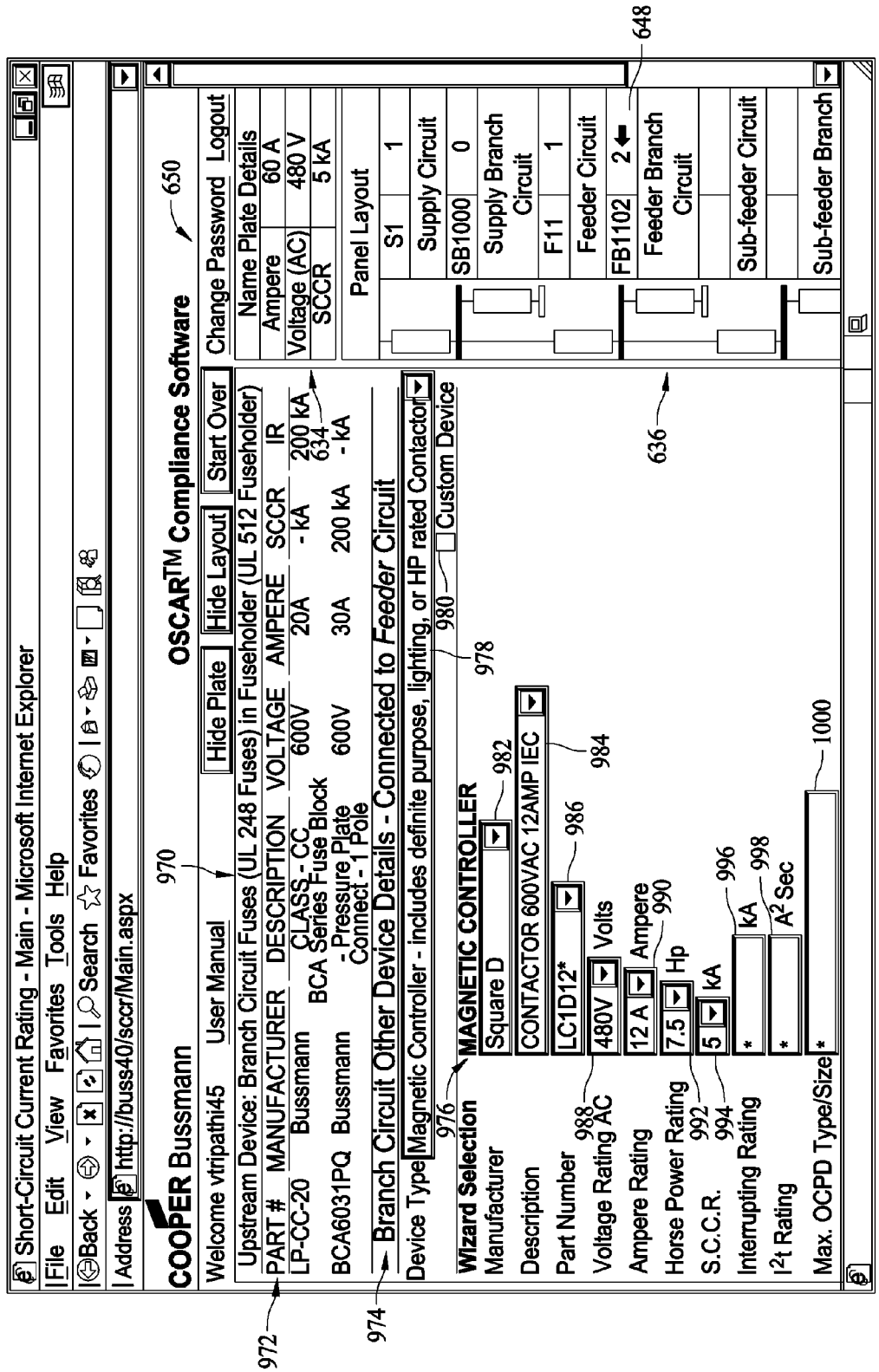

FIG. 35 is an example of a user interface displaying a fourth branch circuit component selection screen for a user of the system 150. The branch circuit component selection screen includes the name plate section 634, the layout section 636, the navigation bar 650 and a branch circuit device selection section 970. The SCCR value is equal to that of the previous screen, indicating that devices selected in the previous screen did not cause an adjustment to the SCCR value. The supply circuit field in the layout section 636 now reads "1", the supply branch circuit field reads "0", the feeder circuit field reads "1" and the feeder branch circuit still reads "2" to indicate to the user that the second branch circuit connected to the feeder circuit is still under consideration. The arrow 648 also points to the feeder branch circuit field in the layout section 636.

The feeder circuit device selection section 970 includes an upstream device section 972 populated with data corresponding to the previously made selections for the second branch circuit, a device type section 974, and a device detail section 976. The device type section 974 includes a device type field 978 and a custom device selector 980. The device type field 978 includes a drop down menu listing any of the devices described above for a branch circuit connected. In the example shown in FIG. 35, a device type of "Magnetic Controller" has been selected.

The device detail section 976 is provided including a manufacturer name field 982, a description field 984, a part number field 986, a voltage rating 988, a current rating 990, a horse power rating 992, an SCCR rating 994, an interrupting rating 996, an $i^2t$ rating 998 and a maximum OCPD type/size field 1000. As shown in FIG. 35, drop down menus are selected for required choices or selections by the user, and the remainder of the fields are populated by the system with values found in the system database or databases for the selected device using the fields 982 through 994. Also as shown in FIG. 35, values for all of the fields may not exist for any given selected device, in which case a dash appears in the respective field.

Once the user makes appropriate selections in the device type field 978 and the detail section 976, the user may scroll down the screen and select an add other device button, or may select a next button to proceed or a previous button to return to the previous screen. When the next button is selected, the algorithms described above are performed using the data and information in the screen of FIG. 35, and the SCCR result, including any adjustments, is displayed in the name plate section 634.

Figure 36:
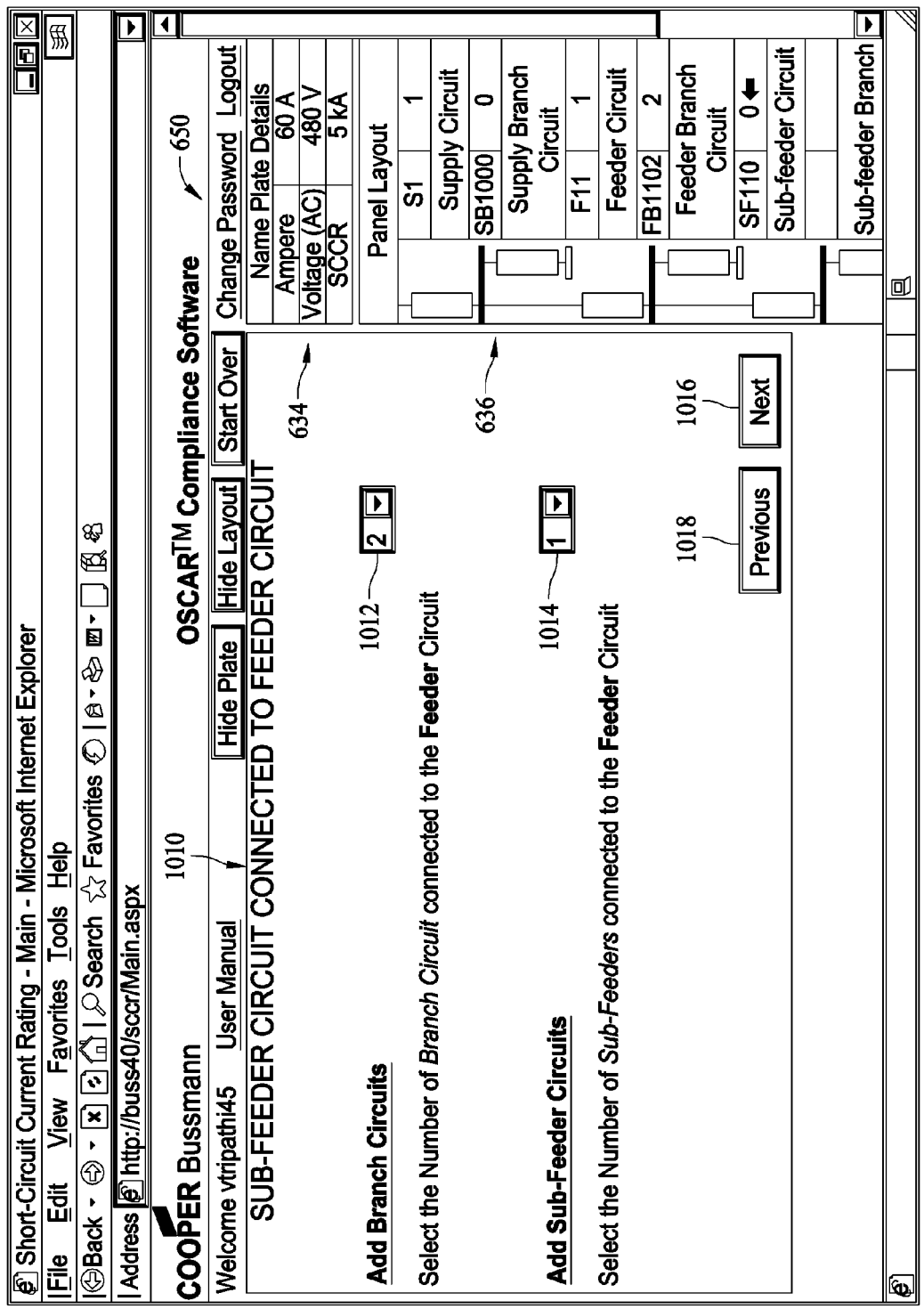

FIG. 36 is an example of a user interface displaying a sub-feeder circuit screen for a user of the analysis and evaluation system 150. The sub-feeder circuit screen includes the name plate section 634, the layout section 636, the navigation bar 650 and a sub-feeder circuit selection section 1010. The SCCR value is the same as the previous screen, indicating that no adjustments were required by the device selected in the previous screen. The supply circuit field in the layout section 636 now reads "1", the supply branch circuit field reads "0", the feeder circuit field reads "1", the feeder branch circuit reads "2", and the sub-feeder circuit field reads "0" as an indication that a selection has not been made. The arrow 648 also points to the sub-feeder circuit field in the layout section 636.

The sub-feeder circuit selection section 1010 displays a field 1012 indicating the previously selected number of branch circuits connected to the feeder circuit, and a sub-feeder circuit field 1014 wherein the user may select a number of sub-feeder circuits connected to the feeder circuit.

The fields 1012 and 1014 may include a drop down menu selections for the user to choose the number of branch circuits and sub-feeder circuits connected to the feeder circuit in the proposed panel design of interest. When the appropriate number of branch circuits and sub-feeder circuits have been selected, the user may select the next button 1016 to proceed or the previous button 1018 to return to the previous screen. In the illustrated example, "1" has been selected for the number of sub-feeder circuits connected to the feeder circuit.

Figure 37:
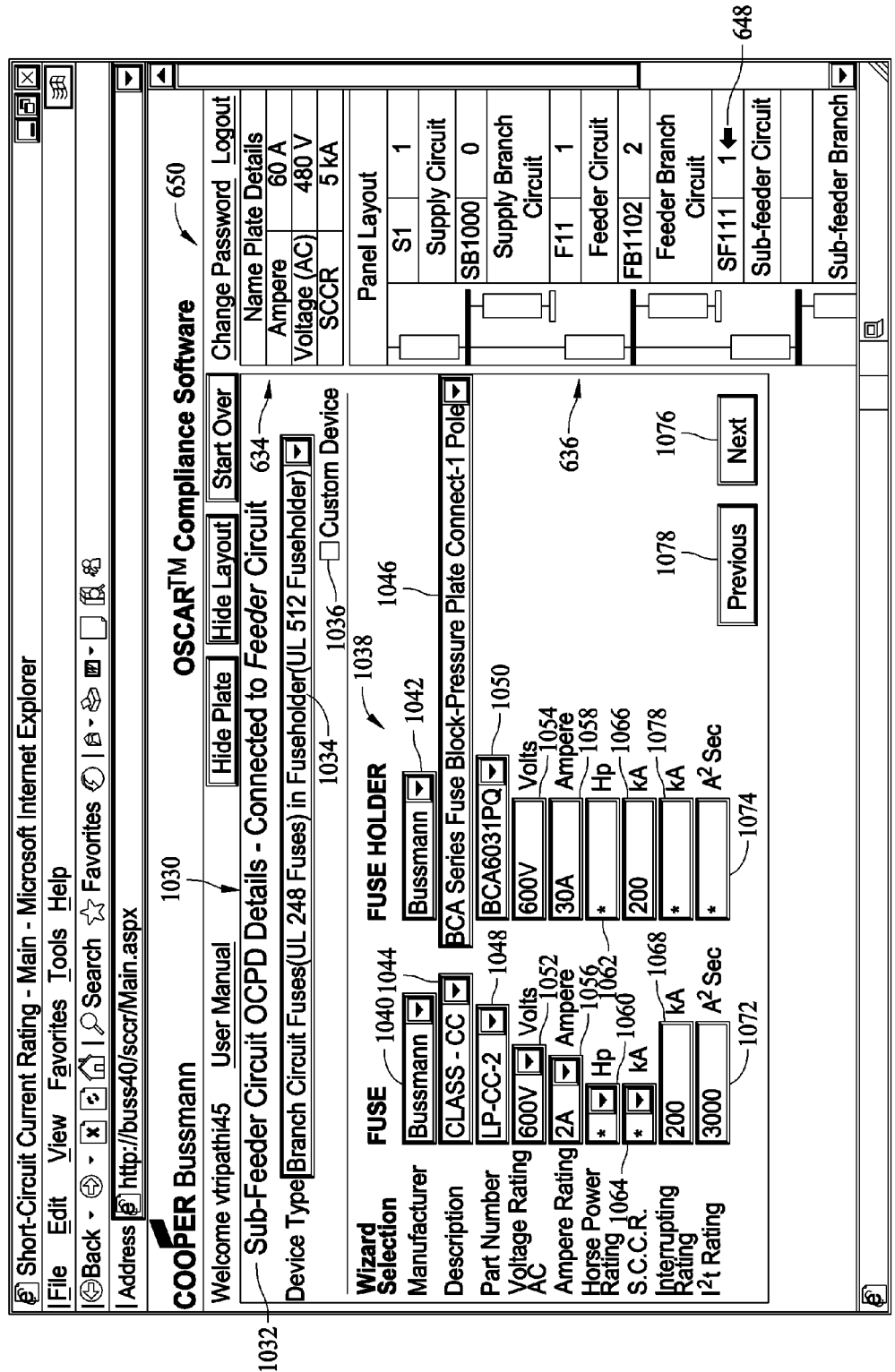

FIG. 37 is an example of a user interface displaying a first sub-feeder circuit component selection screen for a user of the analysis and evaluation system 150 after the screen shown in FIG. 36. The sub-feeder circuit component selection screen includes the name plate section 634, the layout section 636, the navigation bar 650 and a branch circuit device selection section 1030. A current SCCR value is displayed in the field 642. Also, the user may see that the arrow 648 now points to the sub-feeder branch circuit field in the layout section 636. The supply circuit field in the layout section 636 now reads "1", the supply branch circuit field reads "0", the feeder circuit field reads "1", the feeder branch circuit reads "2", and the sub-feeder circuit field now reads "1" to indicate to the user that the sub-feeder circuit connected to the feeder circuit is now under consideration.

The sub-feeder circuit device selection section 1030 includes a descriptive legend 1032, a device type field 1034, and a custom device selector 1036. The device type field 1034 includes a drop down menu listing any of the devices described above for a sub-feeder circuit. In the example shown in FIG. 37, a device type of "Branch Circuit Fuses (UL 248 Fuses) in Fuseholder (UL 512 Fuseholder)" has been selected.

A device detail section 1038 is provided including manufacturer name fields 1040 and 1042 for the devices selected in the device type field 1034, description fields 1044 and 1046 for the selected devices, part number fields 1048 and 1050 for the selected devices, voltage ratings 1052 and 1054 for the devices selected, current ratings 1056 and 1058 for the selected devices, horse power ratings 1060 and 1062 for the selected devices, SCCR ratings 1064 and 1066 for the respective devices, interrupting ratings 1068 and 1070 for the selected devices, and $i^2t$ fields 1072 and 1074 for the selected devices. As shown in FIG. 37, drop down menus are selected for required choices or selections by the user, and the remainder of the fields are populated by the system with values found in the system database or databases for the selected devices using the fields 1040 through 1052 and 1056, 1060, and 1064. Also as shown in FIG. 37, values for all of the fields may not exist for the selected devices, in which case a dash appears in the respective field.

Once the user makes appropriate selections in the device type field 1034 and the detail section 1038, the user may select the next button 1076 to proceed or the previous button 1078 to return to the previous screen. When the next button is selected, the algorithms described above are performed using the data and information in the screen of FIG. 37, and the SCCR result, including any adjustments, is displayed in the name plate section 634.

Figure 38:
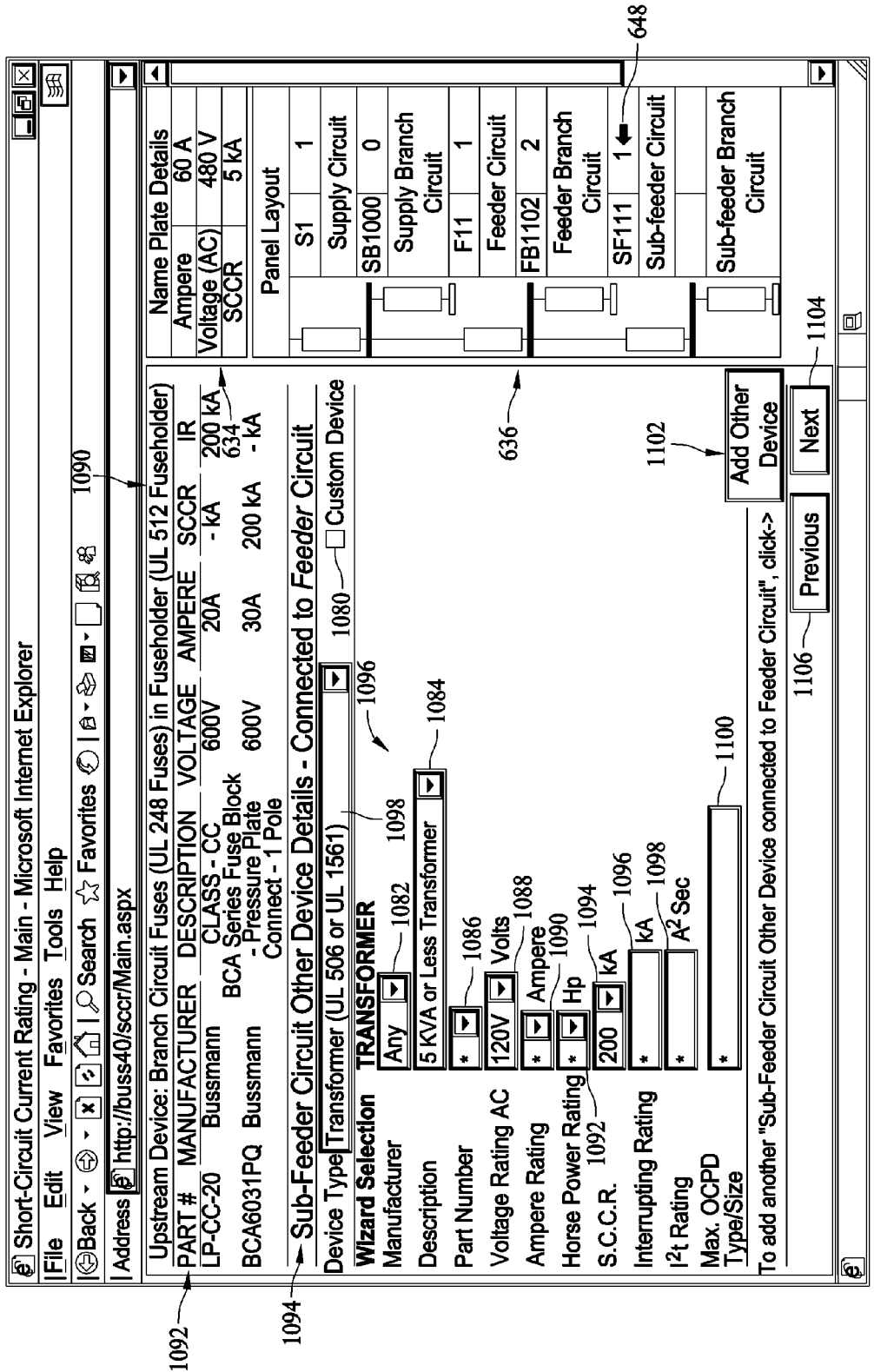

FIG. 38 is an example of a user interface displaying a second sub-feeder circuit component selection screen for a user of the system 150. The branch circuit component selection screen includes the name plate section 634, the layout section 636, the navigation bar 650 (not visible in FIG. 38 because the screen is scrolled down) and a branch circuit device selection section 1090. The SCCR value displayed is the same as the previous screen, indicating that devices selected in the screen did lead to an SCCR adjustments. The supply circuit field in the layout section 636 now reads "1", the supply branch circuit field reads "0", the feeder circuit field reads "1", the feeder branch circuit field reads "2", and the sub-feeder circuit field reads "1" to indicate to the user that the sub-feeder circuit connected to the feeder circuit is still under consideration. The arrow 648 also points to the sub-feeder branch circuit field in the layout section 636.

The feeder circuit device selection section 1090 includes an upstream device section 1092 populated with data corresponding to previously selected devices, a device type section 1094, and a device detail section 1096. The device type section 1094 includes a device type field 1098 and a custom device selector 1080. The device type field 1098 includes a drop down menu listing any of the devices described above for a sub-feeder circuit. In the example shown in FIG. 38, a device type of "Transformer (UL 506 or UL 1561)" has been selected.

The device detail section 1096 is provided including a manufacturer name field 1082, a description field 1084, a part number field 1086, a voltage rating 1088, a current rating 1090, a horse power rating 1092, an SCCR rating 1094, an interrupting rating 1096, an $i^2t$ rating 1098 and a maximum OCPD type/size field 1100. As shown in FIG. 38, drop down menus are available for required choices or selections by the user, and the remainder of the fields are populated by the system with values found in the system database or databases for the selected device using the fields 1082 through 1094. Also as shown in FIG. 388, values for all of the fields may not exist for any given selected device, in which case a dash appears in the respective field.

Once the user makes appropriate selections in the device type field 1098 and the detail section 1096, the user may select an add other device button 1102, a next button 1104 to proceed or a previous button 1106 to return to the previous screen. When the next button is selected, the algorithms described above are performed using the data and information in the screen of FIG. 38, and the SCCR result, including any adjustments, is displayed in the name plate section 634.

Figure 39:
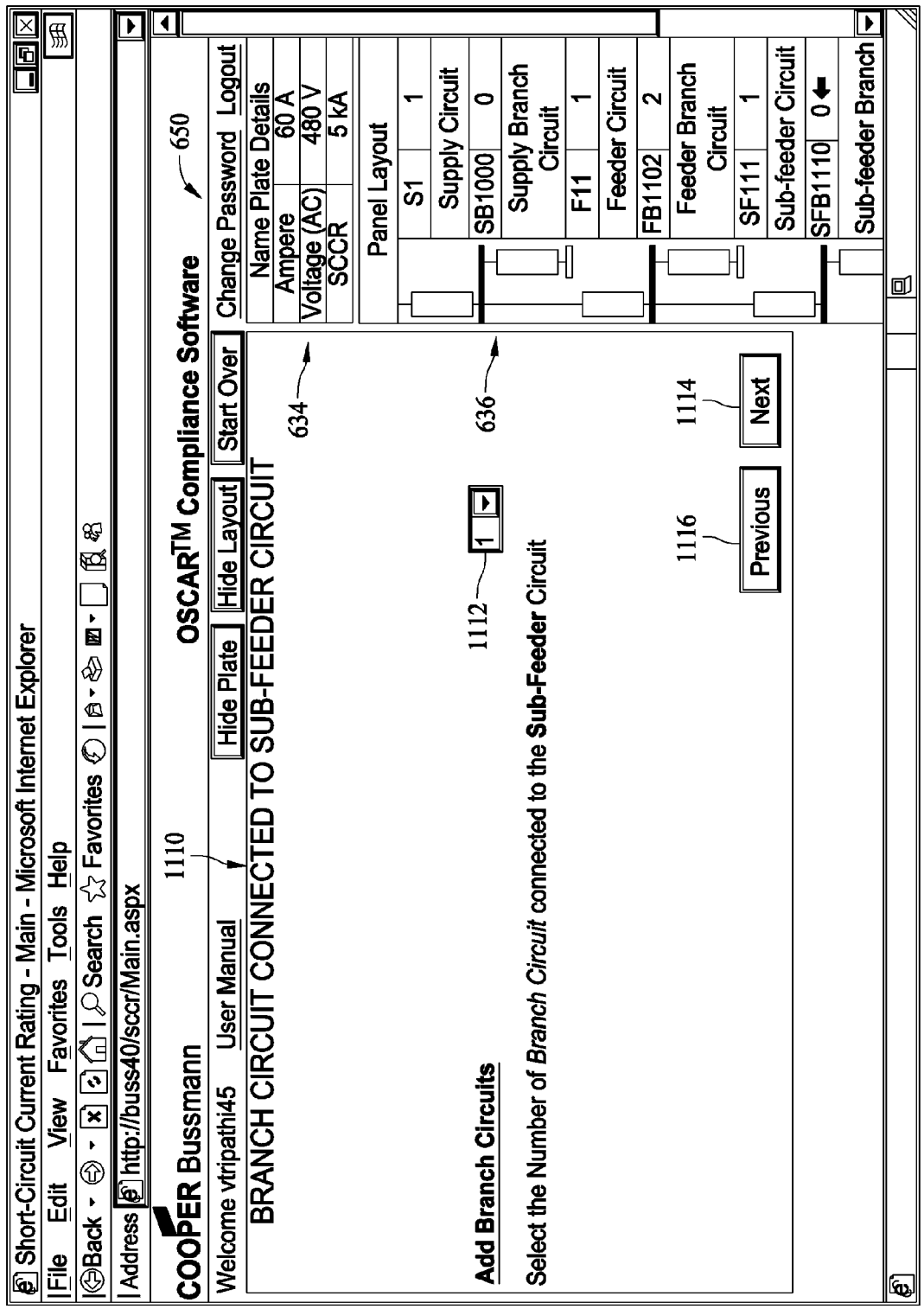

FIG. 39 is an example of a user interface displaying a branch circuit to sub-feeder circuit screen for a user of the analysis and evaluation system 150 after the supply circuit device selection screen shown in FIG. 38. The branch circuit to sub-feeder circuit screen includes the name plate section 634, the layout section 636, the navigation bar 650 and a branch circuit selection section 1110. The SCCR value displayed is the same as the previous screen, indicated that devices selected in the previous screen did not trigger any adjustments in the SCCR. The supply circuit field in the layout section 636 now reads "1", the supply branch circuit field reads "0", the feeder circuit field reads "1", the feeder branch circuit field reads "2", the sub-feeder circuit field reads "1", and the sub-feeder branch circuit field displays "0" to indicate to the user that a selection has not been made. The arrow 648 also points to the sub-feeder branch circuit field in the layout section 636.

The branch circuit selection section 1110 may include a drop down menu selection field 1112 for the user to choose the number of branch circuits connected to the sub-feeder circuit in the proposed panel design of interest. When the appropriate number of branch circuits have been selected, the user may select the next button 1114 to proceed or the previous button 1116 to return to the previous screen. In the illustrated example, "1" has been selected for the number of branch circuits connected to the sub-feeder circuit.

Figure 40:
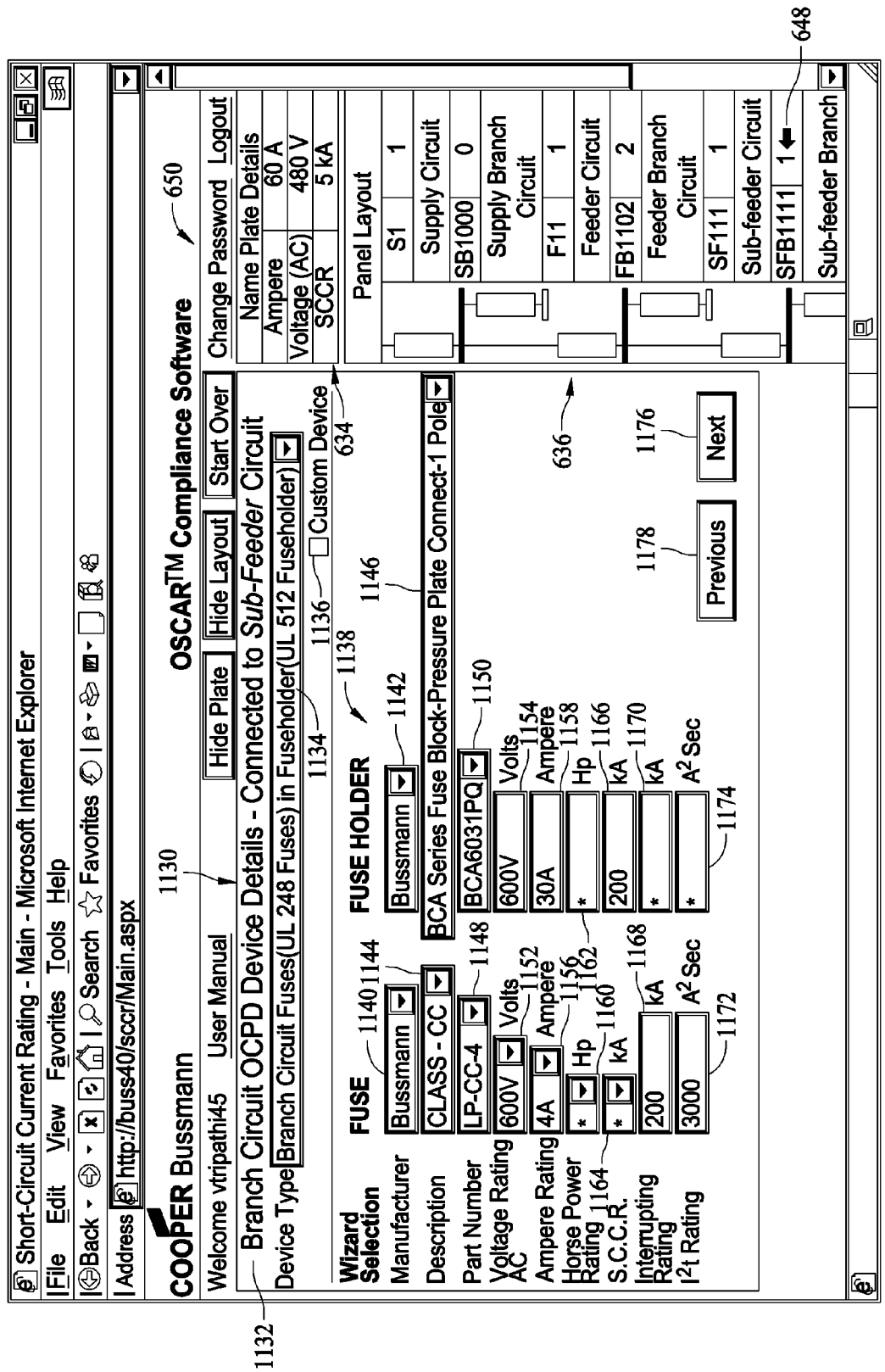

FIG. 40 is an example of a user interface displaying a first branch circuit to sub-feeder circuit component selection screen for a user of the analysis and evaluation system 150 after the screen shown in FIG. 39. The sub-feeder circuit component selection screen includes the name plate section 634, the layout section 636, the navigation bar 650 and a branch circuit device selection section 1130. A current SCCR value is displayed in the field 642. Also, the user may see that the arrow 648 points to the sub-feeder branch circuit field in the layout section 636. The supply circuit field in the layout section 636 now reads "1", the supply branch circuit field reads "0", the feeder circuit field reads "1", the feeder branch circuit reads "2", and the sub-feeder circuit field now reads "1", and the sub-feeder branch circuit field now reads "1" to indicate to the user that branch circuit connected to the sub-feeder is now under consideration.

The sub-feeder circuit device selection section 1130 includes a descriptive legend 1132, a device type field 1134, and a custom device selector 1136. The device type field 1134 includes a drop down menu listing any of the devices described above for a branch circuit. In the example shown in FIG. 40, a device type of "Branch Circuit Fuses (UL 248 Fuses) in Fuseholder (UL 512 Fuseholder)" has been selected.

A device detail section 1138 is provided including manufacturer name fields 1140 and 1142 for the devices selected in the device type field 1134, description fields 1144 and 1146 for the selected devices, part number fields 1148 and 1150 for the selected devices, voltage ratings 1152 and 1154 for the devices selected, current ratings 1156 and 1158 for the selected devices, horse power ratings 1160 and 1162 for the selected devices, SCCR ratings 1164 and 1166 for the respective devices, interrupting ratings 1168 and 1170 for the selected devices, and $i^2t$ fields 1172 and 1174 for the selected devices. As shown in FIG. 40, drop down menus are selected for required choices or selections by the user, and the remainder of the fields are populated by the system with values found in the system database or databases for the selected devices using the fields 1140 through 1152 and 1156, 1160, and 1164. Also as shown in FIG. 40, values for all of the fields may not exist for the selected devices, in which case a dash appears in the respective field.

Once the user makes appropriate selections in the device type field 1134 and the detail section 1138, the user may select the next button 1176 to proceed or the previous button 1178 to return to the previous screen. When the next button is selected, the algorithms described above are performed using the data and information in the screen of FIG. 40, and the SCCR result, including any adjustments, is displayed in the name plate section 634.

Figure 41:
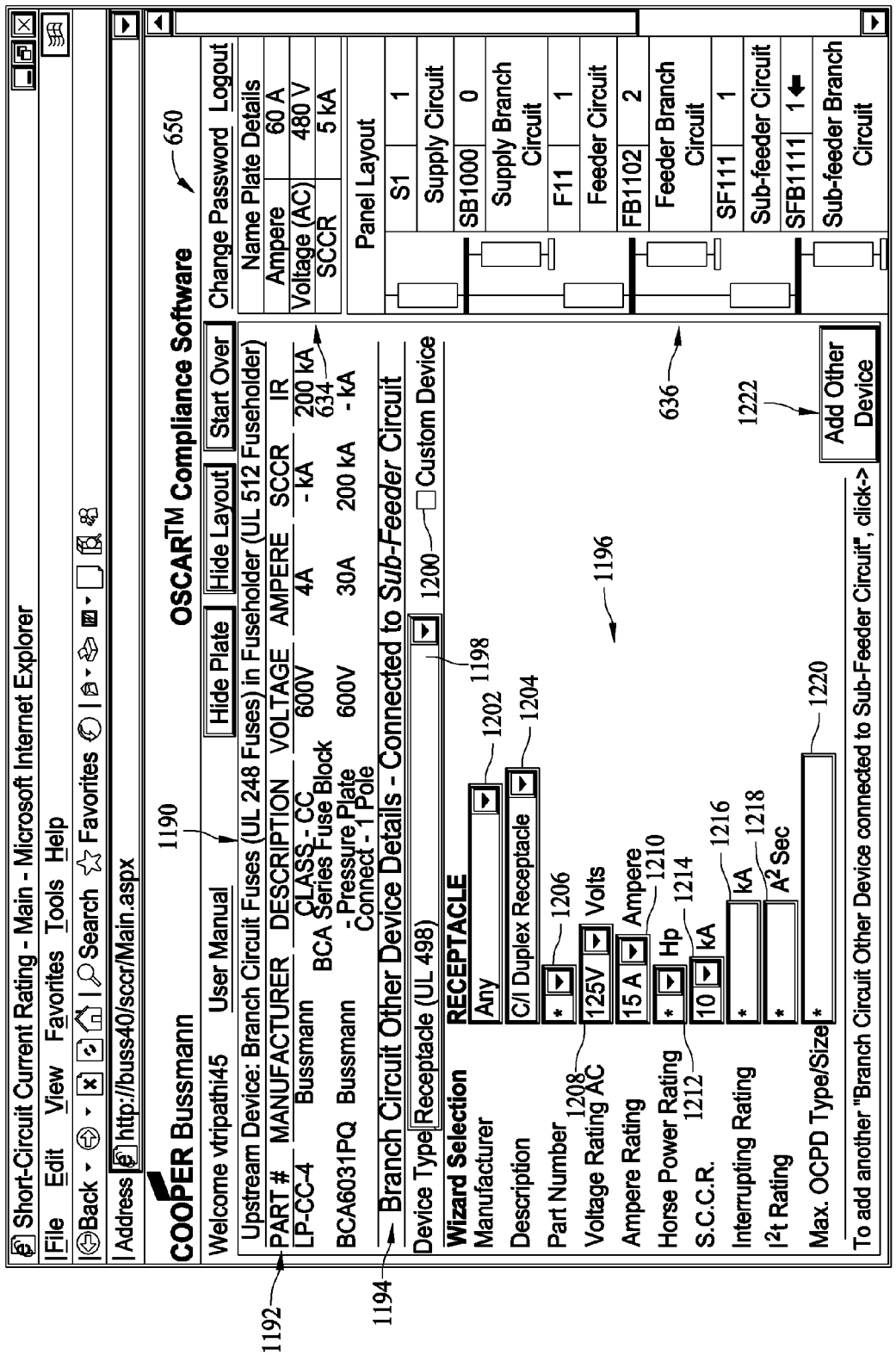

FIG. 41 is an example of a user interface displaying a second branch circuit component selection screen for a user of the system 150. The branch circuit component selection screen includes the name plate section 634, the layout section 636, the navigation bar 650 and a branch circuit device selection section 1190. The SCCR value displayed is the same as the previous screen, indicating that devices selected in the previous screen did not lead to SCCR adjustment. The supply circuit field in the layout section 636 now reads "1", the supply branch circuit field reads "0", the feeder circuit field reads "1", the feeder branch circuit field reads "2", and the sub-feeder circuit field reads "1", and the sub-feeder branch circuit field reads "1" to indicate to the user that the branch circuit connected to the sub-feeder circuit is still under consideration. The arrow 648 also points to the sub-feeder branch circuit field in the layout section 636.

The branch circuit device selection section 1190 includes an upstream device section 1192 populated with data corresponding to previously selected devices, a device type section 1194, and a device detail section 1196. The device type section 1194 includes a device type field 1198 and a custom device selector 1200. The device type field 1198 includes a drop down menu listing any of the devices described above for a branch circuit. In the example shown in FIG. 41, a device type of "Receptacle (UL 498)" has been selected.

The device detail section 1196 is provided including a manufacturer name field 1202, a description field 1204, a part number field 1206, a voltage rating 1208, a current rating 1210, a horse power rating 1212, an SCCR rating 1214, an interrupting rating 1216, an $i^2t$ rating 1218 and a maximum OCPD type/size field 1220. As shown in FIG. 40, drop down menus are available for required choices or selections by the user, and the remainder of the fields are populated by the system with values found in the system database or databases for the selected device using the fields 1202 through 1214. Also as shown in FIG. 41, values for all of the fields may not exist for any given selected device, in which case a dash appears in the respective field.

Once the user makes appropriate selections in the device type field 1198 and the detail section 1196, the user may select an add other device button 1222, a next button to proceed or a previous button (not visible in FIG. 41 but accessible by scrolling the screen down) to return to the previous screen. When the next button is selected, the algorithms described above are performed using the data and information in the screen of FIG. 34, and the SCCR result, including any adjustments, is displayed in the name plate section 634.

Figure 42:
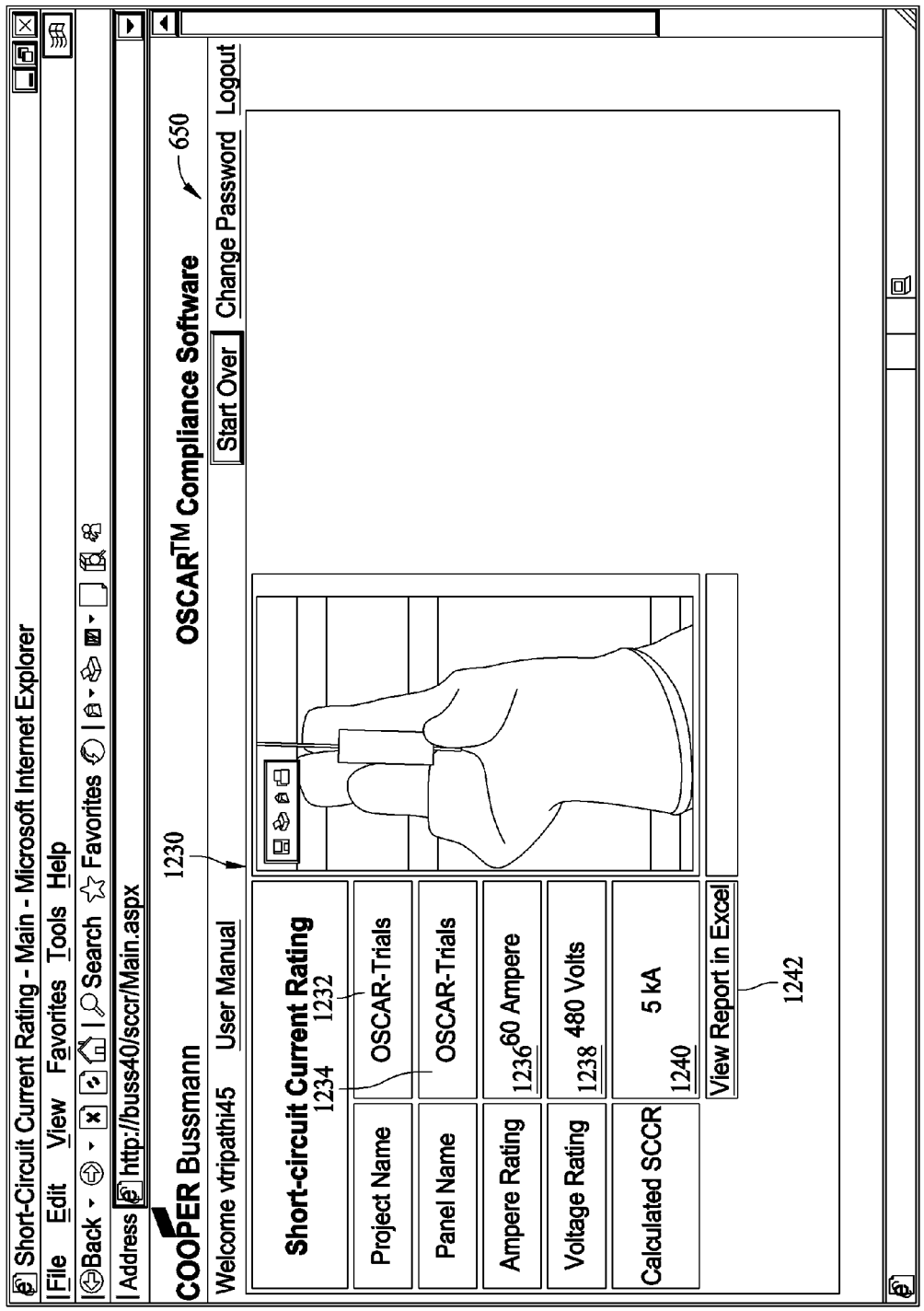

FIG. 42 is an example of a user interface displaying a project summary analysis screen including the navigation bar 650 and a summary analysis section 1230. The analysis section 1230 includes a panel name field 1232, a panel name field 1234, a current rating field 1236, a voltage rating field 1238, an a final SCCR rating field 1240 for the proposed panel design as entered by the user in the previous screens. The fields 1232 through 1240 may be used to print a name plate for the panel. If the desired final SCCR rating value does not meet the needs of a particular load to be connected to the panel, the user may use the previous buttons in the various screens to review the analysis results, determine which devices impact the final result, and choose other devices in an attempt to achieve a different result.

A detailed report generation link 1242 may also be provided. When the report generation link 1242 is selected, a detailed report may be generated for the user's records and for user study of the step-by-step analysis performed by the system and the output SCCR result at each point of analysis.

FIG. 43 is an example of a user interface displaying a detailed project analysis screen for a user of the system 150 for exemplary selected component. The report may include key values for the analysis, and notes and comments indicating the effects of upstream devices on the SCCR rating obtained. The report may be generated electronically in a spreadsheet software package such as Microsoft Excel, or in another convenient format for the user. The detailed report may also be printed or otherwise provided in hard copy form as desired.

Figure 44:
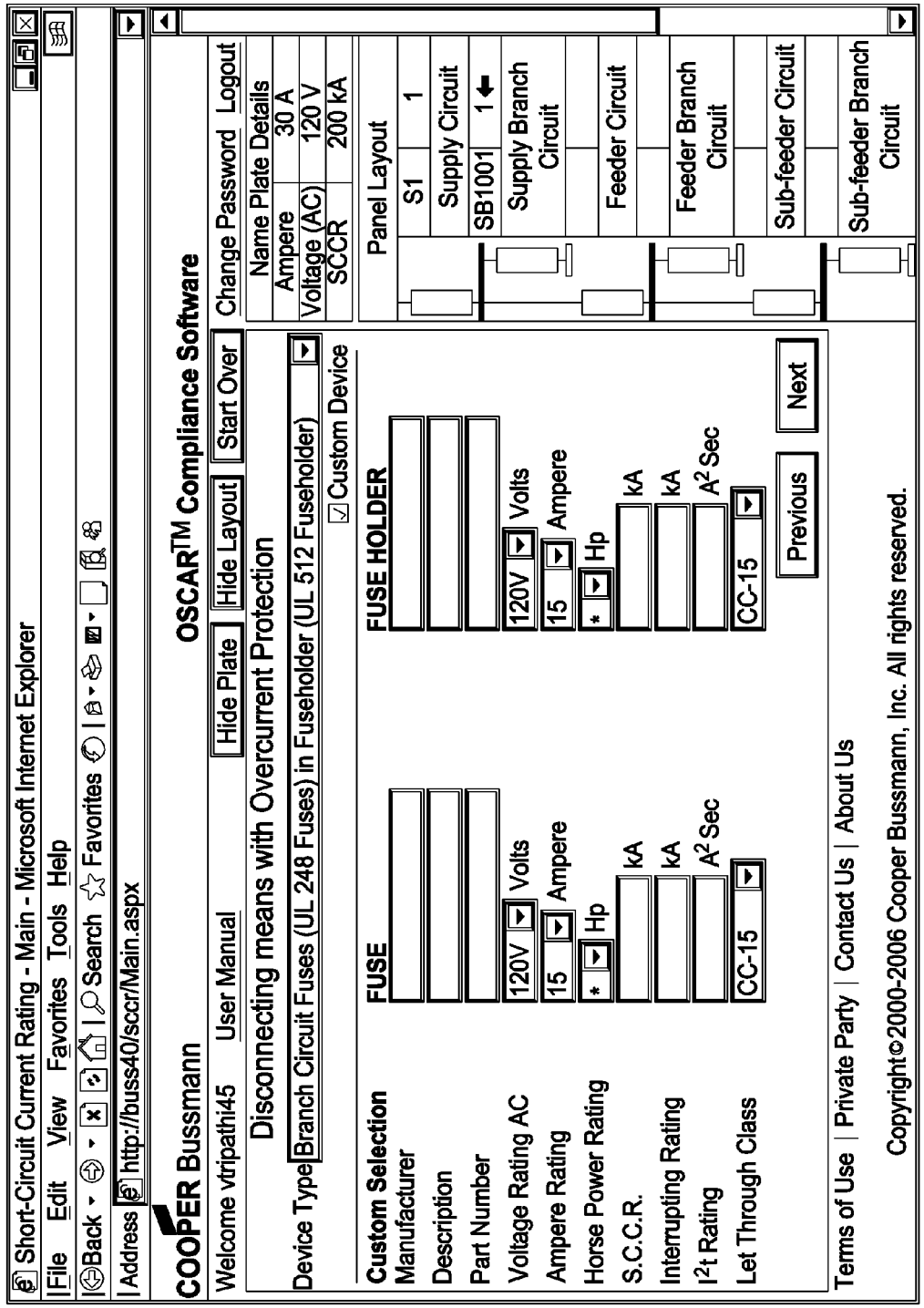

FIG. 44 is another example of a custom device selection screen presenting various fields for the user to complete. The fields presented in the custom device selection screen will vary with the device type selected.

The above described displays and screens shown in FIGS. 24-44 may be effectively used to accommodate complex panel designs, while ensuring an accurately determined SCCR rating according to U.L. 508A. The user interface displays and screens capably present voluminous amounts of data and circuit device details in easy to use, menu-driven form with intuitive links and graphical displays to quickly understand the circuit and device selections, the current point of analysis at each step, and step-by-step analysis results and feedback.

As previously mentioned, the invention utilizes one or more databases. These databases may contain information coordinated by master parts tables. Information contained in these master parts tables may include a common list of manufacturing names for various devices, a common list of voltage ratings for various devices, a common list of ampere ratings for various devices, a common list of combination voltage ratings for various devices, a common list of combination ampere ratings for various devices, and/or other relevant information. Other relevant information in the master parts list may include circuit type definitions (e.g. supply, branch, feeder and tap), categories definitions (e.g. overcurrent protection device ("OCPD")/other), device type definitions association with graphics and categories, relationships created between devices types and circuits and categories, views created for master parts tables for each circuit and category, and/or other information that may help the invention analyze the device and circuit information. The association of these master parts tables with circuit types and categories may allow for flexibility and easy maintenance, without major application changes, to add updates to the master parts tables, e.g. adding device types.

One or more exemplary embodiments may utilize object oriented application design. By dividing the programming of the invention into multiple layers, one layer may be altered without impacting any of the other layers in the program. In an exemplary embodiment, there are three layers: the database layer, the business layer, and the presentation layer. The database layer contains the procedures and information used in subsequent layers. For example, the database layer may store procedures for retrieving and saving data. The database layer may access any of the databases previously described. FIG. 45 shows a chart of the various business objects contained in the business layer, which are designed to accommodate the business rules that may be in the exemplary embodiment. The business layer utilizes the information contained in the database layer information and analyzes the information. The information contained in the business layer may comprise data access objects, common objects, application objects, UL rules objects, user objects, and/or projects and panels objects. The presentation layer then takes the analysis from the business layer and presents the analysis in a visual format the user can interpret. The presentation layer may contain all assets to display information, including but not limited to web pages, custom web controls, JavaScript files, styles sheets and graphic images, to display the application in at least a web browser.

In one or more exemplary embodiments, an administrative tool may be used for manipulating the information contained in the databases. As previously mentioned, the program uses a device database that may comprise a listing of various manufactures. The administrative tool may assist in streamlining the procedure for updating the information contained within the databases. The administrative tool may enable the user to view and/or edit device information existing within the databases or add additional devices to the databases as needed. The edits may be performed online for each individual device or via mass upload of the updated information. The administrative tool may also enable the user to view desired information by filtering the information and/or devices based on certain requirements, including but not limited to manufacturer, family, or other criteria. According to some of the exemplary embodiments, the administrative tool may allow parts recorded in the database to be designated as discontinued, thereby leaving the parts in the database without making the discontinued parts accessible for analysis. Any of the information listed in the database may be altered as needed.

In addition to the previously disclosed methods of entering and editing information to the database, the administrative tool may allow database information to be revised or viewed by use of an import/export function. Information may be exported from the database to an external program, e.g. Microsoft Excel®, or imported to the database from an external program. The user may manipulate single records or multiple records in this manner. Moreover, the user may filter through the records and edit device information.

The information uploaded into these databases may also include information related to the combination ratings of devices stored in the databases. The administrative tool, according to some of the exemplary embodiments, may include a combination rating tool that allows the user to easily enter, verify and/or edit the information of a device's combination rating (described later) for devices entered separately or as a "preset group" in one device record. The user may view devices based on criteria such as the manufacturer of the device. Additionally, the user may add new devices and its relevant corresponding information to the database. Moreover, the user may also edit device information, including but not limited to combination ratings, either individually inline or as part of a large scale upload. Combination ratings may impact the analysis of the circuits modeled in the invention. Additionally, the combination rating information may also include how the combination rating changes when the devices are connected to different devices. This allows the combination rating to change when an associated device is added, removed, or replaced. Edits to the combination rating may be made to individual devices, or may be made to entire groups that are combined together to have a combination rating. Device families may also be edited to change their combination rating. A device may be viewed by family part number or group part number. Also, as indicated above, the device information may be exported from the database to an external program, e.g. Microsoft Excel®, or imported to the database from an external program.

Figure 46:
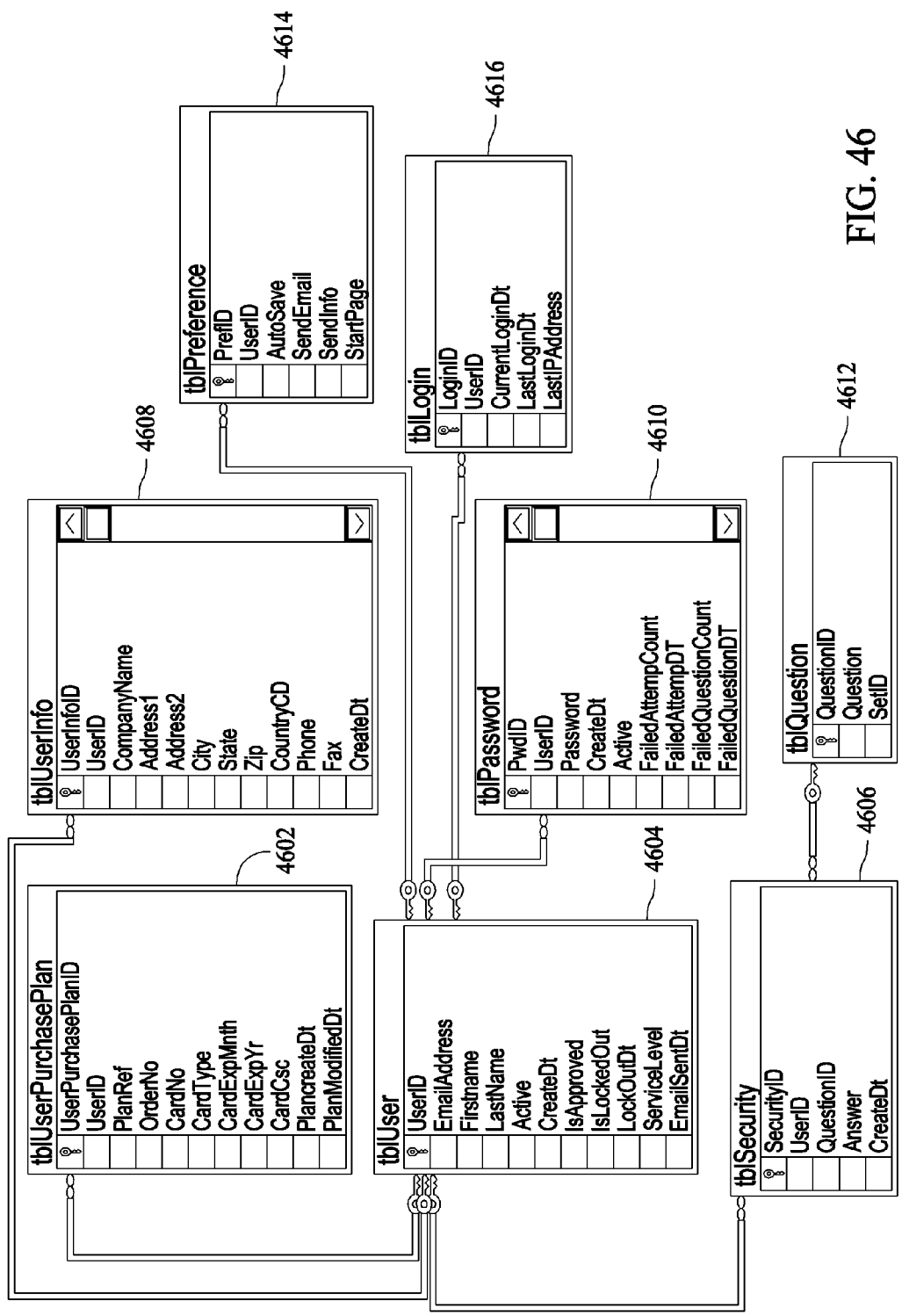
FIG. 46 shows a diagram of how the invention interacts with the user according to an exemplary embodiment of the invention.

FIG. 46 shows a diagram of the interaction of a user admin tool according to an exemplary embodiment. This diagram contains multiple tables, including but not limited to, a user table 4604, a user purchase plan table 4602, a security table 4606, a user info table 4608, a password table 4610, a question table 4612, a preference table 4614 and a login table 4616, and displays the interaction between the multiple tables.

The user table 4604 provides personal user information and may contain one or more of the following information: user ID, email address, first name, last name, active status, creation date, approval status, lock out status, lock out date, service level, and email sent date. The user table 4604 may interact with the security table 4606, the user purchase plan table 4602, the user info table 4608, the preference table 4614, the password table 4610, and the login table 4616.

The user purchase plan table 4602 (hereinafter the "plan table") provides information regarding the purchase plan and payment information and may contain one or more of the following information: purchase plan ID, user ID, plan reference number, order number, card number, card type, card expiration month, card expiration year, card csc, plan creation date, and plan modification date. The plan table 4602 may interact with the user table 4604.

The security table 4606 provides security information to ensure that an authorized user may continue using of the program and may contain one or more of the following information: security ID, user ID, question ID, answer, and creation date. The security table 4606 may interact with the user table 4604 and the question table 4612.

The question table 4612 provides a list of acceptable user identification questions and may contain one or more of the following information: question ID, question, and set ID. The question table 4612 may interact with the security table 4606.

The user information table 4608 (hereinafter the "information table") provides additional information about the user and may contain one or more of the following information: user information ID, user ID, company name, address one, address two, city, state, zip, country code, phone number, fax number, and creation date. The information table 4608 may interact with the user table 4604.

The password table 4610 provides information regarding user password information and failed login attempts and may contain one or more of the following information: password ID, user ID, password, creation date, active status, failed attempt count, failed attempt date, failed question count, and failed attempt question date. The password table 4610 may interact with the user table 4604.

The preference table 4614 provides information regarding user preferences and may contain one or more of the following information: preference ID, user ID, auto save, send e-mail preference, send info preference, and start page preference. The preference table 4614 may interact with the user table 4604.

The login table 4616 provides login information regarding the dates and location and may contain one or more of the following information: login ID, user ID, current login date, last login date, and last IP address. The login table 4616 may interact with the user table 4604.

Although each of the tables above have been described as possessing certain information, more or less information may be provided in each of the tables without departing from the scope and spirit of the exemplary embodiments. Additionally, although specific tables have been described above, more or less tables may be used without departing from the scope and spirit of the exemplary embodiments. Moreover, although specific tables have been described as interacting with one or more other tables, the tables may interact with other tables without departing from the scope and spirit of the exemplary embodiment.

A login screen may appear when the user attempts to login to the system. The login screen may prominently display the product's name, information about short-circuit current rating (SCCR) and other promotional information. The user may use the user's e-mail address as identification along with a password matching the one stored in the password table 4610. A successful login may allow the user to use the product according to the preloaded preferences 4614.

The user may have a profile stored in the user table 4604. This contains information on the user and the status of the user's subscription. This profile may also contain restrictions on the user's privileges in the software.

In the event the user unsuccessfully attempts to login, one or more of the exemplary embodiments may have different responses to failed logins, including: user ID or password not found, user ID or password not correct, account is locked, too many failed login attempts, subscription has expired, trial period has expired, another user is already logged in for this user ID and password, and/or redirecting the user to the new user login so that the user may create a new account.

Additionally, once the user has successfully logged into the software, the software may prompt the user to login again to resume work after a predetermined period of inactivity. The exemplary embodiment may also contain a feature that monitors the current parties accessing the invention and verifies no duplicate logins have occurred. One way of preventing multiple users simultaneously acting on the same account would be the use of a 'cookie' to track who has logged in at any given moment. This would discourage the user from distributing a password to multiple parties and gaining access.

If the user attempts to login and does not have a login account or has not completely registered, then the software may redirect the user to the new user purchase screen linked to the plan table 4602 to purchase a plan.

A user may access the user's personal information that is stored in the database. Users may update their e-mail information, billing information, or any other information at any time by updating the information table 4608. The software allows the user to change their password and store it within the password table 4610. According to an exemplary embodiment, a change password screen may be available to allow the user, once validated as being an allowable user, to change their password. The password should be seven characters long and contain at least one number and one special character. The number may range from 0-9 and the special character may include, but is not limited to, !, @, #, $ and %. The new password may be entered twice, thereby ensuring that the correct new password is stored into the database. The twice entered new password should match each other identically. The new password may be encrypted before being stored in the database. Although the password is shown to be seven characters long, longer or shorter passwords may be used without departing from the scope and spirit of the exemplary embodiment.

Additionally, in the event the user may not remember the user's password, the software may direct the user to a forgot password page once the user enters a valid user ID, which may be a valid e-mail address. The forgot password page may display three security questions. Once the user successfully answers the three security questions, an e-mail may be sent to the user's e-mail address with a new temporary password. Once the user successfully logs into the system with the temporary password, the user may be prompted to change their password using the change password screen, which was described above. Although this embodiment has the user answer three security questions, greater or fewer security questions may be used without departing from the scope and spirit of the exemplary embodiment.

In some embodiments, the login screen might not allow access based on various factors, including user or password not found, user or password not correct, account is locked, too many failed login attempts, expired subscription, expired trial period, or another user with the same login information is already on the system.

According to some exemplary embodiments, the program may allow users a trial period to determine whether they would want to purchase access to the program. This trial subscription may be offered only to those users who have registered. The required information may include, at least, the user information and address. This trial period may be determined by the user administrator, but the exemplary embodiment uses a seven day trial period. In some embodiments, the user may receive a warning e-mail alerting the trial user that only two days remain in their trial period before expiration. When the trial period has expired, the user may receive an e-mail allowing them to either purchase access to the software or have a sales person contact them. Additionally, the appropriate sales person may also receive an automatic copy of all trial users and expiration notices based on certain factors, such as zip codes. In the event a user has already used a trial period, they may be prevented from starting a new trial period.

According to some exemplary embodiments, if a user has been using a subscription, the software may redirect them to the user purchase screen once the subscription period expires. Such alerts to the user may be made at predetermined intervals before expiration of the subscription period. These warnings may occur at thirty days before expiration, fifteen days before expiration, and/or two days before expiration. The expiration notifications may be sent to an appropriate sales person for follow up.

When a user purchases a subscription to the software, the user purchase screen may facilitate a secured transaction. The user information will be collected and validated. Additionally, the user purchase screen may collect information to approve or decline credit card purchases. This information may include, but not limited to, credit card information and user addresses. Additionally, subscribers may be able to access an update to the software as it becomes available.

Additional features related to the invention allow the user administrator to manipulate the system. User administrators may be able to extend or change subscription periods for users. The user administrator may be able to resend purchase messages or trial offers. The user administrator may also be able to generate a report containing information based on number of trial subscriptions, number of purchases based on credit card or distributor, amount of sales made per credit card or distributor, or other information relevant to the user administrator.

According to some exemplary embodiments, the program may include a mechanism that easily allows the user to update UL rule changes in the program so that calculation may be performed using the most current UL rules. These UL rule changes may be fairly frequent, typically once or twice a year. Changes to the rules may be installed into the system prior to any logic reformatting. FIG. 47 shows a chart reflecting examples of recent changes made to the UL rules in the invention according to an exemplary embodiment of the invention.

According to some of the exemplary embodiments, a user manual may be available to the user. A hard copy of the user manual may be sent directly to the user or the user may be provided with access to the user manual via a link from the menu within the software. The user manual may represent and explain the logic flow and process of building a circuit to calculate the SCCR of a panel.

According to some embodiments, a distributor purchase screen may be present to allow the purchase of the product on behalf of a distributor. A new user account may be created or an existing user account may be updated with a SAP order number. Although no credit card information is required, a customer email address and business address may need to be provided. Thus, the customer email address, the business address, new SAP order number and the subscription date may be used to reflect the purchase.

FIG. 48-55 show an overview of how relational databases are utilized to determine the overall electrical rating and SCCR of a combination of devices in accordance with an exemplary embodiment of the invention. The software may contain a relational database that identifies devices that are used in the electrical circuits in combination where the combination of devices impacts the overall electrical rating of the circuit, hereinafter referred to as a combination rating. The software may automatically calculate the combination rating and use this rating within its analysis of the circuit. For example, a 100C series contactor from Allen Bradley has a stand alone rating of 5 ka. However, if the contactor is protected by an appropriate upstream fuse, the rating may be raised to 100 ka due to their combination rating. The combination ratings may be dependent on a number of factors, including size of the overcurrent protection device (amperage rating), type (class for fuses) and part number (e.g. circuit breaker, MCP, or type E combination starter) of overcurrent protection device, and/or the specific part number of the component (e.g. contactor).

Combination ratings may be applied for the following device types: magnetic controllers, nonfused switch UL 98, nonfused switch motor—UL 508, terminal block—PDB (UL 1953), terminal block—feeder circuit (UL 1059), terminal block—branch circuit (UL 1059), solid state relays, bus bar systems, manual motor starter, magnetic motor starter, overload relays and power conversion equipment. If a part is present in the circuit that is not part of the list of combination parts, the combination rating is still applied. However, the combination rating is only applied to the parts found in the combination list, not to the part that is unlisted. The combination rating also is not dependent on the location or the sequence of the components in the circuit. Additionally, the combination rating only applies to the components in the combination, not the overcurrent protection device ("OCPD"). The OCPD is always the first component in a combination. For branches connecting to a supply, the OCPD may be located in the supply. Furthermore, for combinations that include fuses, the fuse switch, pullout, and fuse holders are considered to be combination components and the combination rating is not applied to the fuse itself. The program automatically determines which devices are used as part of the combination rating. Although this embodiment shows that the combination ratings are calculated and applied automatically, these ratings may be determined manually and entered into the database or may be applied manually without departing from the scope and spirit of the exemplary embodiment.

FIGS. 48-55 show different logic flows used for combination devices, transformer devices, and let through calculations.

Figure 48:
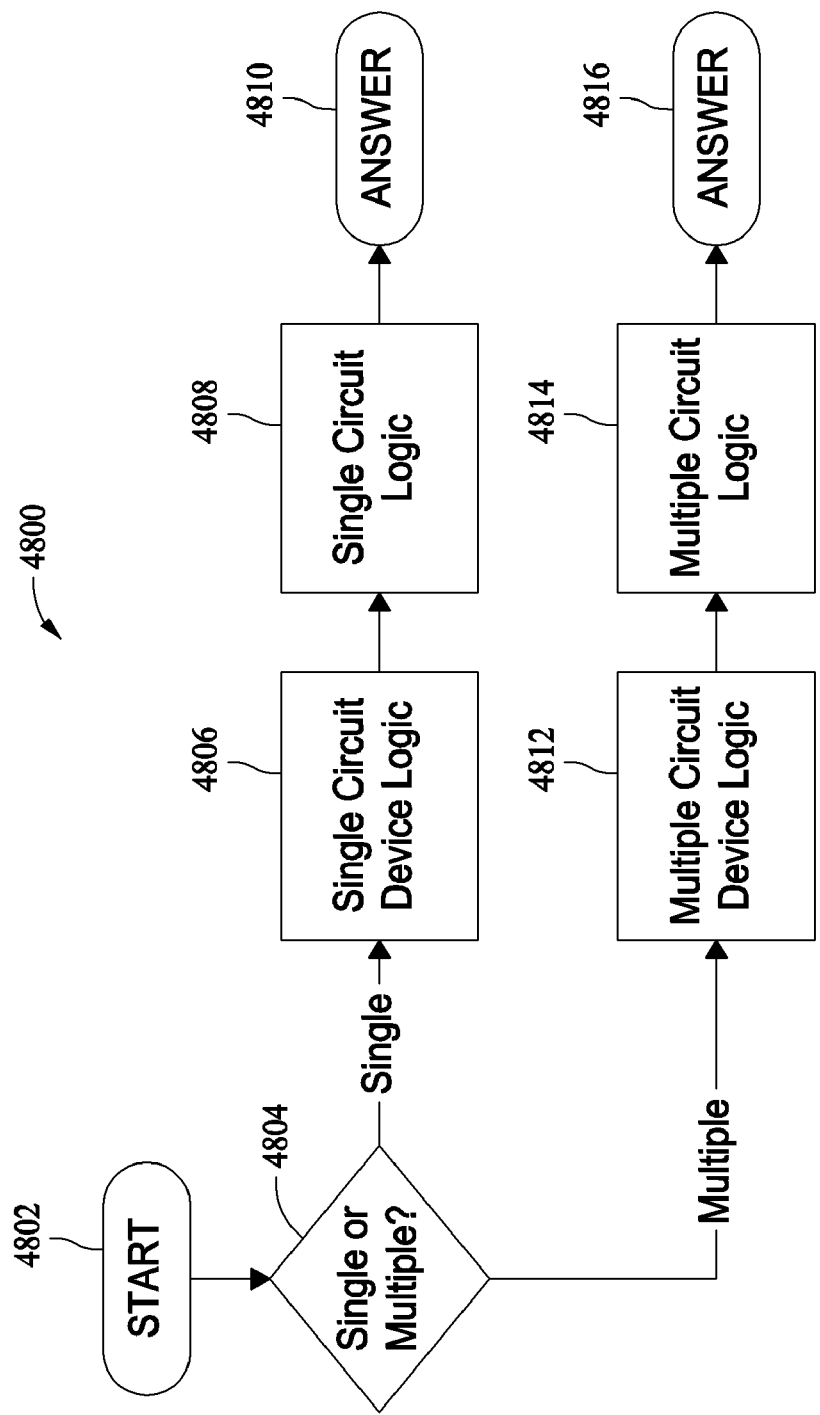
FIG. 48 shows an overview flowchart of the logic used by the relational database according to an exemplary embodiment of the invention.

FIG. 48 shows an example of an overview logic flow 4800 in accordance with an exemplary embodiment of the invention. The overview logic flow 4800 starts at step 4802. Following step 4802, the program determines whether the circuit is a single circuit or multiple circuit at step 4804. If the circuit is determined to be a single circuit, the analysis enters a single circuit device logic at step 4806. The analysis then proceeds from step 4806 and enters a single circuit logic at step 4808. Following step 4808, the analysis determines an answer at step 4810. However, at step 4804, if the program determines that the circuit is a multiple circuit, the analysis enters a multiple circuit device logic at step 4812. The analysis then proceeds from step 4812 and enters a multiple circuit logic at step 4814. Following step 4814, the analysis determines an answer at step 4816.

Figure 49:
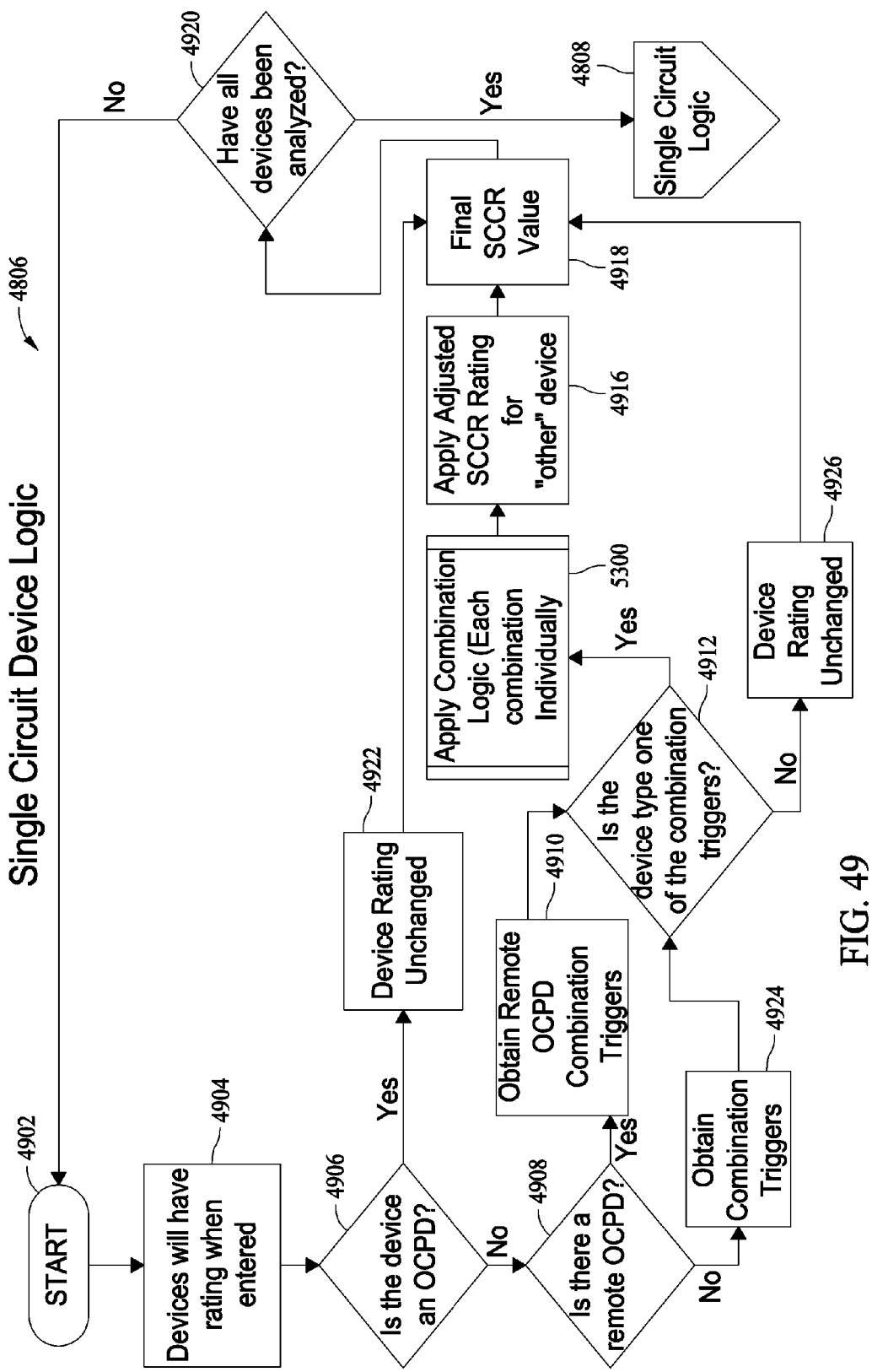
FIG. 49 shows a flowchart of the logic used by the relational database for a single circuit device logic according to an exemplary embodiment of the invention.

FIG. 49 shows an example of the single circuit device logic 4806 from FIG. 48 in accordance with an exemplary embodiment of the invention. The single circuit device logic 4806 starts at step 4902. Following step 4902, the ratings of all the devices are known when the devices are entered at step 4904. After step 4904, the algorithm determines whether the device is an OCPD at step 4906. If the algorithm determines that the device is an OCPD, the algorithm proceeds to step 4922 wherein the device rating remains unchanged. After step 4922, the algorithm calculates a final SCCR value at step 4918. After step 4918, the algorithm determines whether all devices have been analyzed at step 4920. If all devices have been analyzed, the algorithm then proceeds to the single circuit logic at step 4808. However, if all devices have not been analyzed, the algorithm proceeds back to start at step 4902.

However, if the algorithm determines that the device is not an OCPD at step 4906, then the algorithm determines whether there is a remote OCPD at step 4908. If there is a remote OCPD, the algorithm obtains remote OCPD combination triggers at step 4910. After step 4910, the algorithm determines whether the device type is one of the combination triggers at step 4912. If the device is not a combination trigger, the algorithm keeps the device rating unchanged at step 4926. After step 4926, the algorithm proceeds to calculate a final SCCR value at step 4918. The algorithm then proceeds from step 4918 in the same manner as previously described.

However, if the device type is a combination trigger at step 4912, the a combination logic is applied to each combination individually at step 5300 (described below). After step 5300, the algorithm proceeds to apply an Adjusted SCCR rating for "other" device at step 4916. After step 4916, the algorithm proceeds to calculate a final SCCR value at step 4918. The algorithm then proceeds from step 4918 in the same manner as previously described.

Additionally, if at step 4908, the algorithm determines that there is no remote OCPD, the algorithm proceeds to obtain the combination triggers at step 4924. After step 4924, the algorithm determines whether the device type is one of the combination triggers at step 4912. The algorithm then proceeds from step 4912 in the same manner as previously described.

Figure 50:
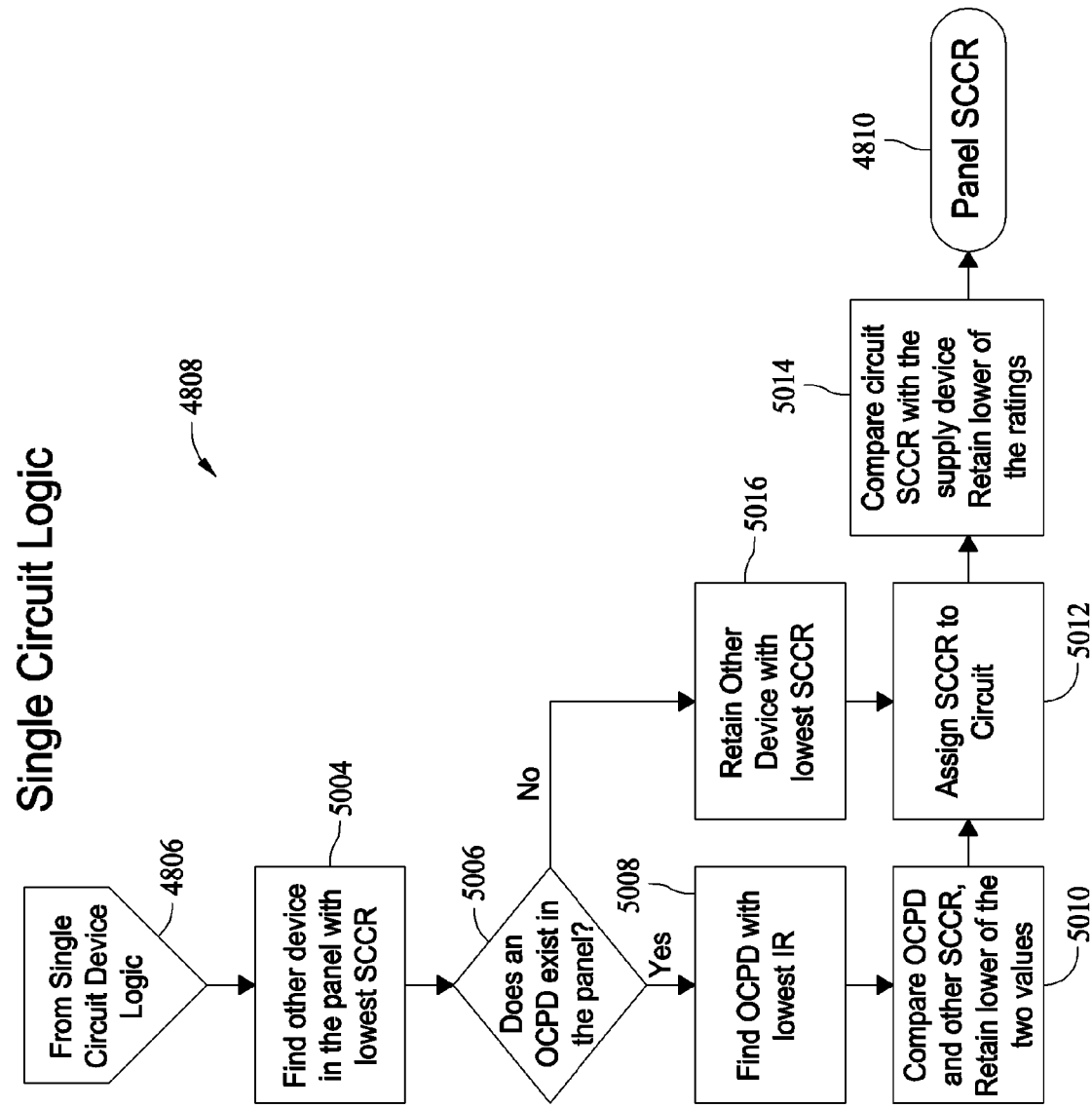
FIG. 50 shows a flowchart of the logic used by the relational database for a single circuit logic according to an exemplary embodiment of the invention.

FIG. 50 shows an example of the single circuit logic 4808 from FIG. 48 in accordance with an exemplary embodiment of the invention. Single circuit logic 4808 receives information from the single circuit logic device at step 4806. The algorithm then proceeds to step 5004 wherein the algorithm finds the device in the panel with the lowest SCCR. After step 5004, the algorithm determines whether the panel contains an OCPD at step 5006. If an OCPD exists in the panel, the algorithm finds the OCPD with the lowest IR rating at step 5008. After step 5008, the algorithm proceeds to step 5010, wherein the algorithm compares the OCPD and other SCCR and retains the lower of the two values. The algorithm then proceeds to step 5012, wherein the retained value from step 5010 is the SCCR that is assigned to the circuit. After step 5012, the algorithm compares the circuit SCCR with the SCCR of the supply device and retains the lower of the two ratings at step 5014. After step 5014, the algorithm proceeds to determining the panel SCCR, or answer, at step 4810.

However, in the event it is determined that the panel does not have an OCPD at step 5006, then the algorithm proceeds to step 5016, wherein the lowest SCCR of the other device is retained. The algorithm then proceeds to assign the lowest SCCR of the other device to the circuit at step 5012. The algorithm then proceeds from step 5012 in the same manner as previously described.

Figure 51:
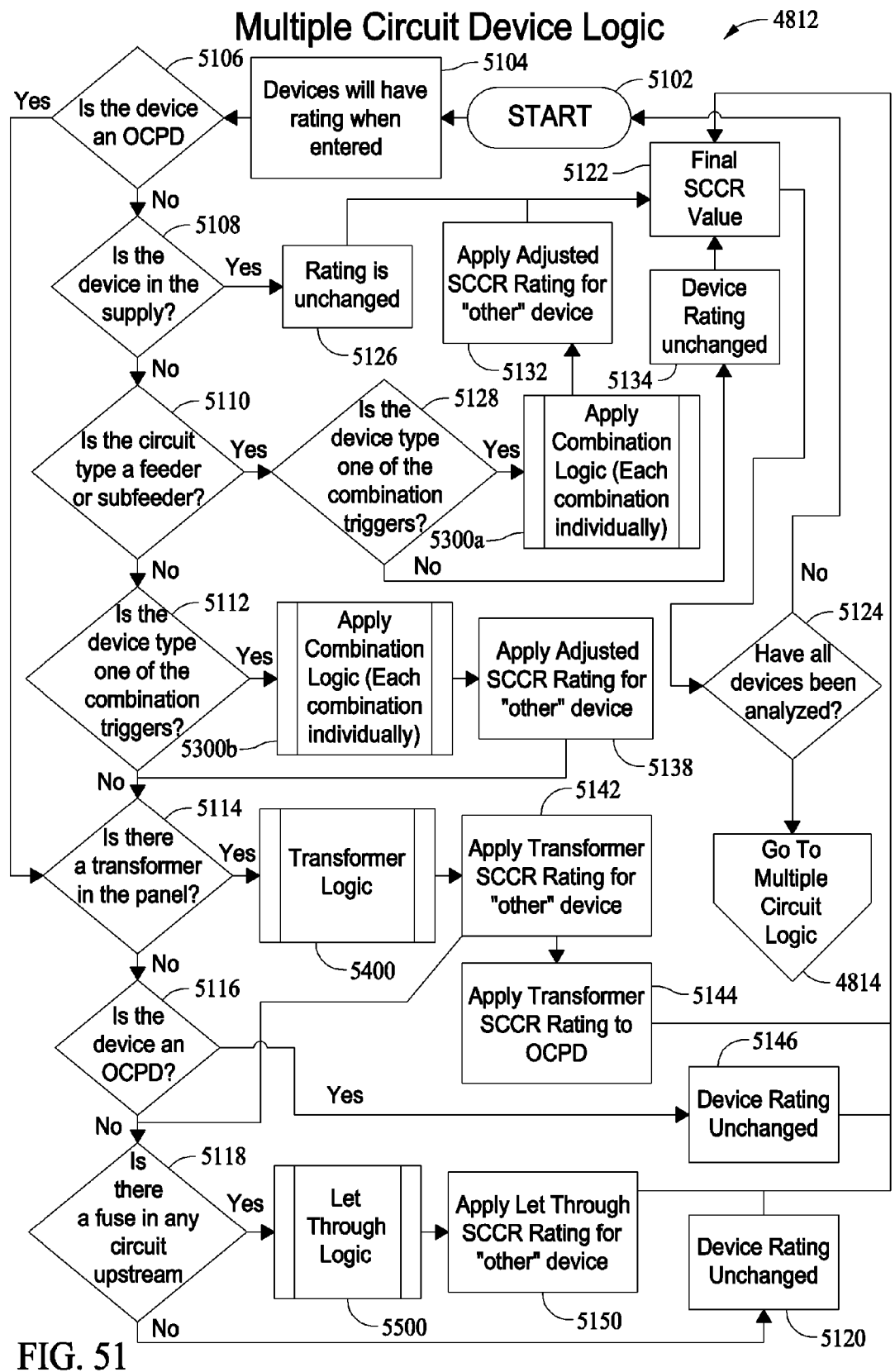
FIG. 51 shows a flowchart of the logic used by the relational database for a multiple circuit device logic according to an exemplary embodiment of the invention.

FIG. 51 shows an example of the multiple circuit device logic flow 4812 from FIG. 48 in accordance with an exemplary embodiment of the invention. Multiple circuit device logic flow 4812 starts at step 5102. After step 5102, the ratings of all the devices are known when the devices are entered at step 5104. The algorithm then proceeds to step 5106, wherein the algorithm determines whether the device is an OCPD. If the device is determined not to be an OCPD, the algorithm looks to see if the device is contained in the supply at step 5108. If the device is not in the supply, then the algorithm determines whether the circuit is a feeder or a sub-feeder at step 5110. If the circuit type is determined not to be a feeder or a sub-feeder, the algorithm looks to see if the device type is one of the combination triggers at step 5112. If the device is determined not to be a combination trigger, the algorithm looks to see if there is a transformer in the panel at step 5114. If there is no transformer in the panel, the algorithm checks the device again to determine whether it is an OCPD at step 5116. If the device is not an OCPD, the algorithm determines whether there is a fuse in any circuit upstream at step 5118. If it is determined that there is no fuse in any circuit upstream, the algorithm proceeds to step 5120, wherein the device rating is unchanged. After step 5120, the algorithm determines the final SCCR value at step 5122. After step 5122, the algorithm determines whether all devices have been analyzed at step 5124. If all devices have been analyzed, the algorithm proceeds to step 4814, wherein the algorithm proceeds to go to the multiple circuit logic 4814. However, if it is determined that all devices have not been analyzed at step 5124, the algorithm proceeds to the start at step 5102.

If at step 5118 a fuse is present in any circuit upstream, the algorithm proceeds to perform a let through logic at step 5500. After step 5500, the algorithm proceeds to apply a let through SCCR rating for "other" device at step 5150. The algorithm then proceeds to determine the final SCCR rating at step 5122. The algorithm then proceeds from step 5122 in the same manner as previously described.

However, if it is determined that the device is an OCPD at step 5116, the algorithm proceeds to step 5146, wherein the device rating remains unchanged. The algorithm then proceeds to determine the final SCCR value at step 5122. The algorithm then proceeds from step 5122 in the same manner as previously described.

If at step 5114, a transformer is found to be in the panel, the algorithm performs a transformer logic at step 5400. The algorithm then proceeds to step 5142, wherein a transformer SCCR rating for "other" device is applied. After step 5142, the algorithm applies a transformer SCCR rating to the OCPD at step 5144. After step 5144, the algorithm determines the final SCCR value at step 5122. The algorithm then proceeds from step 5122 in the same manner as previously described. Optionally, after step 5142, the algorithm may proceed to step 5118 to determine whether there is a fuse in any circuit upstream. In this option, the algorithm may then proceed from step 5118 in the same manner as previously described.

However, if at step 5112 it is determined that the device type is a combination trigger, the algorithm applies a combination logic at step 5300*b*, where each combination is applied individually. After step 5300*b*, the algorithm applies an adjusted SCCR rating for "other" device at step 5138. After step 5138, the algorithm proceeds to step 5114, where the algorithm determines whether a transformer exists in the panel. The algorithm then proceeds from step 5114 in the same manner as previously described.

However, if at step 5110 it is determined that the circuit type is a feeder or a sub-feeder, the algorithm proceeds to step 5128 to determine whether the device type is a combination trigger. If at step 5128 it is determined that the device type is not a combination trigger, the algorithm proceeds to step 5134 wherein the device rating remains unchanged. After step 5134, the algorithm determines the final SCCR value at step 5122. The algorithm then proceeds from step 5122 in the same manner as previously described.

However, if at step 5128, it is determined that the device type is a combination trigger, the algorithm applies a combination logic at step 5300*a*, where each combination is applied individually. After step 5300*a*, the algorithm applies an Adjusted SCCR rating for "other" device at step 5132. After step 5132, the algorithm determines the final SCCR value at step 5122. The algorithm then proceeds from step 5122 in the same manner as previously described.

However, if at step 5108 it is determined that the device is in the supply, the algorithm proceeds to step 5126 wherein the device rating remains unchanged. After step 5126, the algorithm determines the final SCCR value at step 5122. The algorithm then proceeds from step 5122 in the same manner as previously described.

Figure 52:
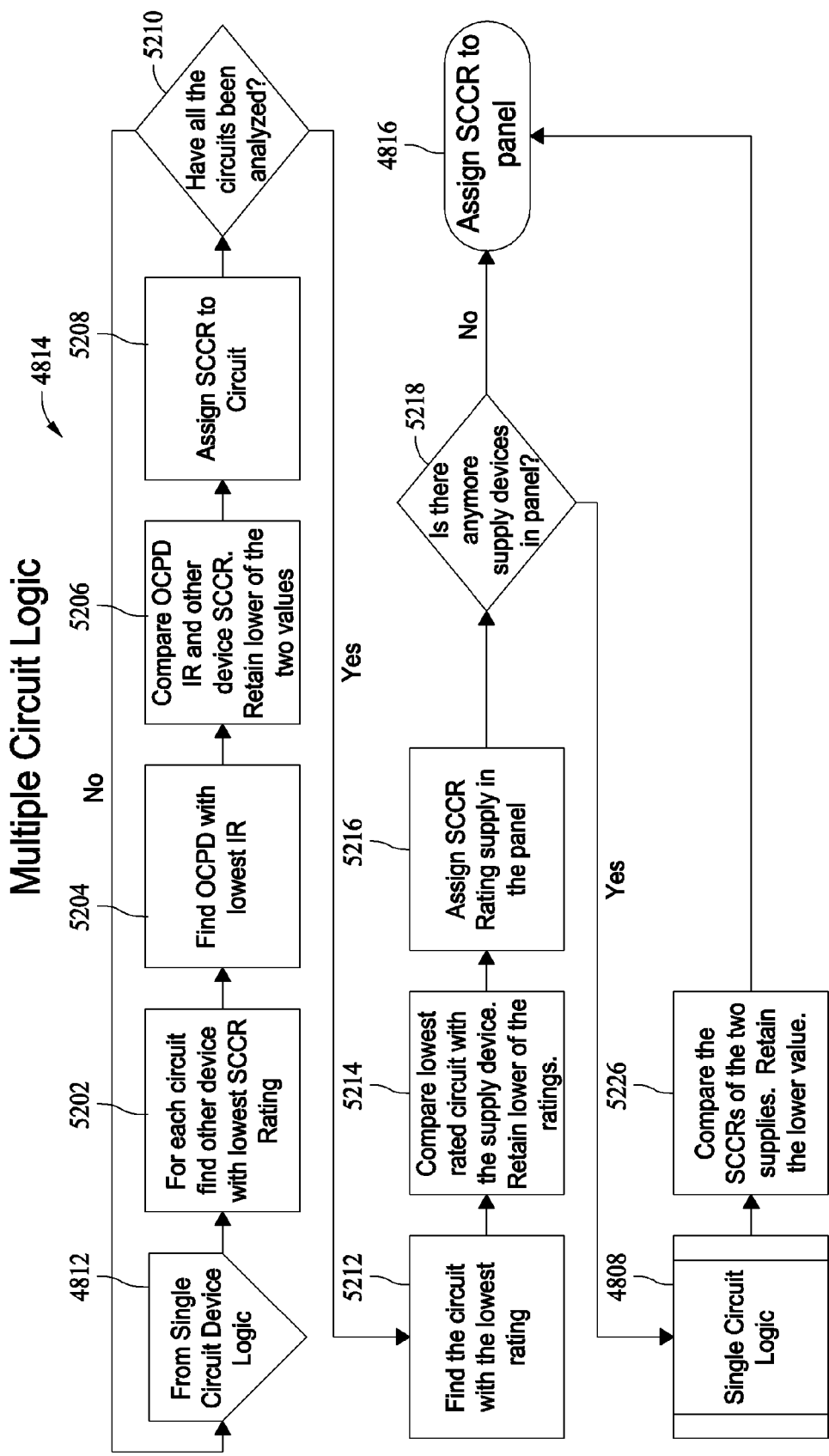
FIG. 52 shows a flowchart of the logic used by the relational database for a multiple circuit logic according to an exemplary embodiment of the invention.

FIG. 52 shows an example of the multiple circuit logic analysis 4814 from FIG. 48 in accordance with an exemplary embodiment of the invention. The multiple circuit logic analysis 4814 begins at step 4812 and receives information from the multiple circuit device logic. After step 4812, the algorithm proceeds to step 5202, wherein the algorithm finds the other device with the lowest SCCR rating for each circuit. After step 5202, the algorithm finds the OCPD with the lowest IR at step 5204. The algorithm then proceeds to step 5206, wherein the algorithm compares the OCPD IR to the other device SCCR and retains the lower of the two values. The retained value is then assigned to the circuit as the SCCR at step 5208. After step 5208, the algorithm determines whether all circuits have been analyzed at step 5210. If all circuits have not been analyzed at step 5210, the algorithm proceeds back to the start at step 4812.

However, if all circuits have been analyzed at step 5210, the algorithm proceeds to step 5212, wherein the algorithm finds the circuit with the lowest rating. The algorithm then proceeds to step 5214, wherein the algorithm compares the lowest rated circuit with the supply device and retains the lower of the ratings. After step 5214, the algorithm assigns the retained value to the SCCR of the supply in the panel at step 5216. After step 5216, the algorithm determines whether there are any more supply devices in the panel at step 5218. If the algorithm determines that there are no more supply devices in the panel, the algorithm assigns the SCCR to the panel in step 4816.

However, if the algorithm determines that there are more supply devices in the panel at step 5218, the algorithm applies the single circuit logic at step 4808. After step 4808, the algorithm compares the SCCRs of the two supplies and retains the lower of the two values at step 5226. After step 5226, the algorithm proceeds to step 4816 and assigns the SCCR to the panel.

Figure 53:
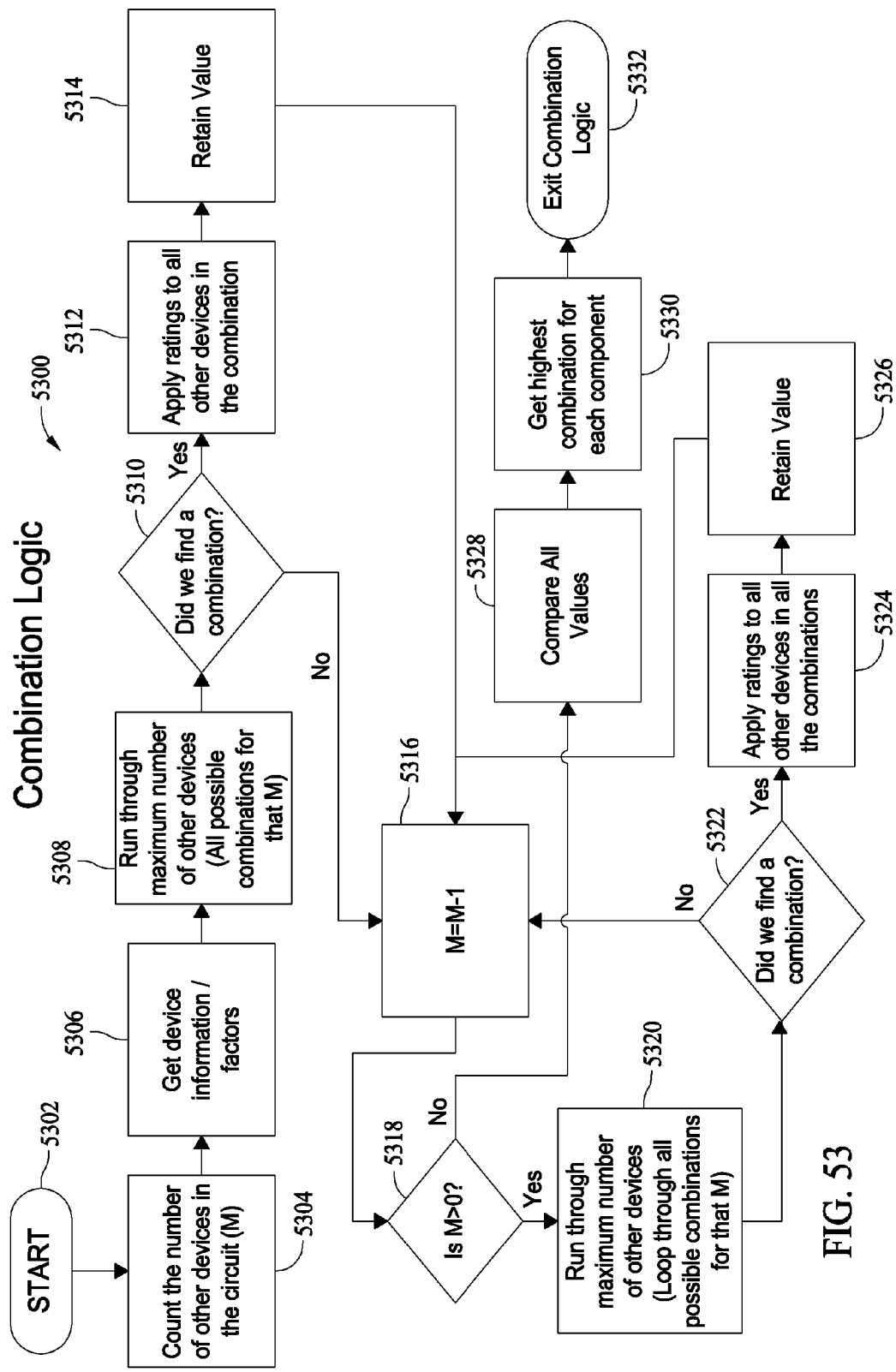
FIG. 53 shows a flowchart of the logic used by the relational database for a combination logic according to an exemplary embodiment of the invention.

FIG. 53 shows an example of the combination logic 5300 in accordance with an exemplary embodiment of the invention. Combination logic 5300 starts at step 5302. After step 5302, the algorithm counts the number of other devices in the circuit and assigns the number to a variable M at step 5304. After step 5304, the algorithm obtains device information and factors at step 5306. The algorithm then proceeds to step 5308, wherein the algorithm runs through the maximum number of other devices, which is all possible combinations for that M. The algorithm then proceeds to step 5310 where the algorithm determines whether a combination is found. If a combination is found at step 5310, the algorithm applies ratings to all other devices in the combination at step 5312. The algorithm then proceeds to step 5314, where the algorithm retains the combination value. The algorithm then proceeds to step 5316, wherein M is then decreased by 1. After step 5316, the algorithm determines whether M is greater than 0 at step 5318. If M is not greater than 0, the algorithm proceeds to step 5328 wherein the algorithm compares all values. At the next step 5330, the algorithm obtains the highest combination for each component. After step 5330, the algorithm proceeds to step 5332 where it exits the combination logic.

However, if at step 5318, M is greater than 0, the algorithm proceeds to step 5320, wherein the algorithm runs through the maximum number of other devices, which loops through all possible combinations for that M. The algorithm then proceeds to step 5322 to determine whether a combination is found. If a combination is found a step 5322, the algorithm applies ratings to all other devices in all the combinations at step 5324. The algorithm then proceeds to step 5326, where the algorithm retains the combination value. The algorithm then proceeds to step 5316, wherein M is then decreased by 1. The algorithm then proceeds from step 5316 in the same manner as previously described.

However, if at step 5322, a combination is not found, the algorithm proceeds to step 5316, wherein M is then decreased by 1. The algorithm then proceeds from step 5316 in the same manner as previously described.

Similarly, if at step 5310, a combination is not found, the algorithm proceeds to step 5316, wherein M is then decreased by 1. The algorithm then proceeds from step 5316 in the same manner as previously described.

Figure 54:
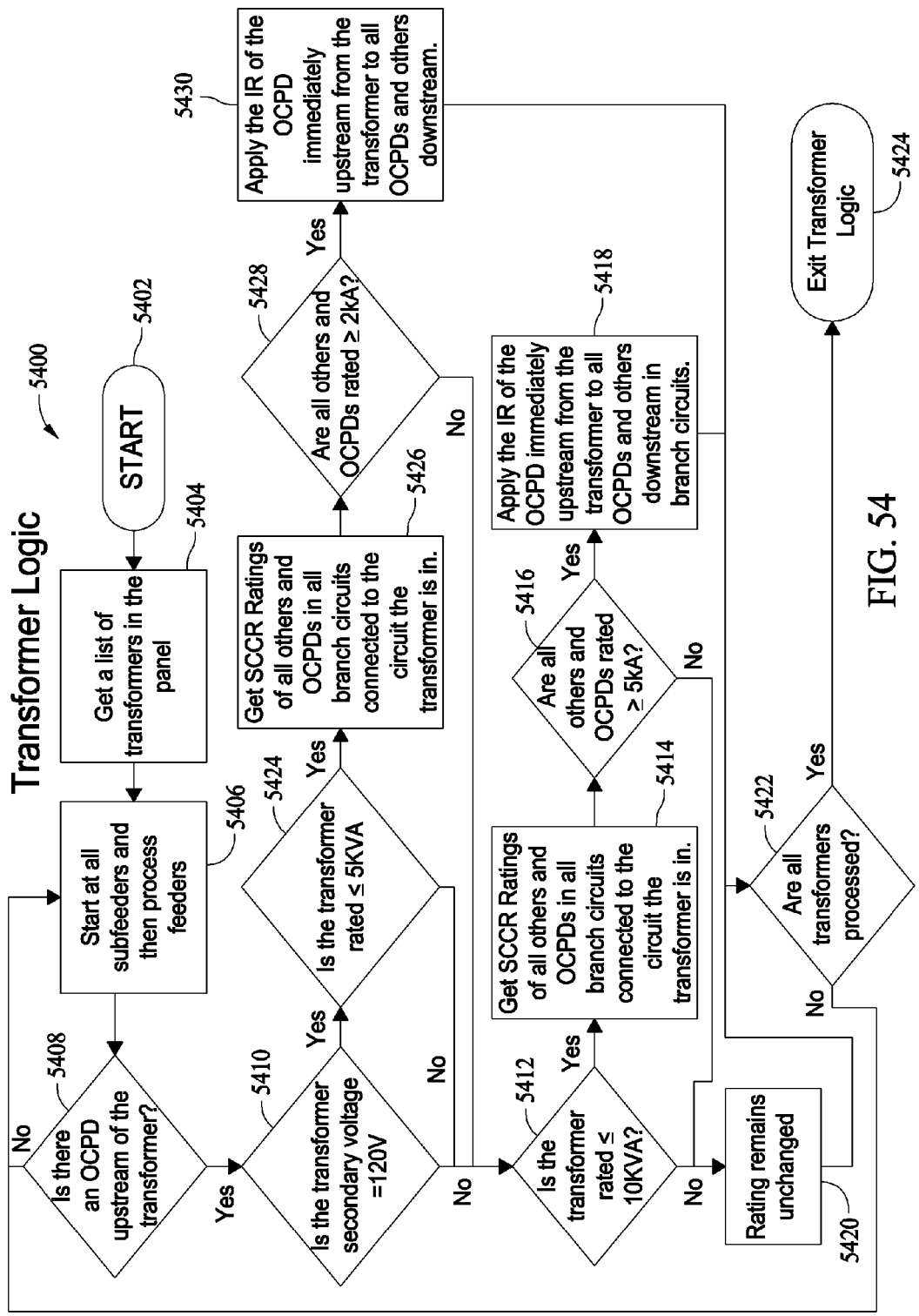
FIG. 54 shows a flowchart of the logic used by the relational database for a transformer logic according to an exemplary embodiment of the invention.

FIG. 54 shows an example of the transformer logic 5400 in accordance with an exemplary embodiment of the invention. The transformer logic 5400 starts at step 5402. After step 5402, the algorithm obtains a list of transformers in the panel at step 5404. As shown in the next step 5406, the process starts at all the sub-feeders and then is followed by the feeders. After step 5406, the algorithm determines whether there is an OCPD upstream of the transformer at step 5408. If an OCPD is present upstream of the transformer, the algorithm proceeds to step 5410 to determine whether the transformer secondary voltage equals 120V. If the transformer secondary voltage equals 120V, the algorithm then determines whether the transformer is rated less than or equal to 5 KVA at step 5424. If the transformer is rated less than or equal to 5 KVA, the algorithm proceeds to step 5426 and obtains SCCR ratings of all others and OCPDs in all branch circuits connected to the circuit the transformer is in. The algorithm then proceeds to step 5428 to determine whether all others and OCPDs are rated greater than or equal to 2 kA. If the all others and OCPDs are rated greater than or equal to 2 kA, the algorithm applies the IR of the OCPD immediately upstream from the transformer to all OCPDs and other devices downstream at step 5430. The algorithm then determines whether all transformers have been processed at step 5422. If all transformers have been processed, the algorithm then exits the transformer logic at step 5424.

However, if all transformers have not been processed at step 5422, the algorithm proceeds to step 5406, where the next transformer is processed starting at all the sub-feeders and then followed by the feeders. The algorithm then proceeds from step 5406 in the same manner as previously described.

However, if at step 5428 the all others and OCPDs are rated less than 2 kA, or if at step 5424 the transformer is rated greater than 5 KVA, or if at step 5410 the transformer secondary voltage is not equal to 120V, the algorithm then proceeds to step 5412, wherein the algorithm determines whether the transformer is rated less than or equal to 10 KVA. If the transformer is rated less than or equal to 10 KVA, the algorithm proceeds to step 5414 and obtains SCCR ratings of all other devices and OCPDs in all branch circuits connected to the circuit the transformer is in. The algorithm then determines whether the all others and OCPDs are rated greater than or equal to 5 kA at step 5416. If the all other devices and OCPDs are rated greater than or equal to 5 kA, the algorithm applies the IR of the OCPD immediately upstream from the transformer to all OCPDs and other devices downstream in branch circuits at step 5418. The algorithm then determines whether all transformers have been processed at step 5422. The algorithm then proceeds from step 5422 in the same manner as previously described.

However, if at step 5416 the all other devices and OCPDs are rated less than 5 kA, or if at step 5412 the transformer is rated greater than 10 KVA, the algorithm then proceeds to step 5420, wherein the algorithm determines that the ratings remain unchanged. After step 5420, the algorithm then determines whether all transformers have been processed at step 5422. The algorithm then proceeds from step 5422 in the same manner as previously described.

However, if at step 5408 there is not an OCPD upstream of the transformer, the algorithm proceeds to step 5406, where the next transformer is processed starting at all the sub-feeders and then followed by the feeders. The algorithm then proceeds from step 5406 in the same manner as previously described.

Figure 55:
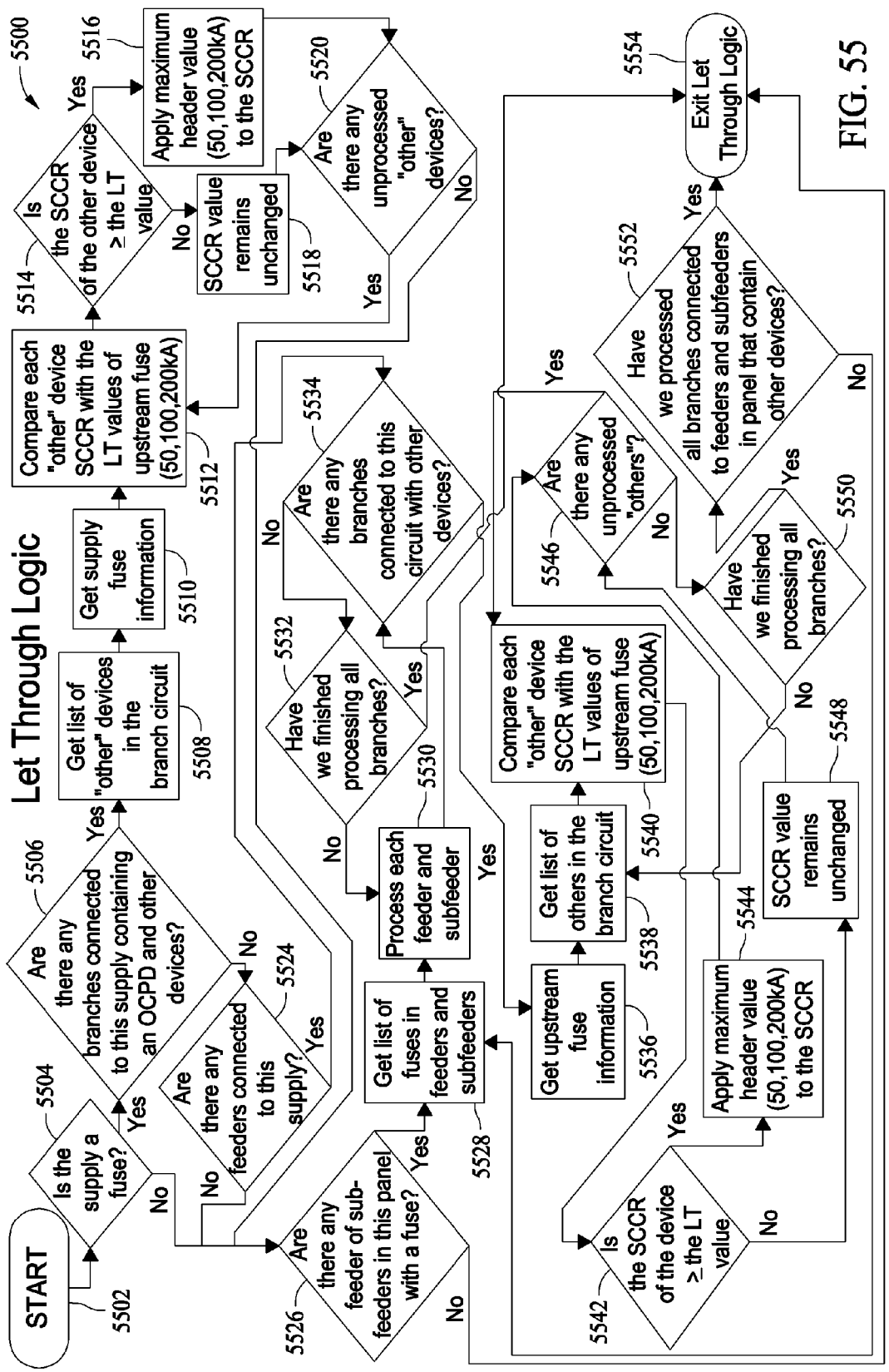
FIG. 55 shows a flowchart of the logic used by the relational database for let-through logic according to an exemplary embodiment of the invention.

FIG. 55 shows an example of the let through logic 5500 in accordance with an exemplary embodiment of the invention. Let through logic 5500 starts at step 5502. After step 5502, the algorithm determines if the supply is a fuse at step 5404. If the supply is not a fuse at step 5504, then the algorithm determines if there are any feeders or sub-feeders in the panel with a fuse at step 5526. If no fuse is found in the feeder or sub-feeders in the panel at step 5526, then let through logic exits at 5554.

However, if at step 5526 a feeder or sub-feeder in the panel is found to have a fuse, the algorithm proceeds to step 5528 where the algorithm obtains a list of fuses in the feeders and sub-feeders. Proceeding to 5530, each feeder and sub-feeder is processed. The algorithm then determines if there are any branches connected to this circuit with other devices at step 5534. If other devices are not detected at step 5534, the algorithm proceeds to step 5532 to determine if all the branches have been processed. If all branches have been processed at step 5532, the let though logic exits at 5554.

If the algorithm at step 5532 determines that all branches have not been processed, then the algorithm returns to step 5530 to process each feeder and sub-feeder. The algorithm goes to step 5534 to determine if any branches have other devices connected to the circuit.

If branches with other devices connected are detected at step 5534, then the algorithm proceeds to step 5536 to get upstream fuse information. After step 5536, the algorithm gets a list of other devices in the branch circuits in step 5538. At the next step 5540, the algorithm compares the other devices SCCR with the LT values of the upstream fuse. Proceeding to 5542, the algorithm determines if the SCCR values of the device is greater than or equal to the LT value. If the SCCR of the device is found to be greater than or equal to the LT value at step 5542, then the algorithm applies the maximum header values to the SCCR at step 5544. After step 5544, the algorithm looks to see if there are any unprocessed other devices at step 5546. If there are unprocessed other devices at step 5546, then the algorithm returns to step 5540 to compare the other device SCCR to the LT value of the upstream fuse. The algorithm proceeds from step 5540 as previously described. However, if there are no unprocessed other devices found at 5546, then the algorithm looks to see if all the branches have been processed at step 5550. If all branches have been processed at step 5550, then the algorithm looks to see if all branches connected to feeders and sub-feeders in the panel containing other devices have been processed at step 5552. If all feeders or sub-feeders containing other devices have been processed at step 5552, then let though logic exits at step 5554. However, if branches with feeders or sub-feeders containing other devices have not been processed at step 5552, then the algorithm returns to step 5528 to get a list of fuses in feeders and sub-feeders. The algorithm proceeds from step 5528 as previously described.

However, if all branches were not finished processing at step 5550, then the algorithm returns to step 5538 to get a list of the other devices for the branch circuit. The algorithm proceeds from step 5538 as previously described. Further, if at step 5542 the SCCR was not found to be greater than or equal to the LT value, then the algorithm would proceed to step 5548 and keep the SCCR value unchanged. From step 5548, the algorithm would proceed to step 5546 to see if any unprocessed other devices remain. The algorithm proceeds from step 5546 as previously described.

If at the beginning of the let through logic analysis, the supply is a fuse at step 5504, then the algorithm determines whether there are any branches connected to the supply containing an OCPD or other device at step 5506. If a branch connected to the supply contains an OCPD or other device at step 5506, then the algorithm obtains a list of other devices in the branch circuit at step 5508 and gets the fuse supply information at step 5510. The algorithm then proceeds to step 5512 where it compares each other devices SCCR with the LT value of the upstream fuse. The algorithm then proceeds to step 5514 where the algorithm determines whether the SCCR value of the other devices is greater than or equal to the LT value. If the value of the SCCR for the other device is greater than or equal to the LT value at step 5514, then the maximum header value is applied at step 5516. The algorithm then proceeds to step 5520 where the algorithm determines whether there are unprocessed other devices. If unprocessed other devices are not found at step 5520, then the algorithm proceeds to step 5526 where the algorithm determines whether there are feeders or sub-feeders in the panel with a fuse. The algorithm then proceeds as previously described from step 5526. However, if at 5520 there are unprocessed other devices found, then the algorithm return to step 5512 to compare the other device SCCR with the LT values. The algorithm proceeds from 5512 as previously described.

If at step 5514 the SCCR value of the other devices is not greater than or equal to the LT value, then the algorithm proceeds to step 5518 and the SCCR value remains unchanged. The algorithm then proceeds to step 5520 to determine if all the other devices have been processed. The algorithm proceeds from 5520 as previously described.

If at step 5506 the algorithm determines there are no branches connected to the supply containing an OCPD or other devices, then the algorithm proceeds to step 5524 to determine if any feeders are connected to the supply. If at step 5524 feeders are connected to the supply, then the algorithm proceeds to step 5534 to determine if there are any branches connected to the circuit with other devices. The algorithm proceeds from step 5534 as previously described. However, if at step 5524 the algorithm does not detect a feeder connected to the supply, then the algorithm proceeds to step 5526 to determine if there are feeders or sub-feeders in the panel with a fuse. The algorithm proceeds from step 5526 as previously described.

Figure 56:
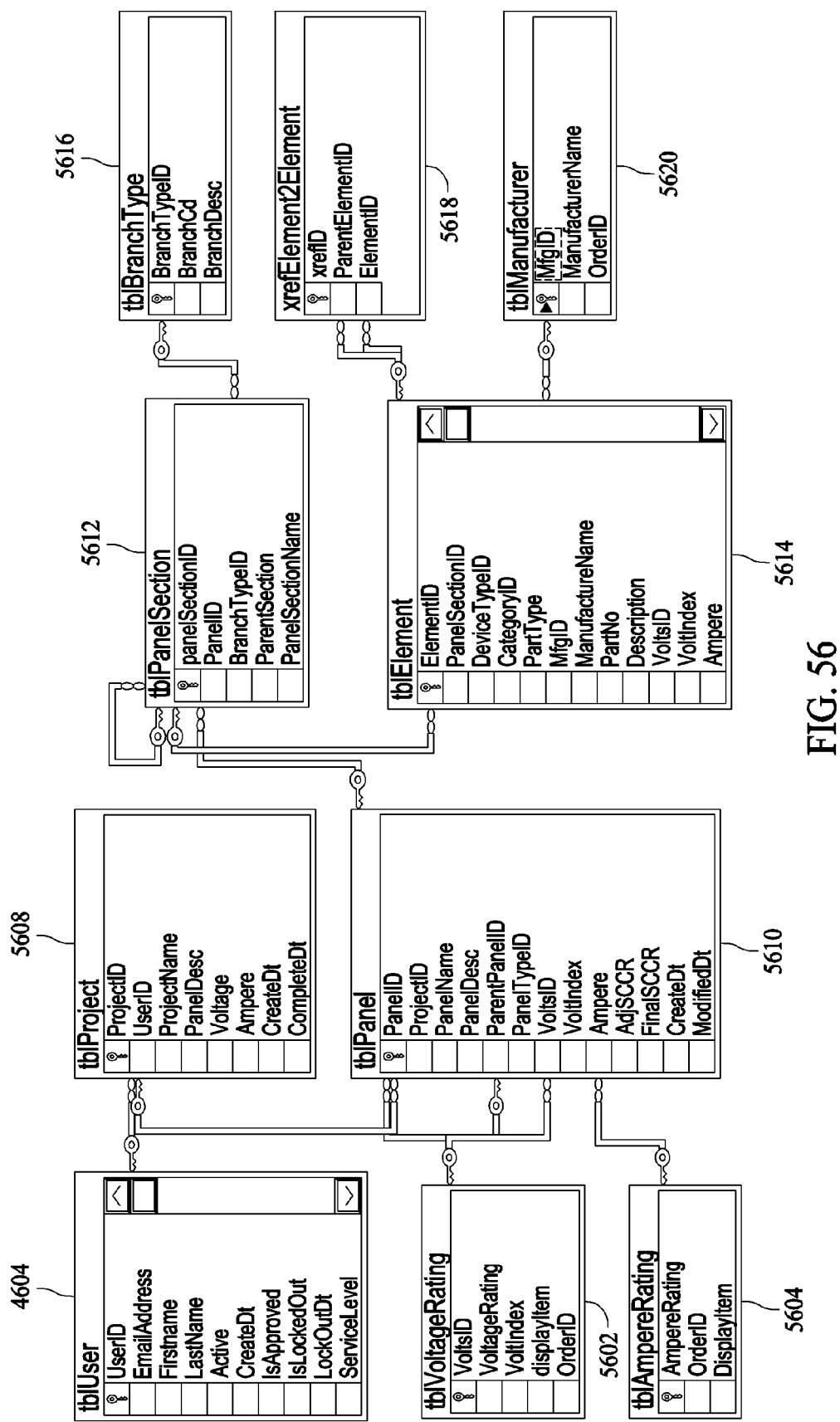
FIG. 56 shows a diagram of how the invention interrelates projects, panels, and associated information in the invention according to an exemplary embodiment of the invention.

FIG. 56 shows a diagram of the interaction between projects, panels, and associated information according to an exemplary embodiment of the invention. This diagram contains multiple tables, including but not limited to, a user table 4604, a project table 5608, a panel table 5610, a voltage rating table 5602, an ampere rating table 5604, a panel section table 5612, an element table 5614, a branch type table 5616, an element to element table 5618 and a manufacturer table 5620, and displays the flow interaction between the multiple tables.

The user table 4604 provides personal user information and may contain one or more of the following information: user ID, email address, first name, last name, active status, creation date, approval status, lock out status, lock out date, and service level. The user table 4604 may interact with the project table 5608.

The project table 5608 provides project information and may contain one or more of the following information: project ID, user ID, project name, panel description, voltage, ampere, creation date, and completion date. The project table 5608 may interact with user table 4604 and the panel table 5610.

The panel table 5610 provides panel information and may contain one or more of the following information: panel ID, project ID, panel name, panel description, parent panel ID, panel Type ID, voltage ID, voltage index, ampere, Adjusted SCCR, final SCCR, creation date, and modification date. The panel table 5610 may interact with the project table 5608, voltage rating table 5602, the ampere rating table 5604, and the panel section table 5612.

The voltage rating table 5602 (hereinafter the "voltage table") provides voltage information and may contain one or more of the following information: voltage ID, voltage rating, voltage index, display item, and order ID. The voltage table 5602 may interact with the panel table 5610.

The ampere rating table 5604 (hereinafter the "ampere table") provides ampere information and may contain one or more of the following information: ampere rating, order ID, and display item. The ampere table 5604 may interact with the panel table 5610.

The panel section table 5612 provides panel section information and may contain one or more of the following information: panel section ID, panel ID, branch type ID, parent section, and panel section name. The panel section table 5612 may interact with the panel table 5610, the element table 5614, and the branch type table 5616.

The element table 5614 provides element or component information and may contain one or more of the following information: element ID, panel section ID, device type ID, category ID, part type, manufacturing ID, manufacturer name, part number, description, voltage ID, voltage index, and ampere. The element table 5614 may interact with the panel section table 5612, the element to element table 5618, and the manufacturer table 5620.

The branch type table 5616 (hereinafter the "branch table") provides branch information and may contain one or more of the following information: branch type ID, branch CD, and branch description. The branch table 5616 may interact with panel section table 5612.

The element to element table 5618 provides parent element information and may contain one or more of the following information: cross-reference ID, parent element ID, and element ID. The element to element table 5618 may interact with the element table 5614.

The manufacturer table 5620 provides manufacturer information and may contain one or more of the following information: manufacturing ID, manufacturer name, and order ID. The manufacture table 5620 may interact with element table 5614.

All projects 5608 are associated with the user 4704. Panels 5610 are associated with the projects 5608, and one of several panels 5612 in a project may be selected. Each panel 5610 has a voltage rating 5602 and an ampere rating 5604. Elements or devices 5614 are contained in the panels 5610. The panels 5610 also contain information on the type of branch connections 5616 in the panels 5610 along with how the devices interact 5618. The elements or devices 5614 have unique characteristics that are stored in the databases, as previously mentioned. When a user logs in, these various panels 5610 of the project 5608 are available for manipulation. The information for the project 5608 and the individual panels 5610 are examined at the time. Additionally, there may be controls that allow the user to select a box or add a new panel.

Figure 57:
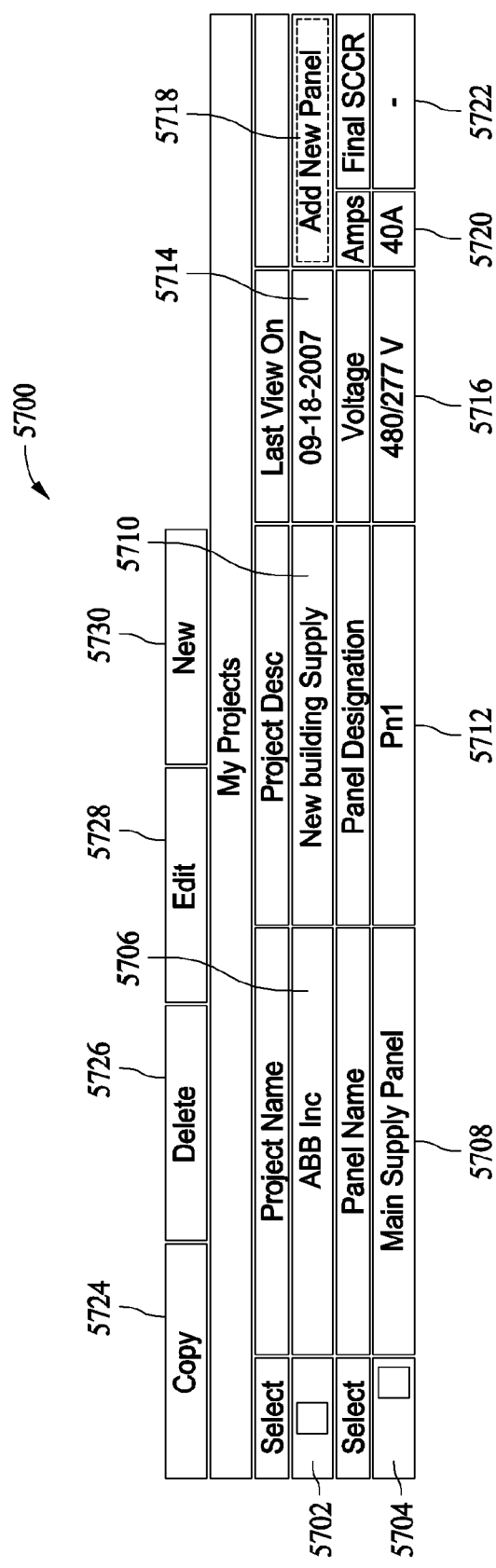
FIG. 57 shows an example of a project information display according to an exemplary embodiment of the invention.

FIG. 57 shows an example of a project information screen 5700 according to an exemplary embodiment of the invention. The project information screen 5700 appears after the user logs in, but before the display of the panel information screen. Items in this embodiment include project name 5706, project description 5710, panel name 5708 currently displayed, panel designation 5712, voltage 5716, amperage 5720, last view on 5714, add new panel 5718, and final SCCR rating 5722. The circuits the user inputs for analysis are contained in a panel in a project. A project may be selected by toggling the project select control 5702. A particular panel may be selected by toggling the panel select control 5704. Each project may contain multiple panels. A project is a collection of panels, while a panel is an individual part for a specific project. Methods to copy 5724, delete 5726, and edit 5728 the project or panel are provided in the exemplary embodiment. New projects are opened by clicking on the new tab 5730. Panels are added to an existing project by clicking the add new panel 5718. The invention tracks the analysis of various projects by use of panels. In some embodiments, the status of the project and/or panel may be indicated as being complete or as being incomplete. This indication may be provided by a marking next to the project name or panel name or by a color indication.

Once a project is selected by toggling the project select control 5702, the project may be copied, deleted or edited. After selecting the project and clicking the copy tab 5724, a window is opened prompting the user to enter a new project name and a description of the new project. All panels under the original source project are copied into the newly created project. After selecting the project and clicking the delete tab 5726, a warning dialog may be displayed indicating that all panels contained in this project will be deleted. The warning dialog will prompt the user to click confirm or cancel. Additionally, after selecting the project and clicking the edit tab 5728, a dialog may be displayed allowing the project name and project description to be edited.

Once a panel is selected by toggling the panel select control 5704, the panel may be copied, deleted or edited. After selecting the panel and clicking the copy tab 5724, a window is opened prompting the user to enter a new panel name and a description of the new panel. The voltage and amperes for the panel remain the same for all components under the original source panel and is copied into the newly created panel. After selecting the panel and clicking the delete tab 5726, a warning dialog may be displayed indicating that all components contained in this panel will be deleted. The warning dialog will prompt the user to click confirm or cancel. Additionally, after selecting the panel and clicking the edit tab 5728, a dialog may be displayed allowing the panel name and panel description to be edited. The voltage or amperes cannot be changed as his may affect all the components associated with the circuits in this panel.

Once a project has been started, the project may be saved. This allows the user to save and close uncompleted projects, save and close completed projects, open and resume work on uncompleted projects, as well as edit a completed project. This feature also allows the user to alter the project name 5706 or panel name 5708 as needed. Additionally, a save function allows the user to save the project regardless of their status in circuit completion. According to some of the exemplary embodiments, when opening an incomplete project, the last panel screen accessed may be displayed, with the other panel screens available and shown in the nameplate. Multiple panels and projects may be saved with the same name. Further, the save as function will allow the user to save a previously completed project, alter the project/panel name and make edits as needed.

Users also have a save as function that allows them to save a project at any screen in the program. After clicking on the save button the user may either resume work on the project or close the project session, as desired. Additionally, in certain embodiments, the save as feature may allow the user to save a project or panel with a new name and/or in a new directory. The user may then open the new project/panel, view the last report screen, and print the report with the new project panel name updated. The user may then go from the report screen to the beginning or the panel information screen of a completed project with the previous selections preloaded. The user may then go through the panel and make edits as needed.

Figure 58:
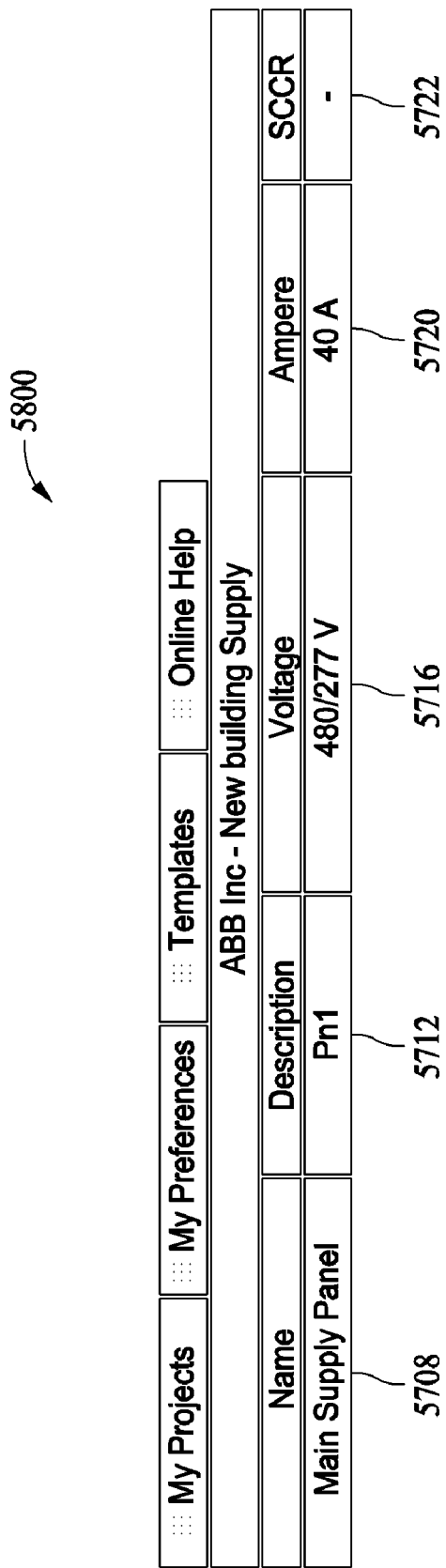
FIG. 58 shows an example of a panel information display according to an exemplary embodiment of the invention.

FIG. 58 shows an example of a panel information section 5800 according to an exemplary embodiment of the invention. Information that may be displayed includes the panel name 5708, the panel description 5712, the voltage rating 5716, the ampere rating 5720, and the final SCCR 5722.

When a new project 5706 or new panel 5708 is selected, a panel selection page is presented where a panel template is selected. The panel name 5708 and panel description 5712 are also entered by the user. Each panel also receives a name from the user before the next panel is entered. When a new panel is selected, the voltage 5716 and panel amperes 5720 need to be selected. Voltage and amperes are selected from a drop down list that has been populated from a filtered list from the database. The panel name 5708, voltage 5716, and amperes 5720 are saved. The panel then contains either a predetermined section of circuits and devices if a simple circuit is selected, or no circuits and no devices if a multiple circuit is selected.

Figure 59:
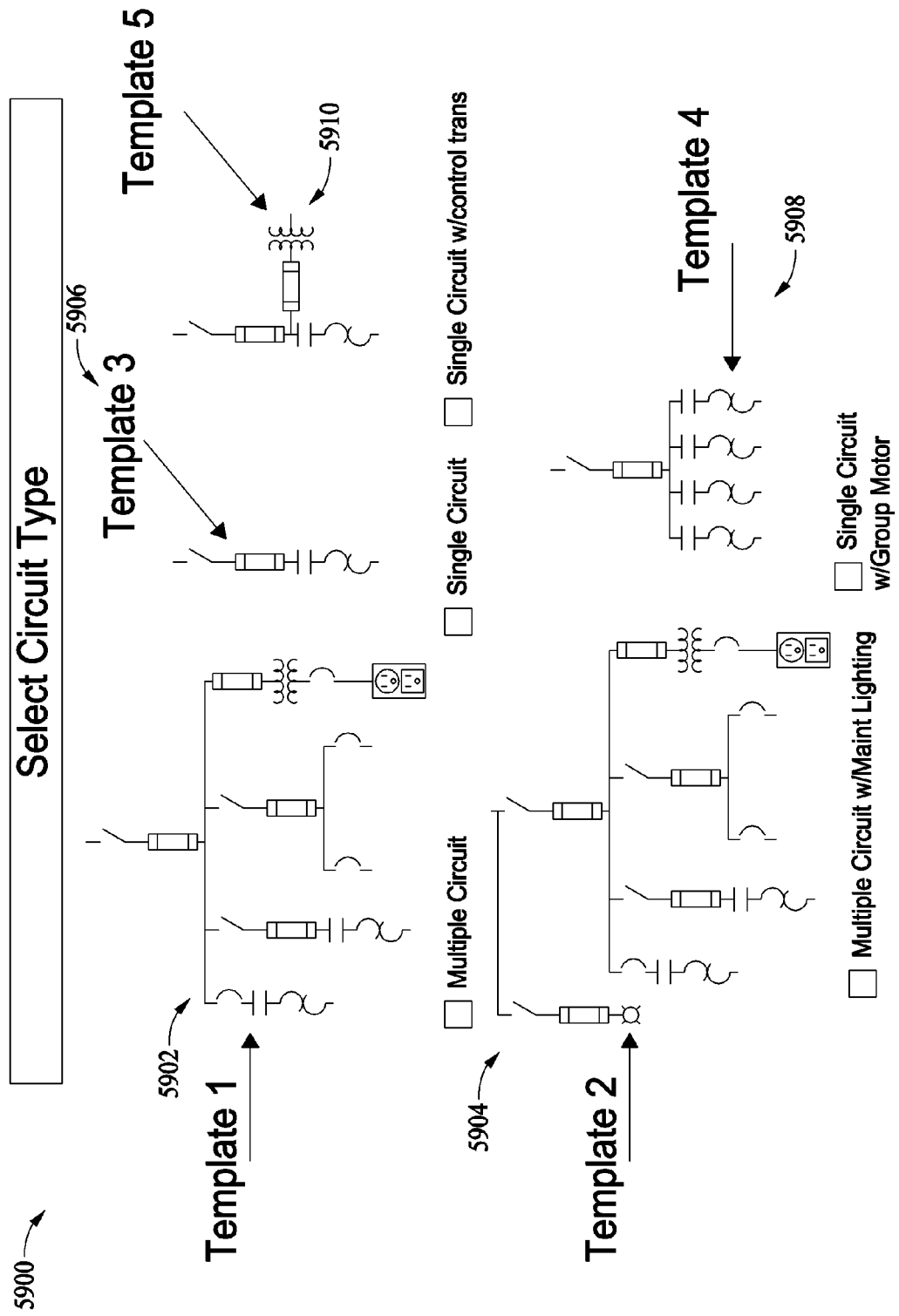
FIG. 59 shows a menu where a circuit template may be selected in accordance with an exemplary embodiment of the invention.

FIG. 59 shows a menu where a circuit type may be selected in accordance with an exemplary embodiment of the invention. The template selection screen 5900 allows a user to select the circuit type they want to use to build a circuit by selecting a template. The templates may handle complex panels of supply circuits, feeder circuits, sub feeder circuits, and branch circuits. The templates may also work with simple devices such as single branch circuits where a supply device is also a branch device. In addition, in some panels the supply device is both a branch device and a feeder device. The template types in the exemplary embodiment include a multiple circuit 5902 which is labeled as template 1, multiple circuits with maintenance lighting 5904 which is labeled as template 2, single circuits 5906 which is labeled as template 3, single circuits with group motor 5908 which is labeled as template 4, and single circuits with control transmission 5910 which is labeled as template 5.

FIG. 60a shows a flowchart 6000 where a multiple circuit template is selected in accordance with an exemplary embodiment of the invention. The multiple circuit template, or template 1, has a free flow circuit and will be created with no predetermined circuits added. At step 6002, the multiple circuit template provides a pop-up question box to determine whether the device for supply circuit connection contains an OCPD. If the device contains no supply OCPD, the first multiple circuit template 6004, or template a, is used to establish rules for the feeder circuits, sub-feeder circuits, taps and branch circuits. However, if the device contains a supply OCPD, the second multiple circuit template 6006, or template b, is used.

According to template 1 in this exemplary embodiment, when a supply is created, at least one branch circuit or feeder will always be connected to the supply. When other, or not OCPD, is selected for the supply, any feeder or branch circuits connected to the supply may automatically get an OCPD. However, when an OCPD is selected for the supply, any feeder or branch circuits connected to the supply do not automatically get an OCPD but may be able to add an OCPD. Additionally, in the event an OCPD was automatically added to branch circuits and/or feeder circuits as a consequence of a no supply OCPD, they can be removed if the supply is later changed to an OCPD.

FIG. 60b shows a chart related to the templates selected in FIG. 60a in accordance with an exemplary embodiment of the invention. The resulting circuit may contain at least one branch circuit or feeder circuit. Feeder circuits and branch circuits connected to the supply may not be added until the supply device is defined. Instructions may be provided to the user notifying them of this requirement. These instructions may be provided to the user upon completely defining the supply device or upon the user attempting to add a feeder circuit or a branch circuit connected to the supply prior to the supply device being completely defined.

The program may verify that if a feeder circuit exists, there will be at least one branch circuit or sub-feeder circuit connected to the feeder circuit. When a branch circuit is connected to a feeder circuit or a sub-feeder circuit, at least one OCPD is required and is therefore automatically created. Although one OCPD is automatically created when a branch circuit is connected to a feeder circuit or a sub-feeder circuit, additional OCPDs may be added. A branch circuit will have the option to add a tap.

The program may verify that if a sub-feeder circuit exists, there will be at least one branch circuit connected to the sub-feeder circuit and may therefore be created automatically. This branch circuit has the option to add more taps. When a branch circuit is connected to a sub-feeder circuit, at least one OCPD is required in the branch. Additionally, when a sub-feeder circuit is created, only one OCPD is allowed.

According to template 2 in the exemplary embodiment, a multiple circuit may be created with a maintenance circuit. This template involves two separate circuits. The first circuit in template 2 is the multiple circuit, and the second circuit is the maintenance circuit. Thus, two separate supplies may be created. The maintenance circuit may comprise an OCPD and other items, including a branch circuit. Additionally, taps may also be added to the branch circuits. A template may be stored and provided by the appropriate database to assist in creating this circuit type. The two multiple circuit templates 6004, 6006, as shown in FIG. 60a, may be used to determine the multiple circuit. When this template is selected, the program may automatically provide device placeholders, with device lists, to aid in circuit design.

Figures 61A, 61B:
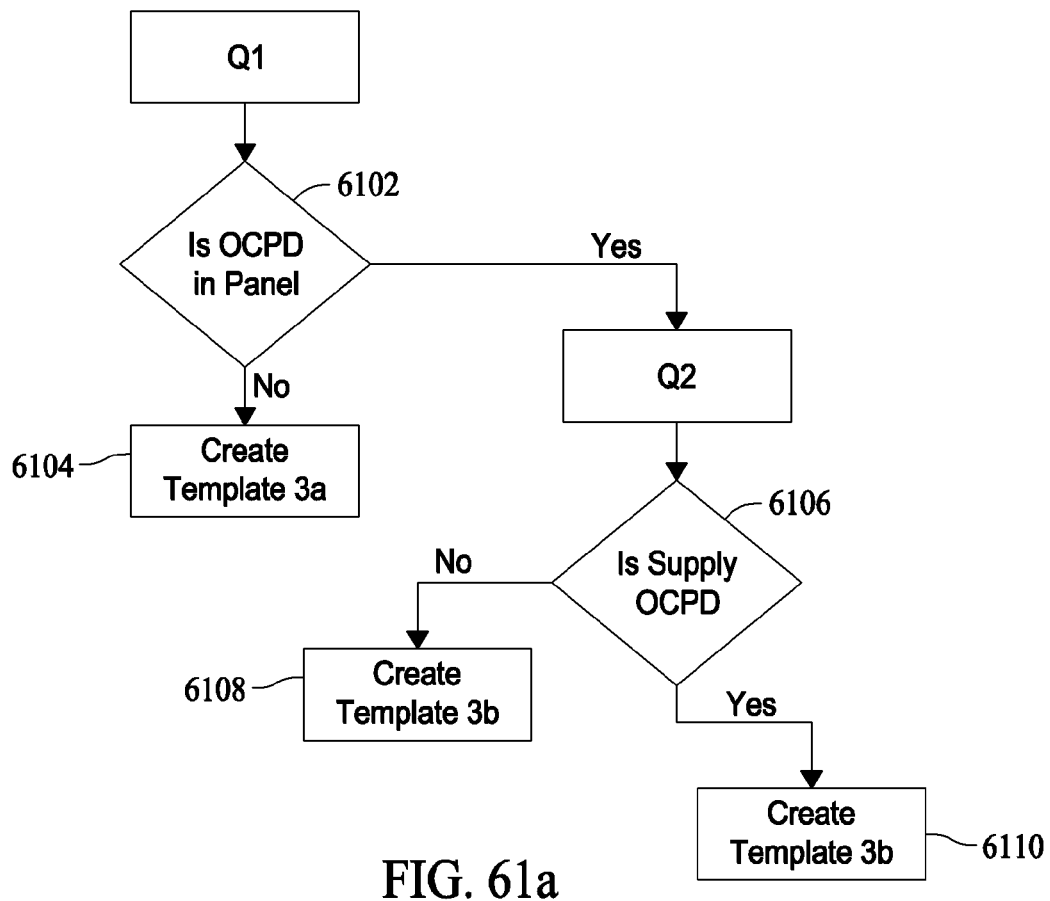
FIG. 61a shows a flowchart where the appropriate version of the single branch circuit template is selected in accordance with an exemplary embodiment of the invention.
FIG. 61b shows a chart related to the templates selected in FIG. 61a wherein the circuit utilizes a remote OCPD in accordance with an exemplary embodiment of the invention.

FIG. 61a shows a flowchart 6100 where the appropriate version of the single branch circuit template is selected in accordance with an exemplary embodiment of the invention. This flowchart applies to each of templates 3-5, which are illustrated in FIG. 59. In an exemplary embodiment, two questions may be asked to determine the appropriate template to be used within the single-circuit template 5906 of FIG. 59. The single-circuit template provides a pop-up question box at step 6102 to determine whether the OCPD is in the panel or is remote. If there is no OCPD in the panel, then the appropriate template 3a is selected at step 6104. If there is an OCPD in the panel, then the single-circuit template provides a second pop-up question box at step 6106 to determine whether the OCPD is in the supply. If the OCPD is in the supply, template 3c is selected at step 6110. However, if the OCPD is not in the supply, template 3b is selected at step 6108.

FIGS. 61b, 61c, and 61d show charts related to the templates which may be selected in FIG. 61a for the single-circuit template. FIG. 61b depicts a chart wherein the circuit utilizes a remote OCPD, which is associated with template 3a. FIG. 61c depicts a chart wherein the circuit utilizes a non-remote OCPD in the supply, which is associated with template 3c. FIG. 61d depicts a chart wherein the circuit does not utilize a remote OCPD and the supply is another device, which is associated with template 3b. If the template calls for a remote OCPD, then neither the remote OCPD nor the supply can be removed. If the supply contains the OCPD, then the supply OCPD cannot be removed. If the supply is another device and there is no remote OCPD, then the supply cannot be removed. The program may automatically provide device placeholders, with device lists, when this template is used in circuit design.

The single branch circuit, template 3, and the following two embodiments based on single branch circuit, template 4 and template 5, may make use of a remote OCPD. FIG. 61e shows a table with an exemplary listing of which devices may be used as an OCPD remotely in accordance with an exemplary embodiment. FIG. 61e shows an example of which items may be used as a remote OCPD. Different items may be selected based on their compatibility with the templates. When utilizing a remote OCPD, the remote OCPD may be considered as part of a combination rating. Additionally, let through logic does not apply to remote OCPDs.

With respect to the single-circuit with group motor template 5908, or template 4, of FIG. 59, and similar to template 3, the flowchart 6100 (FIG. 61a) is used to determine the appropriate template of the single-circuit with group motor template in accordance with an exemplary embodiment of the invention. The difference between template 4 and template 3 is that template 4 is created with two taps with an option to add more taps. Thus, the single-circuit with group motor template provides a pop-up question box at step 6102 to determine whether the OCPD is in the panel or is remote. If there is no OCPD in the panel, then the appropriate template 3a is selected at step 6104. If there is an OCPD in the panel, then the single-circuit with group motor template provides a second pop-up question box at step 6106 to determine whether the OCPD is in the supply. If the OCPD is in the supply, template 3c is selected at step 6110. However, if the OCPD is not in the supply, template 3b is selected at step 6108.

FIGS. 62a, 62b, and 62c show charts related to the templates selected in FIG. 61a wherein the single-circuit contains a group motor in accordance with an exemplary embodiment of the invention. FIG. 62a depicts a chart wherein the circuit utilizes a remote OCPD, which is associated with template 3a. FIG. 62b depicts a chart wherein the circuit utilizes a non-remote OCPD in the supply, which is associated with template 3c. FIG. 62c depicts a chart wherein the circuit does not utilize a remote OCPD and the supply is another device, which is associated with template 3b. If the template calls for a remote OCPD, then neither the remote OCPD nor the supply can be removed. If the supply contains the OCPD, then the supply OCPD cannot be removed. If the supply is another device and there is no remote OCPD, then the supply cannot be removed. The program may automatically provide device placeholders, with device lists, when this template is used in circuit design.

With respect to the single-circuit with power transmission template 5910, or template 5, of FIG. 59, and similar to template 3, the flowchart 6100 (FIG. 61a) is used to determine the appropriate template of the single-circuit with power transmission template in accordance with an exemplary embodiment of the invention. The difference between template 5 and template 3 is that no other taps can be added to the branch circuit in template 5. Thus, the single-circuit with power transmission template provides a pop-up question box at step 6102 to determine whether the OCPD is in the panel or is remote. If there is no OCPD in the panel, then the appropriate template 3a is selected at step 6104. If there is an OCPD in the panel, then the single-circuit with power transmission template provides a second pop-up question box at step 6106 to determine whether the OCPD is in the supply. If the OCPD is in the supply, template 3c is selected at step 6110. However, if the OCPD is not in the supply, template 3b is selected at step 6108.

FIGS. 63a, 63b, and 63c show charts related to the templates selected in FIG. 61a wherein the single circuit contains a power transmission in accordance with an exemplary embodiment of the invention. FIG. 63a depicts a chart wherein the circuit utilizes a remote OCPD, which is associated with template 3a. FIG. 63b depicts a chart wherein the circuit utilizes a non-remote OCPD in the supply, which is associated with template 3c. FIG. 63c depicts a chart wherein the circuit does not utilize a remote OCPD and the supply is another device, which is associated with template 3b. If the template calls for a remote OCPD, then neither the remote OCPD, the supply, nor the tap can be removed. If the supply contains the OCPD, then neither the supply OCPD nor the tap can be removed. If the supply is another device and there is no remote OCPD, then neither the supply nor the tap can be removed. The program may automatically provide device placeholders, with device lists, when this template is used in circuit design.

Figure 64:
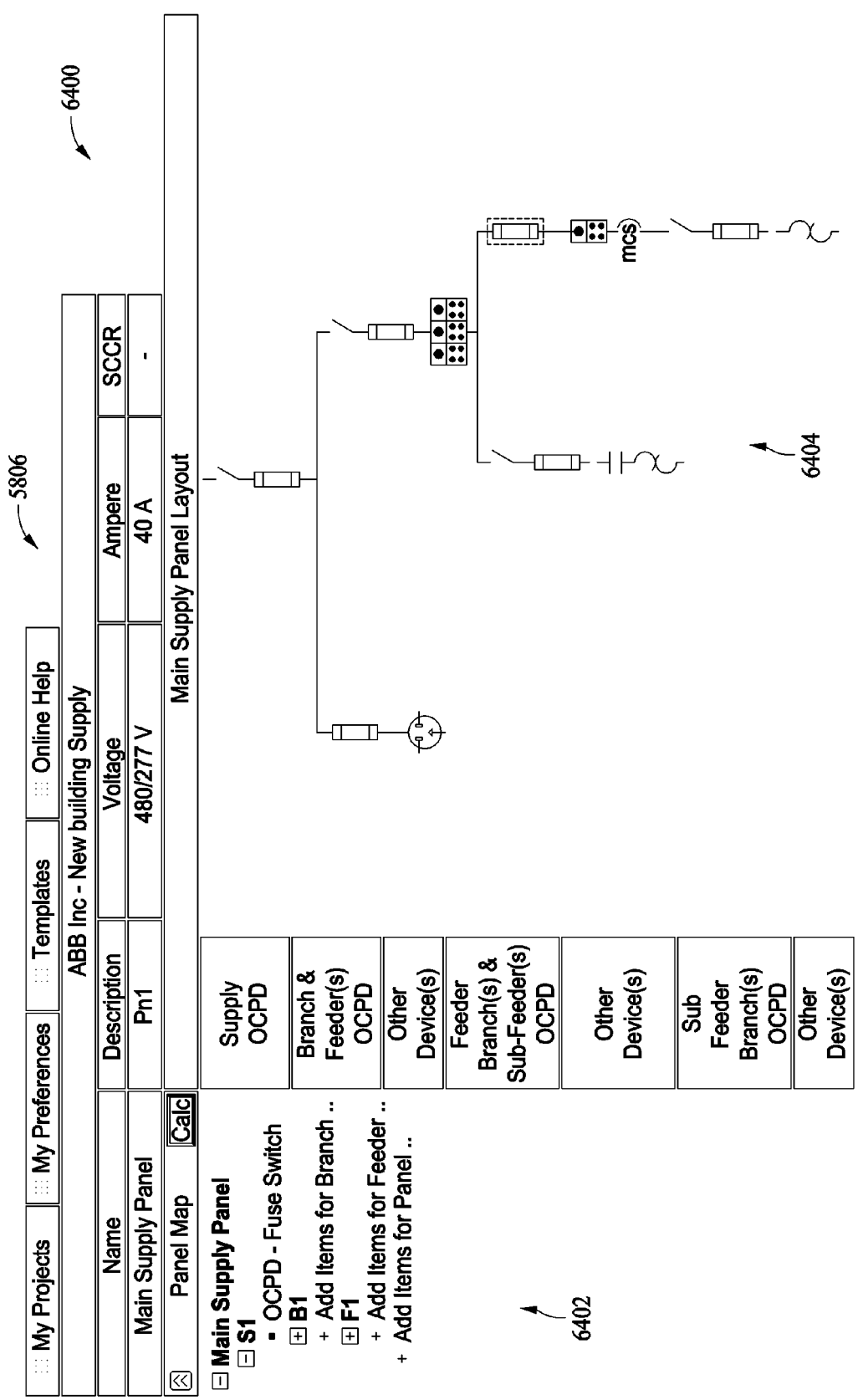
FIG. 64 shows an icon graphic user interface comprising a panel information section, panel map, and panel layout in accordance with an exemplary embodiment of the invention.

In addition to previously disclosed user interfaces, the exemplary embodiment of the invention also utilizes an icon graphic user interface. FIG. 64 shows a screenshot of an icon graphic user interface 6400 comprising a panel information section 5806, a panel map 6402, and a panel layout 6404 in accordance with an exemplary embodiment of the invention. The panel information section 5806 displays the project name, the panel name, the description of the panel, the voltage of the panel, the ampere rating of the panel and the SCCR of the panel. Once the template has been created by the method described above, the selected template is displayed in the panel layout 6404, which is located below the panel information section 5806 and on the right side of the icon graphic user interface 6400. Additionally, the panel map 6402, which is located below the panel information section 5806 and to the left of the panel layout 6404, displays the structure of the circuit and may also display device icons. The panel layout 6404 shows a graphical display of the entire circuit on the same page, which may be visible to the user. This icon graphic user interface 6400 allows the user to see any aspect of the circuit, from branch circuits, feeder circuits, sub-feeder circuits, taps, and supplies.

Figure 65:
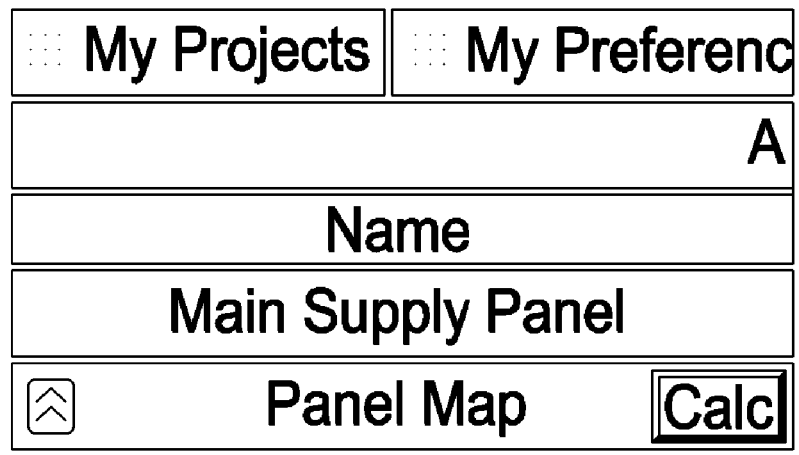
FIG. 65 shows a panel map where information regarding the structure of the circuit may be displayed in an outline format in accordance with an exemplary embodiment of the invention/

FIG. 65 shows a panel map 6402 where information regarding the structure of the circuit may be displayed in an outline format in accordance with an exemplary embodiment of the invention. The panel map 6402 may allow the user to access any part of the panel as needed. A section may be expanded by clicking on the plus symbol 6506, 6510 on the left side of a device. Similarly, a section may be contracted by clicking on the minus symbol 6502, 6504 on the left side of a device. The user may add or remove circuit types so long as the requirements for the template is met. The user may edit the circuit, which includes naming and/or saving the circuit. The last circuit that the user edited remains in an expanded form. Devices already attached to the circuit maybe edited or removed by clicking on the device. If a device is selected for removal, a warning may be displayed if the removal could lead to a detrimental change in the circuit. Examples include the required branch circuit or feeder connected to supply, a branch circuit or feeder connected to a sub-feeder circuit, or removing a branch circuit from a sub-feeder circuit.

Items may be added by using the plus icons 6508, 6512, 6514 on the sides of placeholders. The program may inquire how many items will be added and getting information on those items. Devices will not be added unless the requirements for the template are met. Once created, the circuit can be individually named.

Figure 66:
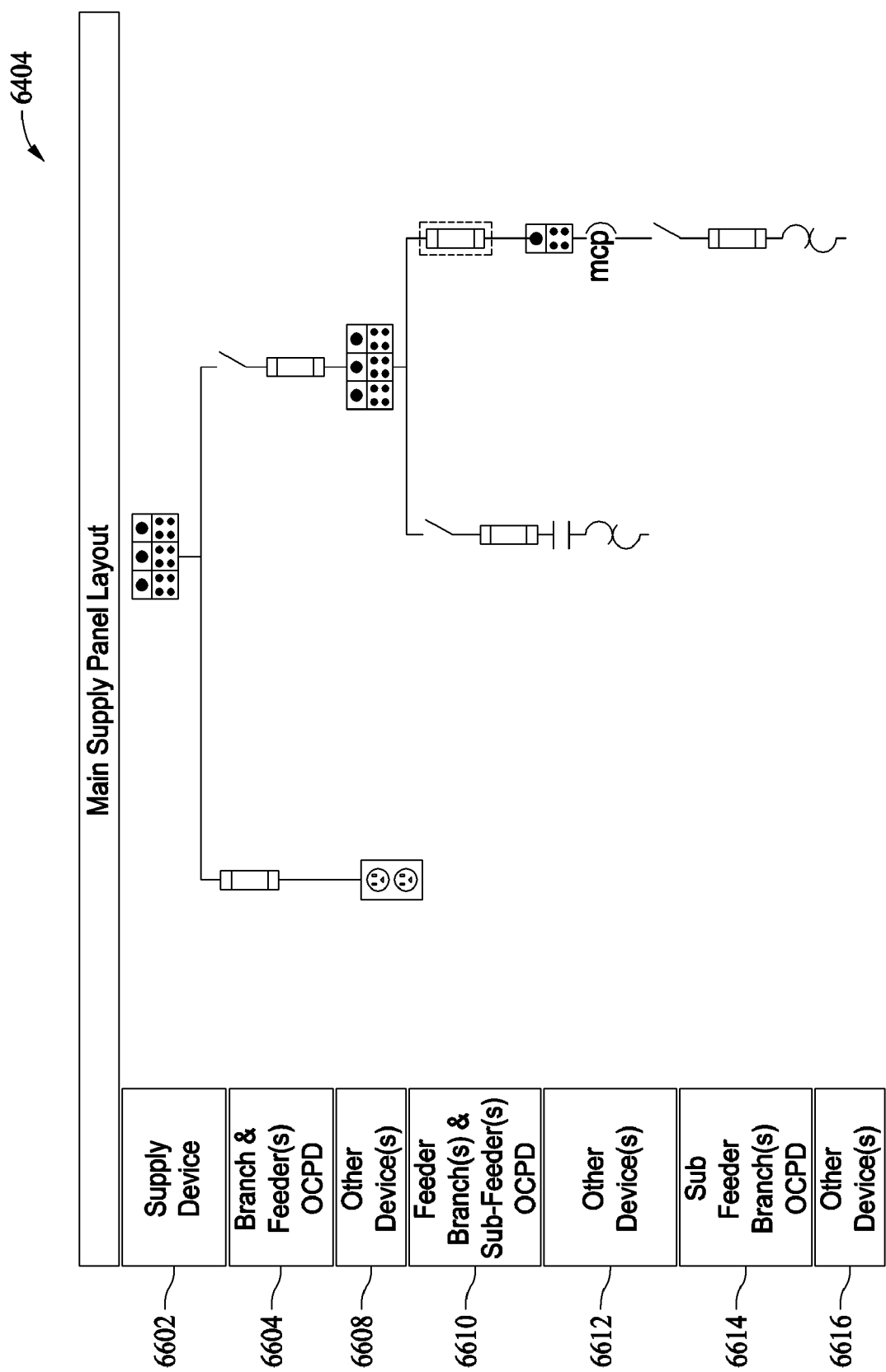
FIG. 66 shows a panel layout where information regarding the structure of the circuit may be displayed in an iconic format in accordance with an exemplary embodiment of the invention.

FIG. 66 shows a panel layout 6404 where information regarding the structure of the circuit may be displayed in a graphical format in accordance with an exemplary embodiment of the invention. When an item is selected in the panel layout 6404, it will also be selected in the panel map 6402. According to some exemplary embodiments, the circuit and the devices may be edited by clicking on the icon of the device. An additional editing feature allows the user to edit the icon by double clicking on the icon after it has been placed in the panel layout 6404. The panel layout 6404 may also display the weakest link when calculating the SCCR rating. The weakest link may be displayed by altering the color of the weakest link or by placing an indication next to the weakest link.

Once the template has been properly generated, the invention allows the user to design the circuit by placing information about the circuit into the interface. The interface will allow connections to be made based on rules contained in the templates. These templates will direct the circuit building as explained below. When adding devices to the template, the devices may be edited, canceled, or removed.

The information in the panel map 6402 and the panel layout 6404 is interconnected. When an item is edited in one area, it is also updated in the other area. When the cursor selects an item in one area, the same item is also selected in the other area. The selected item also displays its SCCR rating based on the current configuration.

When the cursor is placed over an icon, information about the device may be displayed. Exemplary information includes circuit type, manufacturer name, part number, voltage, amperage, SCCR or IR, Adjusted SCCR, and automated comments. Also, selecting the icon will allow the item to be renamed or otherwise edited.

Taps will be available in the icon graphic user interface 6400 for single circuits and multiple circuits. They shall be displayed as separated circuits in a separate horizontal region, but will be dealt with as other devices in the circuit they are vertically connected to. Multiple tap devices may be contained in the same tap circuit. Multiple tap circuits may be connected to branch circuits only.

The hierarchy established in the exemplary embodiment is reflected in the icon graphic user interface 6400. Starting from the top down: supply 6602, branch/feeder OCPD 6604, branch and feeder other devices 6608, tap off branch connected to supply (not shown in this embodiment), branch sub-feeder OCPD 6610, branch sub-feeder other devices 6612, tap off branch connected to feeder (not shown in this embodiment), branch off sub-feeder OCPD 6614, branch other off sub-feeder 6616, and tap off branch connected to sub-feeder (not shown in this embodiment). The level of the hierarchy may display only if there is an item populating that level.

The program graphically displays all the information for the circuit on the same page. The user can use the panel layout 6404 to access branch circuits, taps, feeder circuits sub feeder circuits, and supply circuits. All circuit connections may be represented by lines. Thus, items are connected to each other on the panel layout 6404 by lines. Additionally, lines that connect new circuits may be connected to the last device of the previous circuit. Also, remote devices may be connected to another device or circuit by a dashed line. FIG. 67 show a chart filled with various icons that may be used in the exemplary embodiment, with a description next to the icon. These icons represent a particular device that may be inserted into the graphical circuit.

When a device is added to a circuit, the device characteristics may be defined in several ways. Some items may be created by default in the template. The device may be selected from a menu as previously described in FIG. 67. This menu will contain device information including, but not limited to, voltage index and amperage. The items may be selected by a database based on the circuit type. Based on the part selected, an index may be provided that will display information of multiple types of devices to use. The items may be sorted by manufacturer, description, part number, voltage rating, amps, SCCR, and IR.

FIG. 68 shows an example of a search function that allows users to look for details on a specific device in accordance with an exemplary embodiment of the invention. Possible methods of searching for a device is entering information for any part of the field, the whole field, or the start of the field. Entering information for any part of the field may be performed by placing wild cards on both sides of the search term, wherein the wild card includes, but is not limited to "%". Entering information for the whole field may be performed by placing no wild cards on either side of the search term. Entering information for the start of the field may be performed by placing a wild cards on the right side of the search term, wherein the wild card includes, but is not limited to "%".

Alternatively, FIG. 69 shows an example of a pull down search function that allows users to look for details on a specific device in accordance with an exemplary embodiment of the invention. One example of the search criteria is voltage filtering. Voltage filtering has the software display only devices with a voltage rating sufficient to exist in the circuit based on the voltage index for the circuit. Devices with an insufficient voltage rating are not displayed. Similarly, the search may be performed using the device type, manufacturer, amperes, horsepower, SCCR and/or IR. The search criteria for amperes, horsepower, SCCR and IR may be provided by ranges. The selection process may also be performed using a combination of two or more search criteria.

FIG. 70 shows a parts selection screen where the user selects a device in accordance with an exemplary embodiment of the invention using a combination of pull down menus and entering parts of the field.

Figure 71:
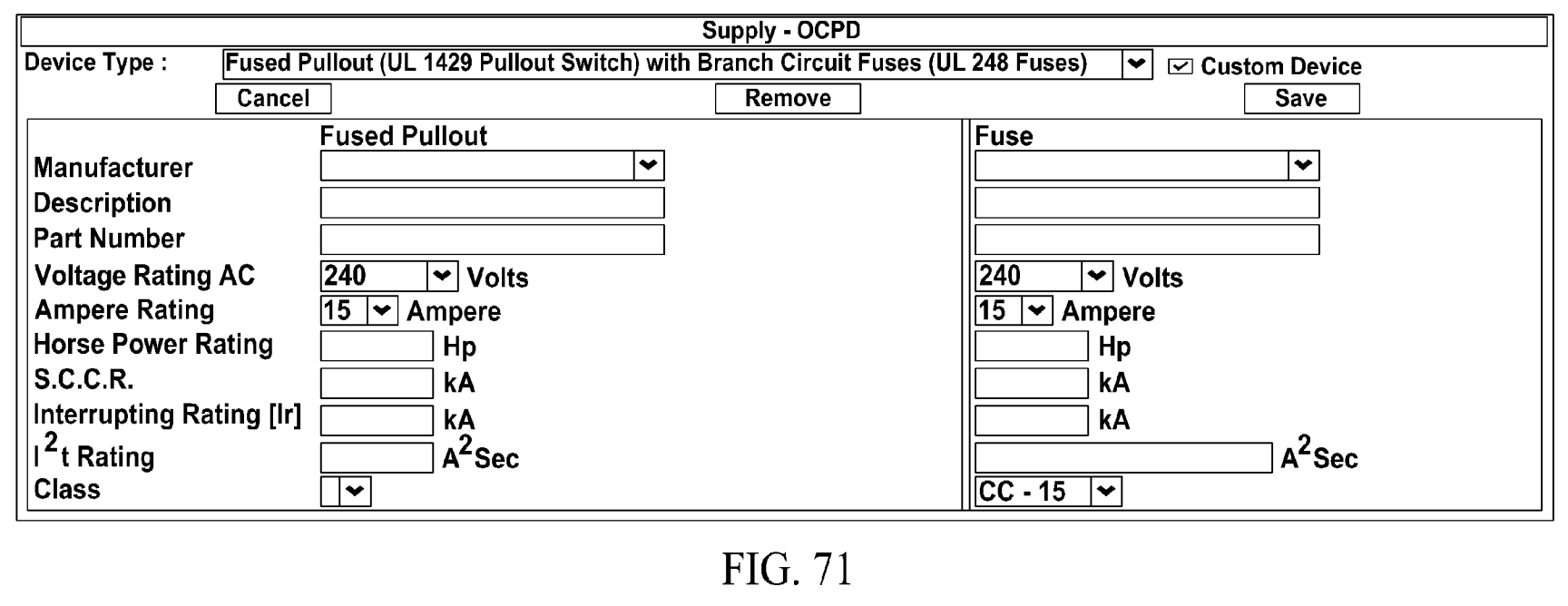

FIG. 71 shows a custom input option where the user may input information about a device in accordance with an exemplary embodiment of the invention. The custom device option allows the user to place into the panel a device with particular specifications. Information that may be entered includes the name of the manufacturer, the description of the device, part number, voltage rating, amperage rating, horse power rating, SCCR, interruption rating, and class. Further, if a custom item necessarily has to come with a second item (example a fuse and a particular fused pullout), then both of them may be entered on the same screen. The custom device input shall be prominently displayed.

If a selected device used in a template is dependent on another device, the device will be selected individually, but the relationship between the devices will be maintained in the software. If a transformer or other voltage impacting device is selected and later changed, the invention will prompt the user that such change will require modifying downstream devices if applicable. Similarly, if an OCPD is removed upstream, a warning will be given.

Once all the items are connected, a SCCR calculation many be processed. This calculation may be refreshed upon alteration of the previously completed circuit. The invention calculates SCCR based on previously described logic flows shown in FIGS. 48-55. Once SCCR is calculated, the value is displayed on the screen. The weakest link is automatically displayed. The weakest link may be displayed by altering the color of the weakest link or by placing an indication next to the weakest link.

Figure 72A:
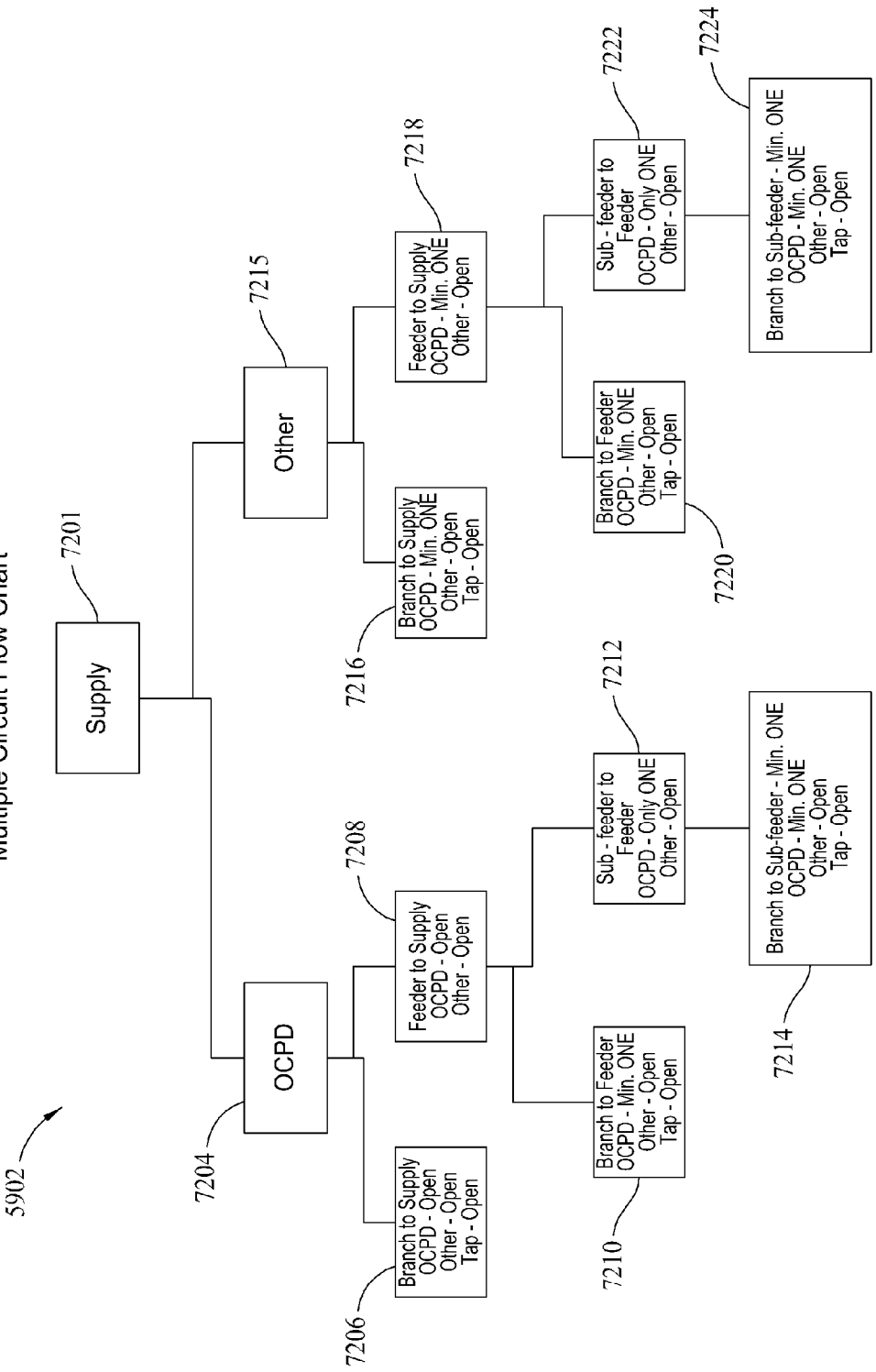
FIG. 72a shows a flowchart of how a circuit may be assembled according to the multiple circuit template in accordance with an exemplary embodiment of the invention.

FIG. 72a shows a flowchart 7200 of how a circuit may be assembled according to the multiple circuit template 5902, template 1, in accordance with an exemplary embodiment. As previously shown in FIGS. 60A and 60B, rules have been established as to how devices may connect and interact. The first choice is to establish whether the supply circuit 7201 is an OCPD 7204 or another device 7215. If the supply circuit is an OCPD 7204, at least one of a branch circuit 7206 or a feeder circuit 7208 should be connected to the OCPD supply 7204. Although at least one branch circuit 7206 or feeder circuit 7208 should be connected to the OCPD supply 7204, multiple branches and/or feeder may be connected to the OCPD supply. If a branch circuit 7206 is connected to the OCPD supply 7204, an OCPD, other device or tap may also be added, but is not required.

However, if the feeder circuit 7208 is connected to the OCPD supply 7204, an OCPD or an other may be added, but is not required. Additionally, at least one of a branch circuit 7210 or a sub-feeder circuit 7212 should be connected to the feeder circuit 7208. Although at least one branch circuit 7210 or sub-feeder circuit 7212 should be connected to the feeder circuit 7208, multiple branches and/or sub-feeders may be connected to the feeder circuit 7208. If a branch circuit 7210 is connected to the feeder circuit 7208, at least one OCPD must be added. An other device or a tap may be added, but is not required.

However, if the sub-feeder circuit 7212 is connected to the feeder circuit 7208, only one OCPD must be added and another devices may be added. Additionally, at least one of a branch circuit 7214 must be connected to the sub-feeder circuit 7212. Although at least one branch circuit 7214 must be connected to the sub-feeder circuit 7212, multiple branches may be connected to the sub-feeder circuit 7212. The branch circuit 7214 must have at least one OCPD and may have another device and/or a tap, but is not required.

If the supply circuit is another supply 7215, at least one of a branch circuit 7216 or a feeder circuit 7218 should be connected to the other supply 7215. Although at least one branch circuit 7216 or feeder circuit 7218 should be connected to the other supply 7215, multiple branches and/or feeders may be connected to the other supply 7515. If a branch circuit 7216 is connected to the other supply 7215, at least one OCPD must be connected to the branch circuit 7216, but another device and/or a tap may be added, but is not required.

However, if the feeder circuit 7218 is connected to the other supply 7215, at least one OCPD must be connected to the feeder circuit 7218, but another device may be added, but is not required. Additionally, at least one of a branch circuit 7220 or a sub-feeder circuit 7222 should be connected to the feeder circuit 7218. Although at least one branch circuit 7220 or sub-feeder circuit 7222 should be connected to the feeder circuit 7218, multiple branches and/or sub-feeders may be connected to the feeder circuit 7218. If a branch circuit 7220 is connected to the feeder circuit 7218, at least one OCPD must be connected to the branch circuit 7220, but another device or a tap may also be added, although not required.

However, if the sub-feeder circuit 7222 is connected to the feeder circuit 7218, only one OCPD must be added and another device may be added. Additionally, at least one of a branch circuit 7224 must be connected to the sub-feeder circuit 7222. Although at least one branch circuit 7224 must be connected to the sub-feeder circuit 7222, multiple branches may be connected to the sub-feeder circuit 7222. The branch circuit 7224 must have at least one OCPD and may have another device and/or a tap, but is not required.

FIG. 72*b* shows an example of a multi-circuit panel map 6402 according to an exemplary embodiment of the flowchart shown in FIG. 72*a*. This multi-circuit panel map 6402 illustrates a portion of FIG. 72*a*, wherein the supply is another supply.

FIG. 72*c* shows a chart illustrating which devices are compatible with the flowchart shown in FIG. 72*a*. Different devices may be selected based on their compatibility with the icon template rules. The chart shows which devices may be installed with preceding devices in the chart.

Figure 73A:
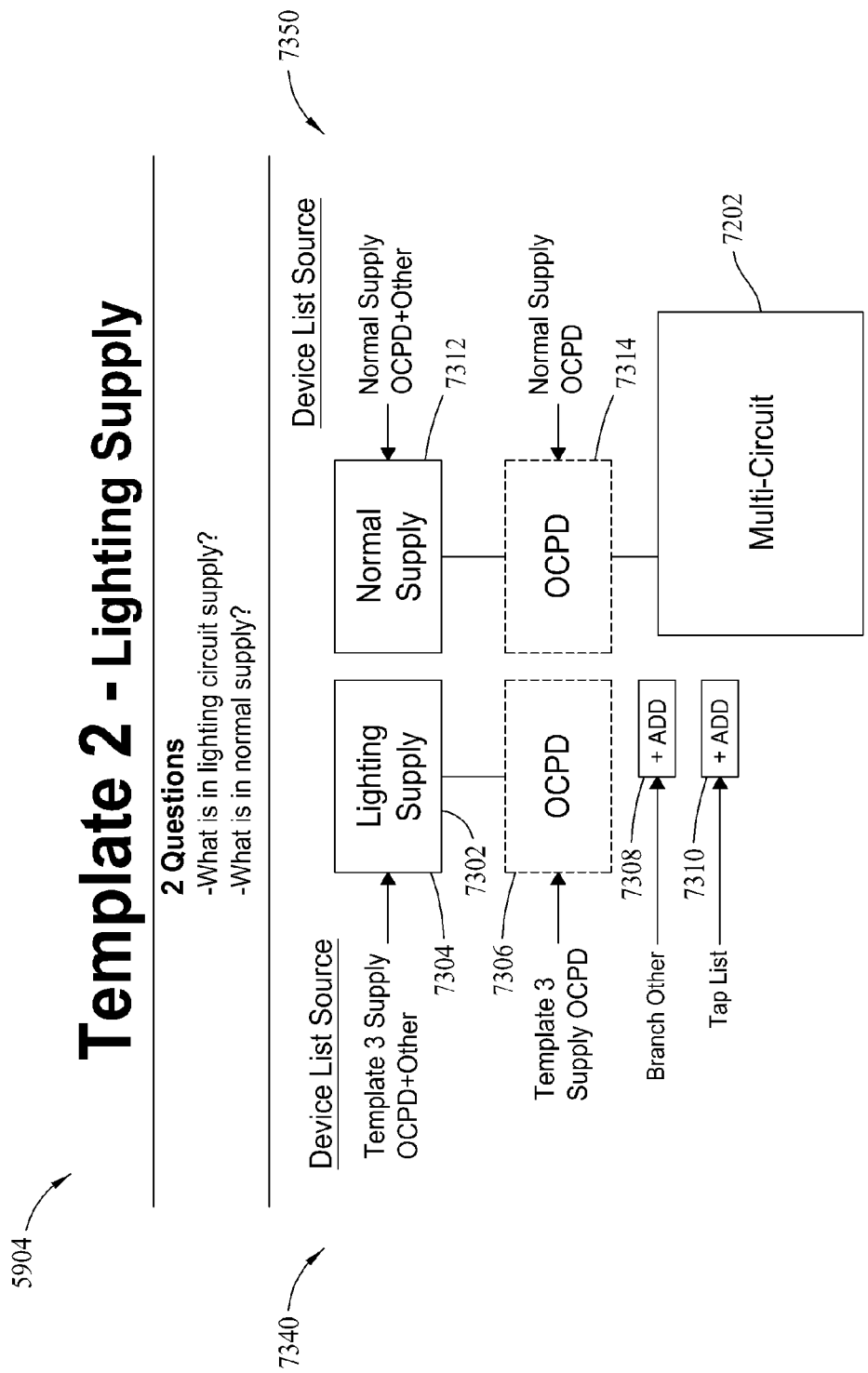
FIG. 73a shows the template where a multi-circuit comes with a maintenance circuit in accordance with an exemplary embodiment of the invention.

FIG. 73*a* shows the template 2 layout 7300 where a multi-circuit comes with a maintenance circuit in accordance with an exemplary embodiment. As explained previously, there are two separate circuits: a standard multi-circuit 7350 and a separate maintenance circuit 7340. The maintenance circuit 7350 uses a supply OCPD 7304 or alternatively a separate OCPD 7306 depending on the embodiment. The template includes a branch other device placeholder 7308 and a tap circuit placeholder 7310. The standard multi-circuit uses a normal supply circuit 7312, then the OCPD 7314 is installed and the software treats the remaining like the multi circuit template 7202.

Figure 73B:
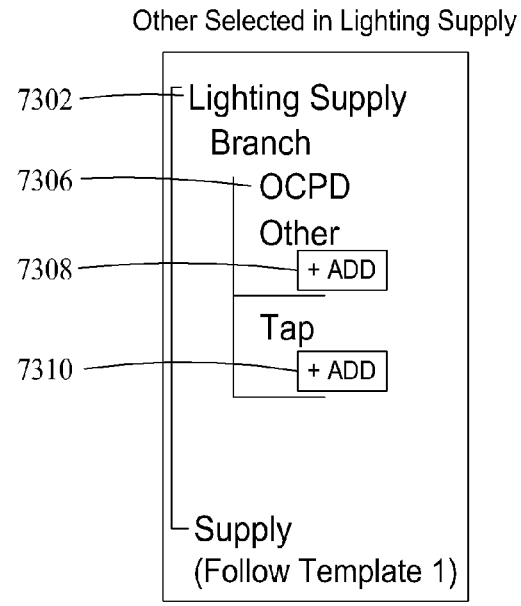
FIG. 73b shows an example of the panel map where the lighting supply is a supply other device.

FIG. 73*b* shows an example of the panel map where the lighting supply is a supply other device 7302. A branch is shown to be connected to the supply other device 7302, wherein the branch contains an OCPD 7306 and may additionally contain another device placeholder 7308 and a tap circuit placeholder 7310.

Figure 73C:
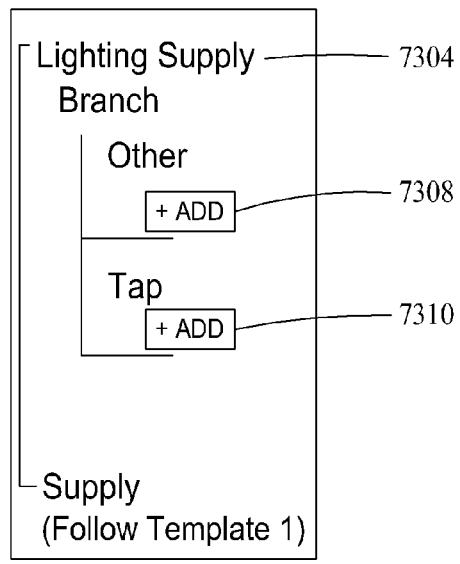
FIG. 73c shows an example of the panel map where the lighting supply contains a supply OCPD.

FIG. 73*c* shows an example of the panel map where the lighting supply 7302 contains a supply OCPD 7304. A branch is shown to be connected to the OCPD lighting supply, wherein the branch may contain another device placeholder 7308 and a tap circuit placeholder 7310.

Figure 74A:
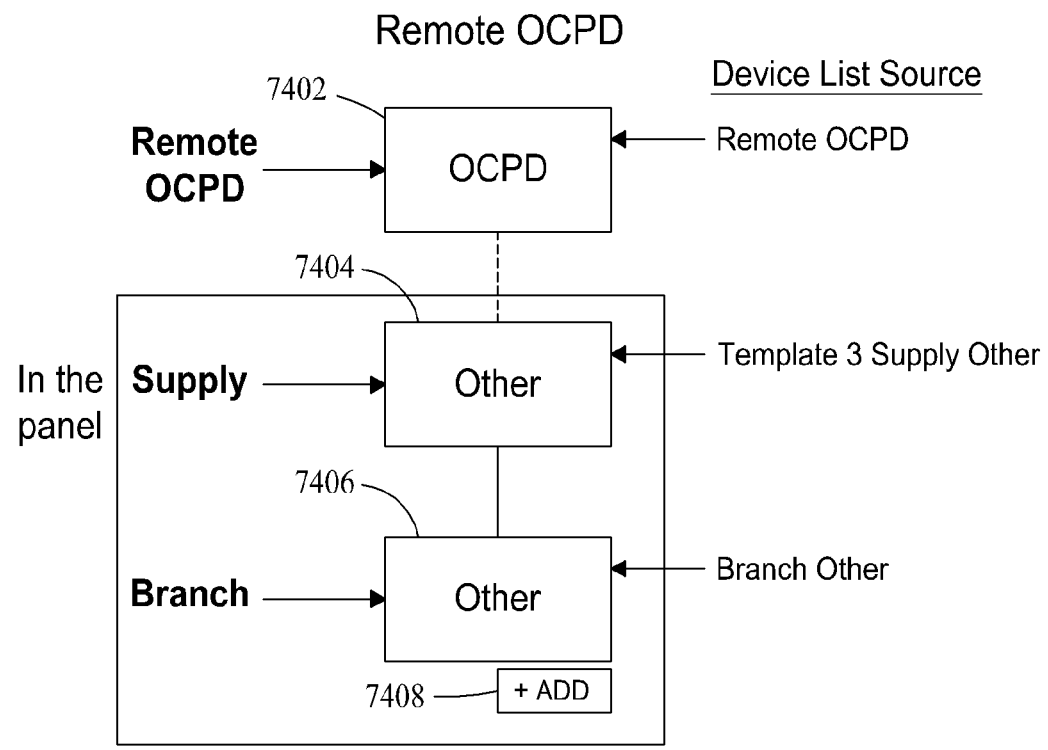
FIGS. 74a-e refer to the template for a single branch circuit, where FIGS. 74a-b deal with a single branch circuit with a remote OCPD, while FIGS. 74c-d contain an OCPD in the panel.
Figure 74B:
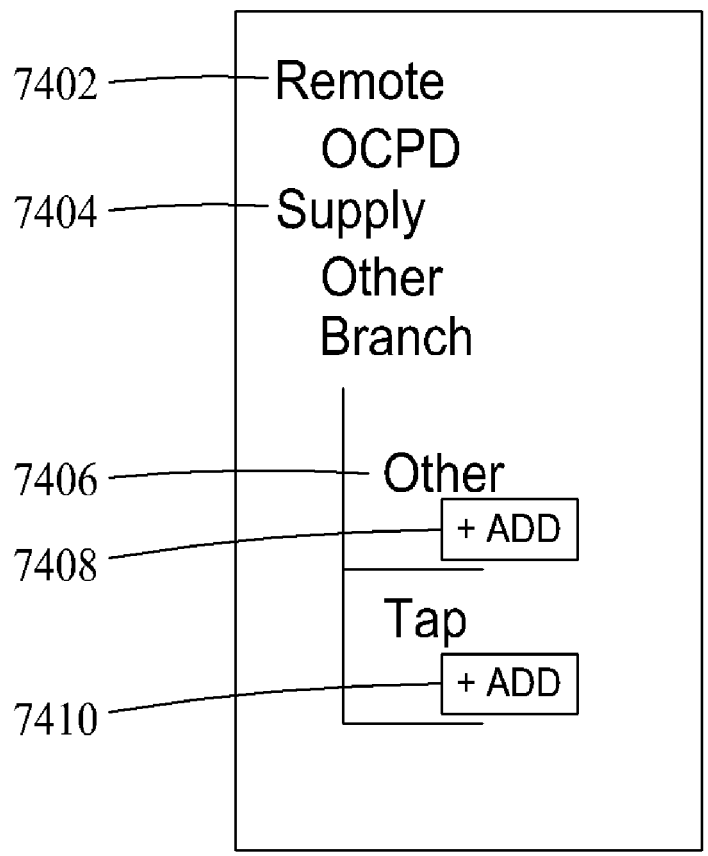
Figure 74C:
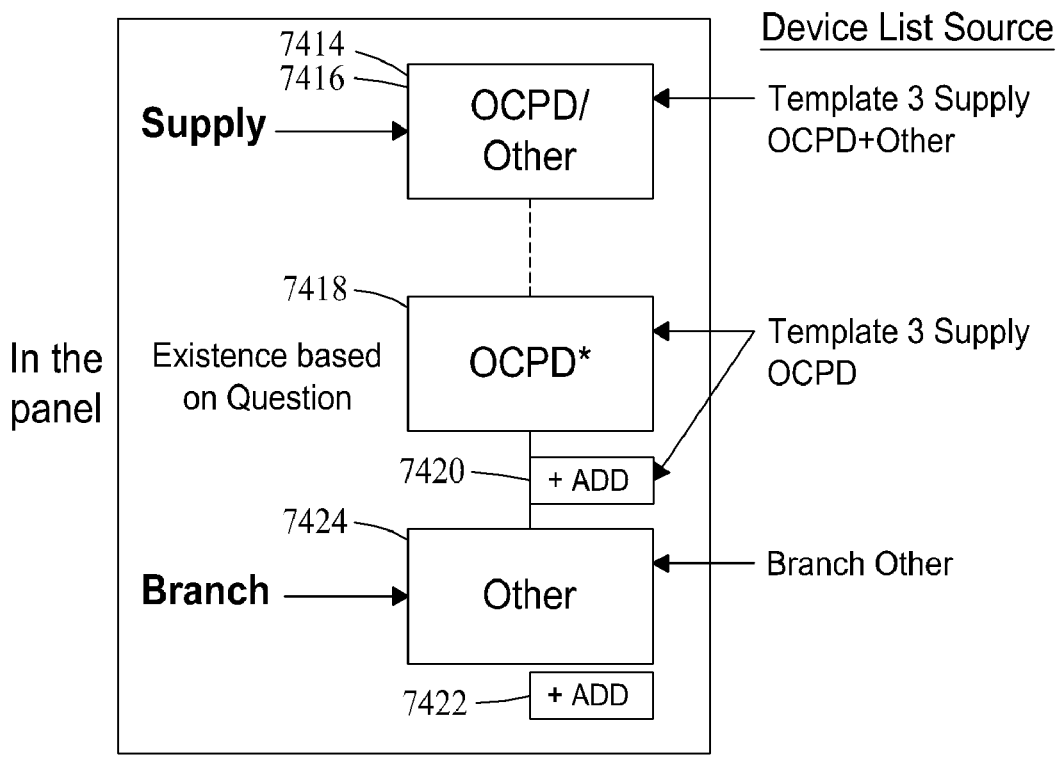
Figure 74D:
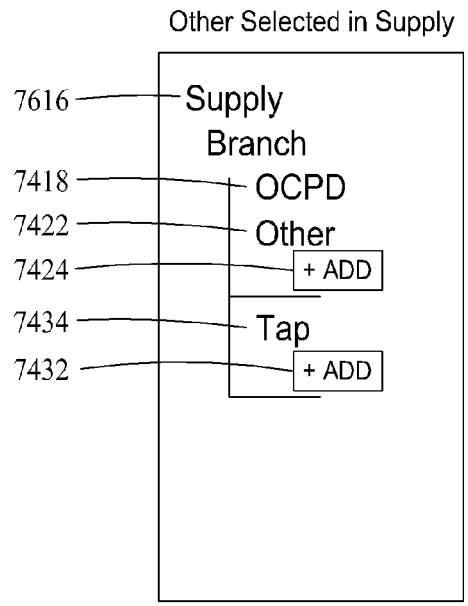
Figure 74E:
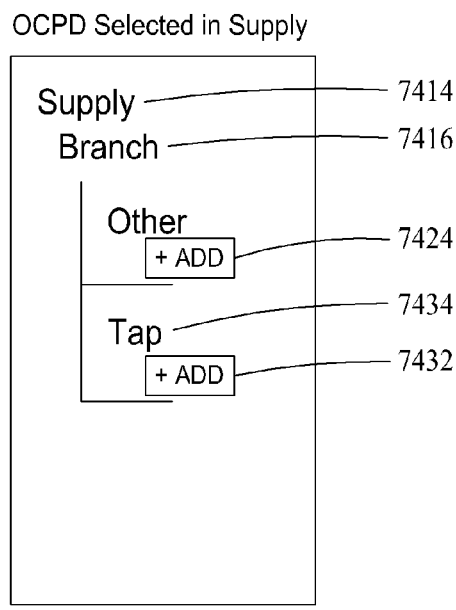

FIGS. 74*a-e* refer to the template 3 for a single branch circuit 5906, where FIGS. 74*a-b* deal with a single branch circuit with a remote OCPD 7402, and FIGS. 74*c-e* contain an OCPD 7414 in the panel. When the single circuit template 5906 is selected, the user chooses the applicable OCPD location. All templates for a single branch circuit automatically provide device placeholders.

FIG. 74*a* shows an example of a single circuit template 5906, template 3, where a single branch circuit is connected to a remote OCPD 7402 in accordance with an exemplary embodiment. The branch other devices 7406 and supply other devices 7404 are in the panel while the remote OCPD 7402 is not located within the panel. A branch other placeholder 7408 is established for another device to be attached to the branch circuit.

FIG. 74*b* shows an example of the panel map where a single branch circuit is connected to a remote OCPD 7402. The remote OCPD 7402 connects to the supply other device 7404. The supply other device 7404 then attaches to a branch other device 7406 and also attaches to branch other device placeholders 7408 and tap circuit placeholders 7410.

FIG. 74*c* shows an example of a single circuit template 5906 where a single branch circuit is connected to the supply. Overcurrent protection may come from a supply OCPD 7414, or may come from a separate OCPD 7418 when the supply is a supply other device 7416. The branch other circuit connects to one of the OCPDs 7414, 7418. If the OCPD 7418 is a separate device, then the template contains an OCPD placeholder 7420. The branch circuit also contains another device placeholder 7422 for other devices 7424.

FIG. 74*d* shows an example of the panel map where a single branch circuit uses a supply other device 7416. A branch OCPD 7418 connects to the supply other device 7416. Additionally, a branch other device 7422, a tap device 7434, a placeholder for a branch other device 7424 and a placeholder for a tap circuit 7432 may be attached to the supply other device 7414.

FIG. 74*e* shows an example of a panel map where a single branch circuit uses a supply OCPD 7414. A branch other device 7416, a tap device 7434, a placeholder for a branch other device 7424, a placeholder for an OCPD 7530 and a placeholder for a tap circuit 7432 may be attached to the supply OCPD 7414.

FIG. 74*f* shows a table with an exemplary listing of what device can be used for the template shown in FIG. 74*a*. Different items may be selected based on their compatibility with the template. Items selected are based on whether the template uses a supply OCPD 7414 or a supply other device 7416.

Figure 75A:
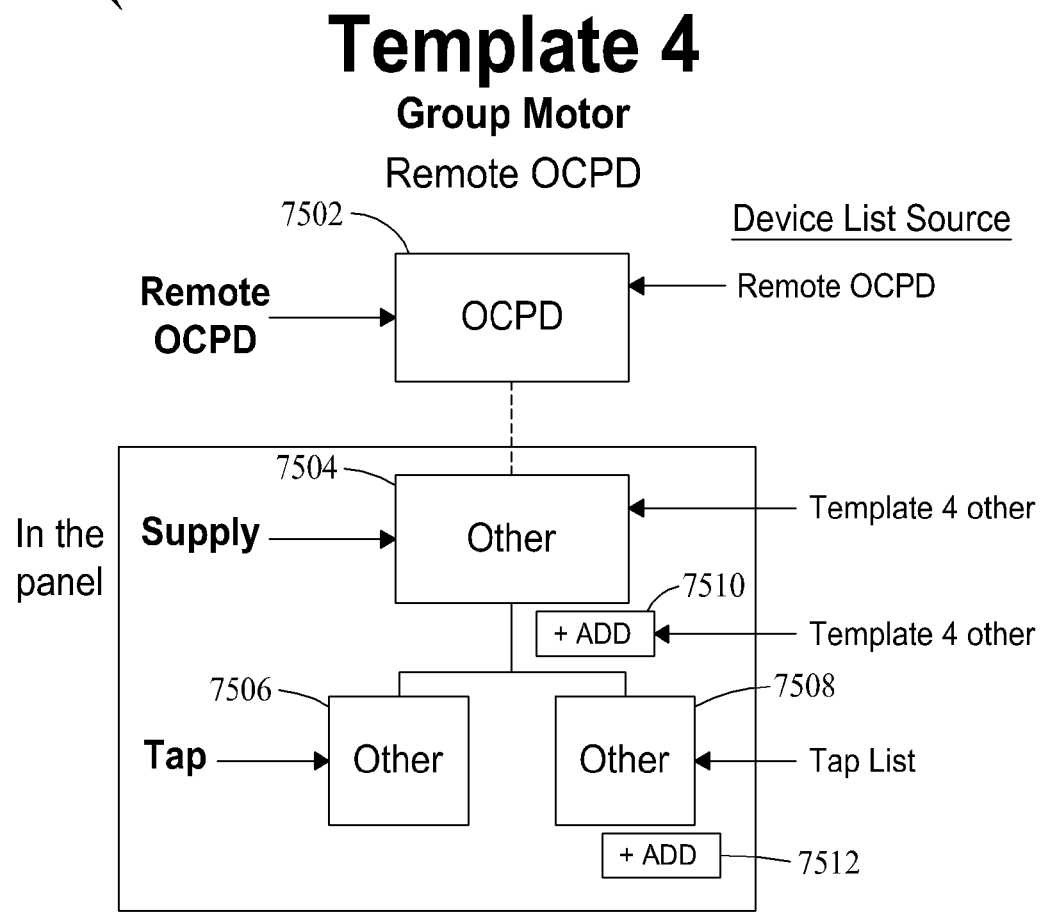
FIGS. 75a-e refer to the template for a single branch circuit with a group motor, where FIGS. 75a-b deal with a single branch circuit with a remote OCPD, while FIGS. 75c-d contain an OCPD in the panel.
Figure 75B:
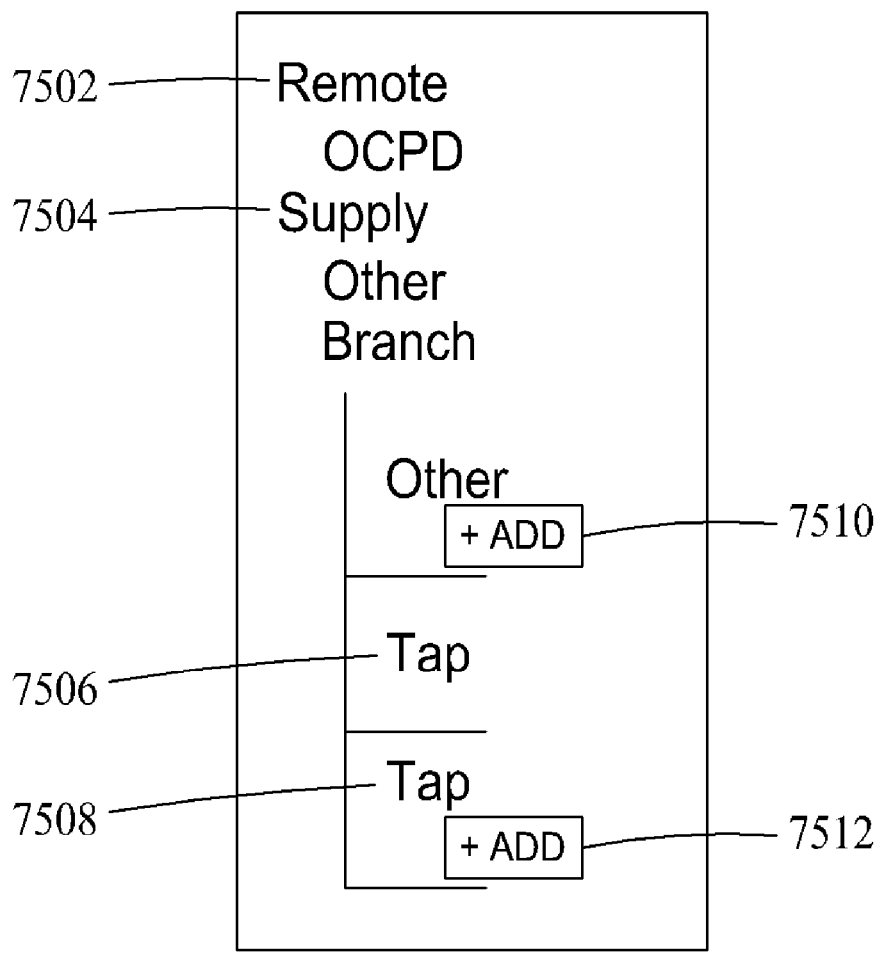

FIGS. 75*a-f* refer to the template 4 for a single branch circuit with a group motor 5908 according to an exemplary embodiment. FIGS. 75*a-b* deal with a single branch circuit with a remote OCPD 7502, while FIGS. 75*c-e* contain an OCPD 7522 in the panel. When the single circuit template with a group motor is selected, the user chooses the applicable OCPD location. All templates for a single branch circuit with a group motor automatically provide device placeholders.

FIG. 75a shows an example of the template 4 where a single branch circuit with a group motor is used with a remote OCPD 7502 in accordance with an exemplary embodiment. The supply other device 7504 and tap circuits 7506, 7508 are in the panel while the remote OCPD 7502 is not in the panel. The template contains supply circuit other device placeholder 7510 and a tap placeholder 7512.

FIG. 75b shows an example of a panel map where a single branch circuit with a group motor and a remote OCPD 7502. The remote OCPD 7502 connects to the supply other device 7504. The supply other device 7504 connects to a branch, wherein the branch contains an other device placeholder 7510 and two taps 7506, 7508, which contains one tap placeholder 7512.

Figure 75C:
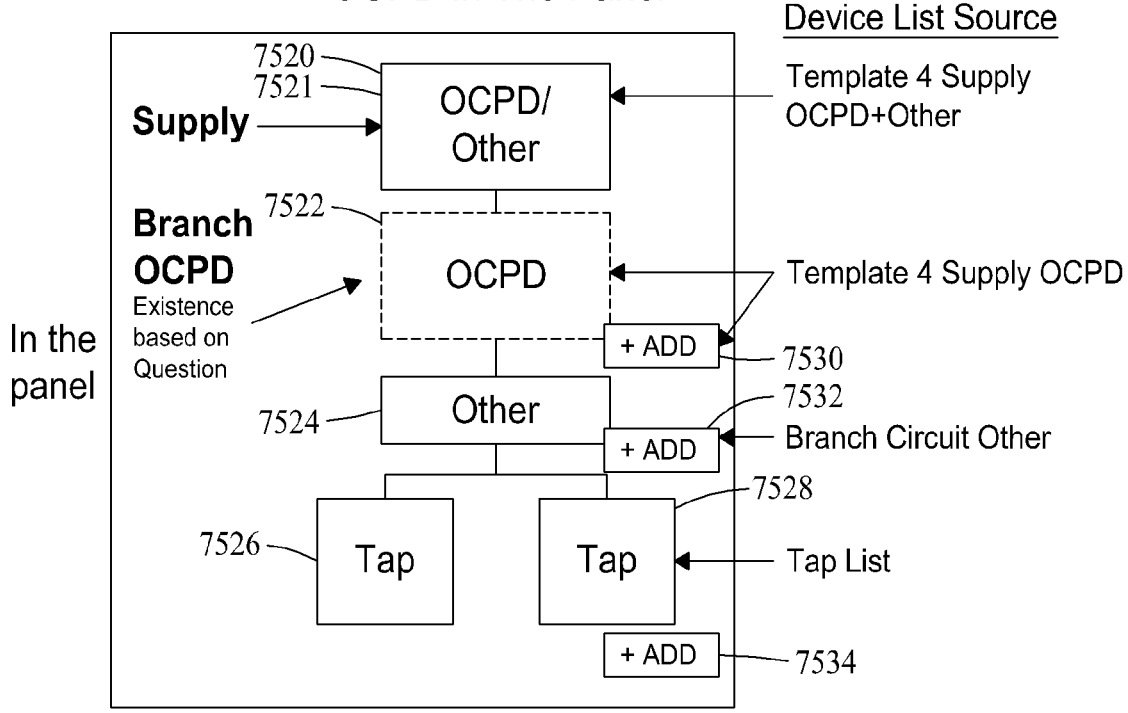

FIG. 75c shows an example of the template 4 where a single branch circuit with a group motor 5908 is used with an OCPD in the panel in accordance with an exemplary embodiment. As shown, the design may use a supply OCPD 7521 or a supply other device 7520 with a branch OCPD 7522 as a separate unit in the panel. The branch OCPD 7522 or the supply OCPD 7521 connects to the other devices 7524 which then connects to the tap circuits 7526, 7528. The template also contains branch OCPD placeholders 7530, branch circuit other device placeholders 7532, and tap circuit placeholders 7534.

Figure 75D:
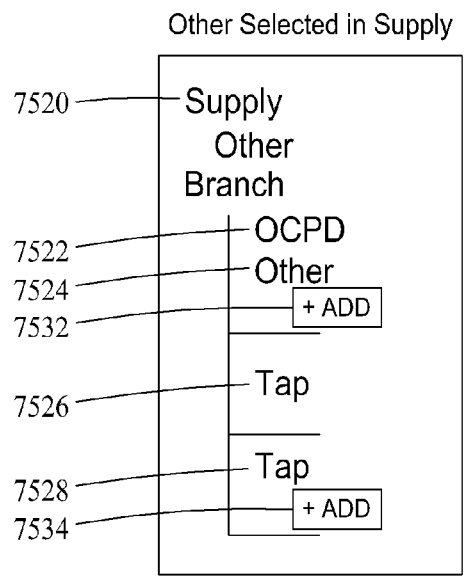

FIG. 75d shows an example of a panel map where a single branch circuit with a group motor is used with an branch OCPD 7522 in the panel, but not in the supply other device 7520. The supply other device connects to a branch circuit. The branch OCPD 7522 connects to the supply other device 7520 via the branch circuit. The branch circuit also connects to two tap circuits 7526, 7528. The branch circuit also connects to a tap placeholder 7534 and another device placeholder 7532.

Figure 75E:
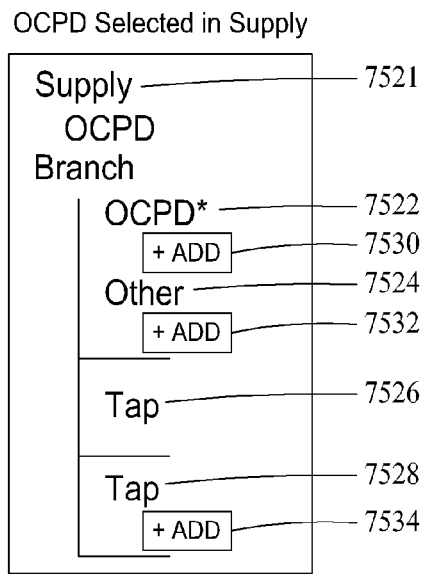

FIG. 75e shows an example of a panel map where a single branch circuit with a group motor is used with a supply OCPD 7521. The supply OCPD 7521 connects to a branch circuit. At the branch circuit, it may also connect to a separate OCPD 7522. The branch circuit also connects to two tap circuits 7526, 7528. The branch circuit also connects to a tap placeholder 7534 and another device placeholder 7532.

FIG. 75f shows a table with an exemplary listing of what devices can be used for the template shown in FIGS. 75a-e. Different items may be selected based on their compatibility with the template. Items selected are based on whether the template uses a supply OCPD 7521 or supply other device 7520.

Figure 76A:
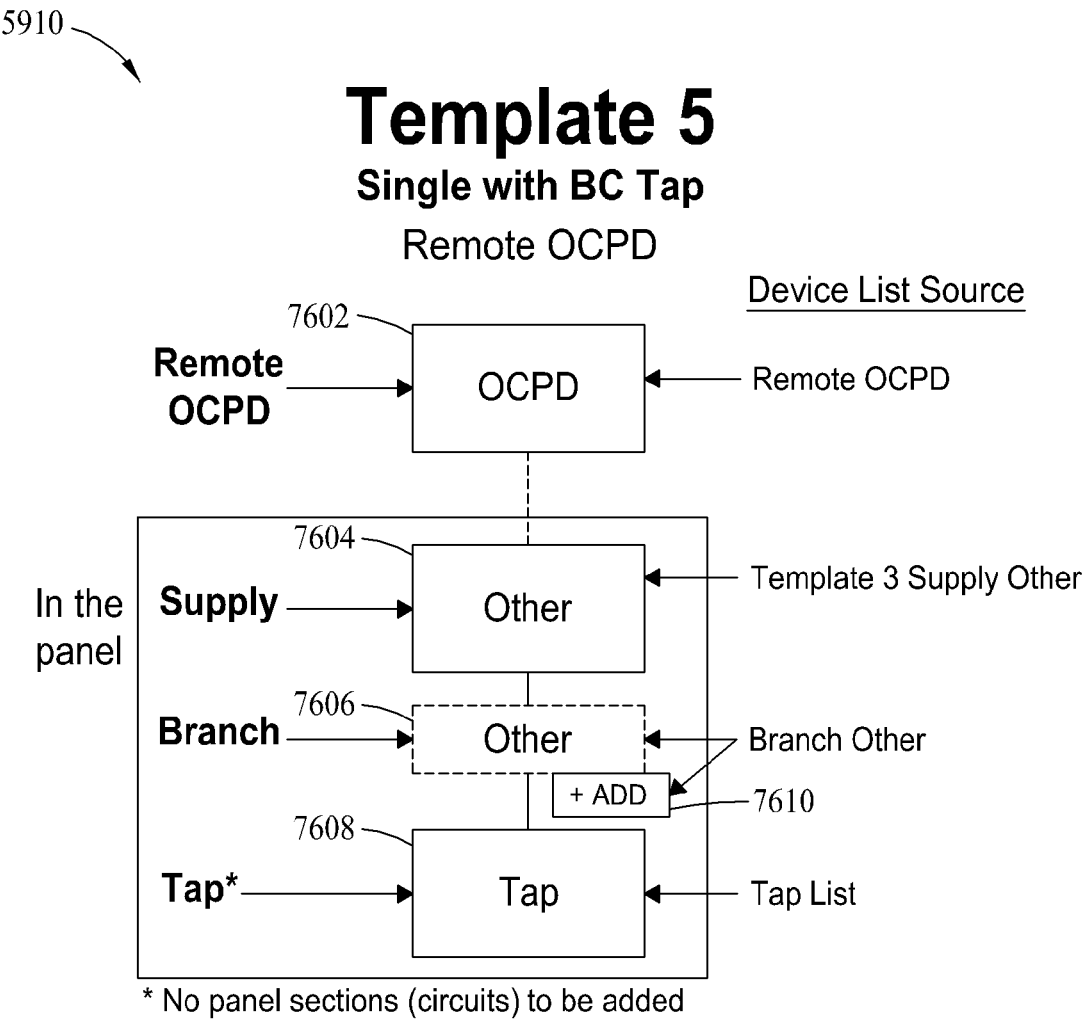
FIGS. 76a-f refer to the template for a single branch circuit with a branch circuit tap, where FIGS. 76a-b deal with a single branch circuit with a remote OCPD, while FIGS. 76c-d contain an OCPD in the panel and in the supply, while FIGS. 76e-f contain an OCPD in panel and Other device in supply.
Figure 76B:
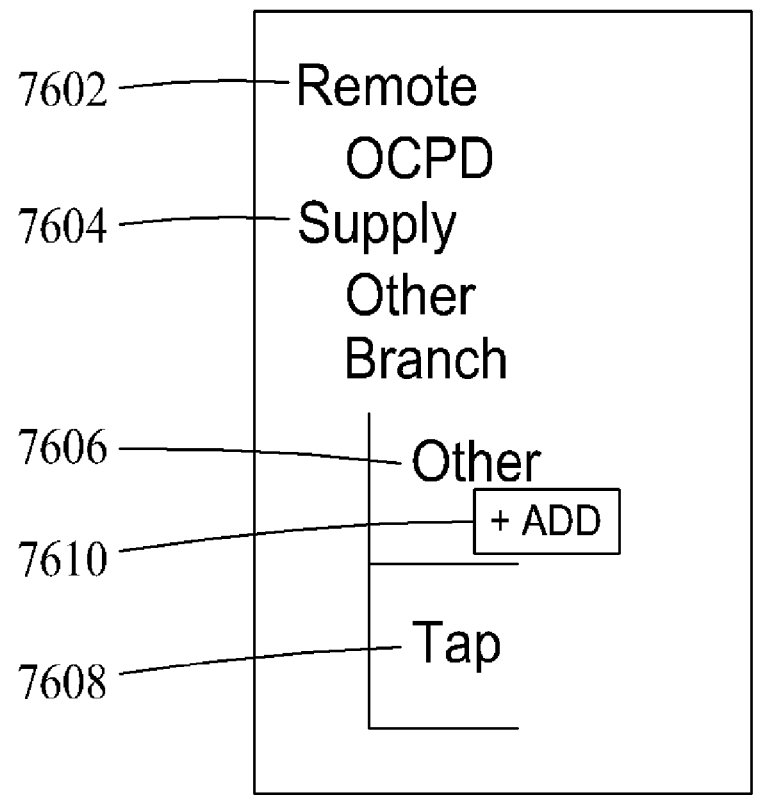

FIGS. 76a-f refer to the template 5 for a single branch circuit with a single branch circuit tap 5910 in accordance with an exemplary embodiment. FIGS. 76a-b show a single branch circuit with a remote OCPD 7602, while FIGS. 76c-d contain a supply OCPD 7622 in the panel, while FIGS. 51e-f contain a branch OCPD 7644 in the panel and a supply other device 7642. All templates for a single branch circuit with a branch circuit tap automatically provide device placeholders.

FIG. 76a shows an example of the template 5 where a single circuit with a remote OCPD 7602 is connected to the supply other device 7604. The supply other device 7604 connects to a branch other circuit 7606. The branch other circuit 7606 contains a branch other device placeholder 7610.

FIG. 76b shows an example of a panel map where a single circuit with a remote OCPD 7602 is connected to the supply other device 7604. The supply other device 7604 connects to a branch other device 7606 with a branch other device placeholder 7610.

Figure 76C:
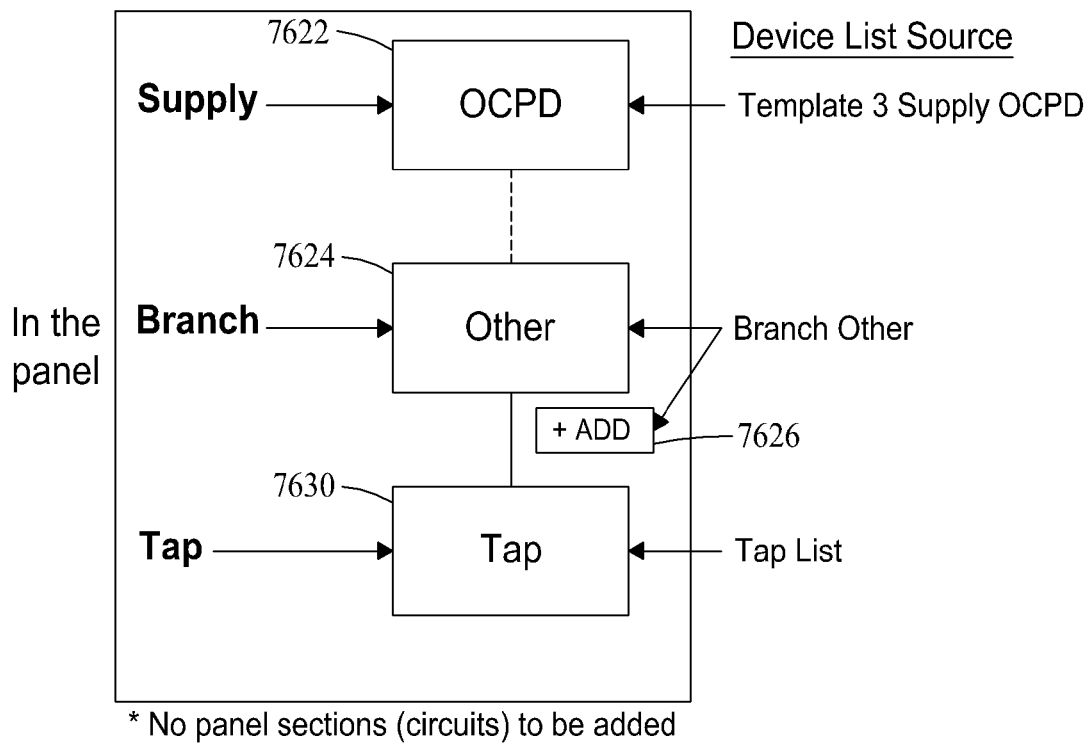

FIG. 76c shows an example of the template 5 where a single circuit with a supply OCPD 7622 is in the panel according to an exemplary embodiment. The supply OCPD 7622 connects to the branch other circuits 7624. The branch other circuit 7624 has a branch circuit other placeholder 7626.

Figure 76D:
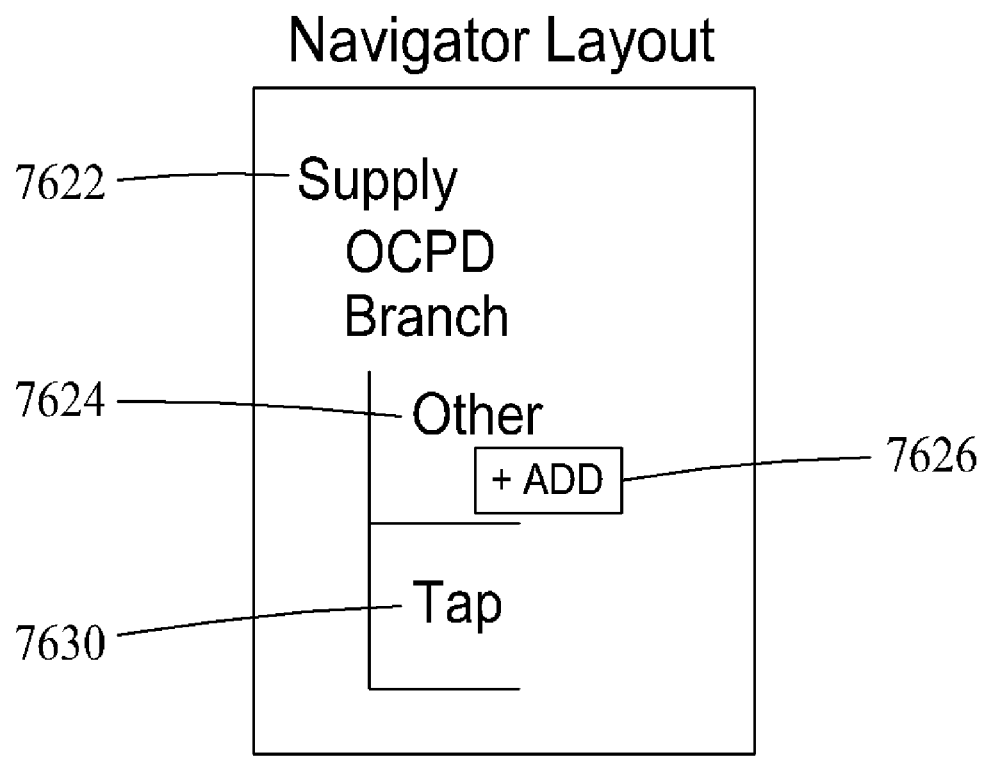

FIG. 76d shows an example of a panel map where a single circuit with a supply OCPD 7622 is in the panel in accordance with an exemplary embodiment. The supply OCPD 7622 connects to the branch other circuit 7624, wherein the branch other circuit 7624 connects to a branch other device placeholder 7626.

Figure 76E:
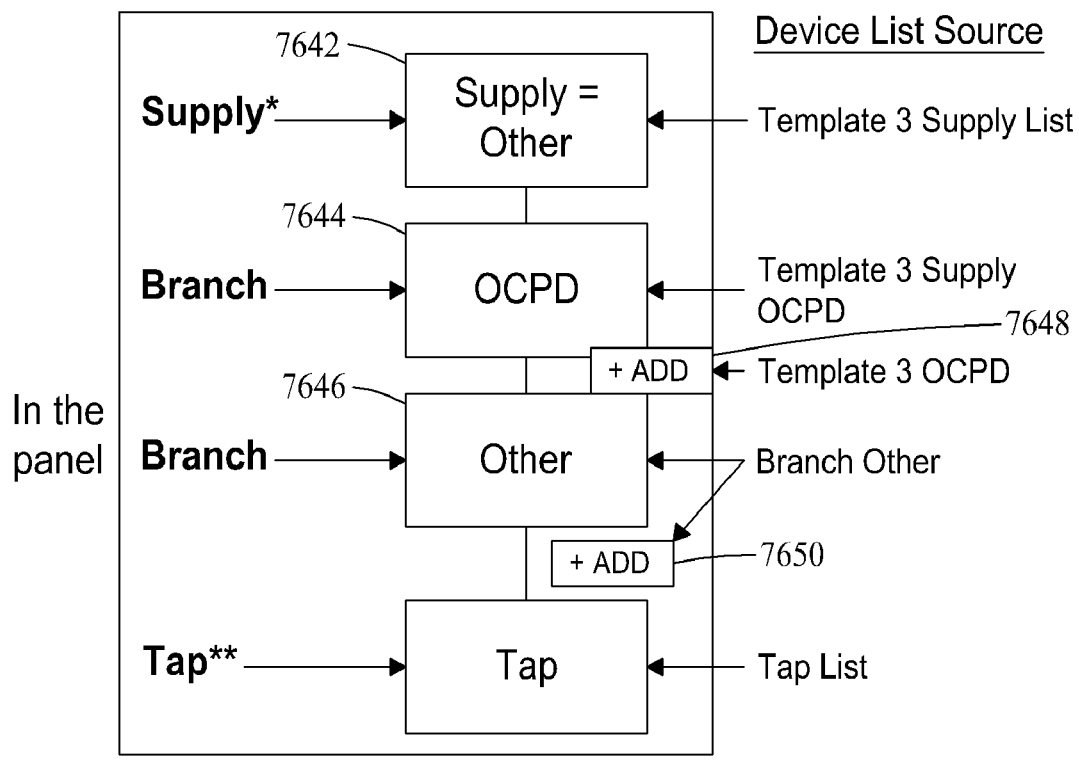

FIG. 76e shows an example of the template 5 where a single circuit with a branch OCPD 7644 is in the panel with a supply other device 7642 in accordance with an exemplary embodiment. The supply other device 7642 connects to a branch OCPD 7644, which in turn is connected to a branch other device 7646. The branch circuit has an OCPD placeholder 7648 and a branch other device placeholder 7650.

Figure 76F:
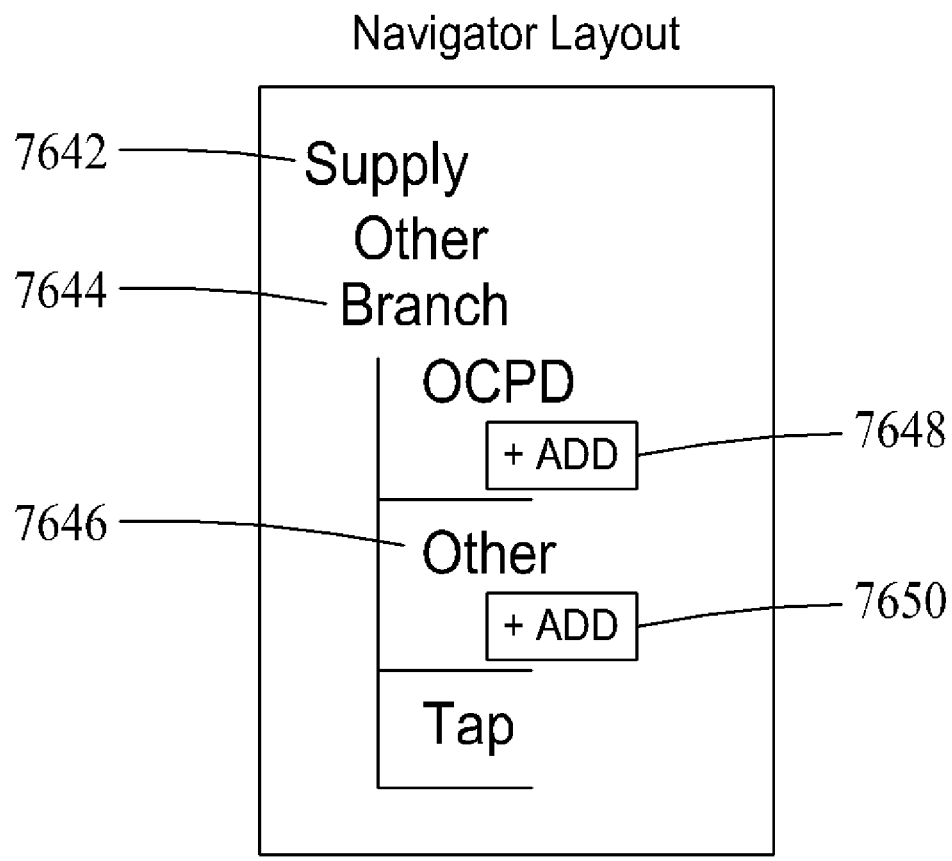

FIG. 76f shows an example of a panel map where a single circuit with a branch OCPD 7644 is in the panel with a supply other device 7642. The supply other device 7642 connects to the branch OCPD 7644. The branch also connects to a branch other device 7646. The branch circuit also has another device placeholder 7650 and an OCPD placeholder 7648.

FIG. 76g shows a table 7604 describing the devices that may be used for the OCPD and other device lists for taps as shown in FIGS. 76a, 76c, and 76e in accordance with an exemplary embodiment. FIG. 76g shows an example of how devices may be selected based on the single branch circuit based on the template used. Different devices may be selected based on their compatibility with the template. The devices selected are based on whether a tap is used or not. The chart shows which devices may be installed with preceding devices in the chart.

Reports are available once the circuit has been designed. The report has the same name as the names on the panel navigator. These reports contain information such as the final SCCR value. Additionally, the panel workspace or other sections may be presented in a print-friendly format to allow the user to print out the information. Additionally, the report is consistent with the previously described reporting format. Taps will also be represented in the report as would branch circuits and branch circuit other devices after they have been reported. The SCCR will prominently be displayed.

There shall be the ability to add and remove devices except for the following cases shown in FIG. 72a-76g. The user shall be able to remove the device by clicking on the device except for supply devices, branch OCPD connected to feeder and sub-feeder, and those cases shown in FIG. 72a-76g. The user shall be able to add devices except for those cases shown in FIG. 72a-76g.

The user interface display may be implemented conventionally in a computer program embodied on a computer readable medium and having segments of code or instructions executed by a computer that correspond to the various functions and features described above.

It is understood that additional segments of code corresponding to additional displays, links, graphics, information, and indicia may be provided in further embodiments, and further that not all of the exemplary information provided in the above-described displays and screens need be used in some embodiments of the invention. The user interface displays may be varied to suit the needs of specific electrical systems, customized for particular devices, and may be used for assessment and evaluation of standards other than N.E.C. §110.10 and U.L. 508A.

When the user interface displays are implemented on a network-based system as described above, the system may flexibly present information and perform analysis of proposed designs to multiple users simultaneously, and through menu-driven graphical displays and information links, system users may quickly access needed information to properly manage and reliably evaluate compliance of proposed product and system designs with promulgated industry standards. Device selections, data, and analysis may be saved on the system 150 by virtue of the unique project names and panel designations for later access by authorized users. As such, the user need not complete the entire analysis in a single session, but rather may conveniently exit the system and later return to the project. Detailed reports may likewise be saved on the system 150 for further study and analysis.

V. SYSTEM ADAPTATIONS

The systems and processes described above are not limited to the specific embodiments described herein. Components of each system and each process can be practiced independent and separate from other components and processes described herein. Each component and process also can be used in combination with other components, systems and processes.

For example, the foregoing analysis and evaluation system 150 may be implemented in whole or in part to meet the needs of a particular electrical system or for cost management reasons. In other words, the analysis and evaluation system 150 may not require selection of all of the described circuit and components, or perform all of the described functions set forth above. Likewise, the analysis and evaluation system 150 may be configured or adapted to require input or selection of circuits and devices and that are not described above, and to perform functions other than those specifically described. Varying degrees of complexity and functionality may be provided for cost management reasons and to meet the needs of particular users. It should now be apparent that the system components and functionality may be mixed and matched to generate varying systems which obtain the benefits of the present invention to varying degrees.

VI. CONCLUSION

The benefits and advantages of the invention are now believed to be amply demonstrated in the various embodiments disclosed.

One embodiment of a method of evaluating a proposed design of a product having a plurality of interconnected devices in light of a promulgated industry standard is disclosed. The method includes: accepting data and information corresponding to the plurality of devices, the data and information relating to an application of the standard to the proposed design; applying the standard to the accepted data and information as it is accepted; and presenting analysis information as information corresponding to each device is accepted.

Optionally, the method may also include presenting the analysis information in a screen display, with the screen display including a selection section for one of the plurality of devices, and a name plate section including the analysis information. The screen display may also include a product layout section. The method may also include generating a detailed analysis report.

The promulgated industry standard may relate to an electrical system, and the electrical system may optionally include an electrical control panel. The standard may relate to a short-circuit current rating of the electrical control panel. The plurality of devices may be located in one of a supply circuit to an electrical product, a branch circuit connected to the supply circuit, a feeder circuit connected to the supply circuit, a branch circuit connected to the feeder circuit, a sub-feeder circuit, or a branch-circuit connected to the sub-feeder circuit. The devices may be interconnected in a plurality of electrical circuits, and the standard may relate to an electrical rating of the combination of interconnected circuits.

Applying the standard in the method may include obtaining a reference value for each individual device, and adjusting the reference value based upon a comparison of the reference value and a default value. Applying the standard may also include obtaining a reference value for each component analyzed, and adjusting the reference value based upon a presence of a specified device connected upstream to the component being analyzed and a comparison of the obtained reference value and a corresponding reference value for the specified device. Still further, applying the standard may include obtaining a reference value for each component analyzed, and adjusting the reference value based upon a comparison of the obtained reference values and a value associated with another device, which may be an overcurrent protection device.

The method may additionally include accepting product information, and filtering the accepted data and information for the devices consistently with the accepted product information. The method may also include prompting selection of the data and information to a user.

An embodiment of a network-based system for evaluating a proposed electrical product design having interconnected electrical circuit devices for compliance with a promulgated standard is also disclosed. The system includes a client system having a browser, a database for storing information, and a server system adapted to be coupled to the client system and the database. The server is adapted to accept device data and information corresponding to eligible circuit devices for the proposed product design, receive user provided data and information regarding the proposed product, selectively present the device data and information to a user based on the received user provided data and information for the product, and apply the standard to devices selected by a user from the selectively presented device data and information.

Optionally, the server may also be adapted to display a result of the applied standard as each device is selected by the user. The server may present selection information in a screen display, with the screen display including a selection section for one of an overcurrent protection device and another device, and a name plate section including analysis information for the standard. The product may be an electrical control panel, and the server may be adapted to present a screen display including a circuit layout section for the panel. The standard may relate to a short-circuit current rating for the product, and the server may be adapted to present a screen display including an updated short-circuit current rating value for the product as each device is selected. The server may also be adapted to generate a detailed analysis report.

Optionally, the plurality of interconnected devices may be located in one of a supply circuit to an electrical control panel, a branch circuit connected to the supply circuit, a feeder circuit connected to the supply circuit, a branch circuit connected to the feeder circuit, a sub-feeder circuit, or a branch-circuit connected to the sub-feeder circuit. Each of the circuit may include an overcurrent protection device.

The server may be adapted to apply the standard by obtaining a reference value for each individual device that is a non-overcurrent protection device, and adjusting the reference value based upon a comparison of the reference value and a default value. Also, the server may be adapted to apply the standard by obtaining a reference value for each individual device analyzed, and adjust the reference value based upon a presence of a specified device connected upstream to the component being analyzed and a comparison of the obtained reference value and a corresponding reference value for the specified device, which may be a transformer. The server may also be adapted to apply the standard by obtaining a reference value for the device being analyzed and comparing a current let through value of the overcurrent protection device with the obtained value. The server may be adapted to apply the provisions of NEC Article 409 and U.L. 508A to an electrical control panel design.

Overcurrent devices may optionally be selected from the group of a fused pullout device, a pullout switch, a fused switch, a circuit breaker, a combination starter, a branch circuit fuse and a custom device. The circuit devices may be part of a remote disconnection means, with the circuit devices being selected from the group of: branch circuit fuses in a fuse holder, a bus bar system, a GFCI receptacle, a magnetic controller, a magnetic motor starter, a manual motor starter, a molded case switch, a non-fuse switch, an overload relay, power conversion equipment, a receptacle, a semiconductor fuse, a silicon control rectifier, a terminal block, and a custom device. The circuit devices may also be part of a feeder circuit, with the circuit devices being selected from the group of: a bus bar system, a magnetic controller, a molded case switch, a non-fused switch, a semiconductor fuse, a silicon control rectifier, a terminal block, a transformer, a multi-lug terminal and a custom device.

An embodiment of a network-based system for evaluating a short-circuit current rating of a proposed design of an electrical control panel having multiple interconnected circuits is also disclosed. The circuits include at least one of a feeder circuit connected to a supply circuit, a branch circuit connected to the supply circuit, a sub-feeder circuit, and a branch circuit connected to the sub-feeder circuit, wherein each of the circuits comprises an overcurrent protection device and another device. The system includes a client system comprising a browser, a database for storing information, and a server system adapted to be coupled to the client system and the database. The server is further adapted to accept device data and information corresponding to eligible overcurrent protection devices and other devices for the proposed control panel, receive user provided data and information regarding the proposed control panel, selectively present the device data and information to a user based on the received user provided data and information for the proposed panel, and determine the short circuit current rating for the panel as each device is selected by the user from the selectively presented device data and information.

Optionally, the server may also be adapted to display the determined short circuit current rating to the user. The server may be adapted to present selection information in a screen display, the screen display including a name plate section including the determined short circuit current rating. The display may also include a circuit layout section for the panel and an indicator to identify circuits being analyzed. The server may also be adapted to generate a detailed short circuit current rating report for the proposed panel design.

Optionally, the server may be adapted to determine an Adjusted SCCR Rating as devices are selected. The server may also determine a Trans. Through SCCR value based on the Adjusted SCCR value. The server may further determine a Let-Thru SCCR value based upon the Trans. Through SCCR value.

The server may be adapted to prompt selection of the data and information to a user. Overcurrent protection devices may be selected from the group of group of a fused pullout device, a pullout switch, a fused switch, a circuit breaker, a combination starter, a branch circuit fuse and a custom device. The circuit devices are part of a remote disconnection means, and the circuit devices may be selected from the group of: branch circuit fuses in a fuse holder, a bus bar system, a GFCI receptacle, a magnetic controller, a magnetic motor starter, a manual motor starter, a molded case switch, a non-fuse switch, an overload relay, power conversion equipment, a receptacle, a semiconductor fuse, a silicon control rectifier, a terminal block, and a custom device. The circuit devices may be part of a feeder circuit, with the circuit devices being selected from the group of: a bus bar system, a magnetic controller, a molded case switch, a non-fused switch, a semiconductor fuse, a silicon control rectifier, a terminal block, a transformer, a multi-lug terminal and a custom device.

A computer program embodied on a computer readable medium for evaluating and assessing a proposed electrical system in light of a promulgated industry standard is also disclosed. The program comprises at least one code segment that receives user provided selections for devices utilized in the proposed electrical system, and, in response to the received selections; determines an output value corresponding to the promulgated industry standard; and displays the output value for inspection by a user when a selection is received.

Optionally, the program may also include code segments for one or more of the following features: a display of a product name plate including a current rating for the proposed electrical system, a voltage rating for the proposed electrical system, and the output value; a display of a product layout section for the proposed electrical system, an indication of a current stage of the analysis for the proposed electrical system; and display of device information for selected devices. The device information may including at least one of a manufacturer name, a description, a part number, a voltage rating, a current rating, a horse power rating, an SCCR rating, an interrupting rating, an $i^2t$ rating, a maximum overcurrent protection device type/size value, a let-thru class value.

Additionally, the program may also include code segments for one or more of the following optional features 50: a display of a supply circuit selection screen, a display of a feeder circuit selection screen, a display of a sub-feeder circuit selection screen, a display of a branch circuit selection screen, a display of a short-circuit current rating screen for the proposed electrical system, generation of a detailed short-circuit current rating report for the proposed electrical system, which may be an electrical control panel.

An electronic system for evaluating a short circuit current rating of multiple interconnected circuits is also disclosed. The system includes means for storing data and information relating to eligible circuit devices for the interconnected circuits, means for receiving user provided circuit device selections; means for determining the short current rating after each circuit device selection is received, and means for communicating the short current rating to the user after each circuit device selection is received.

Optionally, the means for storing installation data may comprise a database. The data and information may be selected from the group of a manufacturer name, a description, a part number, a voltage rating, a current rating, a horse power rating, an SCCR rating, an interrupting rating, an $i^2t$ rating, a maximum overcurrent protection device type/size value, a let thru class value.

The means for receiving may comprise a network-based system. The means for displaying may comprise a computer program embodied on a computer readable medium. The means for communicating may comprise a display screen.

The circuits may comprise overcurrent protection devices and other devices. The overcurrent protection devices may be selected from the group of group of a fused pullout device, a pullout switch, a fused switch, a circuit breaker, a combination starter, a branch circuit fuse and a custom device. The circuit devices may be part of a remote disconnection means, with the circuit devices being selected from the group of: branch circuit fuses in a fuse holder, a bus bar system, a GFCI receptacle, a magnetic controller, a magnetic motor starter, a manual motor starter, a molded case switch, a non-fuse switch, an overload relay, power conversion equipment, a receptacle, a semiconductor fuse, a silicon control rectifier, a terminal block, and a custom device. The circuit devices may be part of a feeder circuit, with the circuit devices being selected from the group of: a bus bar system, a magnetic controller, a molded case switch, a non-fused switch, a semiconductor fuse, a silicon control rectifier, a terminal block, a transformer, a multi-lug terminal and a custom device.

While the invention has been described in terms of various specific embodiments, those having ordinary skill in the art and the benefit of this disclosure will recognize that the invention can be practiced with modification within the spirit and scope of the claims.

What is claimed is:

1. A method of evaluating a proposed design of a product having a plurality of interconnected devices in light of a promulgated industry standard, the method implemented in a computer system, the method comprising:
   creating, with the computer system, a graphic display representing a layout of a plurality of interconnected devices;
   accepting, with the computer system, a plurality of data corresponding to a proposed design of a product having the plurality of interconnected devices;
   applying, by the computer system, the promulgated industry standard to the accepted plurality of data corresponding to the proposed design; and
   presenting, with the computer system, an analysis corresponding to the plurality of interconnected devices.

2. The method of claim 1, further comprising:
   prompting, with the computer system, a selection of a template corresponding to the proposed design of the product; and
   modifying the template based on the plurality of data.

3. The method of claim 1, wherein the graphic display comprises a selection of icons for representing the plurality of interconnected devices.

4. The method of claim 1, wherein accepting a plurality of data corresponding to a proposed design comprises searching for at least one of the plurality of data corresponding to at least one of the plurality of interconnected devices, wherein the at least one of the plurality of data is stored in a database.

5. The method of claim 1, wherein accepting a plurality of data corresponding to a proposed design comprises receiving at least one of the plurality of data corresponding to at least one of the plurality of interconnected devices, wherein the at least one of the plurality of data is entered by a user.

6. The method of claim 1, wherein the analysis is presented on a screen display, the screen display comprising a selection section for at least one of the plurality of interconnected devices and a name plate section for presenting the analysis.

7. The method of claim 6, wherein the screen display further comprises a panel layout section for displaying information regarding the proposed design of the product in an iconic format.

8. The method of claim 1, wherein creating a graphic display comprises:
   prompting a selection of a plurality of icons from a menu; and
   placing the plurality of selected icons in a panel layout section.

9. The method of claim 1, wherein presenting an analysis comprises generating a detailed analysis report.

10. The method of claim 1, wherein the promulgated industry standard relates to an electrical system.

11. The method of claim 10, wherein the electrical system comprises an electrical control panel.

12. The method of claim 1, wherein the promulgated industry standard relates to a short-circuit current rating of an electrical control panel.

13. The method of claim 1, wherein the plurality of interconnected devices are interconnected in a plurality of electrical circuits, and wherein the promulgated industry standard relates to an electrical rating of a combination of the plurality of electrical circuits.

14. The method of claim 1, wherein applying the promulgated industry standard comprises obtaining a reference value for at least one of the plurality of interconnected devices, and adjusting the reference value based upon a comparison of the reference value and a default value.

15. The method of claim 1, wherein applying the promulgated industry standard comprises obtaining a first reference value for at least one of the plurality of interconnected devices, and adjusting the first reference value based upon a presence of a specified device connected upstream to the at least one of the plurality of interconnected devices being analyzed and a comparison of the first reference value and a corresponding second reference value for the specified device.

16. The method of claim 1, wherein applying the promulgated industry standard comprises obtaining a reference value for at least one of the plurality of interconnected devices, and adjusting the reference value based upon a comparison of the obtained reference values and a value associated with a separate device.

17. The method of claim 1, further comprising accepting data for a plurality of devices, and filtering the accepted data for the plurality of devices in view of the previously accepted data corresponding to the plurality of devices.

18. The method of claim 1, further comprising accepting, with the computer system, the promulgated industry standard.

19. The method of claim 1, wherein the method is implemented in a networked-based computer system.

20. The method of claim 1, wherein presenting, with the computer system, an analysis corresponding to the plurality of interconnected devices comprises presenting the analysis as each of the interconnected devices is identified by a user.

21. The method of claim 20, wherein presenting the analysis as each of the interconnected devices is identified by a user comprises presenting a short circuit current rating of the product.

22. The method of claim 1, wherein accepting, with the computer system, a plurality of data corresponding to a proposed design of a product having the plurality of interconnected devices comprises accepting, with the computer system, a plurality of data for one or more eligible circuit devices selectable by a user for the interconnected circuit devices in the proposed design.

23. The method of claim 22, wherein applying, by the computer system, the promulgated industry standard comprises determining a short circuit current rating of the selected one or more eligible circuit devices in the interconnected circuit devices as the one or more eligible circuit devices are selected by the user.

24. A network-based system for evaluating a proposed electrical product design having interconnected electrical circuit devices for compliance with a promulgated standard, the system comprising:
   a client system comprising a browser;
   a database for storing information; and
   a server system adapted to be coupled to the client system and the database, the server system further adapted to:
      accept a plurality of data corresponding to one or more eligible circuit devices for a proposed product design;
      receive a plurality of user provided data and information regarding the proposed product design;
      selectively present the plurality of data to a user in a graphic format based on the plurality of user provided data and information; and
      apply a promulgated standard to the one or more eligible circuit devices selected by the user from the accepted plurality of data.

25. The system of claim 24, wherein the server system is adapted to apply a promulgated standard to the one or more eligible circuit devices when selected by the user.

26. The system of claim 24, wherein the promulgated industry standard relates to a determination of a short circuit current rating of the interconnected electrical circuit devices in the proposed electrical product design.

27. An electronic system for evaluating a short-circuit current rating of a proposed design of an electrical panel having multiple interconnected circuits, the circuits including at least one of a feeder circuit connected to a supply circuit, a branch circuit connected to the supply circuit, a sub-feeder circuit, and a branch circuit connected to the sub-feeder circuit, wherein each of the circuits comprises an overcurrent protection device and another device, the electronic system comprising:
   a processor-based device adapted to:
      accept a plurality of device data and information corresponding to one or more eligible overcurrent protection devices and other devices for a proposed electrical panel;
      receive a plurality of user provided data and information regarding the proposed electrical panel design;
      selectively present the plurality of device data and information to a user in a graphic format based on the plurality of user provided data and information; and
      determine the short circuit current rating for the proposed electrical panel as each of the one or more eligible overcurrent protection devices and other devices is selected by the user.

28. The electronic system of claim 27, wherein the system comprises:
   a client system comprising a browser;
   a database for storing information; and
   a server system adapted to be coupled to the client system and the database, the processor based-device being provided in the server system.

29. The electronic system of claim 27, wherein the processor-based device is a computer.

30. A computer program embodied on a non-transitional computer readable medium for evaluating and assessing a proposed electrical system in light of a promulgated industry standard, the program comprising:
   at least one code segment that receives user provided selections for devices utilized in a proposed electrical system, and, in response to the received selections;
      determines an output value of the proposed electrical system corresponding to the promulgated industry standard;
      displays the output value of the proposed electrical system for inspection by a user when a selection is received; and
      displays the proposed electrical system in a graphic format.

31. The computer program of claim 30, wherein the promulgated industry standard relates to a determination of a short circuit current rating for the proposed electrical system.

32. An electronic system for evaluating a short circuit current rating of multiple interconnected circuits, the system comprising:
   means for storing data relating to eligible circuit devices for a plurality of interconnected circuits;
   means for receiving a user provided circuit device selection;
   means for determining a short circuit current rating after each user provided circuit device selection is received; and
   means for communicating the short circuit current rating to a user after each user provided circuit device selection is received, wherein the means for communicating comprises a display screen utilizing a graphic format representing a layout of the plurality of interconnected devices.

33. The electronic system of claim 32, wherein the means for storing data, the means for receiving, the means for determining, and the means for communicating the short circuit current rating to a user are integrated into a single device.

34. The electronic system of claim 32, wherein the means for storing data, the means for receiving, the means for determining, and the means for communicating the short circuit current rating to a user are distributed in a networked-based computer system.

35. An electronic system for evaluating a proposed electrical product design having interconnected electrical circuit devices for compliance with a promulgated industry standard, the system comprising:
   a processor-based device adapted to:
      accept a plurality of data corresponding to one or more eligible circuit devices for a proposed product design;
      receive a plurality of user provided data and information regarding the proposed product design;
      selectively present the plurality of data to a user in a graphic format based on the plurality of user provided data and information; and
      apply the promulgated industry standard to the one or more eligible circuit devices selected by the user from the accepted plurality of data.

36. The electronic system of claim 35, wherein the processor-based device comprises a computer.

37. The electronic system of claim 35, wherein the processor-based device comprises a server in a networked-based computer system.

38. The system of claim 35, wherein the promulgated industry standard relates to a determination of a short circuit current rating for the interconnected electrical circuit devices in the proposed electrical product design.

39. The system of claim 38, wherein the short circuit current rating is determined with each selection of an eligible circuit device by the user.

40. The system of claim 35 wherein the promulgated industry standard is applied with each selection of an eligible circuit device by the user.

\* \* \* \* \*